(12) United States Patent
Trans

(10) Patent No.: US 6,377,640 B2
(45) Date of Patent: *Apr. 23, 2002

(54) MEANS AND METHOD FOR A SYNCHRONOUS NETWORK COMMUNICATIONS SYSTEM

(75) Inventor: Francois Trans, Los Altos, CA (US)

(73) Assignee: Stanford Syncom, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,383

(22) Filed: Jul. 31, 1998

Related U.S. Application Data

(60) Provisional application No. 60/054,415, filed on Jul. 31, 1997, provisional application No. 60/054,406, filed on Jul. 31, 1997, provisional application No. 60/085,605, filed on May 15, 1998, and provisional application No. 60/089,526, filed on Jun. 15, 1998.

(51) Int. Cl.[7] ................................................. H04B 1/00
(52) U.S. Cl. ........................ 375/354; 370/286; 370/289
(58) Field of Search ............................... 375/354, 355, 375/356; 370/503, 286, 299; 348/500; 358/409

(56) References Cited

U.S. PATENT DOCUMENTS

| | | | | |
|---|---|---|---|---|
| 4,630,217 A | * | 12/1986 | Smith et al. ................ 702/124 |
| 4,648,060 A | * | 3/1987 | Allen et al. ................. 708/845 |
| 4,905,282 A | | 2/1990 | McGlynn et al. ............. 380/48 |
| 5,111,208 A | * | 5/1992 | Lopez ......................... 342/174 |
| 5,162,723 A | | 11/1992 | Marzalek et al. .......... 324/77 B |
| 5,541,955 A | | 7/1996 | Jacobsmeyer ............... 375/222 |
| 5,550,810 A | | 8/1996 | Monogiousdis et al. ...... 370/18 |
| 5,625,651 A | | 4/1997 | Cioffi ......................... 375/354 |
| 5,754,352 A | * | 5/1998 | Behrens et al. ............ 375/354 |
| 5,787,363 A | | 7/1998 | Scott et al. ................ 455/557 |
| 5,841,667 A | | 11/1998 | Martin .................. 364/551.01 |
| 5,930,267 A | * | 7/1999 | Daneshrad et al. ......... 375/355 |

OTHER PUBLICATIONS

Per Lindgren; *A Multi–Channel Network Architecture Based On Fast Circuit Switching*; May 1996; Kungel Teknisha Högskolan Royal Institue of Technology; pp. i–180.

* cited by examiner

Primary Examiner—Chi Pham
Assistant Examiner—Kevin M Burd
(74) Attorney, Agent, or Firm—Fenwick & West LLP

(57) ABSTRACT

Nodes on a network are synchronized with each other using a clock transfer system. The communications channels between the nodes are then measured and calibrated for optimal bandwidth. The optimized channels and synchronization enables a new form of signaling based on precise control of the frequency, amplitude, and phase of the waveform of the signal. Receiving nodes receive information in order to locate the signal at the appropriate frequency, phase and amplitude. Precision control of these parameters also servers as a unique signature of the transmitting node preventing security breaches as the signal's characteristic are unique to the transmitting node. The channel is continuously updated with a precision control system to insure that the nodes are not out of phase.

4 Claims, 77 Drawing Sheets

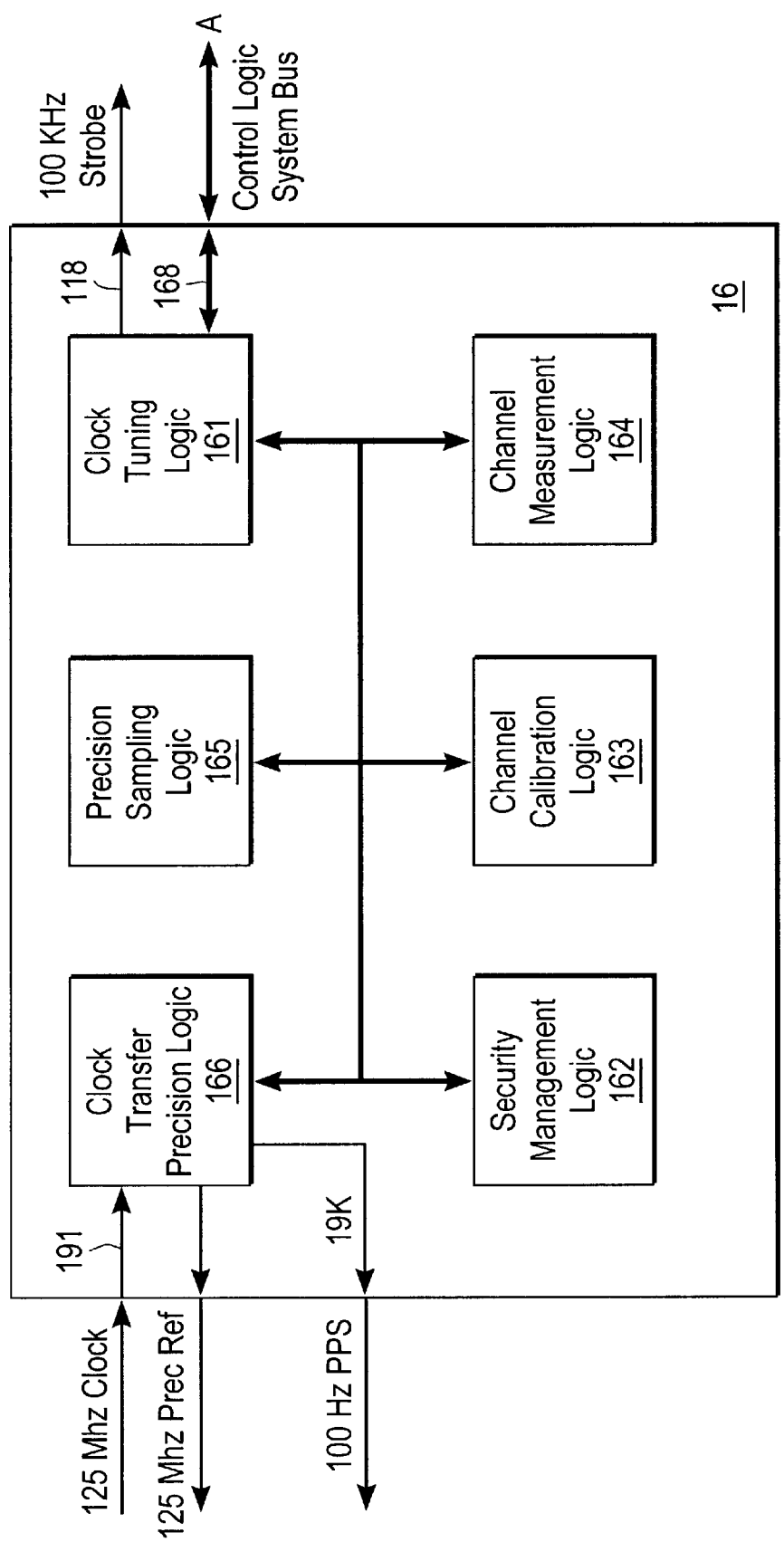
Figure 1A Com2000™ Control Logic

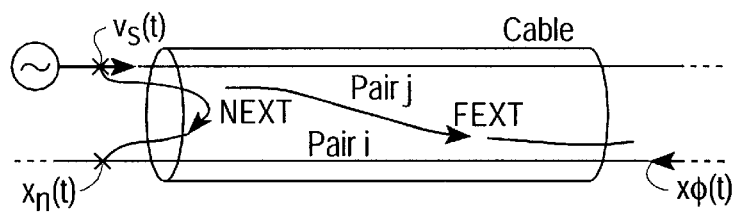
Figure 1B-1
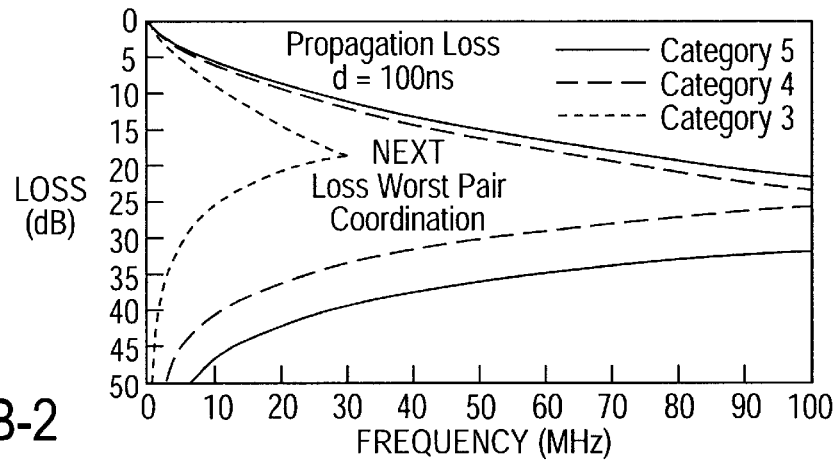
Figure 1B-2
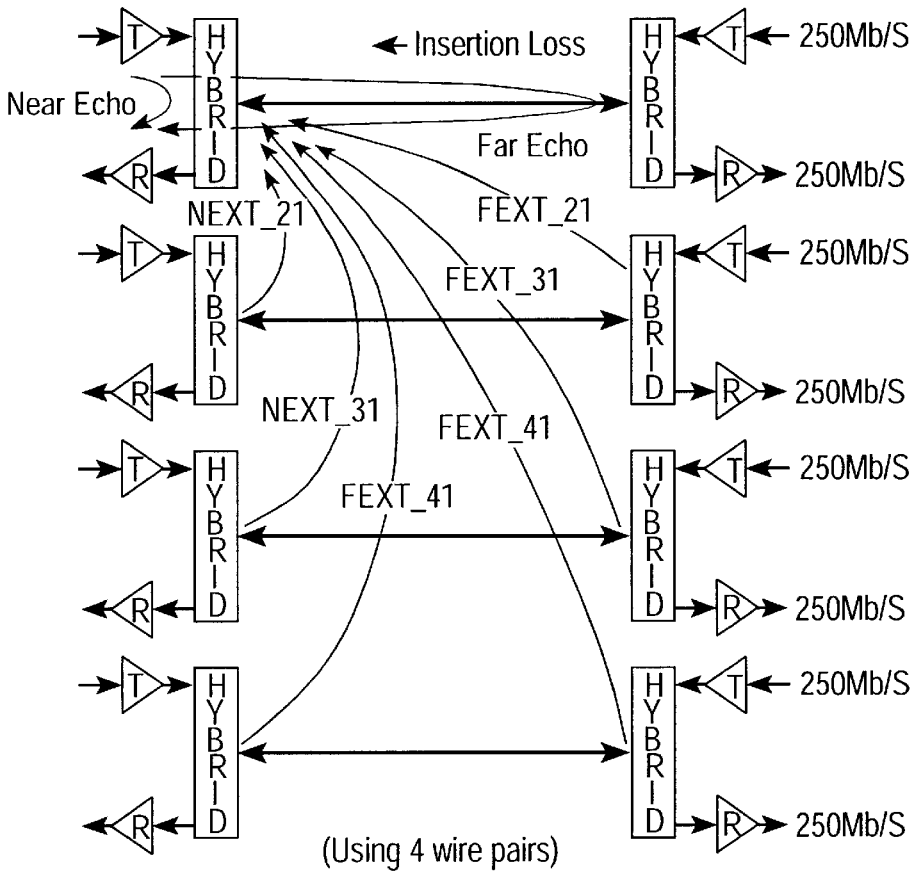
Figure 1B-3  Gigabit Ethernet over CAT-5 Cable

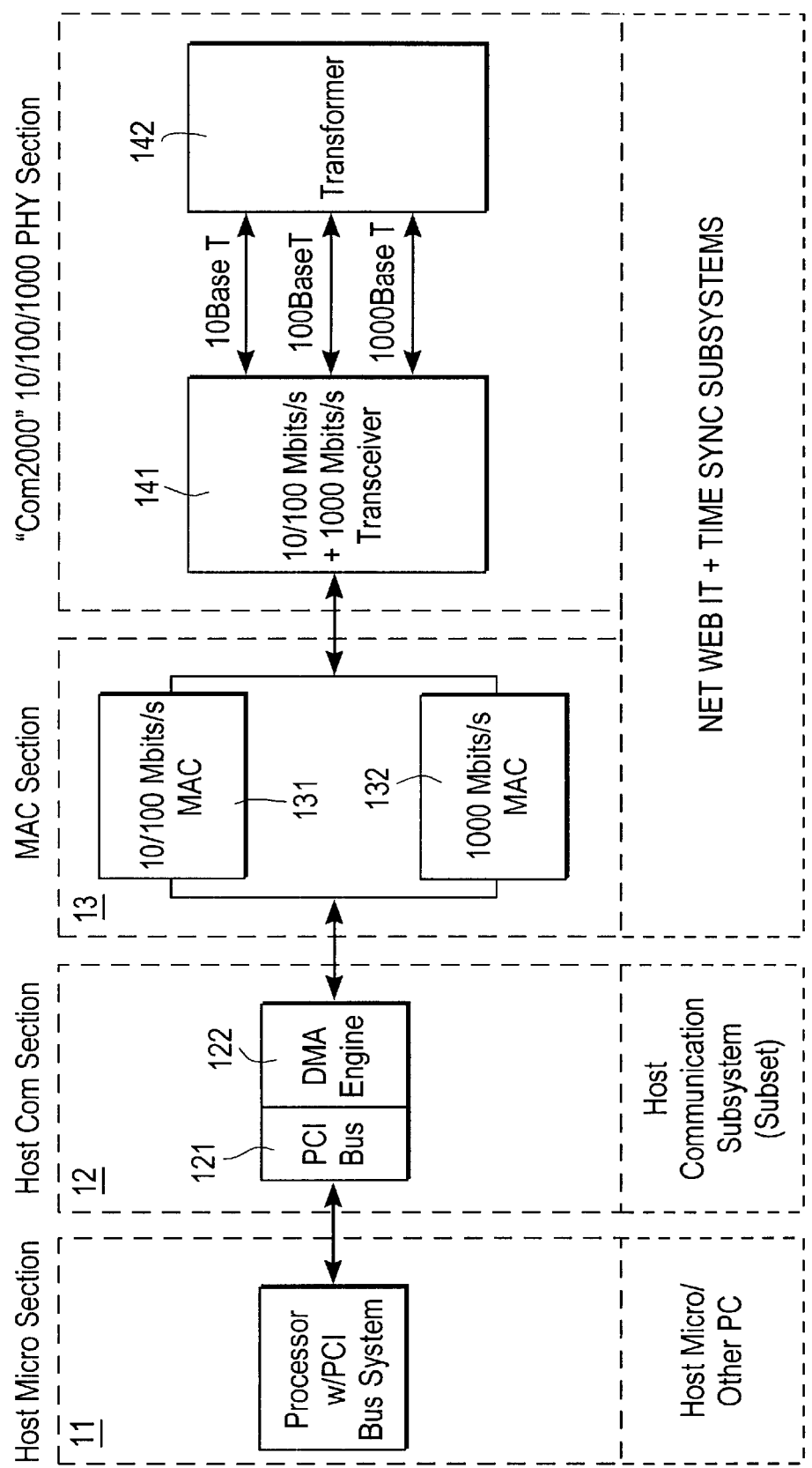
Figure 1C "ITSync" Gigabit Ethernet System Overview

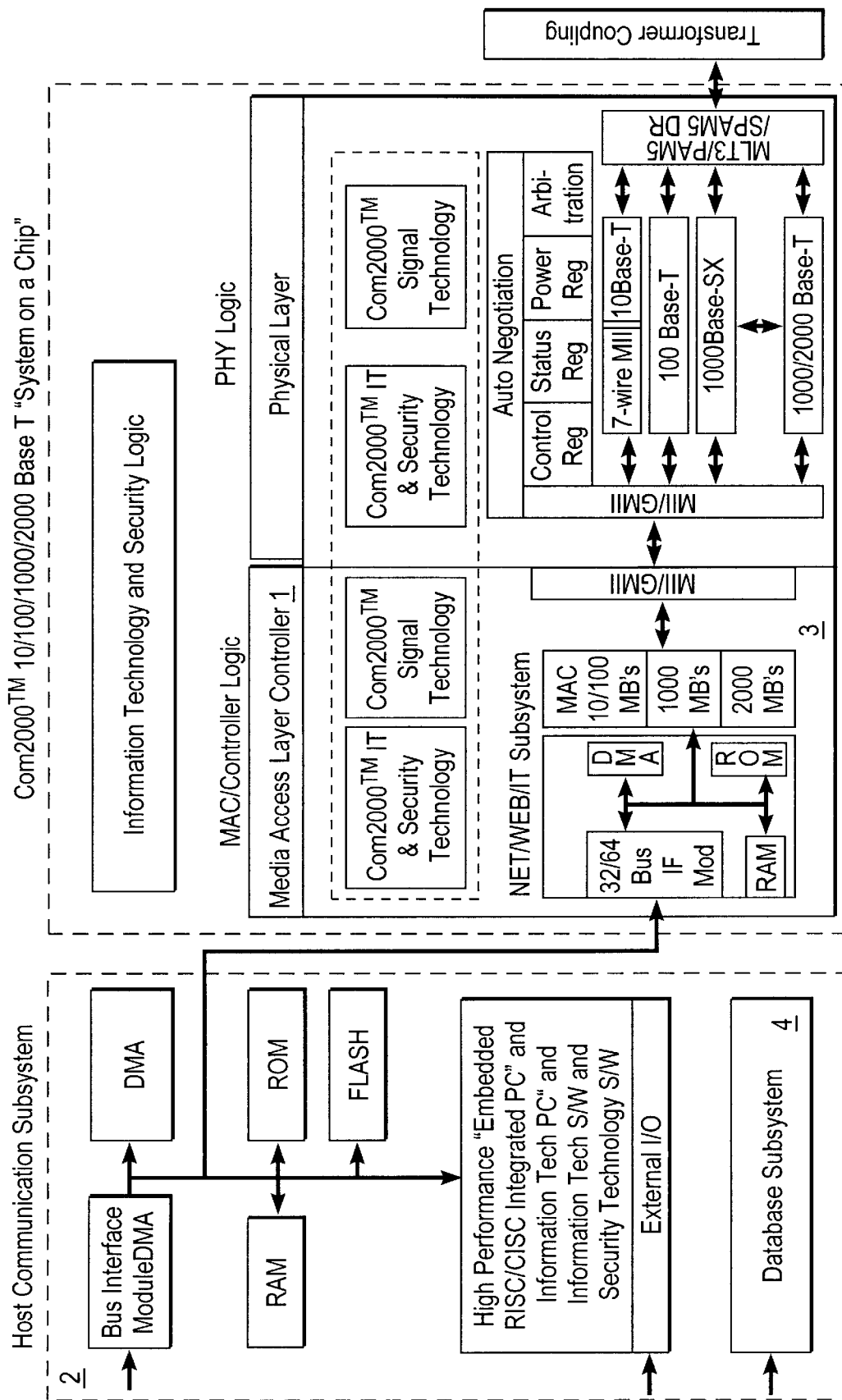
Figure 1D Com2000™ ITSync System Archetecture

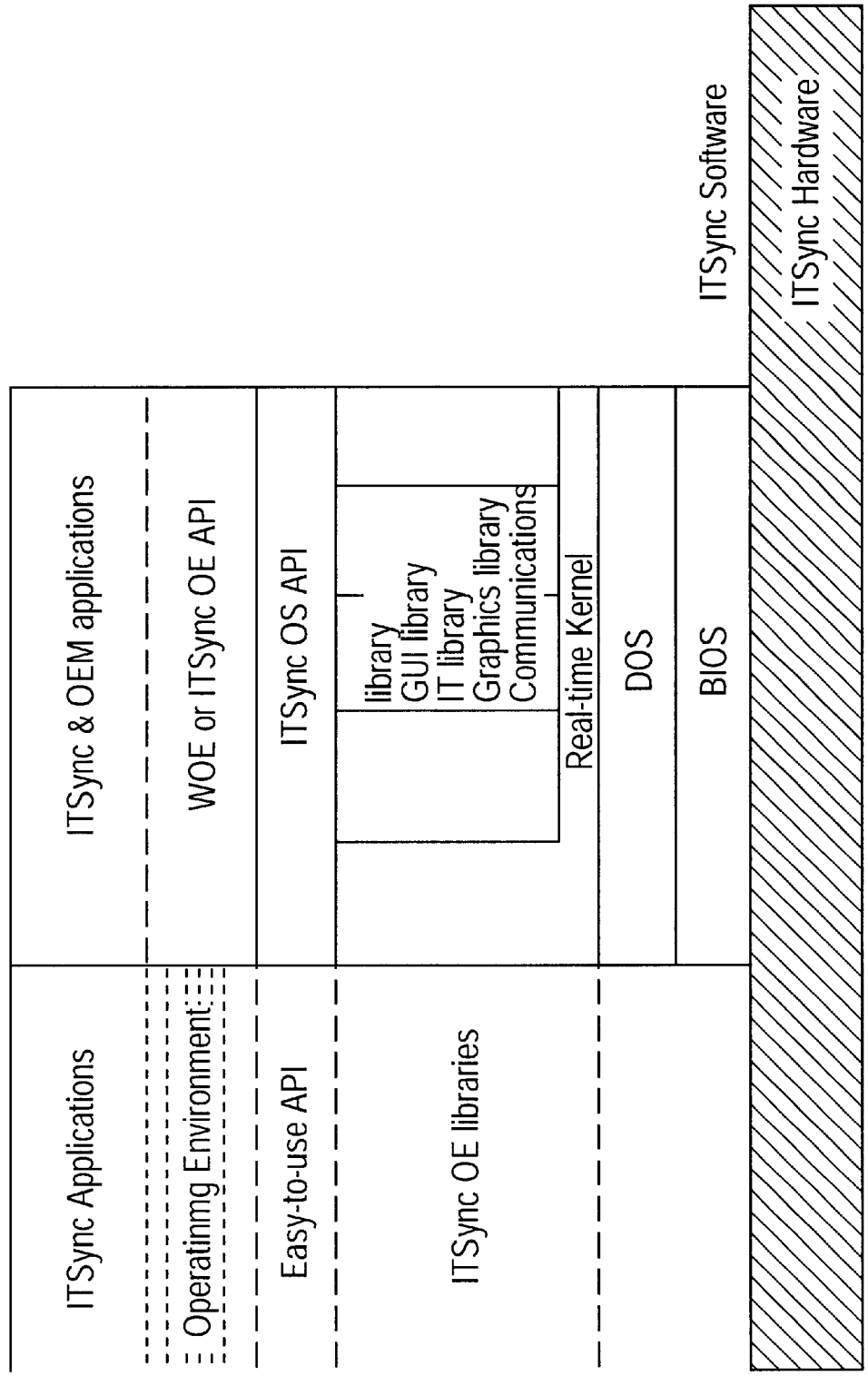
Figure 1E ITSync Software Architecture

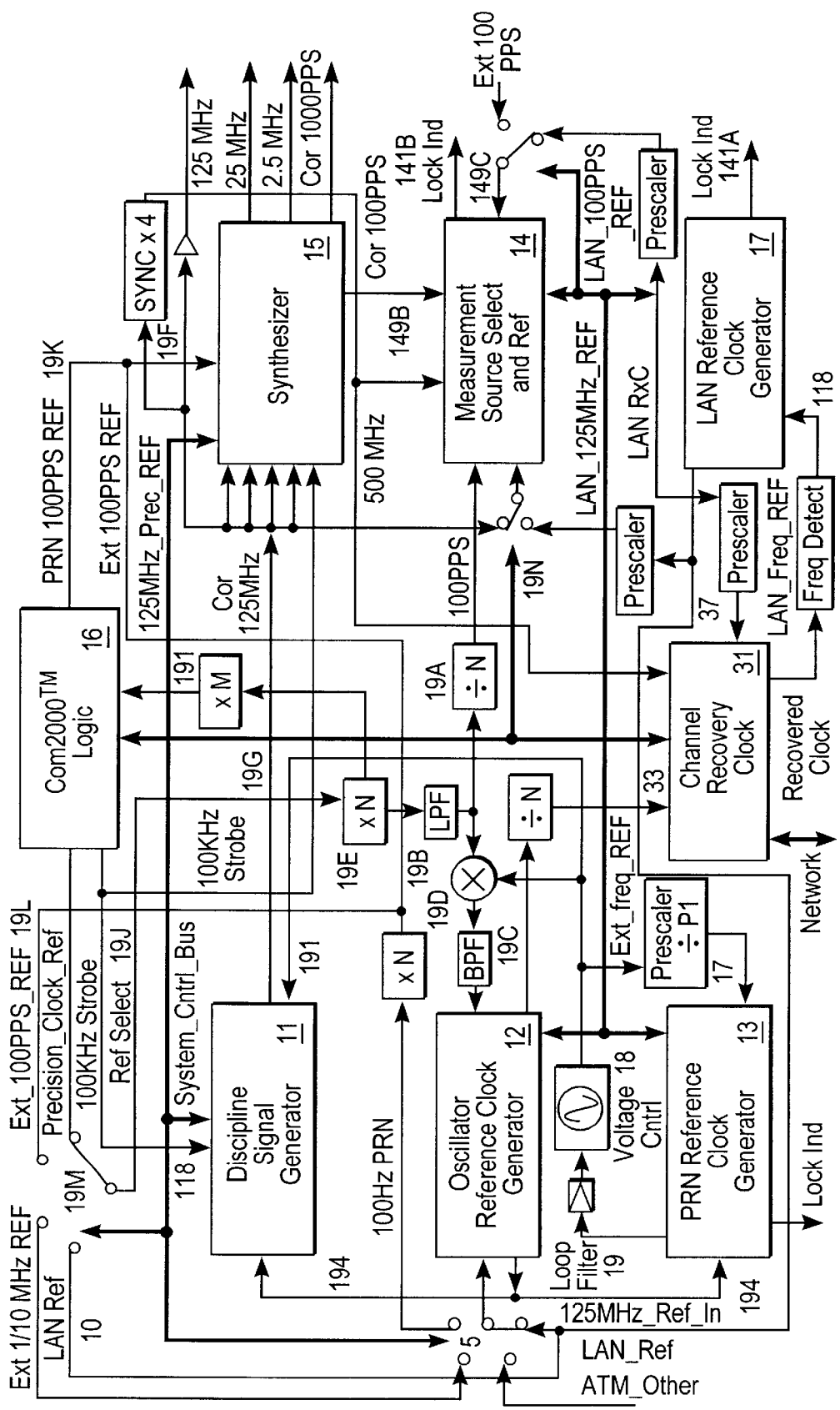
Figure 1I Com2000™ Subsystem Block Diagram

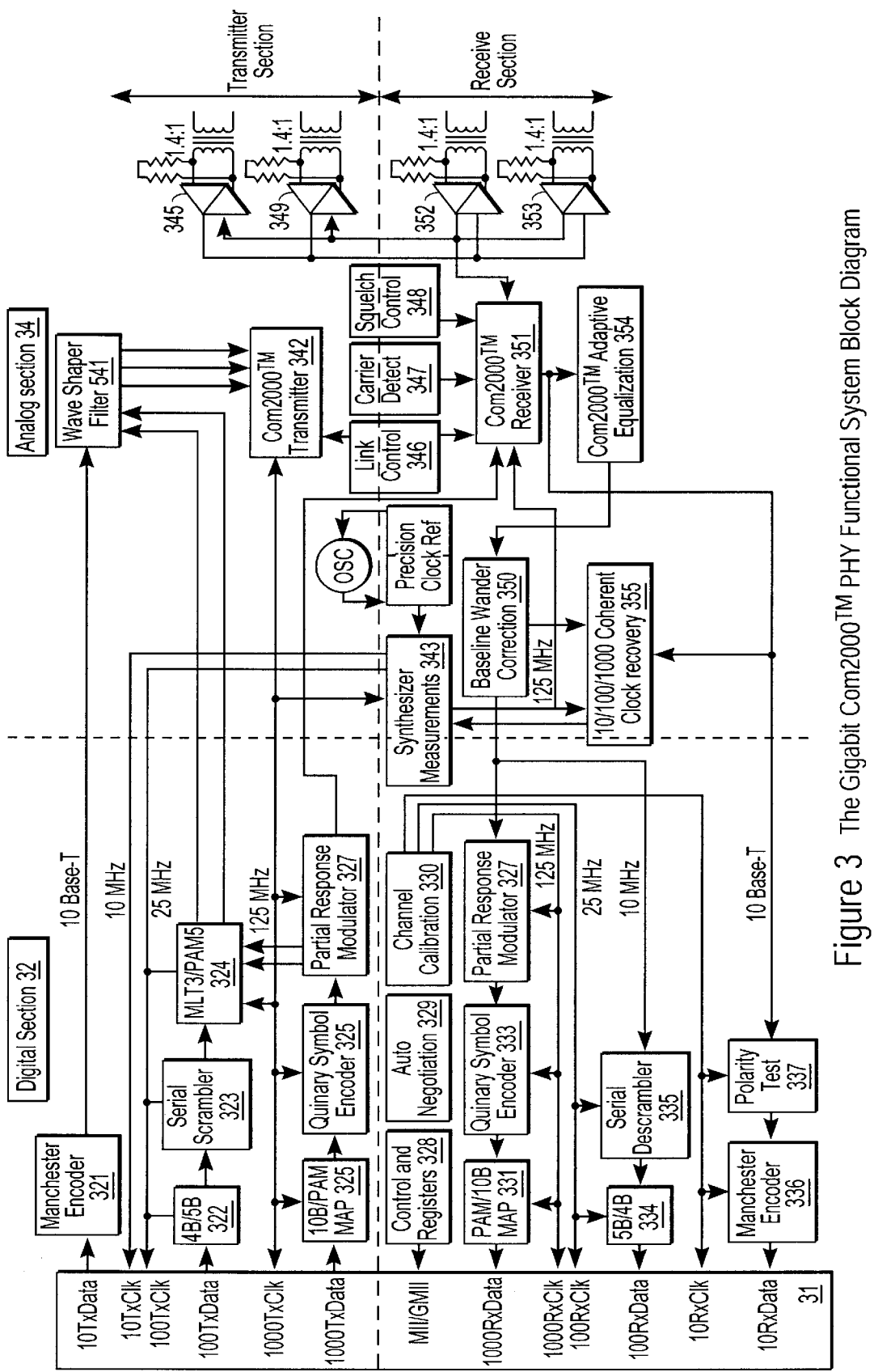
Figure 3 The Gigabit Com2000™ PHY Functional System Block Diagram

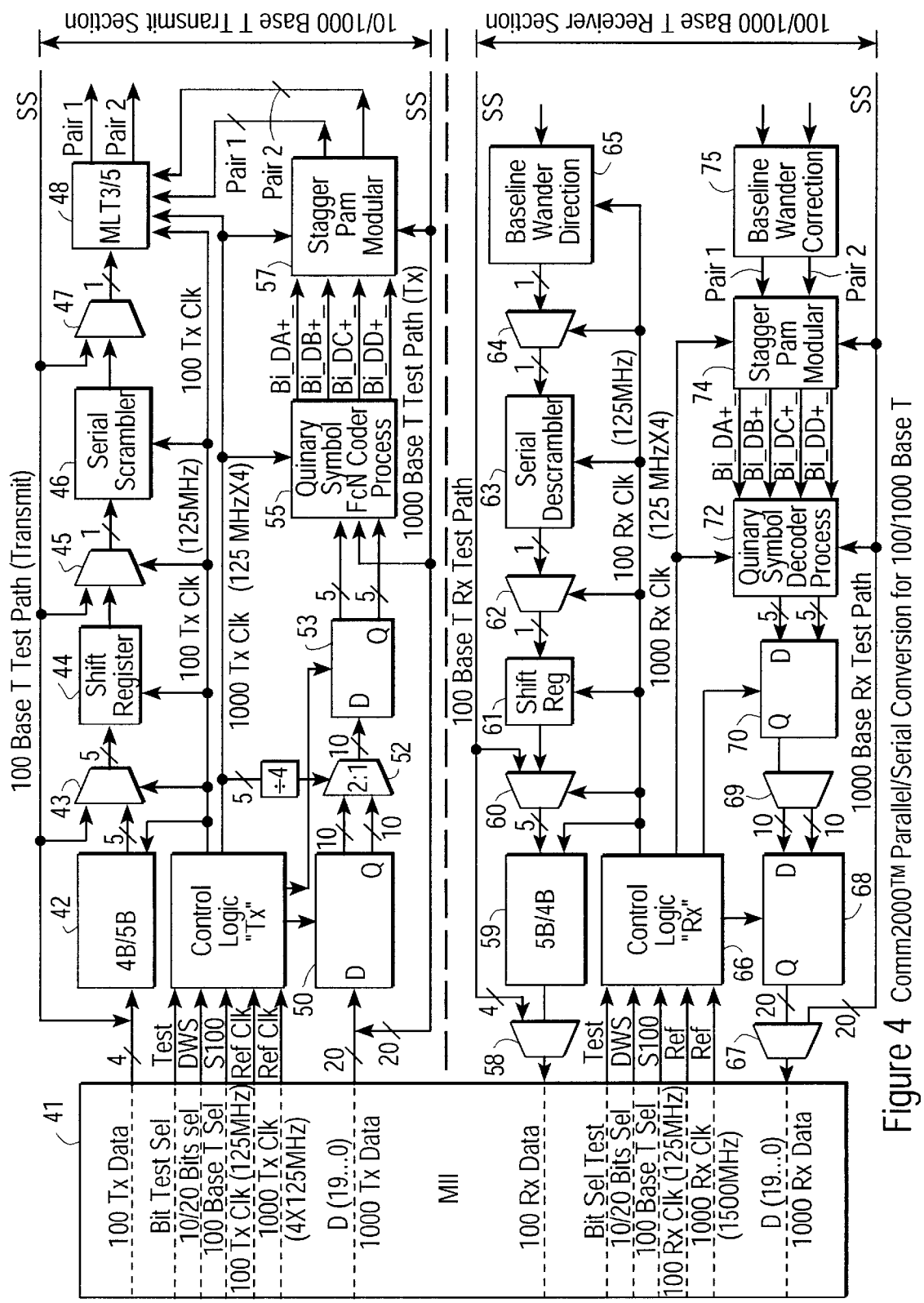
Figure 4 Comm2000™ Parallel/Serial Conversion for 100/1000 Base T

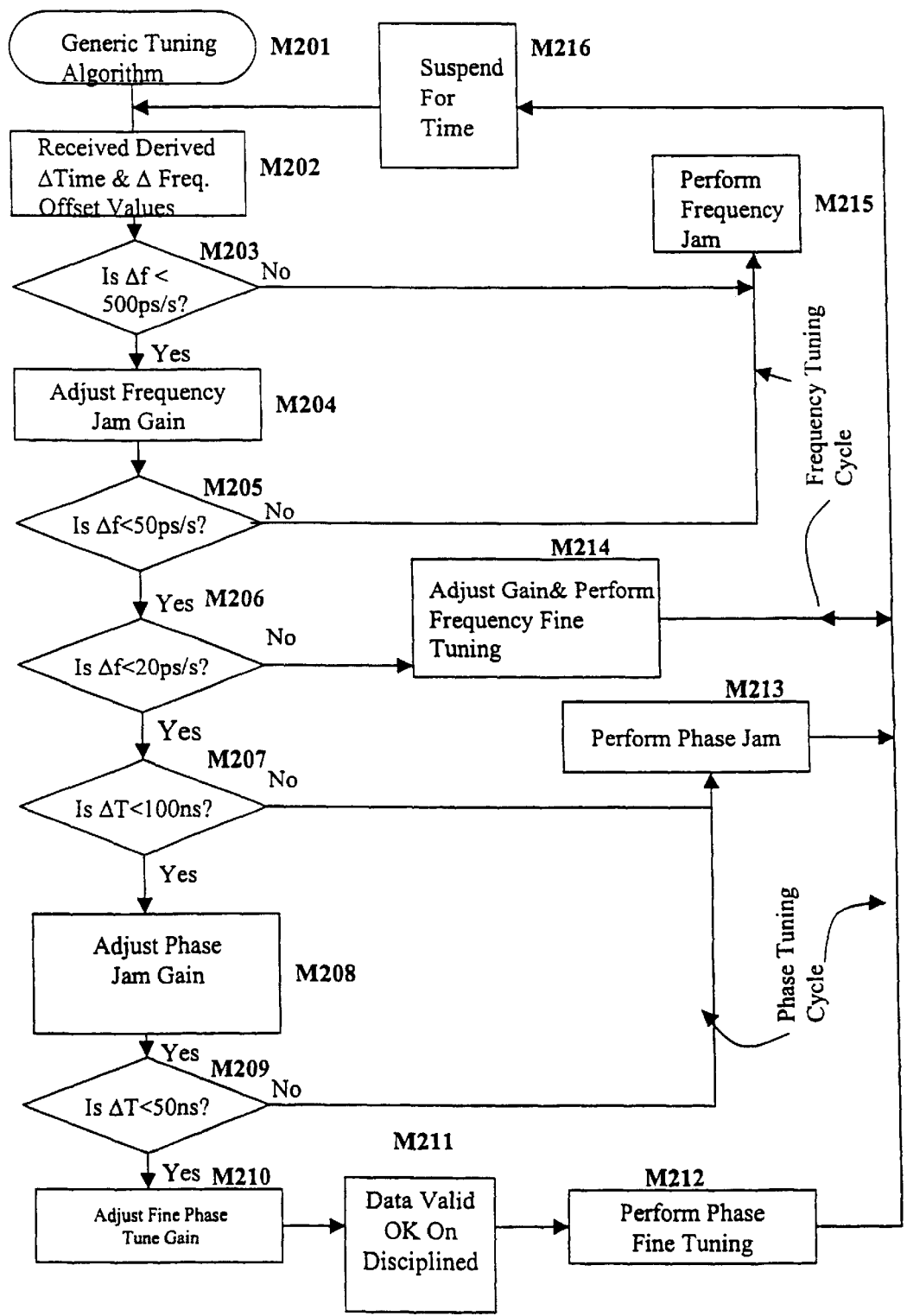
Figure 5a. Generic Tuning Algorithm.

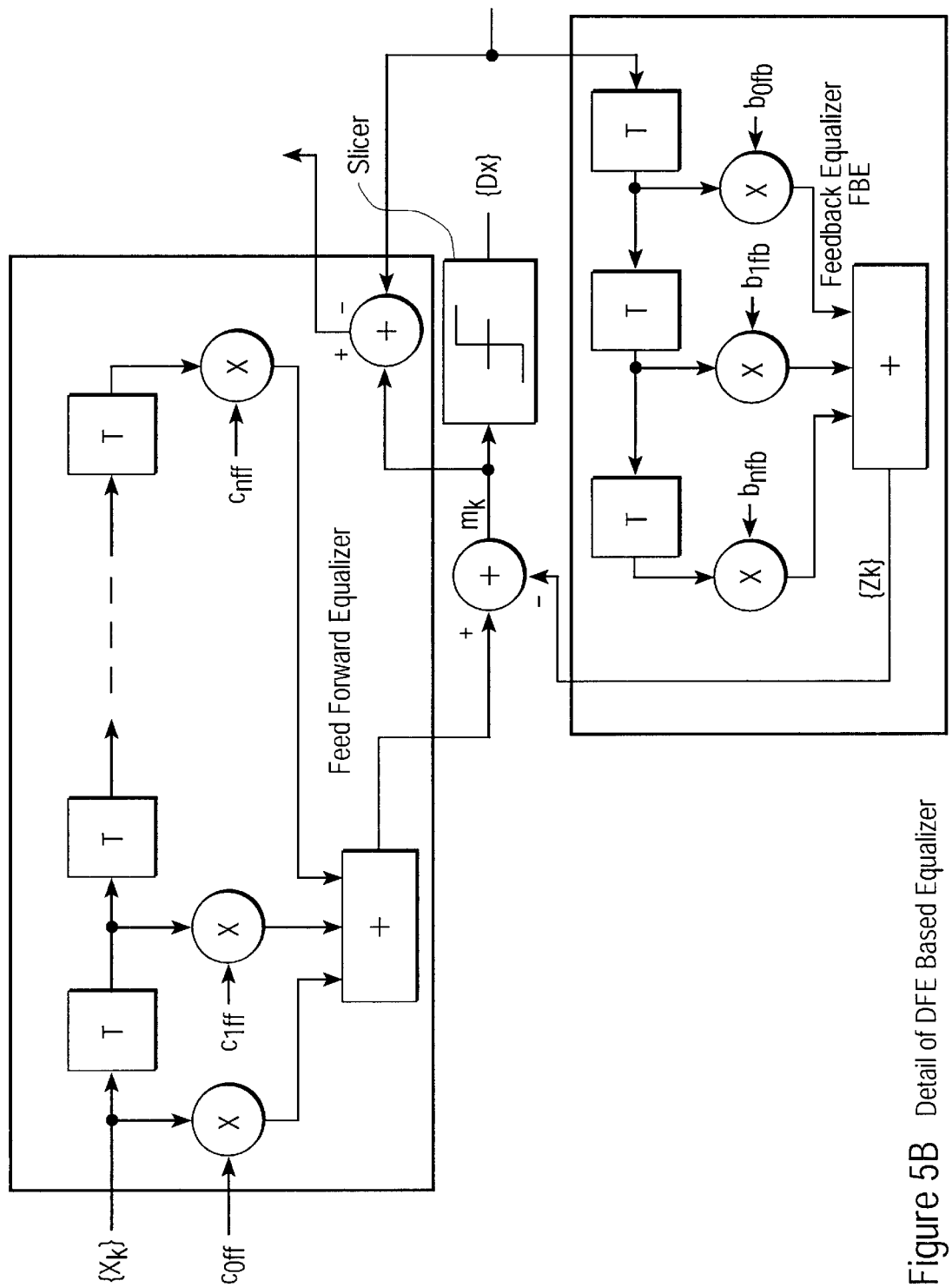
Figure 5B  Detail of DFE Based Equalizer

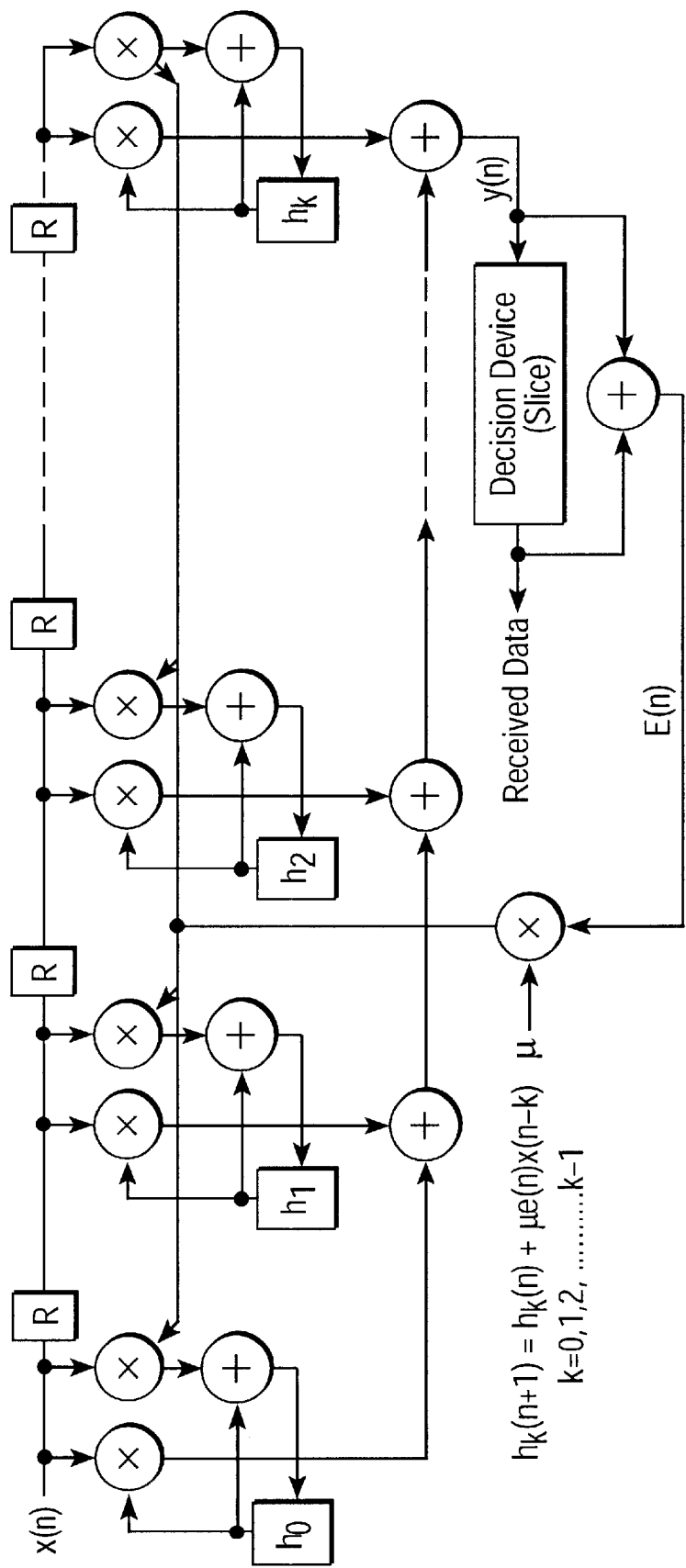
Figure 5C  LinearEqualizer with LMS Update

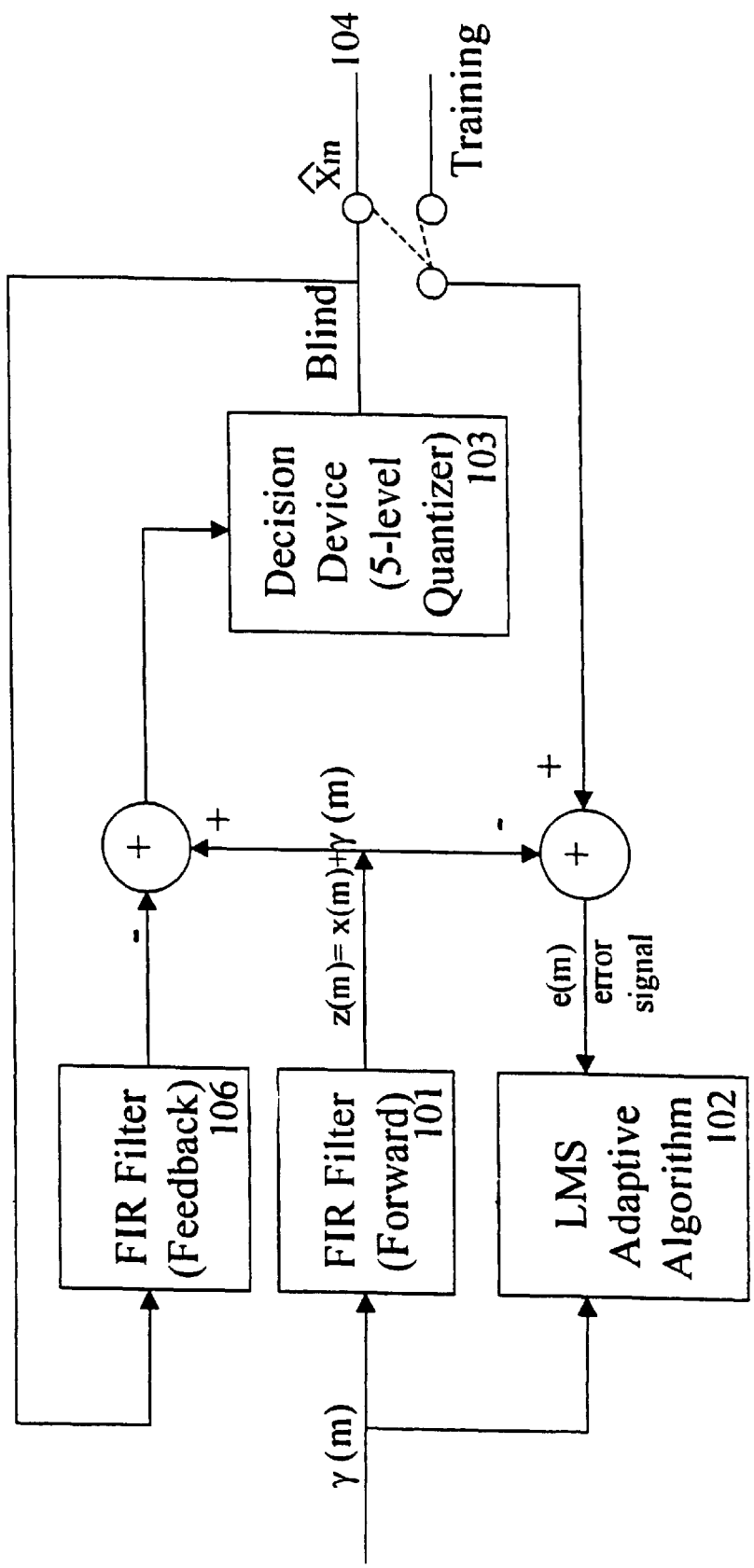
Figure 5d. Com2000™ LMS Adaptive Equalizer

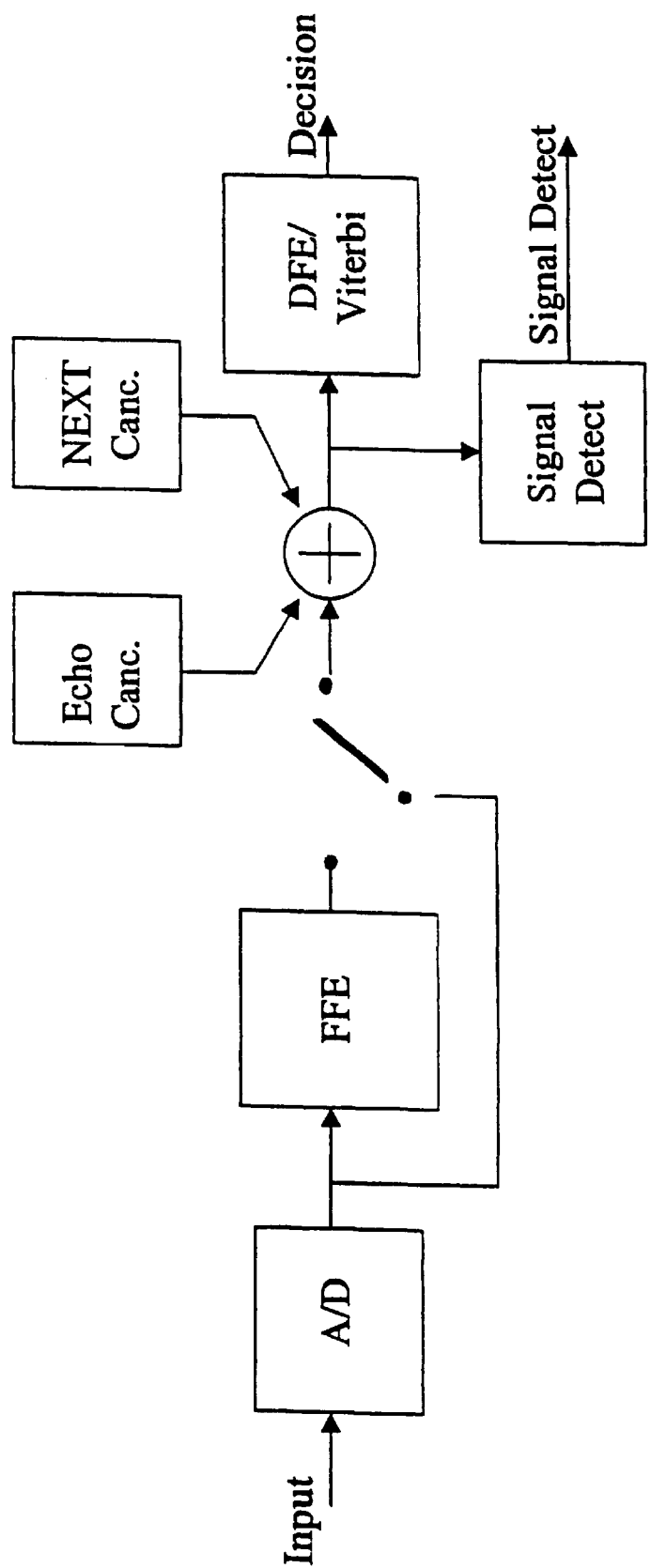
Figure 5e. Signal Detection In a Noisy Environment

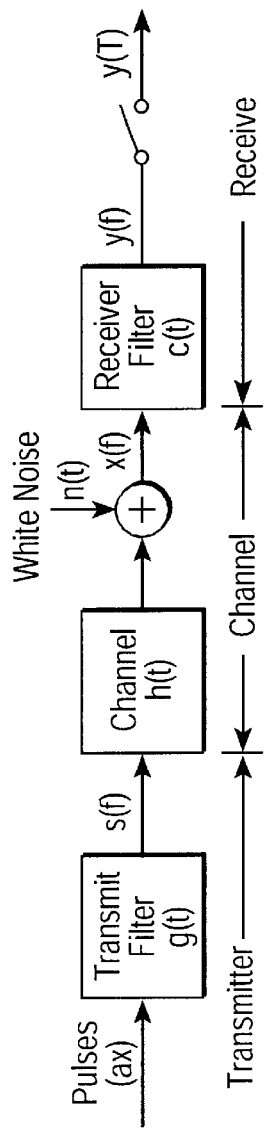
Figure 6-1
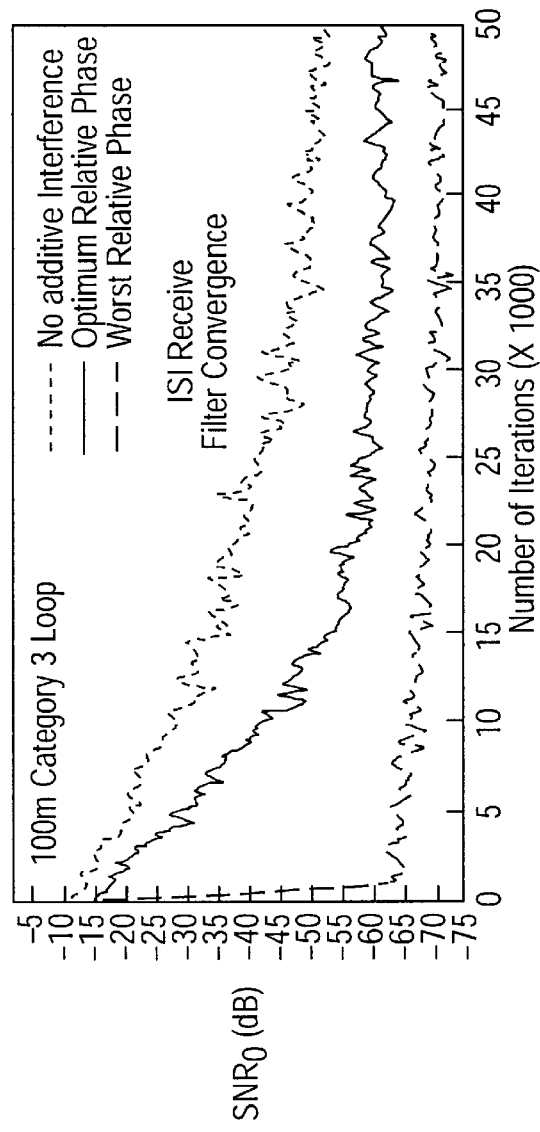
Figure 6-2 Intersymbol Interference

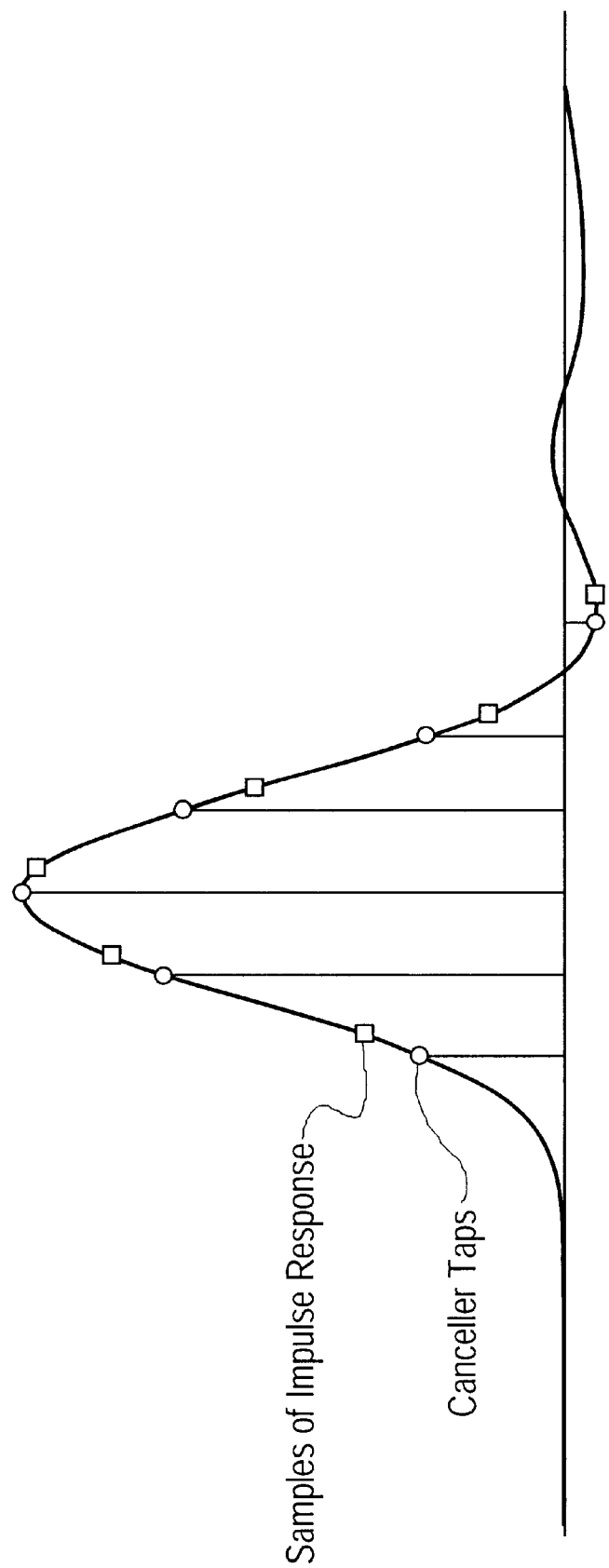
Figure 6A Echo and NEXT CANCELLER PERFORMANCE

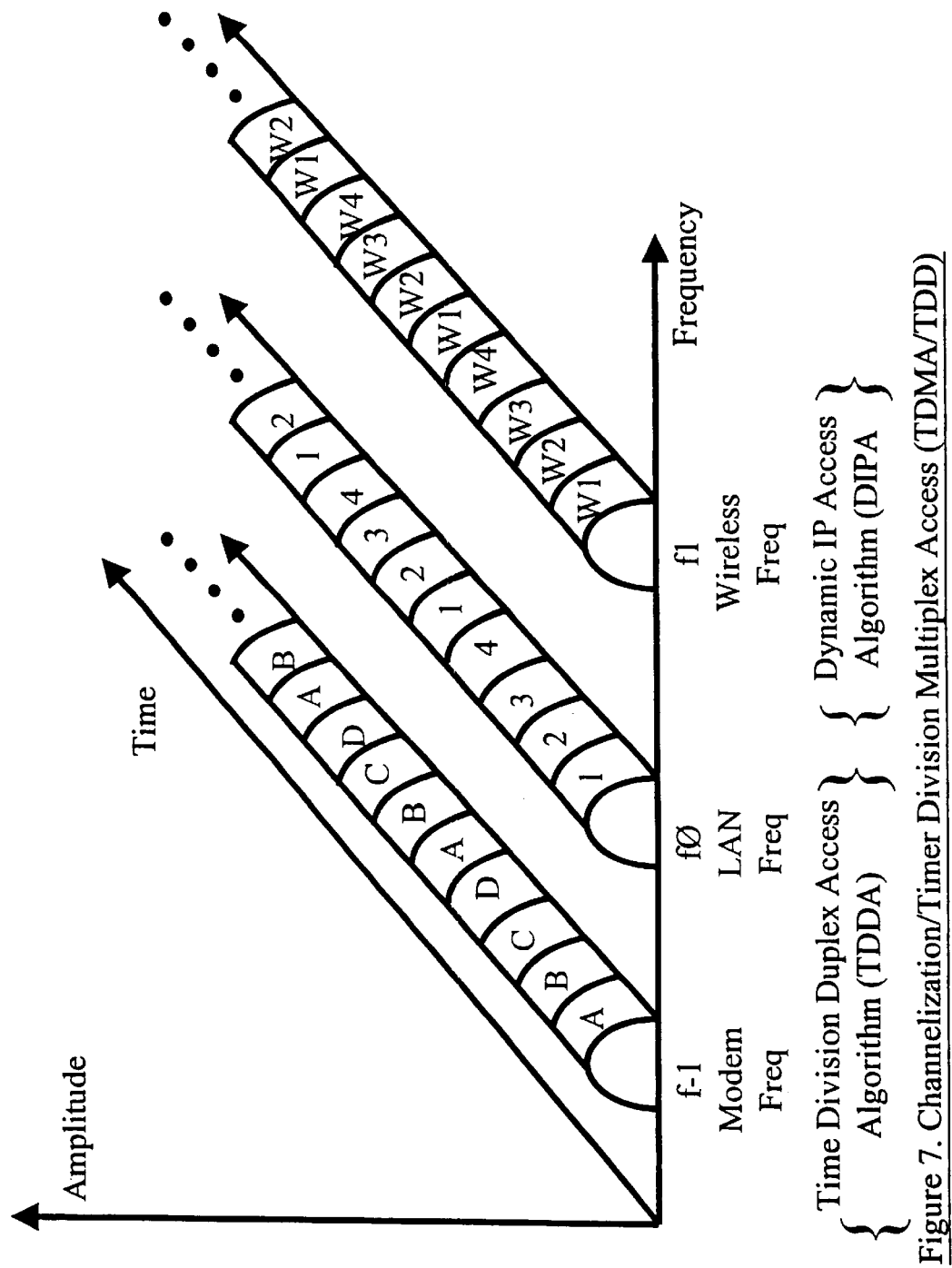
Figure 7. Channelization/Timer Division Multiplex Access (TDMA/TDD)

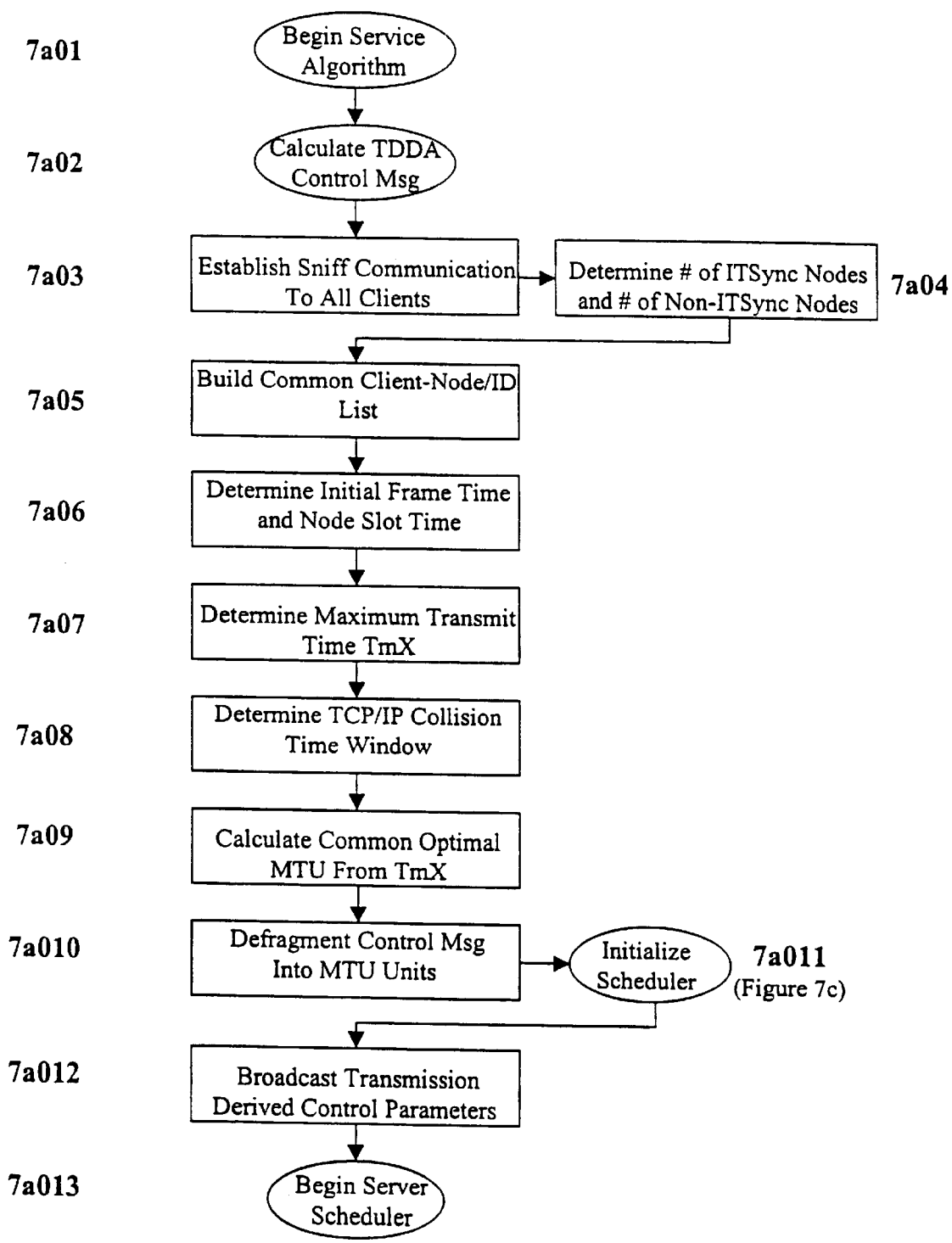
Figure 7a0. TDDA Algorithm

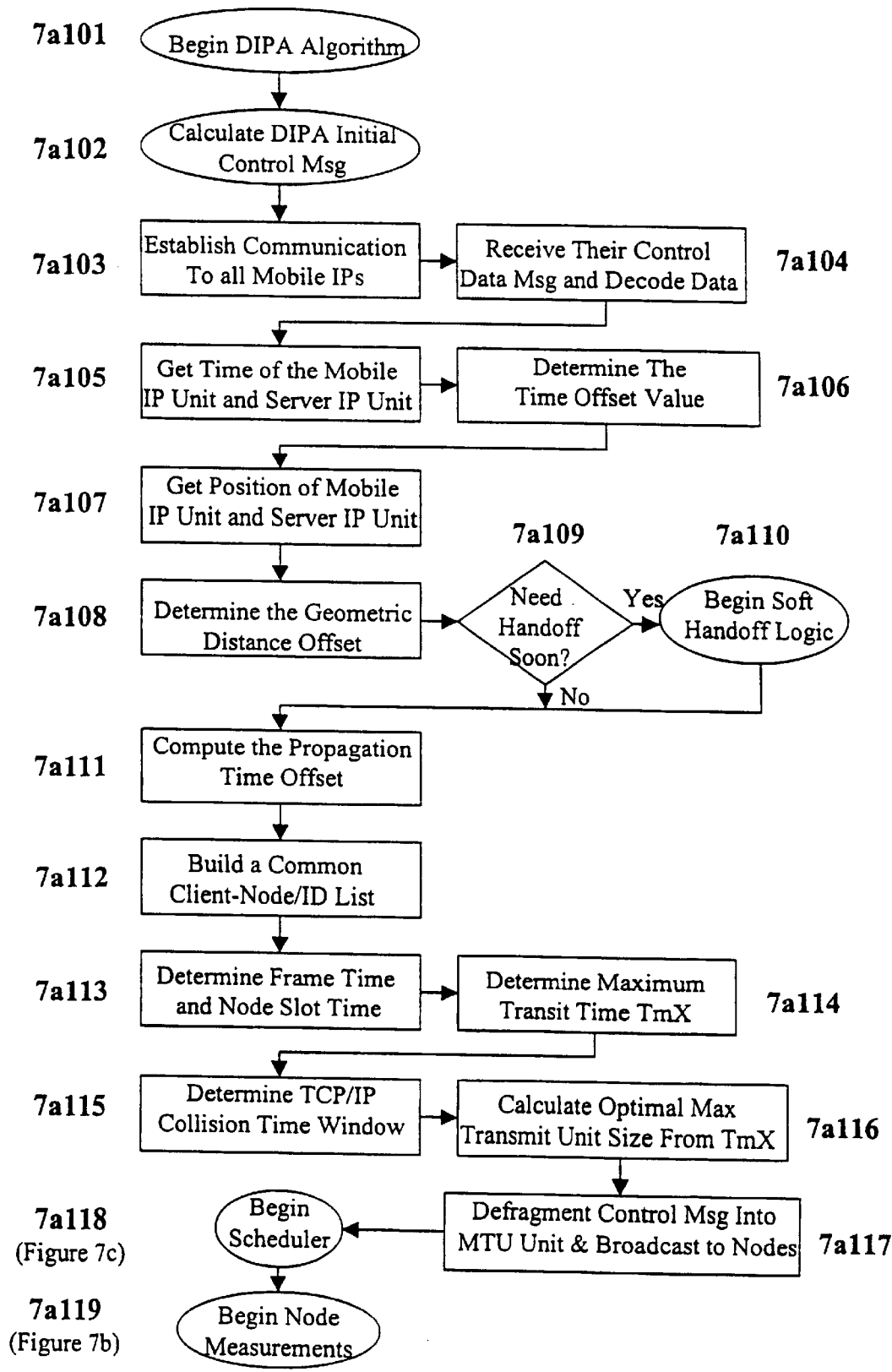
Figure 7a1. DIPA Algorithm

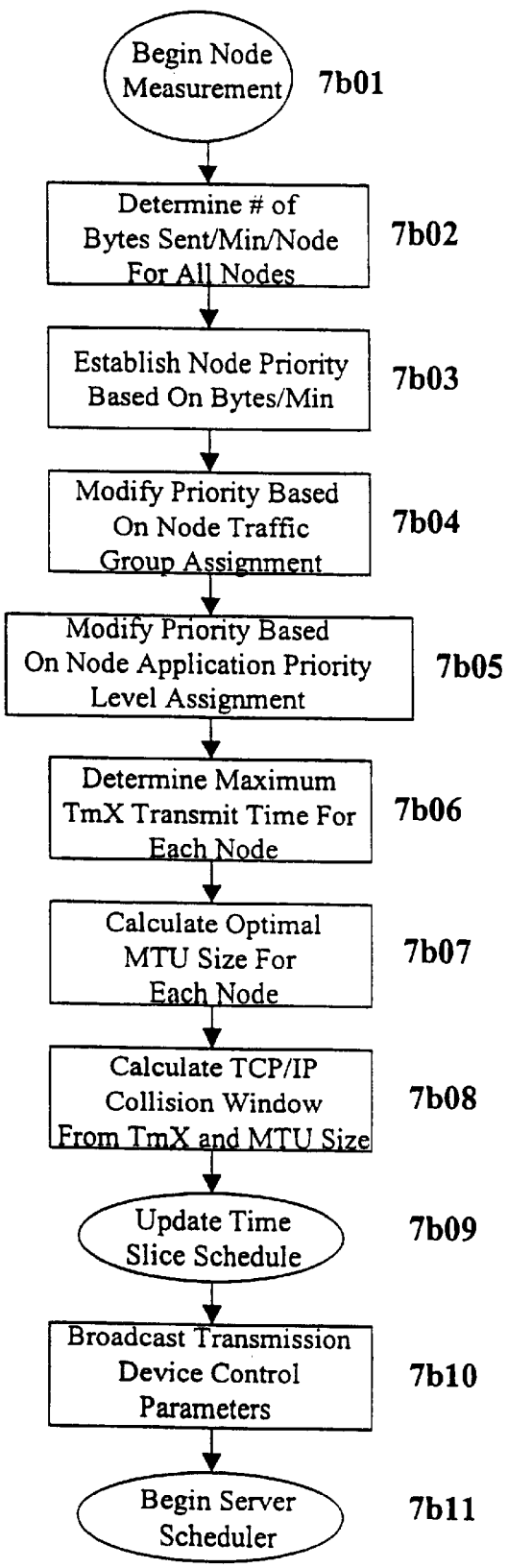
Figure 7b. DIPA/TDPA Algorithm

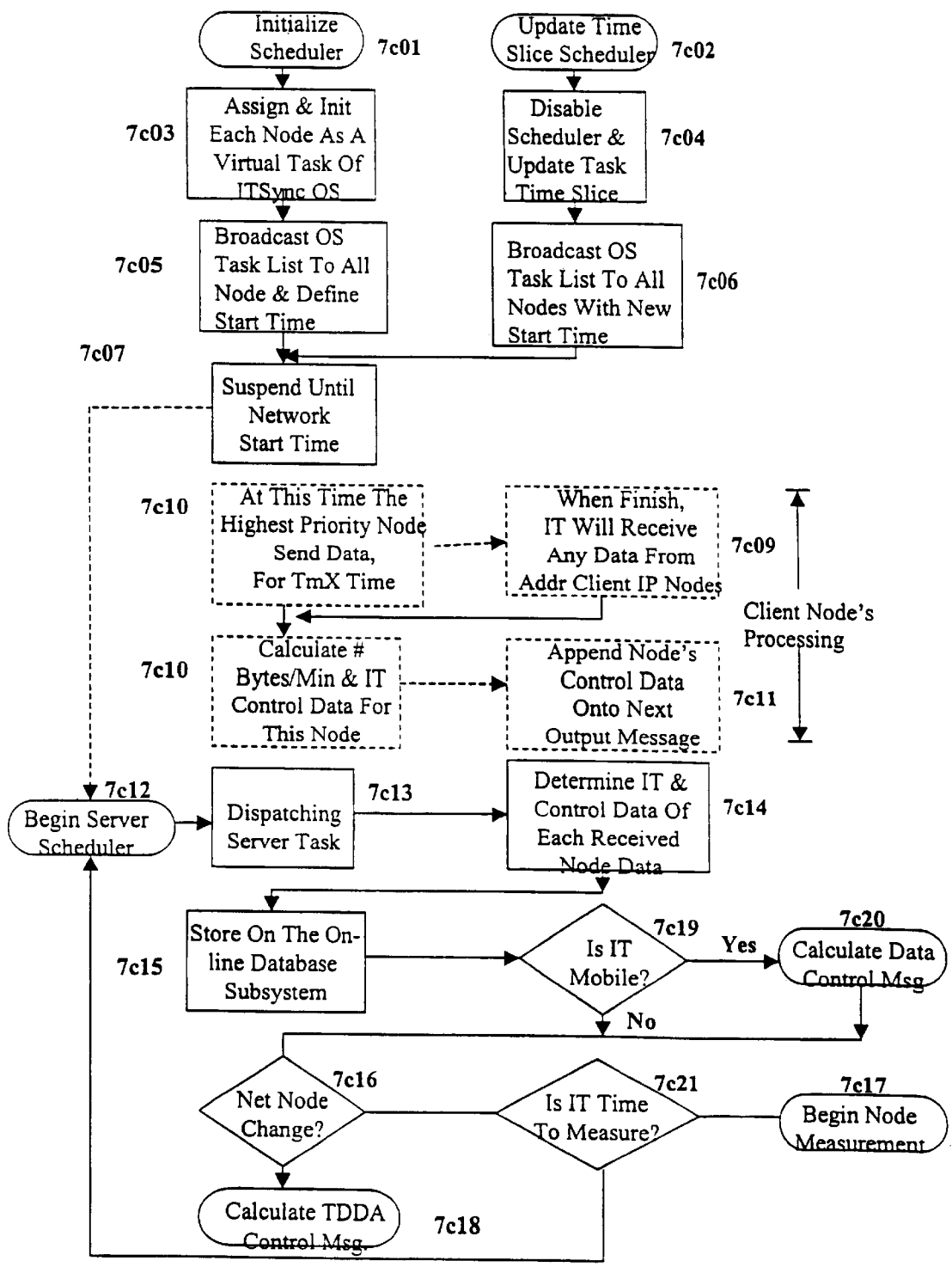
Figure 7c. DIPA/TDDA ALGORITHM

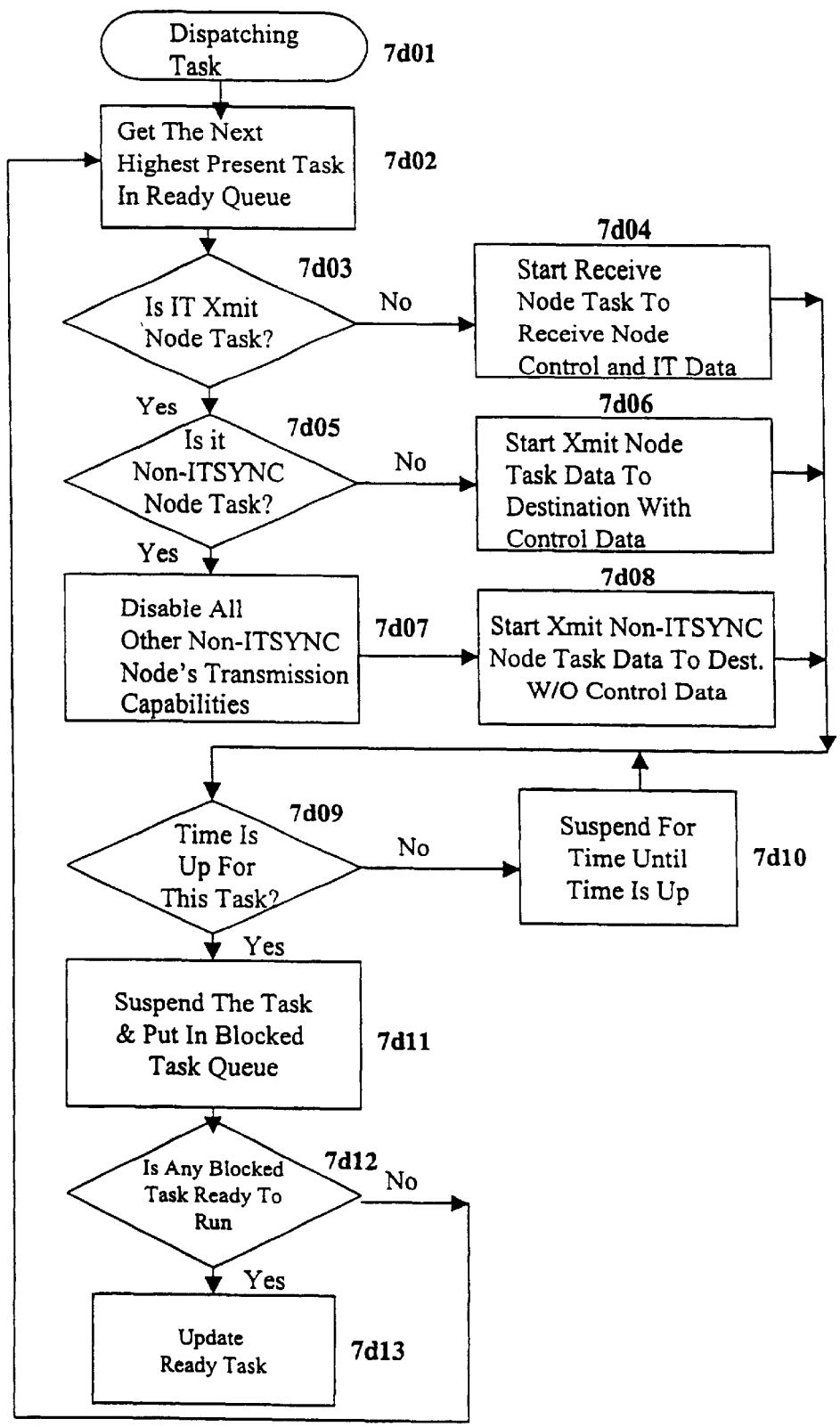
Figure 7d. DIPA/TDDA Algorithm

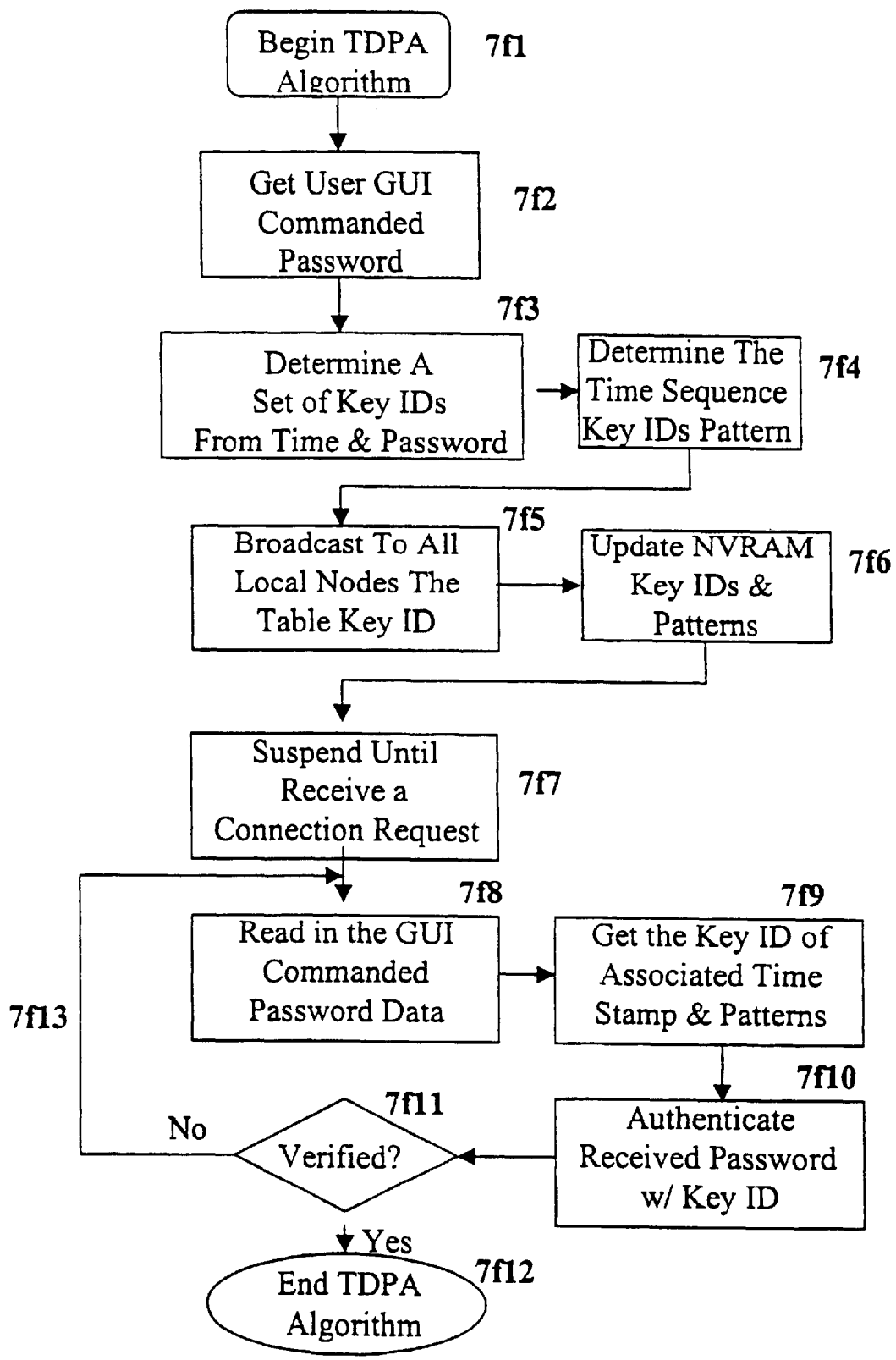
Figure 7f. TDPA Algorithm

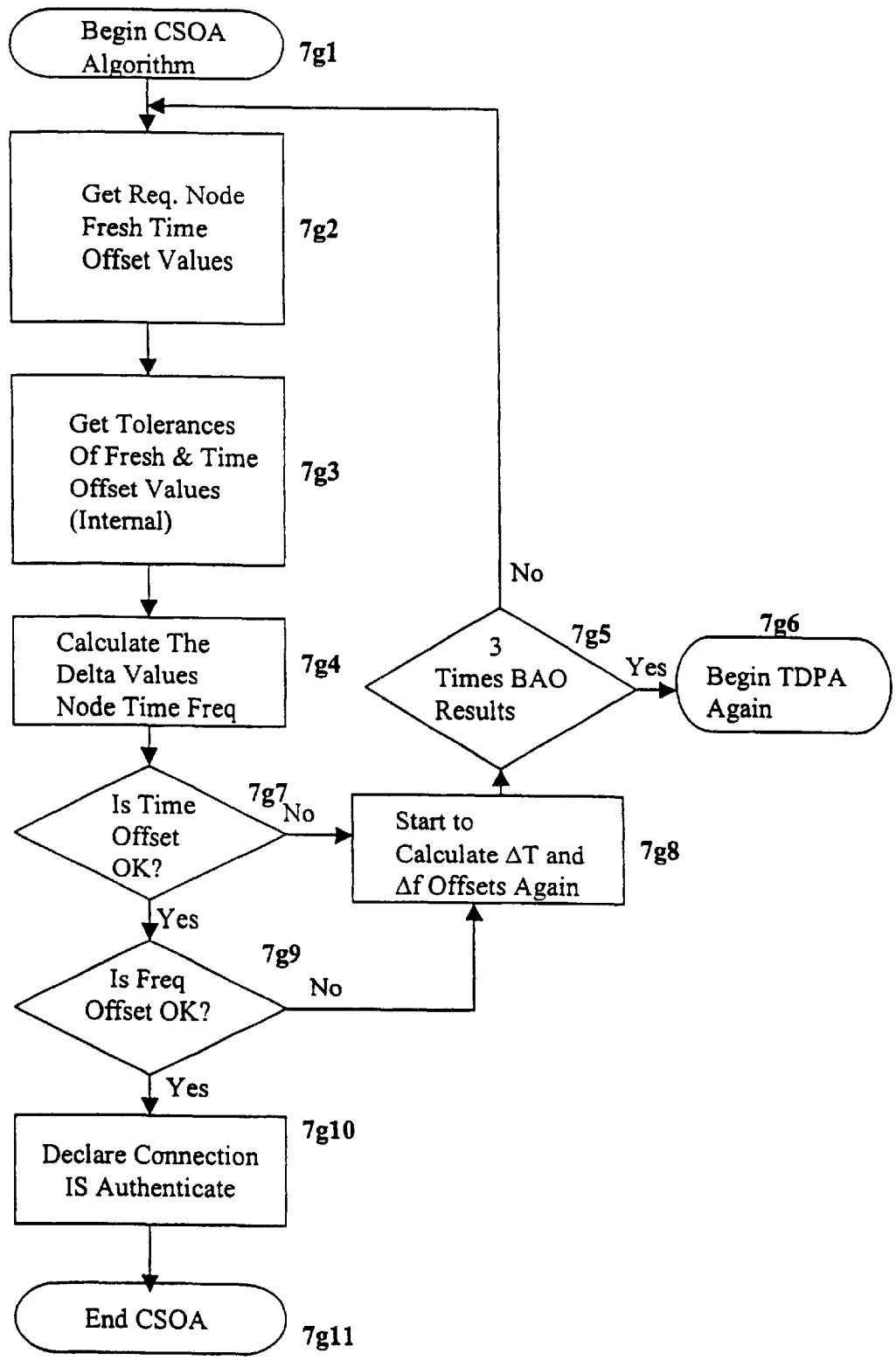
Figure 7g. CSOA Algorithm.

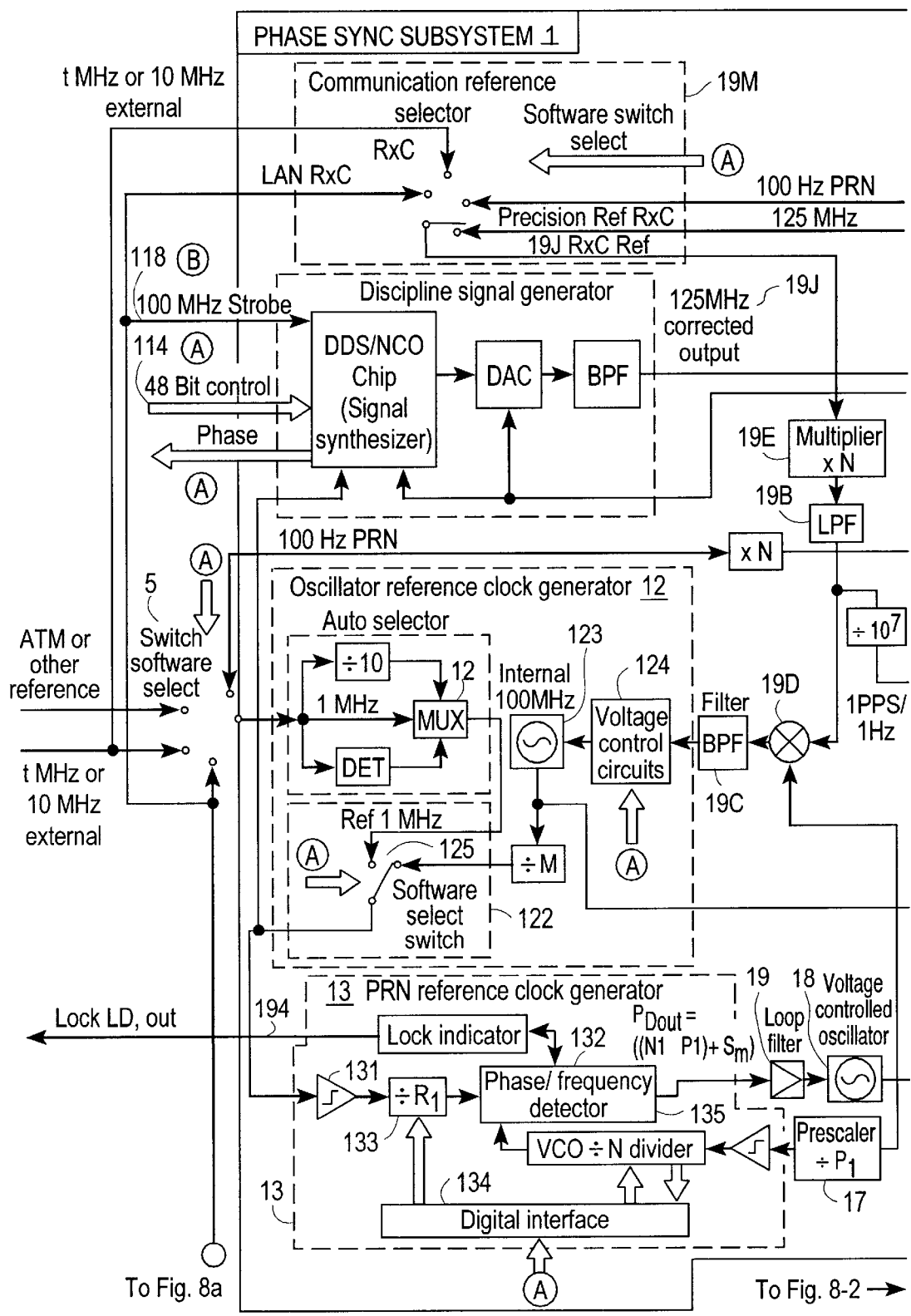
Figure 8-1 Comm2000™ System Block Diagram

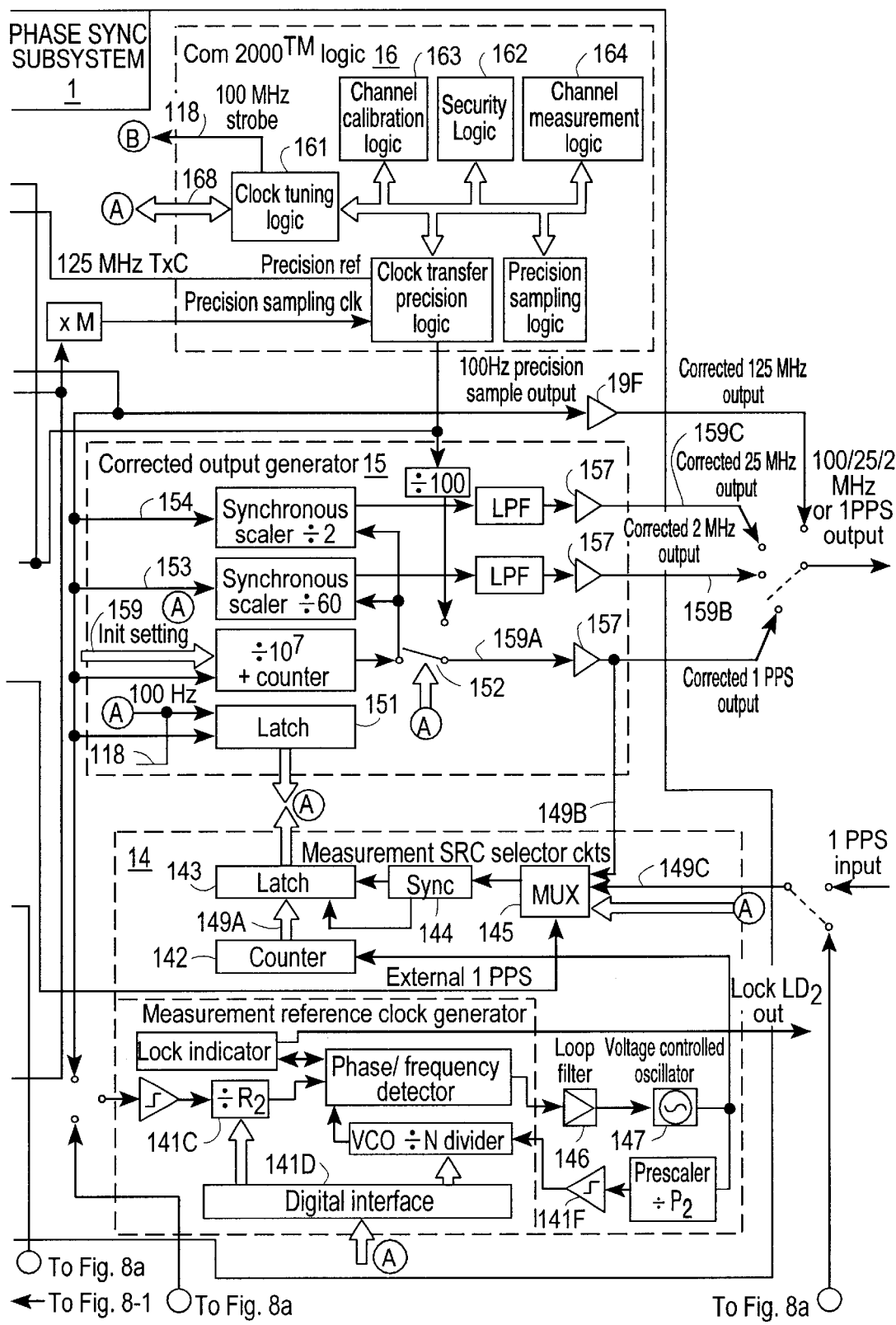
Figure 8-2 Comm2000™ System Block Diagram

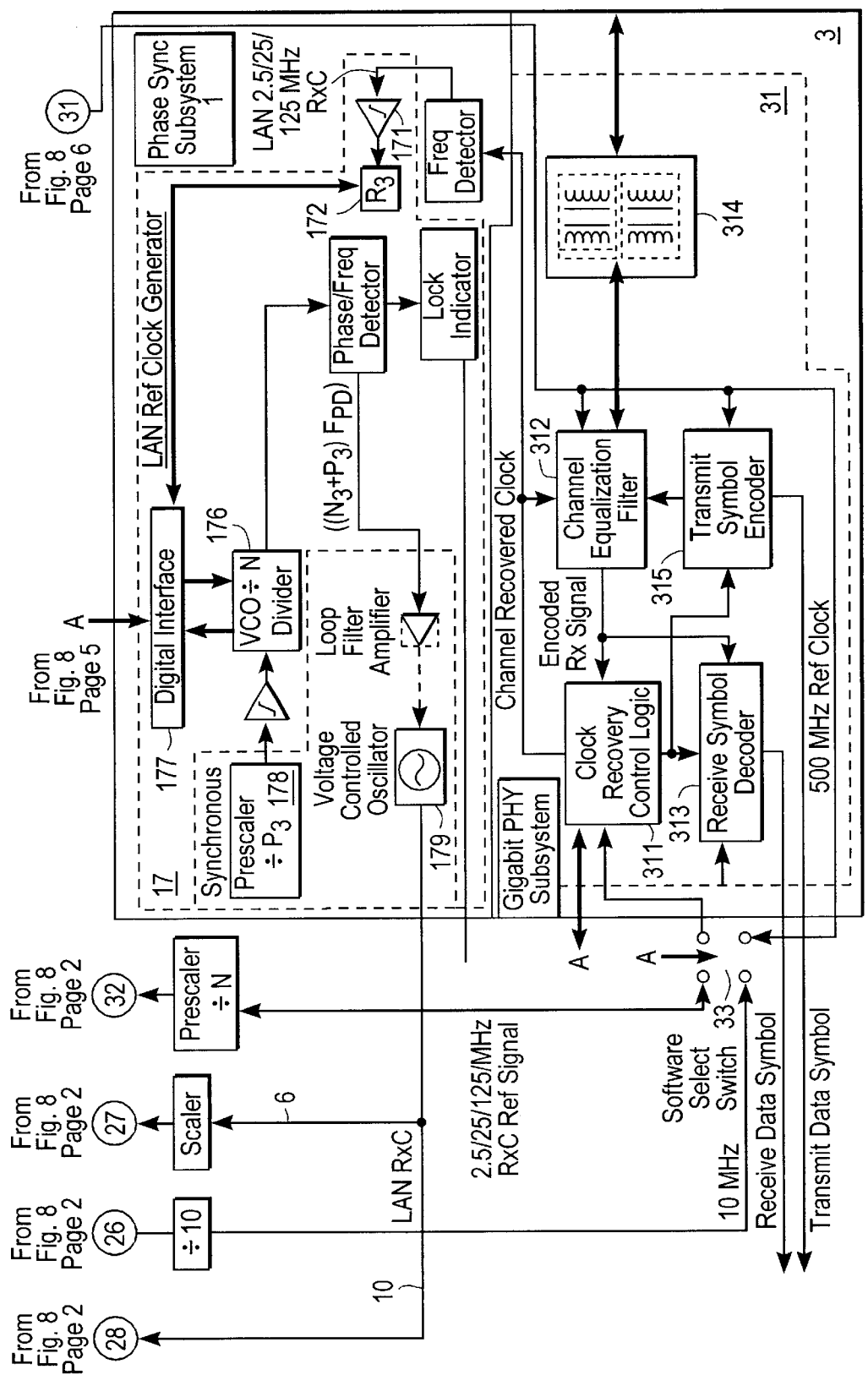
Figure 8A Com2000™ System Block Diagram

|                      | 3 dB Design | 10 dB Design |
|----------------------|-------------|--------------|
| Margin without FEXT  | 3.5 dB      | 10.7 dB      |
| Margin with FEXT     | 2.5 dB      | 6.7 dB       |
| Margin with FEXT + 3 | 1.8 dB      | 4.9 dB       |

Figure 8C

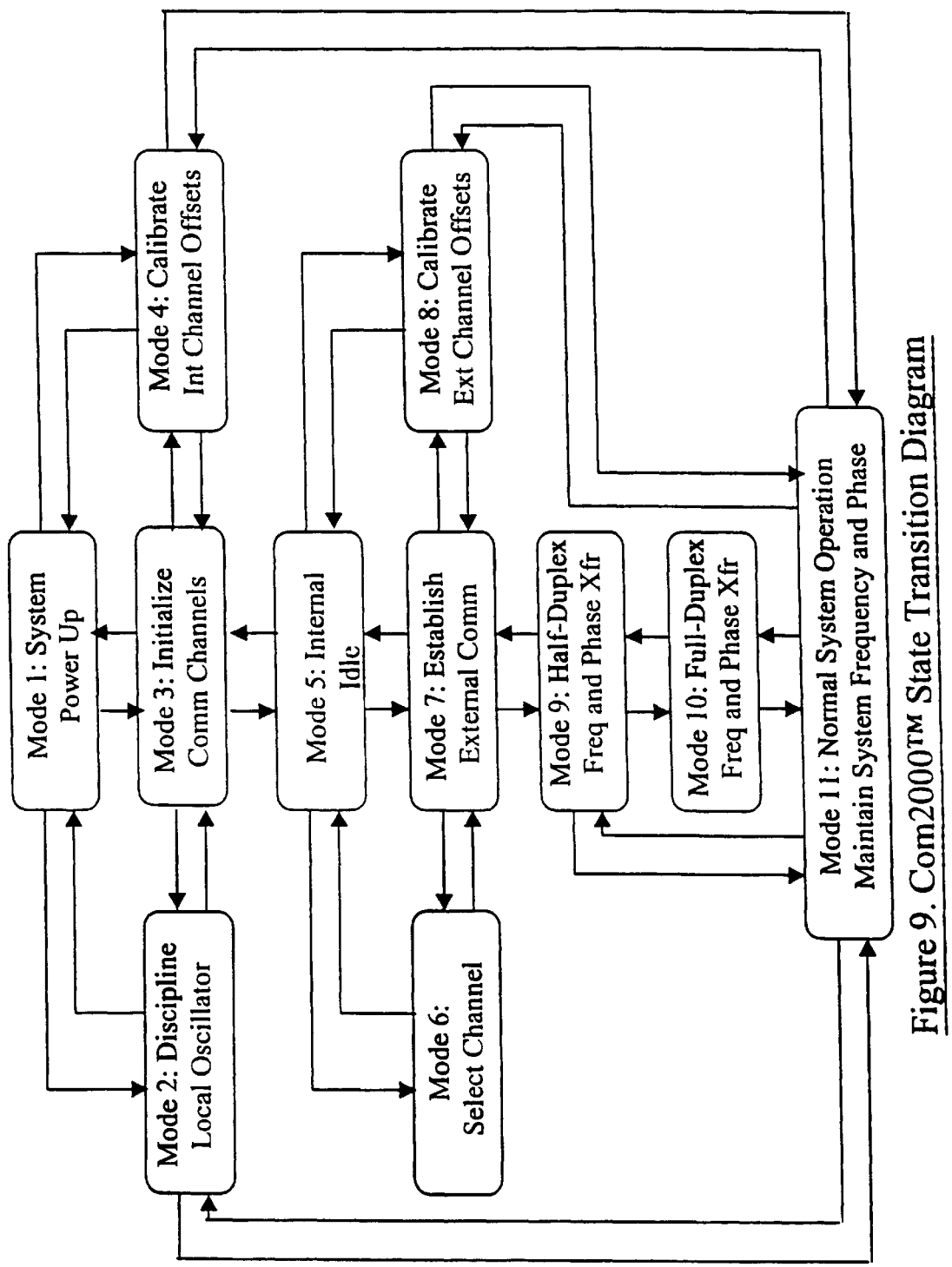
Figure 9. Com2000™ State Transition Diagram

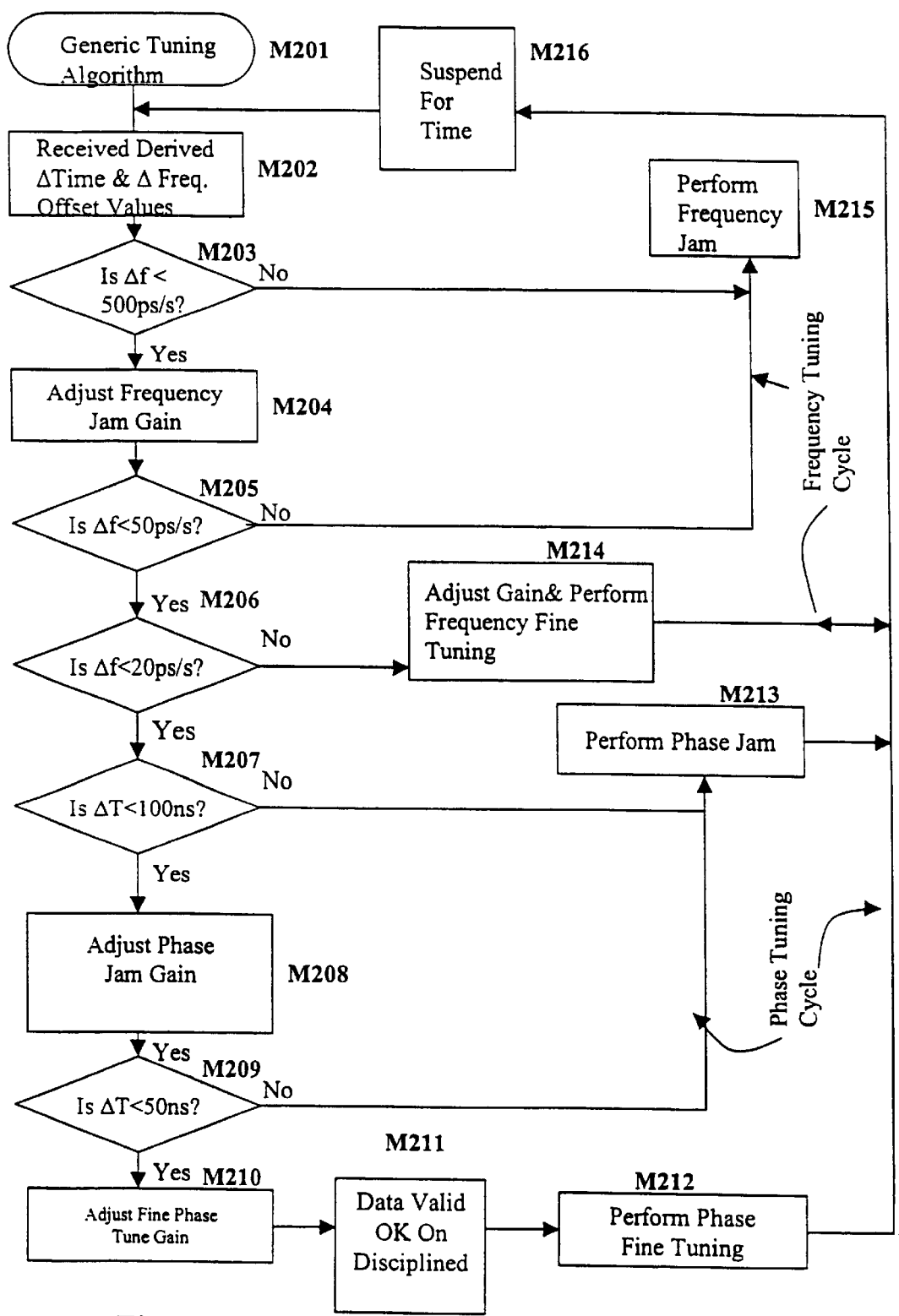
Figure 9a. Mode 2 Generic Tuning Algorithm.

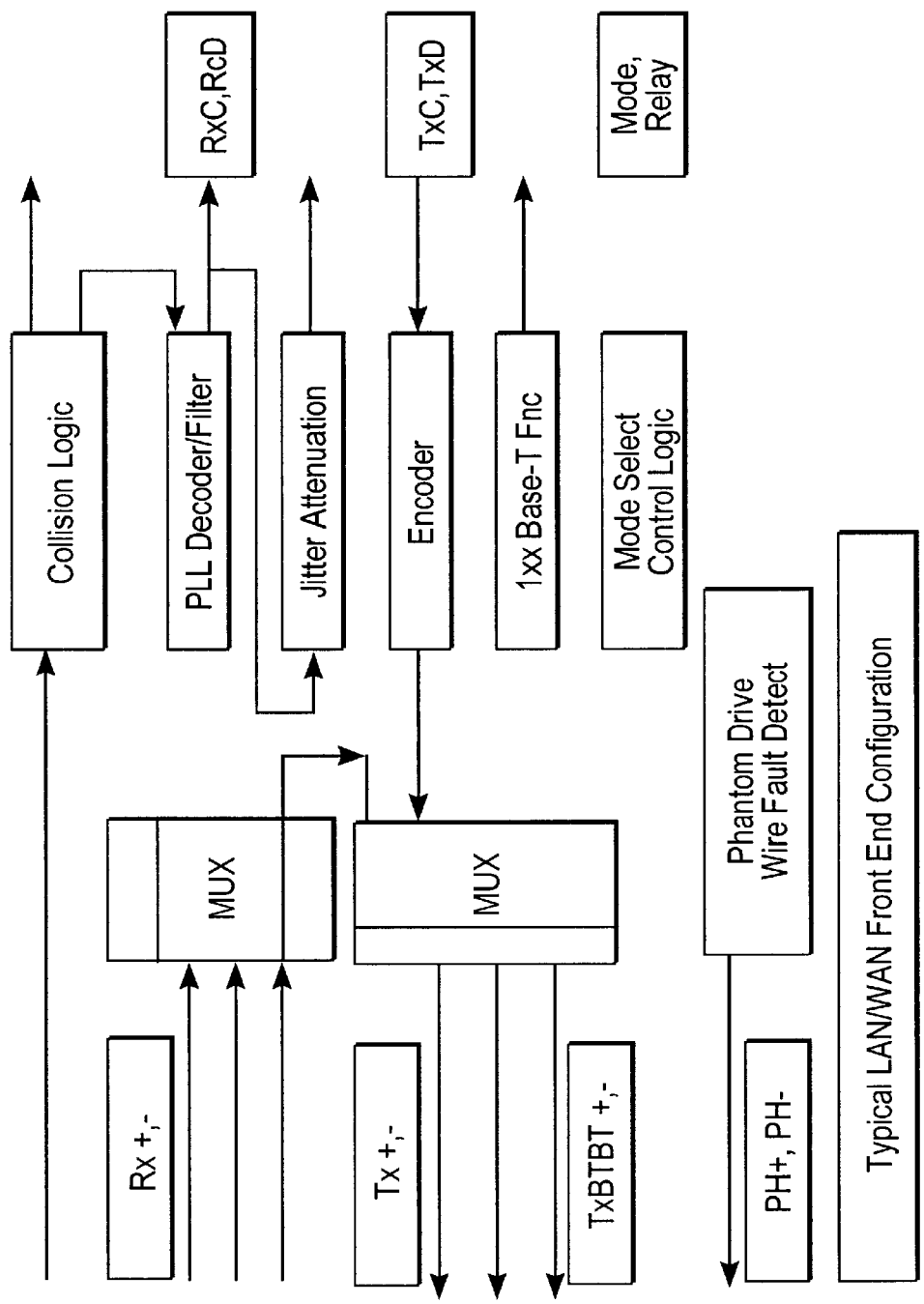
Figure 10  LAN Front End Diagram

Performance of 51.84 Mb/s 16-CAP transceiver over 100 m
category 3 cable with one cyclostationary NEXT interferes

| TIA/EIA NEXTR model | a = 1.2 | 1/T = 12.96 Mbauch | $P_2 = 10^{-10*}$ | |
|---|---|---|---|---|
| $f_1$ (i T/d) | $SNR_i$ (dB) | $SNR_1$ (dB) | $SNR_n$ (dB) | Margin (dB) |
| $f_0$ | 12.5 | 13.0 | 54.9 | 31.65 |
| $f_1$ | 12.5 | 14.8 | 58.1 | 43.85 |
| $f_2$ | 12.5 | 18.3 | 61.3 | 38.05 |
| $f_3$ | 12.5 | 18.4 | 61.9 | 38.65 |
| $f_4$ | 12.5 | 14.8 | 60.5 | 37.35 |
| $f_5$ | 12.5 | 13.0 | 57.1 | 33.85 |

* Margins are with respect to $P_2 = 10^{-10}$ for which $SNR_{o,mf} = 23.23$ dB

Figure 10A

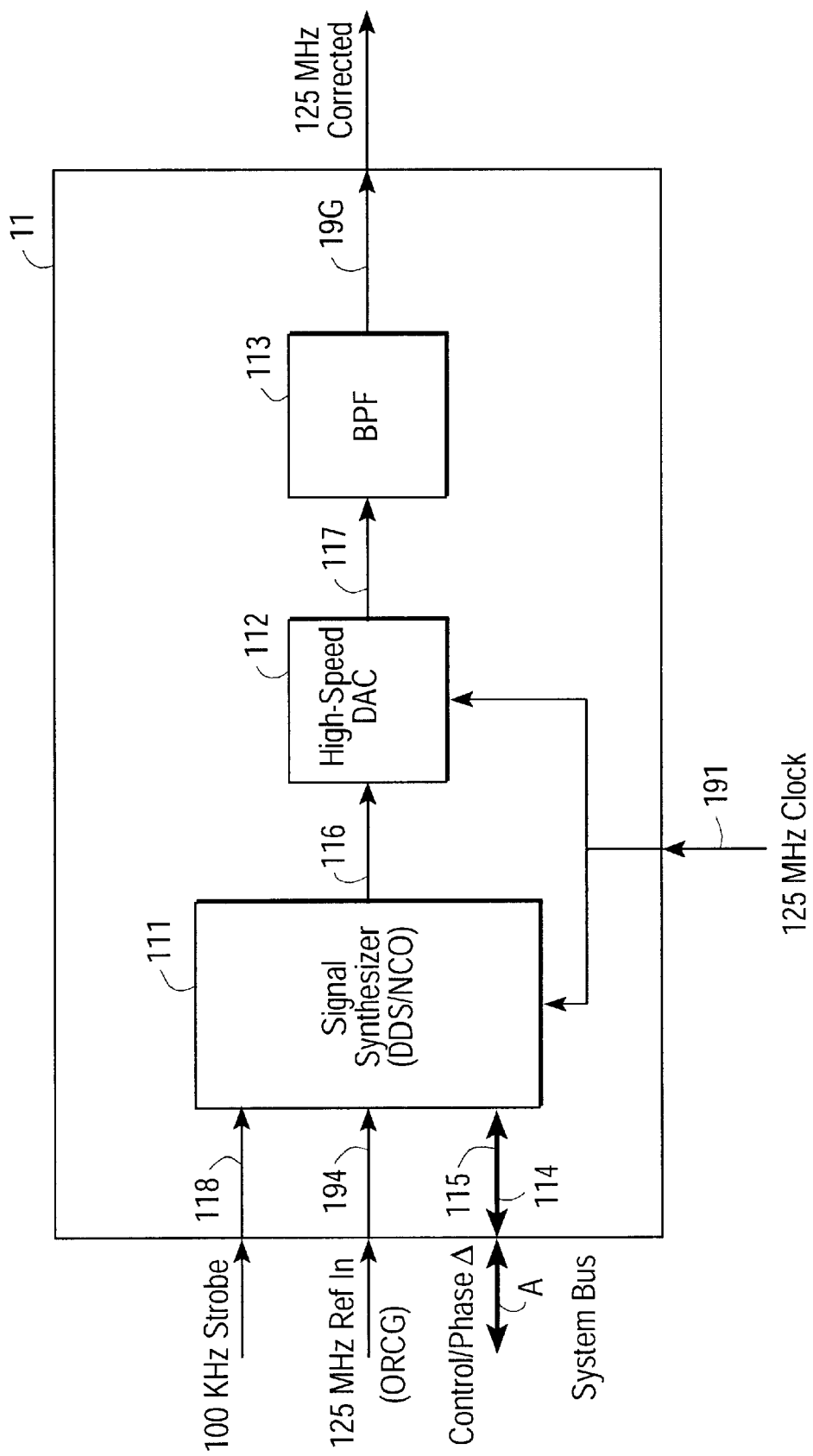
Figure 11 Discipline Signal Generator

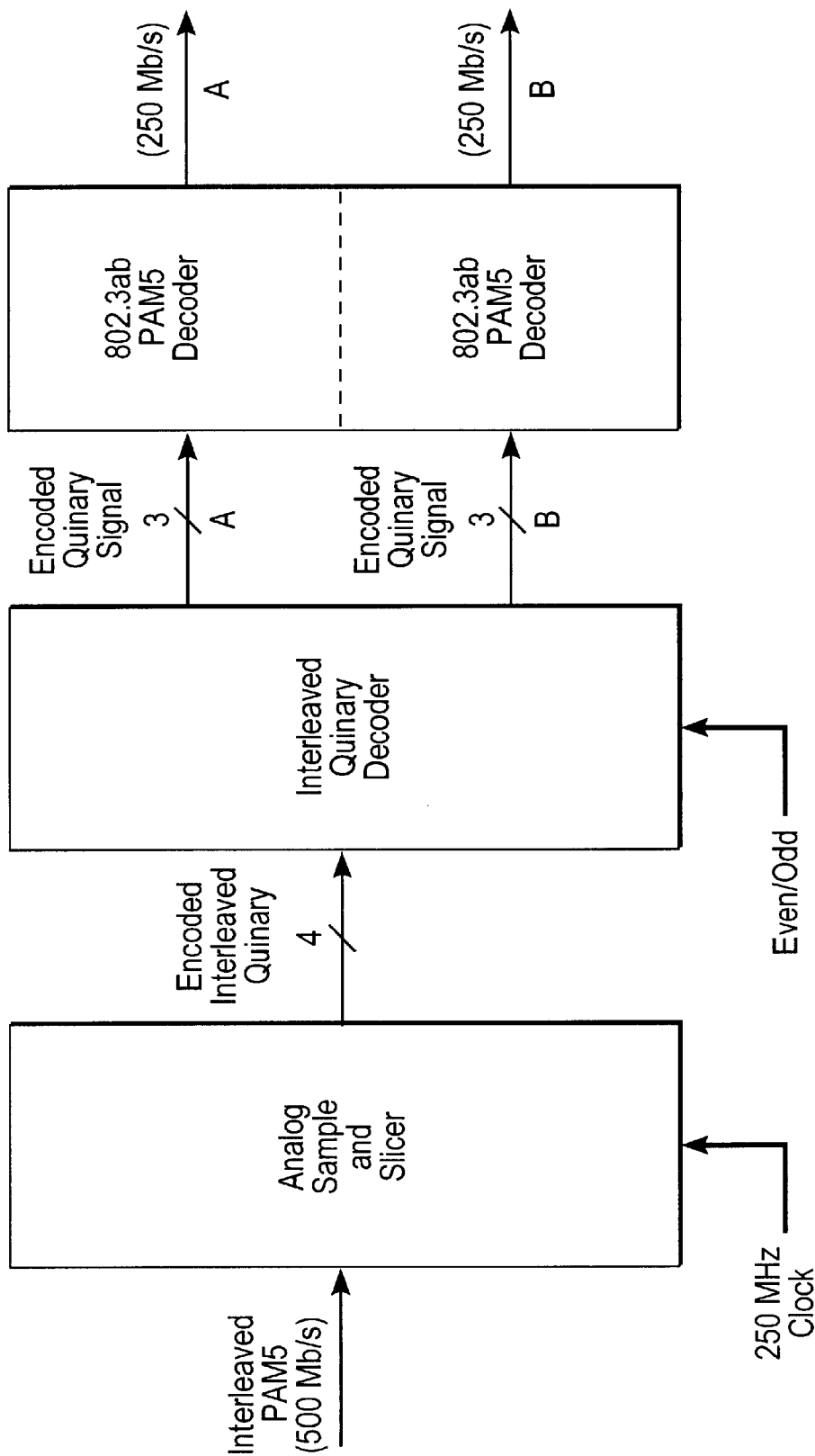
Figure 11A  Interleaved PAM5 Data Recovery

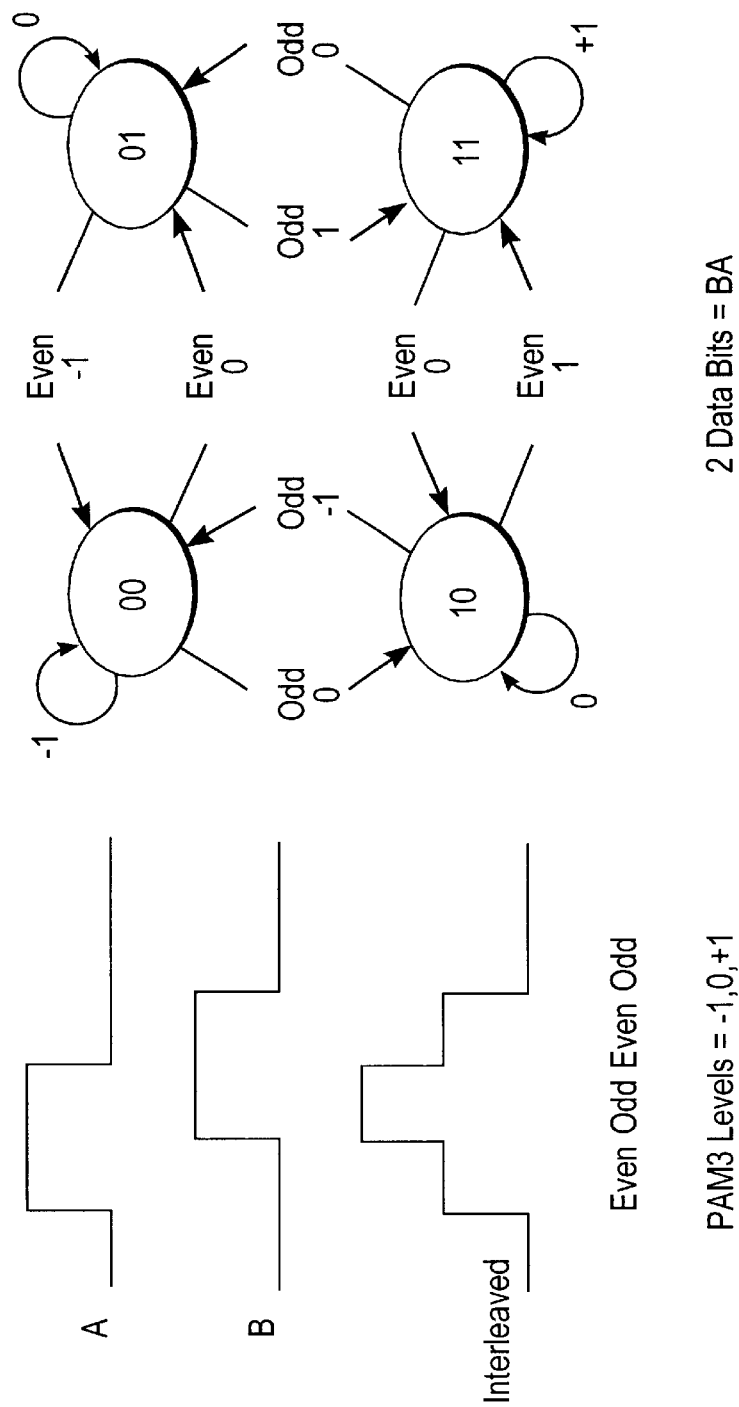
Figure 11B  Interleaved Binary Decoder Example

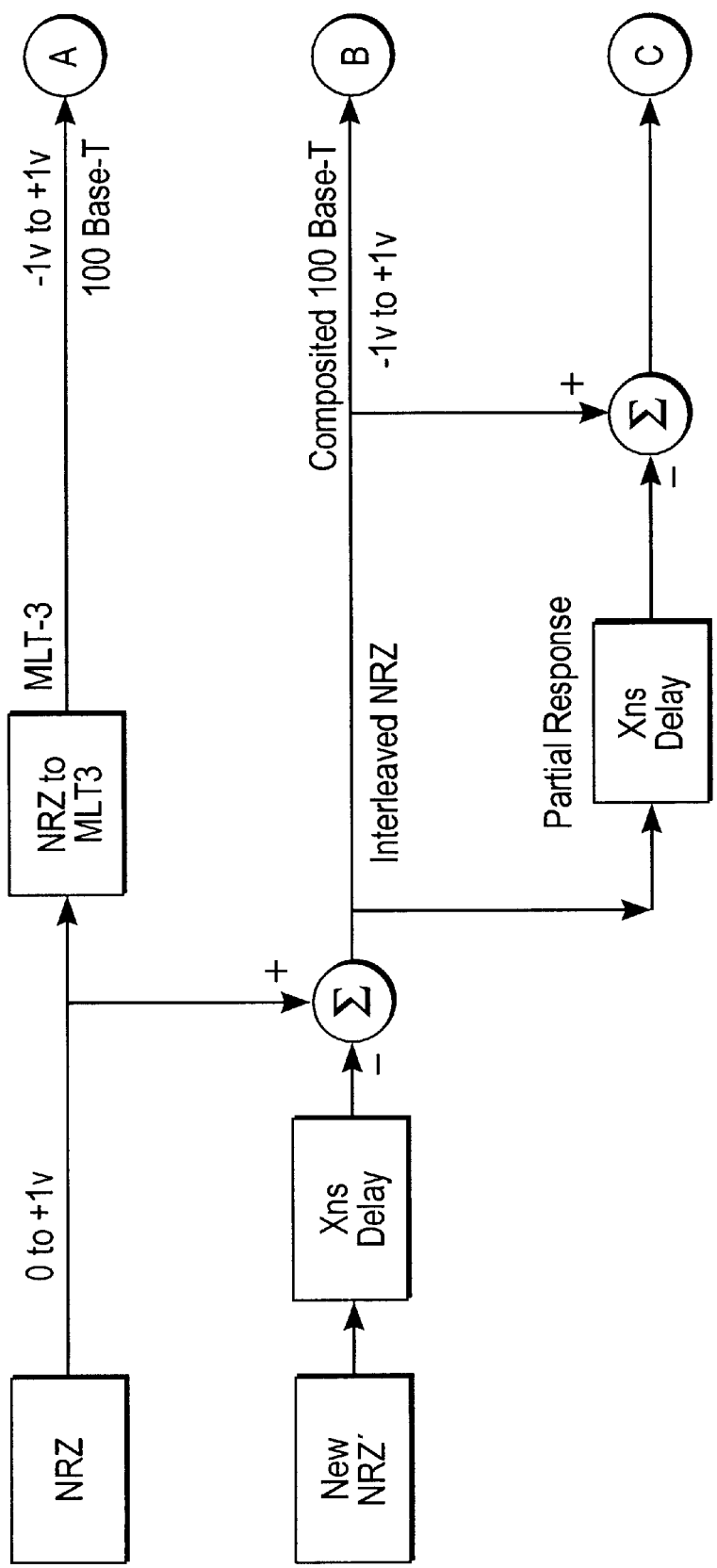
Figure 11C Com2000™ NRZ Partial Response Signaling Overview
Note: Xns is multiple of 4ns

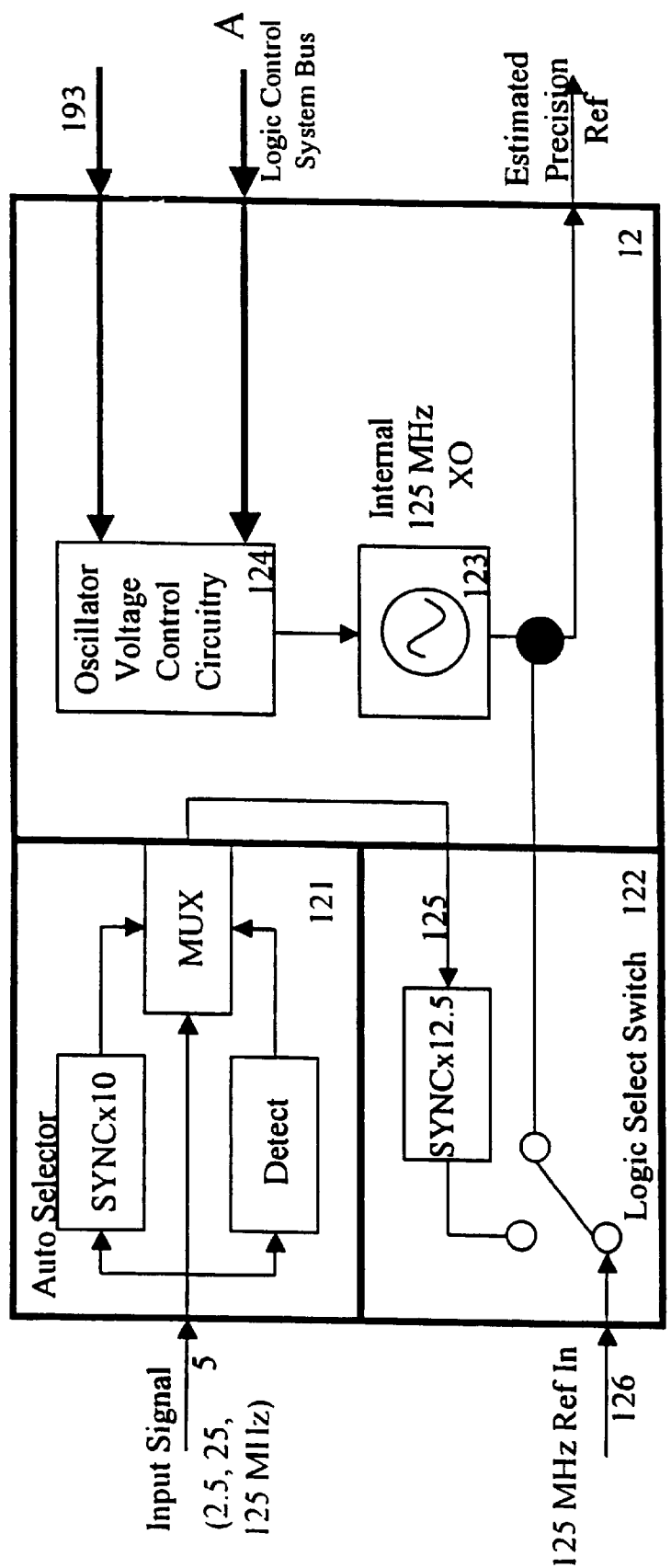
Figure 12. Oscillator Reference Clock Generator

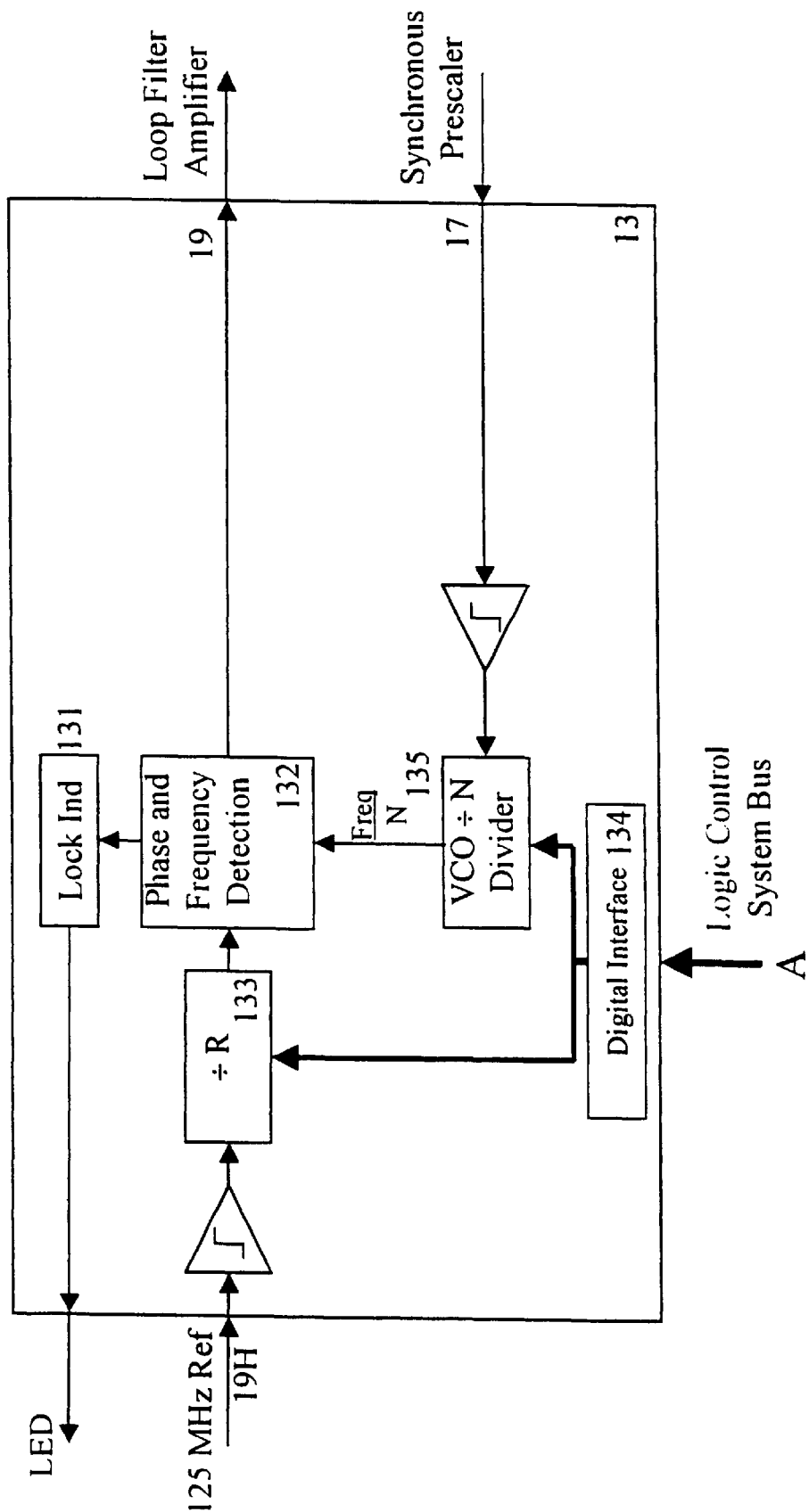
Figure 13. Precision Reference Clock Generator

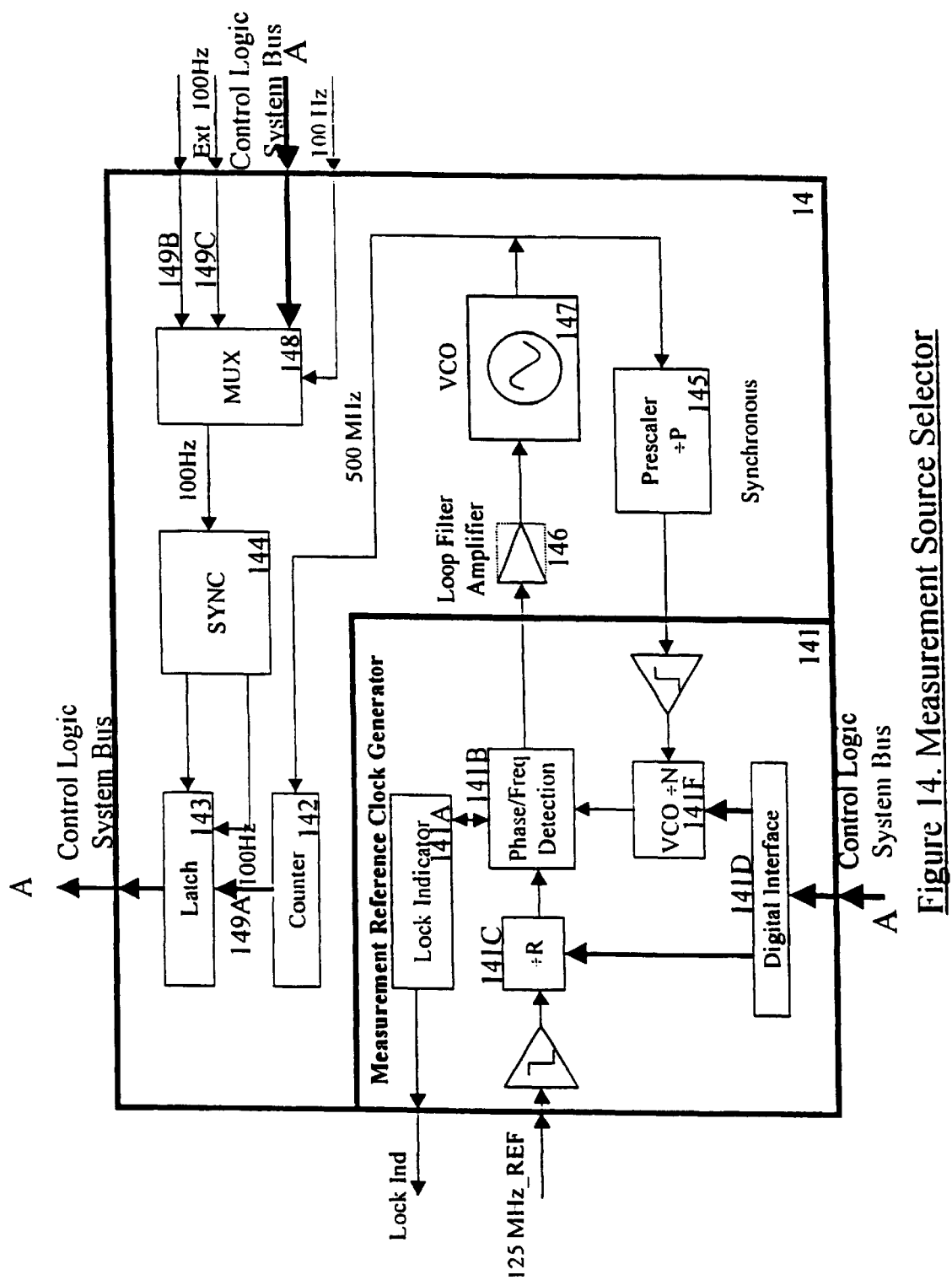
Figure 14. Measurement Source Selector

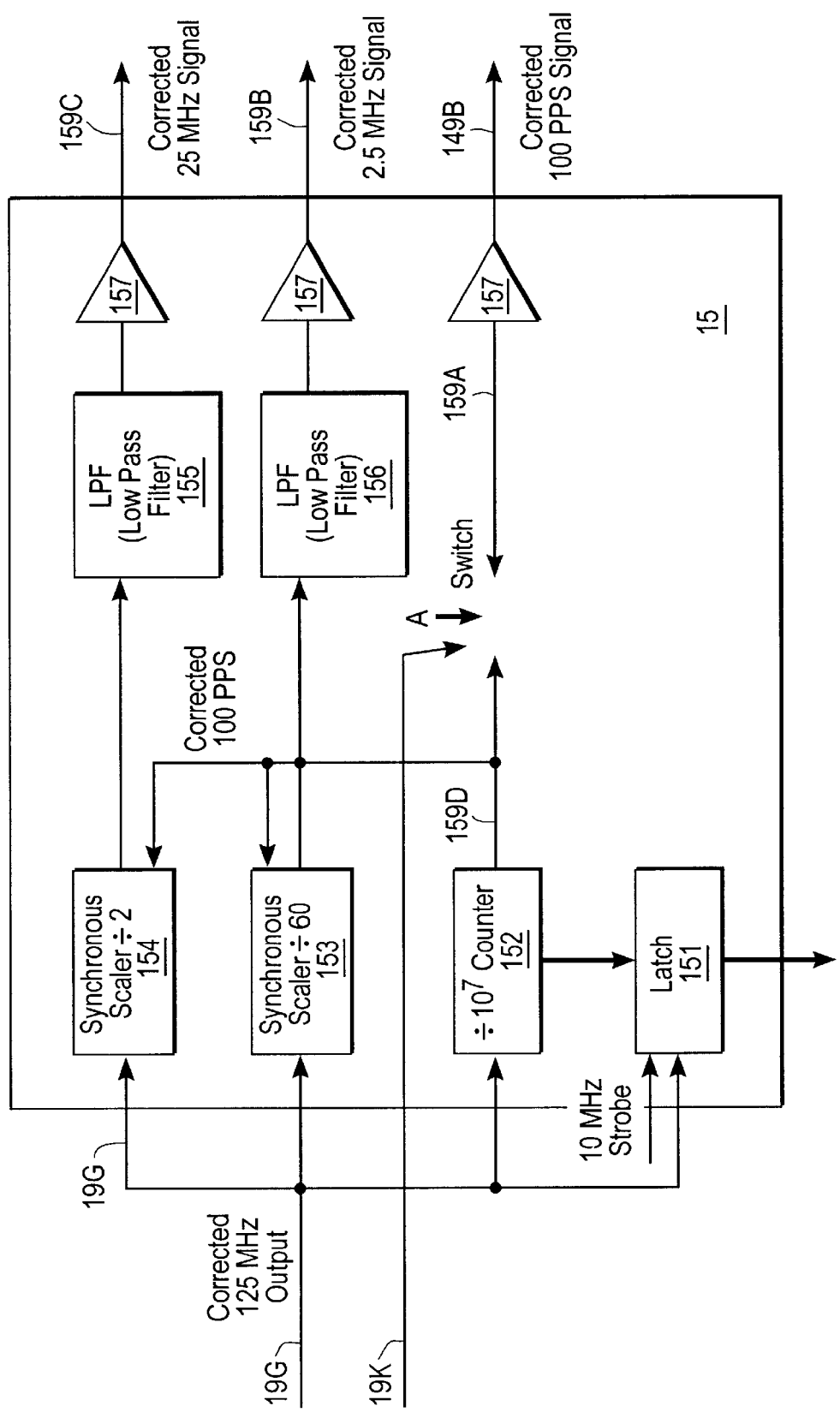
Figure 15 Corrected Output Generator

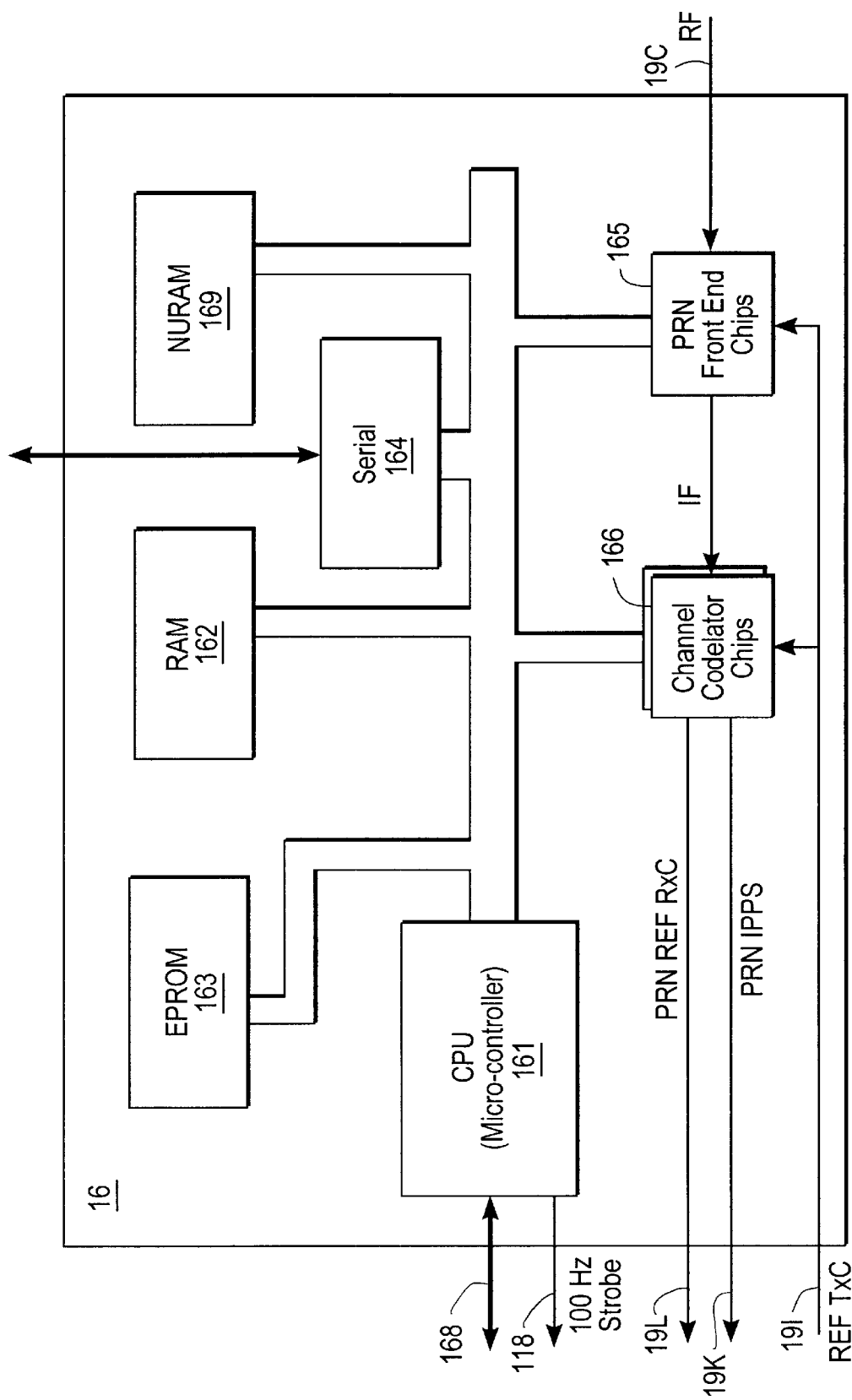
Figure 16  The PRN Receiver

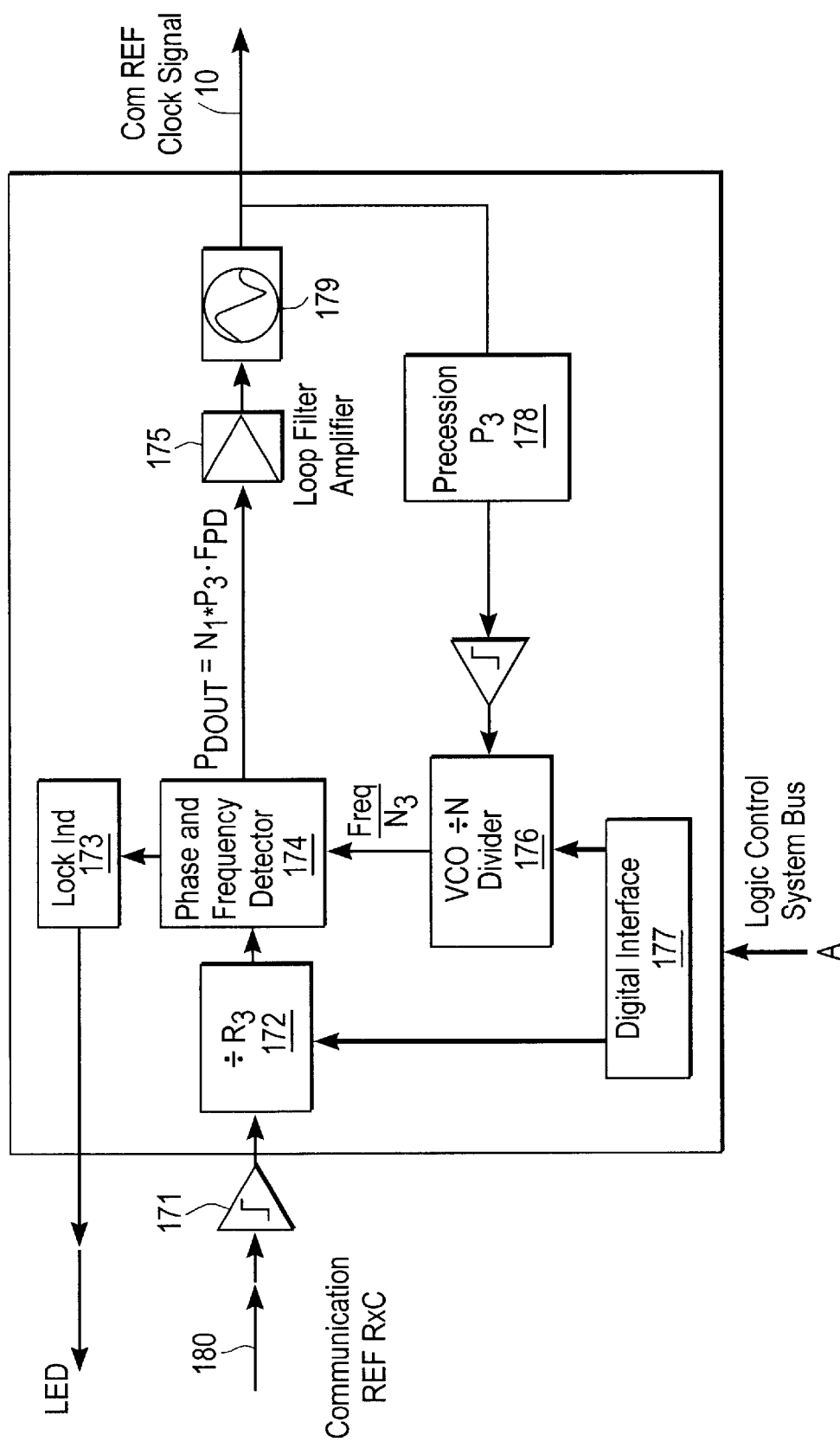
Figure 17 Com REF Clock Generator

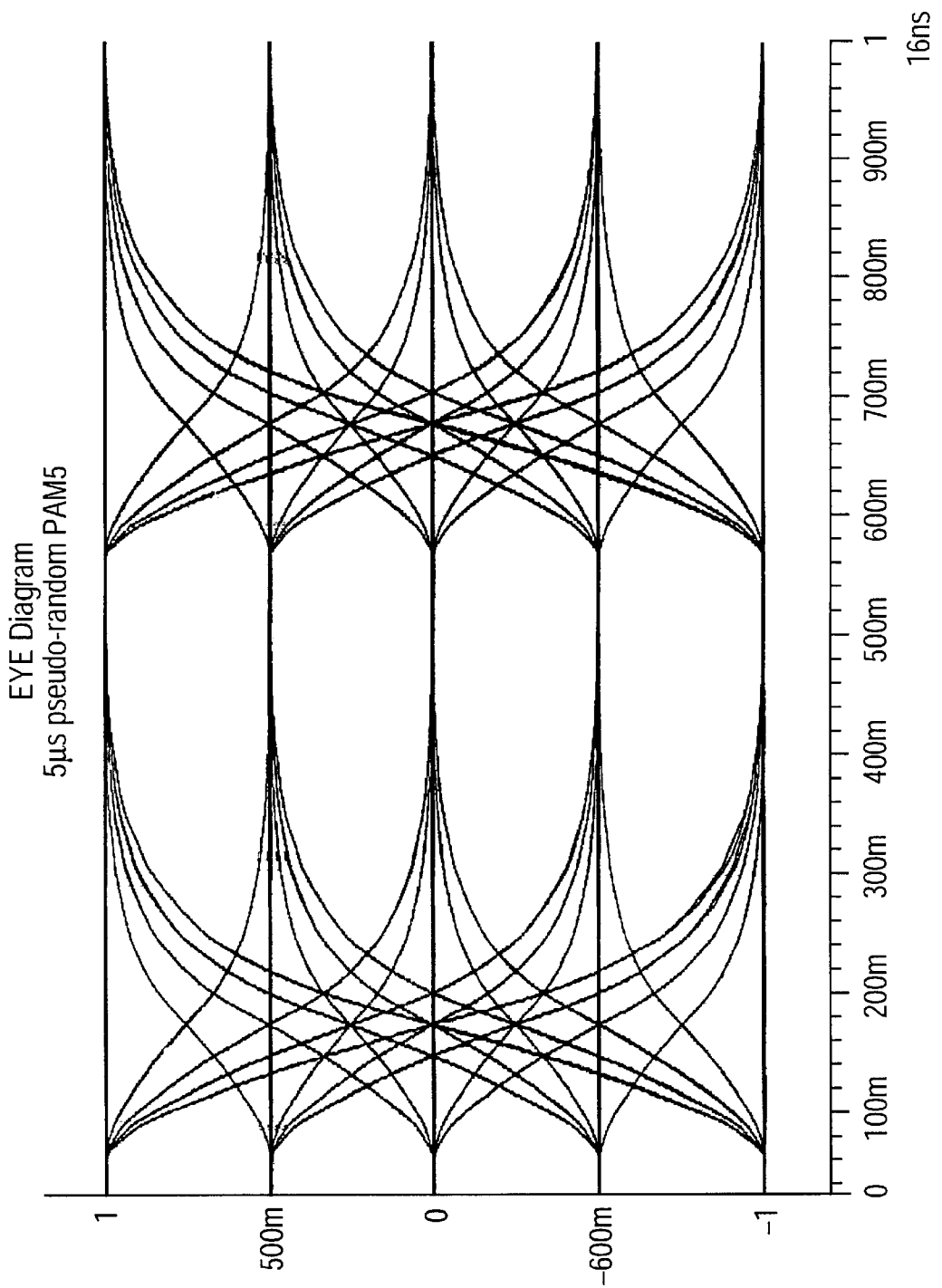
Figure 18 WF(/COL/RUN/RESULTS/VT3:3)

| Supplemental Delay Specifications | Propagation Delay for Horizontal Wiring Runs | Propagation Delay Skew for Horizontal Wiring Runs |
|---|---|---|
| 100VG-AnyLAN IEEE 802.12 | Required due to hub-to-end station MAC protocol timers Maximum: 1.2 µSec one way total 5.7 nSec.meter one way | Required due to multiple pair half duplex transmission mechanism. Maximum limit: 67 nSec |
| 100Base-Tx IEEE 802.3 | Required due to worst case collision delay budget. Maximum: 556 nSec one-way (assumes category 5 media only) | Not applicable |
| 100Base-T4 IEEE 802.3 | Required due to worst case collision delay budget. Maximum: 570 nSec one-way total 5.7 nSec/meter one way (measured between 2 and 12.5 MHz) | Required due to multiple pair half duplex transmission mechanism. Maximum between 2 and 12.5 MHz) |

Figure 29

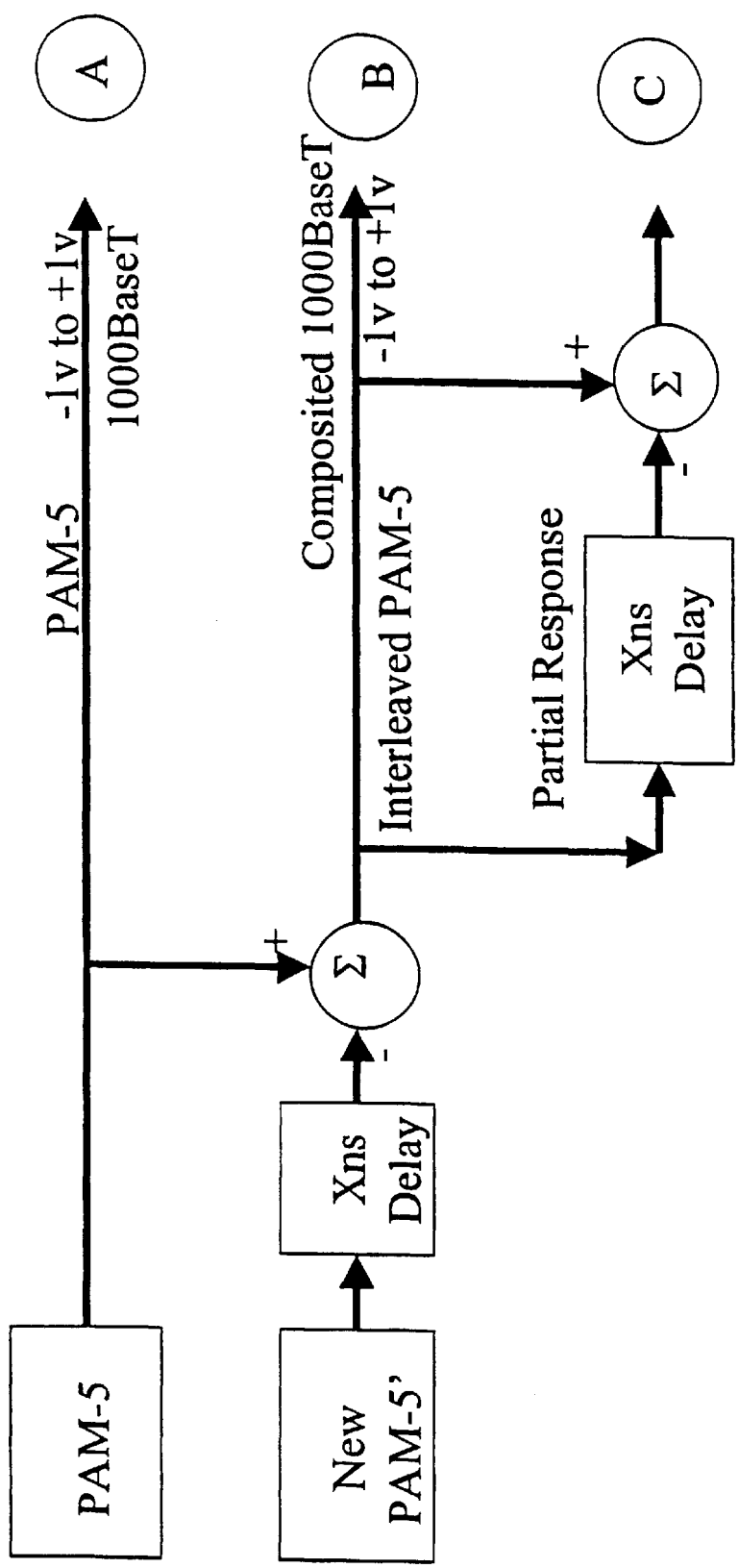
Figure 31. Com2000™ PAM-5 Partial Response Signaling Overview

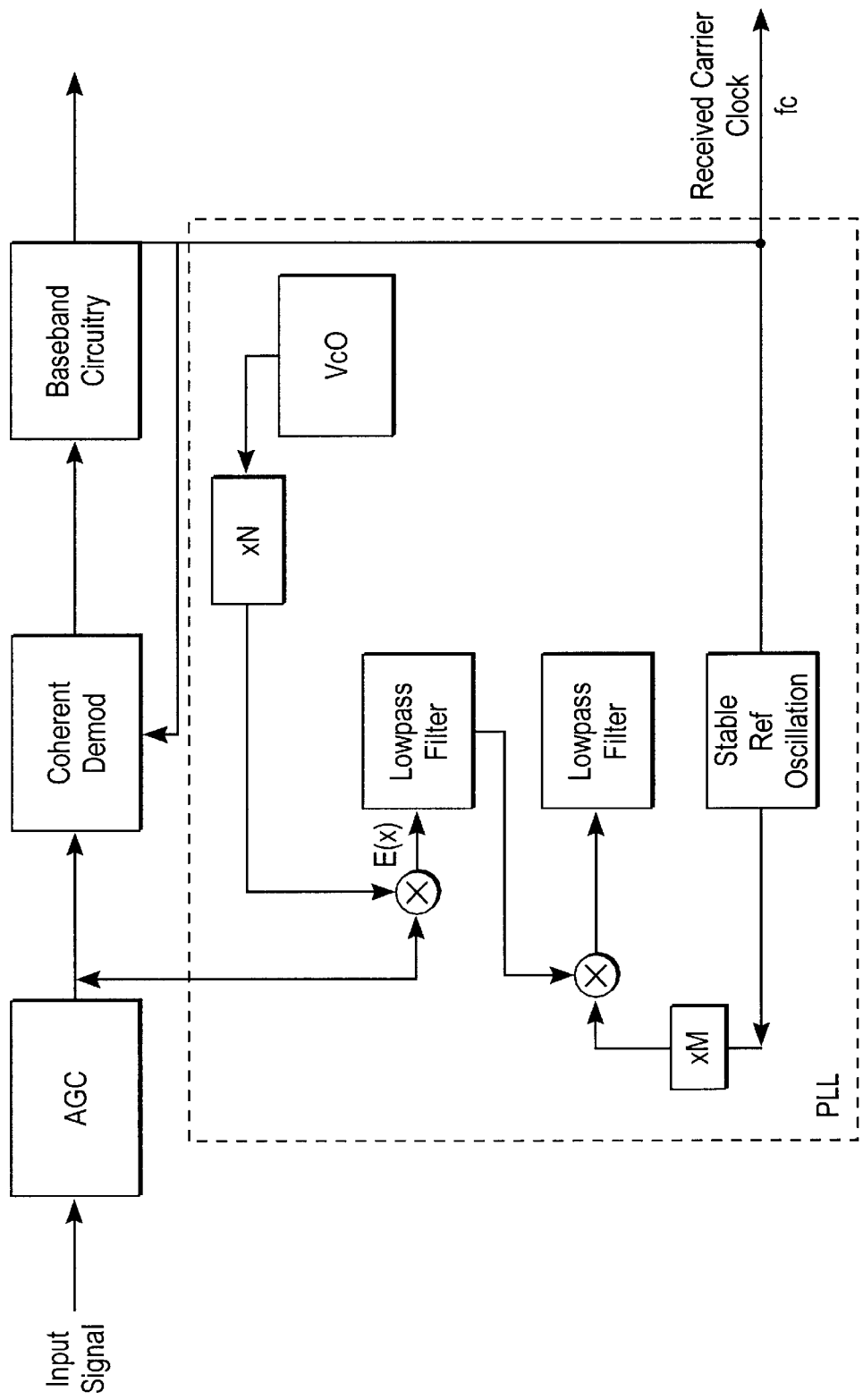
Figure 33 Com2000™ Coherent Carrier Recovery

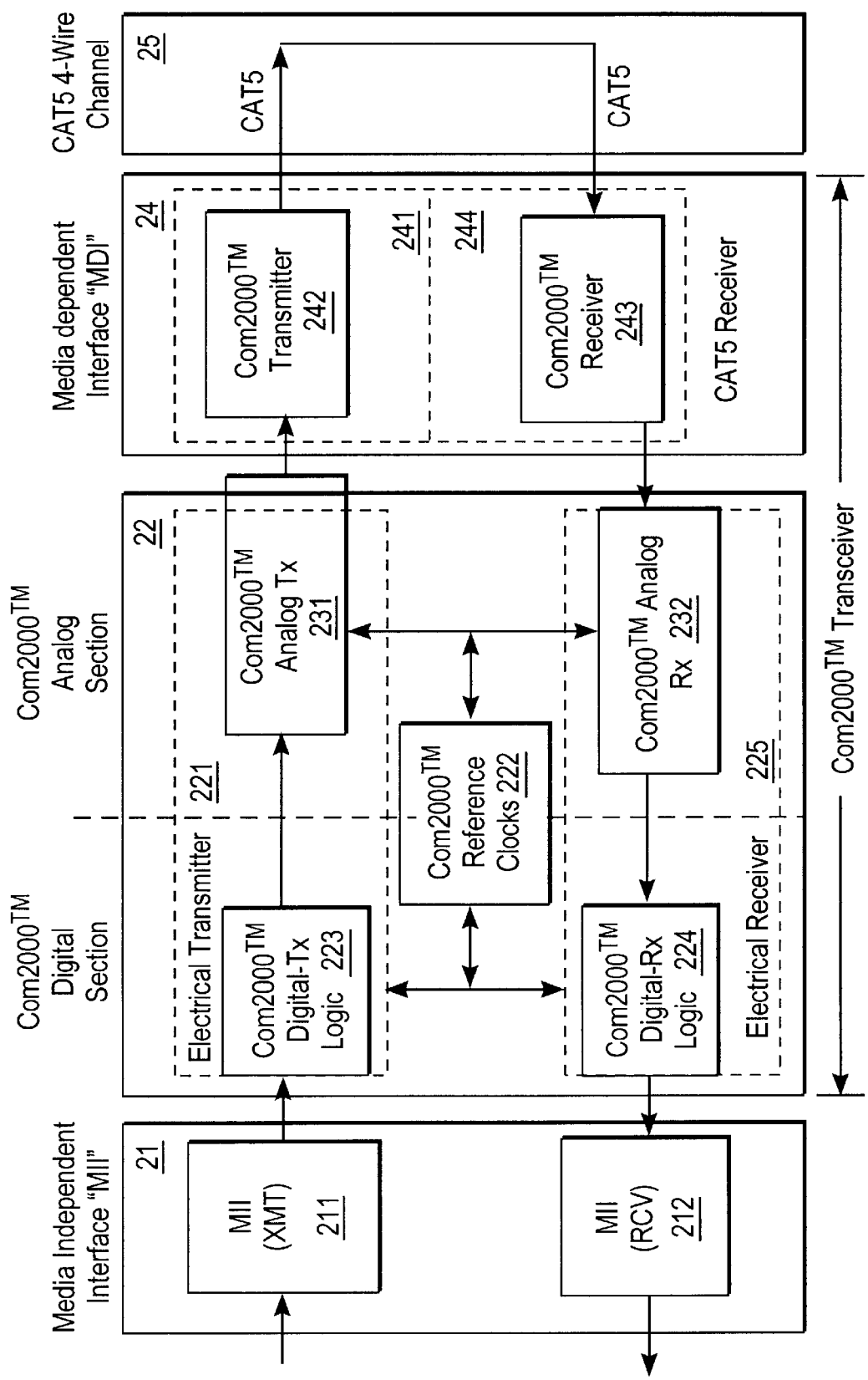
Figure 34 Com2000™ 10/100/1000 Base Tx Transceiver Overview

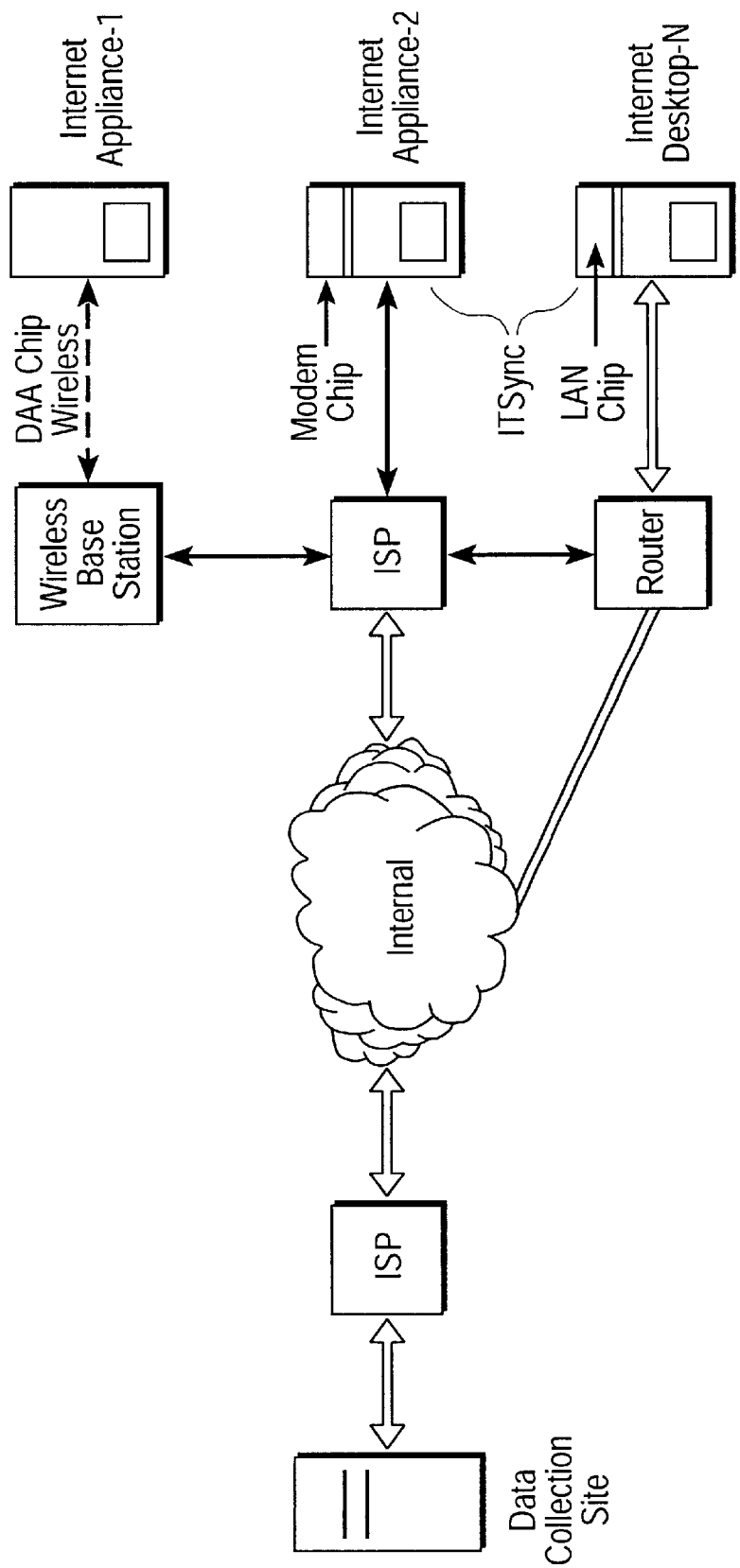
Figure 35  Universal ITSync System in Internet Virtual Network Block Diagram

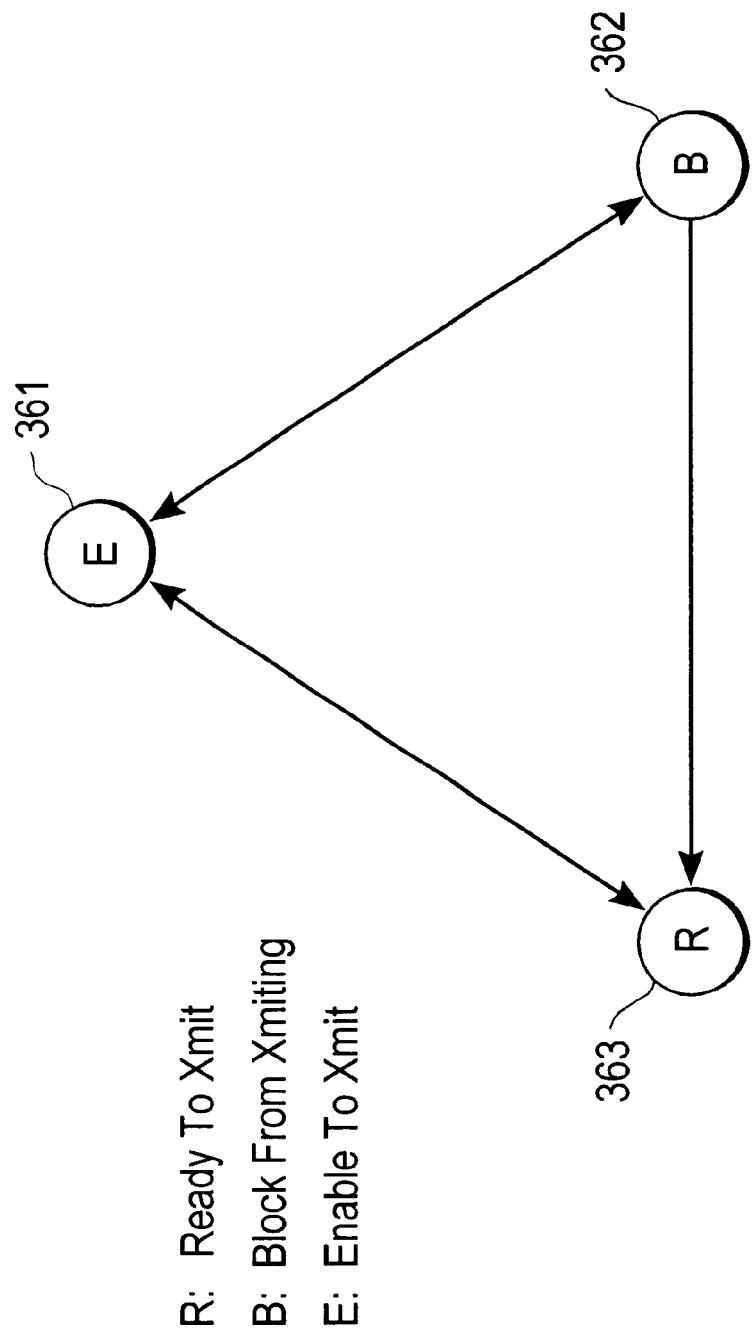
R: Ready To Xmit
B: Block From Xmiting
E: Enable To Xmit
Figure 36  Transmit Test State Transitions

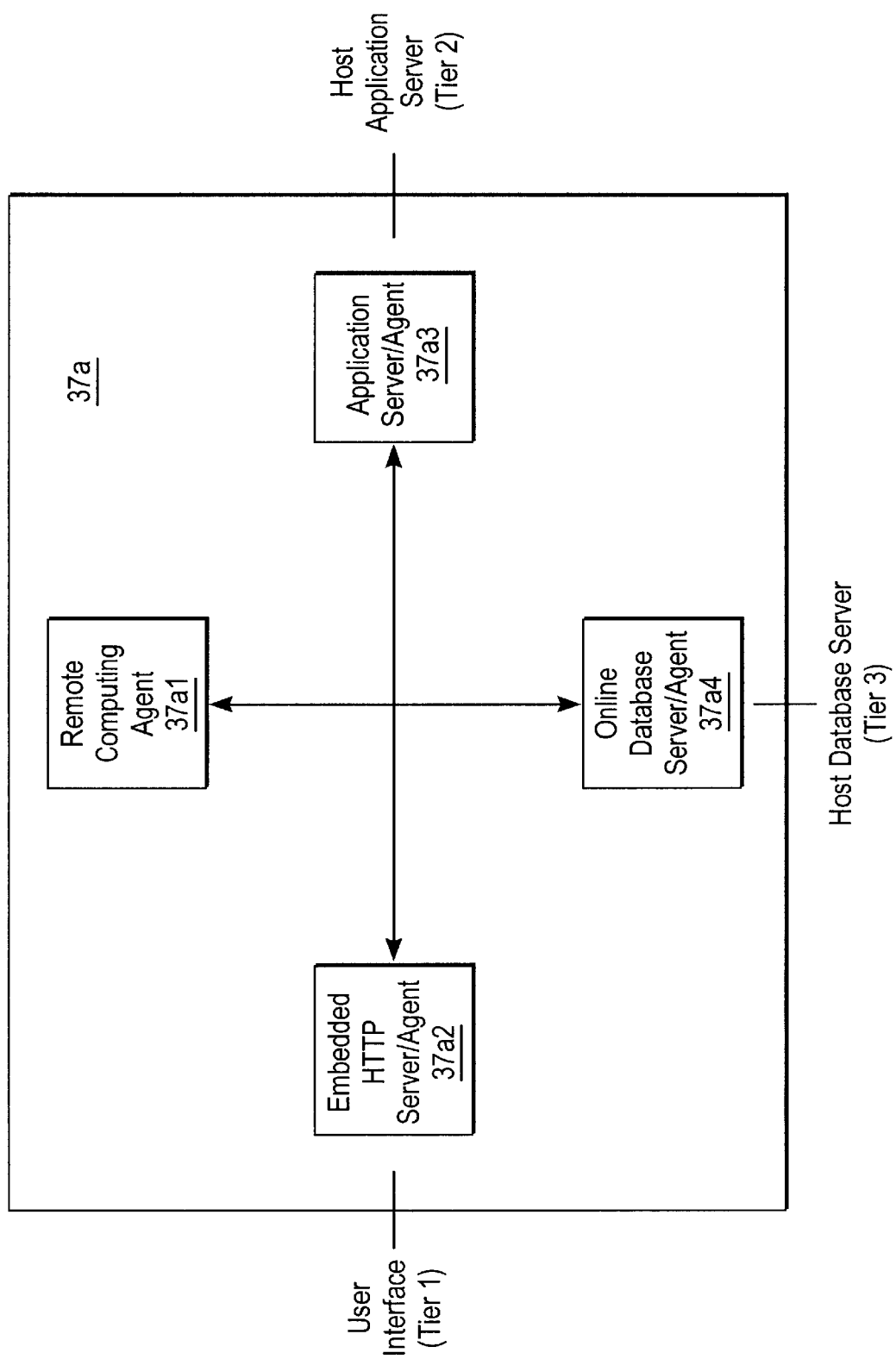
Figure 37 ITsync Remote/Distributed Computing Model

MEANS AND METHOD FOR A SYNCHRONOUS NETWORK COMMUNICATIONS SYSTEM

The following U.S. provisional patent applications are all incorporated by reference herein in their entirety: (1) U.S. Provisional patent application Ser. No. 60/054,406 filed on Jul. 31, 1997 by Francious Trans entitled "Method and Means for a Synchronous Network Communication System"; (2) U.S. Provisional patent application Ser. No. 60/054,415 filed on Jul. 31, 1997 by Francious Trans entitled "Method and Means for a Universal Information Technology System"; (3) U.S. Provisional patent application Ser. No. 60/085,605 filed on May 15, 1998 by Francious Trans entitled "System and Method for Scalable Com2000 Gigabit Ethernet CAT5 Physical Layer (GPHY4 )"; and (4) U.S. Provisional patent application Ser. No. 60/089,526 filed on Jun. 15, 1998 by Francious Trans entitled "Simulation Finding for the Scalable Com2000 Gigabit Ethernet CAT5 Physical Layer (GPHY4 )".

FIELD OF THE INVENTION

The present invention applies to data communication media interfaces which send and receive coded digital data signals at high speeds over digital communication channels.

BACKGROUND SECTION

Today's LAN/WAN networking systems are required to manage ever increasing loads from faster CPUs, laser printers, scanners, multimedia access, digital imaging and other user required applications and peripheral network components. As networking systems expand, the bandwidth of the networks must also expand to accommodate the increased traffic.

Expanding bandwidth, however, relies on either installing the latest communications technology or improving transmission over existing communications lines. Installing the latest communications technology is one solution that that is frequently adopted. The cost of upgrading to the most recent communications technology, however, may be prohibitive for many users. For these users, improving transmission over existing communications lines is the preferred choice.

In addition to providing increased bandwidth. existing communications technology must also be capable of scaling bandwidth. This is in part due to the fact that certain devices may require different levels of bandwidth for proper operation. Unfortunately, many communications systems do not provide the necessary scalability resulting in excess bandwidth for some users while providing too little bandwidth for others. By scaling the bandwidth to the need, the bandwidth can be more efficiently allocated among the competing communications applications.

In addition to bandwidth capacity and scalability limitations, communications systems also suffer from security breaches. This is in part due to the fact that security systems for data transmission often rely on coding schemes, such as public key encryption, that require special software programs for coding the data. If the user receiving the transmission does not have the necessary software, the signal cannot be decoded causing further delays in communication.

Finally, the system and method for providing the increased and scalable bandwidth that provides secure communications would preferably be capable of universal application. Universal application in this instance refers to the capability of providing a complete solution to communications transmissions such that the receiver and the transmitter are both capable of seamlessly sending and receiving the new communications signal. Ideally, this would be true across all communications mediums capable of supporting the system and method devised to resolve these problems.

Therefore, what is needed is a system and method for improving data transmission and scalability over different types of communications systems. What is further needed is a system and method that enables secured communications by providing improved identification of a signal's transmitter or recipient.

SUMMARY OF INVENTION

The present invention provides a system and method for increasing bandwidth while enabling improved security for network communications. The invention comprises a clock transfer system, a channel measurement and calibration system, an equalization system, a precision sampling system and a security system. Furthermore, these systems are combined to enable a new wireless network system.

Clock Transfer system provides synchronous phase and frequency transfer from one network node to another that proliferates throughout the entire network. The Channel Measurement and Calibration system measures the communications channel to determine the highest possible data capacity and calibrates the channel to correct for errors or defects in order to maximize data throughput. The Equalization system delivers the noise reduction schemes for improving the signal to noise ratio (SNR) of the Com2000™ system. Once the channel noise has been reduced and the node has been synchronized, the signal coding system provides a baseband line signal coding method that increases the effective data throughput by increasing the number of symbols per hertz of data transmission. The Precision Sampling system implements a precision phase offset in order to deliver precision phase delay controls for the new coding system.

The combination of these systems enables a security system that transmits the signature of a sending node over the waveform by pre-positioning the signal at a specific frequency and phase matrix cell. Although the invention will be primarily described with reference to an Ethernet wireline embodiment, the present invention also provides the means for enabling a wireless data communication environment embodied in the form of a Wireless Information System.

BRIEF DESCRIPTION OF THE DRAWINGS

FIG. 1A is the Com2000™ System Block Diagram. It is used to illustrate the Com2000 System's major components, interfaces and applications.

FIG. 1B is the Com2000™ System in a 2 pair cabling Network as opposed to the proposed 802.3ab I OOOBaseT that uses 4 wire pairs. The proposed 802.3ab 1000 BaseT receiver complexity is also 4 times the complexity of the Com2000™ GPHY4 system. This figure is used to illustrate the Com2000™ System noise considerations and applications.

FIG 1C is the ITSync System in a Three Tier Data Delivery Model. It is used to illustrate the new ITSync System's Intranet and Internet Information Delivery interfaces. It is also used as illustration for high level component's interactions and interfaces.

FIG. 1D is the ITSync Hardware Architecture Block Diagram. It is used to provide a high level descriptions of signal and data interactions of the major components in ITSync Hardware System.

FIG. 1E is the ITSync Software Architecture Block Diagram. It is used to provide a high level descriptions of major software components, their interfaces and layer breakdown structures.

FIG 1I is the Time Sync Subsystem Block Diagram of the ITSync System. It is used to illustrate the Time Sync Subsystem's major components, interfaces and applications.

FIG. 3 is the Detail Com2000™ GPHY4's Subsystem Block. It is used to illustrate the Subsystem's major components, interfaces and applications.

FIG. 4 is the Detailed Subsystem Block Diagram of the Com2000™. Data Conversion subsystem. It is used to illustrate the Subsystem's major components of data conversion, interfaces and applications for both the digital and analog circuit perspectives.

FIG. 5a is the Time Sync Subsystem's Mode 2 Software Logic Block Diagram of the ITSync System. It is used to illustrate the software logics of the mode 2 component of the Subsystem's software major components, interfaces and applications.

FIG. 5b is the Detail Level of Decision Feedback Equalizer for Detection Subsystem Block Diagram for the Com2000™ Equalizer subsystem. It is used to illustrate the equalizer coefficient generation, major components, interfaces and applications.

FIG. 5c is the Detail Level of NEXT and ECHO Equalizers Subsystem Block Diagram for the Com2000™ ECHO/NEXT Equalizer subsystem. It is used to illustrate the Cross Talk Noise Cancellation major functional components, interfaces and applications.

FIG. 5d is the Detail Level of NEXT and ECHO Equalizers Subsystem Block Diagram for the Com2000™ ECHO/NEXT Equalizer subsystem. It is used to illustrate the interaction between different filters during different mode of Cross Talk Noise Cancellation operations. It also illustrates the major functional components, interfaces and applications.

FIG. 5e is the High Level Data Signal Detection Subsystem Block Diagram for the Com2000™ Signal Detection subsystem. It is used to illustrate the Signal Detection Circuit's major components, interfaces and applications.

FIG. 6 illustrates the Detail Level Impacts of ISI and SNR on the DFE Equalizers and their convergence. It is used to illustrate the Inter-symbol Interference Noise Cancellation major functional component analysis, interfaces and applications.

FIG. 6a details Level Performance of ISI and SNR impacts on the ECHO/NEXT/FFE/DFE Equalizers and the coefficient derivations. This diagram shows Subsystem Block Diagram for the unsynchronized clock phase (AWGN noise) contributions and Com2000™ Equalizer on effective SNR. It is used to illustrate the phase and time dispersion (phase) effects on the ECHO and NEXT Cancellation functional component analysis.

FIG. 7 illustrates the TDMA Time chart for Host Communication Subsystem's WOE Logic Block Diagram of the System. It is used to illustrate the time and frequency TDDA and DIPA algorithm logics of the communication director component in the Subsystem's software.

FIG. 7A0 illustrates the Time Division Duplex Access or TDDA Algorithm of the Host Communication Software Logic. It is used to illustrate the transition logic of the communication TDDA component in the Subsystem's software.

FIG. 7A1 is the Dynamic Internet Protocol Access or DIPA Algorithm of the Host Communication Software Logic. It is used to illustrate the transition logic of the communication DIPA component in the Subsystem's software.

FIG. 7B is the common operating logic for both TDDA and DIPA Algorithms of the WOE Communication Software Logic. It is used to illustrate the time variant transmission period that allocates for each of the nodes of the TDDA & DIPA components in the Subsystem's software.

FIG. 7C is the common operating logic for both TDDA and DIPA Algorithms of the WOE Communication Software Logic. It is used to illustrate the foreground and background scheduling time variant transmission period that allocates for each of the nodes of the TDDA & DIPA components in the Subsystem's software.

FIG. 7D is the common operating logic for both TDDA and DIPA Algorithms of the WOE Communication Software Logic. It is used to illustrate the time variant transmission period that allocates for each of the nodes of the TDDA & DIPA components in the Subsystem's software.

FIG. 7F is the Time Division Password Access or TDPA Algorithm logic of the WOE Communication Software Logic. It is used to illustrate the time variant password access period that allocates for each of the nodes of the networking components in the Subsystem's software.

FIG. 7G is the Carrier Signal Offsets Access or CSOA Algorithm logic of the WOE Communication Software Logic. It is used to illustrate the time variant connection signal access period that allocates for each of the nodes of the networking components in the Subsystem's software.

FIGS. 8 and 8a are analog circuit illustrations of an embodiment of the subsystem block diagram for the Com2000™'s Reference Clocks & Measurements Subsystem having 6 distinct subsystems: Disciplined Signal Generator, Oscillator Reference Clock Generator, Precision Reference Clock Generator, Precision Receiver, Corrected Output Generator, and Measurement Source Selector.

FIG. 8c summarizes of the SNR margin figures resulting from the simulations of the 3 dB and the 10 dB design criterias. The simulations are based on the Matlab™ code published in the IEEE 1000Base-T Bluebook.

FIG. 9 is the Reference Clocks & Measurements Subsystem's VHDL State Transition Block Diagram of the Com2000™ System. It is used to illustrate the States and Modes of the Subsystem's State Transition Diagram major components, interfaces and applications.

FIG. 9a is the Reference Clocks & Measurements Subsystem's Mode 2 detailed VHDL algorithm diagram of the Com2000™ System. It is used to illustrate the VHDL logic of the mode 2 component of the Subsystem's VHDL State Transition Diagram.

FIG. 10 is a Typical LAN Front End Configuration Logic Block. It is used to illustrate the PHY logic of the major components of the 10/100BaseT logic, interfaces and applications.

FIG. 10a provides the simulation results obtained with a 51.84 Mb/s 16 CAP transceiver operating over 100m CAT3 cable.

FIG. 11 is the Discipline Signal Generator Diagram. It is used to illustrate the Signal Synthesis of the Time Sync Hardware Subsystem.

FIG. 11a illustrates the interleaved Pam-5 data recovery system.

FIG. 11b provides an example of a binary decoder of the present invention.

FIG. 11c illustrates the standard 100BaseT MLT-3 and Newly Invented Partial Response of NRZ signaling and their associated data generator & block diagrams.

FIG. 12 is the Oscillator Reference Clock Generator Diagram. It is used to illustrate the Oscillator Tuning and Selection Circuits of the Time Sync Subsystem.

FIG. 13 is the Pseudo Random Noise (PRN) and Reference Clock Generator Diagram. It is used to illustrate the Synchronous phase lock loop circuit of the Time Sync Subsystem.

FIG. 14 is the Measurement Source Selector Diagram. It is used to illustrate the Phase Lock Loop, Time and Frequency Measurement Counter circuits of the Time Sync Subsystem.

FIG. 15 is the Corrected Output Generator Diagram. It is used to illustrate the synchronous output signals circuits of the Time Sync Subsystem.

FIG. 16 is the PRN Receiver Diagram. It is used to illustrate the PRN tracking receiver circuits for decoding the reference signal data.

FIG. 17 is the Communication Reference Clock Generator Diagram. It is used to illustrate the Phase-Lock Loop and signal synthesis of the reference signal circuit.

FIG. 18 provides a simulated Eye Diagram for 1000BaseT PAM-5 signaling.

FIG. 29: Relevance of Propagation Delay and Delay Skew specifications to emerging 1000BaseT IEEE.

FIG. 31 illustrates the 1000BaseT PAM-5 signaling (Output A) and newly invented Partial Response of PAM-5 signaling (B & C) and their associated data generator and block diagrams.

FIG. 33 depicts the Com2000™ Coherent Carrier Recovery. It is used to illustrate the phase coherent clock recovery for the partial response PAM-5 modulated input signal.

FIG. 34 illustrates a 100/1000BaseT and Com2000™ 2000Base-T device transmits on all four pairs from both directions of each pair simultaneously.

FIG. 35 illustrates the ITSync System in a Virtual Network. It provides the ITSync System functions and applications in multiple platforms when it integrates and functions as a component of Internet.

FIG. 36 is the Host Communication Subsystem's WOE Logic Block Diagram of the ITSync System. It is used to illustrate the transition logics of the communication director component in the Subsystem's software.

FIG. 37 is the Three-Tier Software Model Diagram in the Distributed and Remote Computing Application Models. It is used to illustrate the ITSync system's major components, their interfaces and applications in a multi-tiers logic system's software.

DETAILED DESCRIPTION OF THE PREFERRED EMBODIMENT

Figure 2:
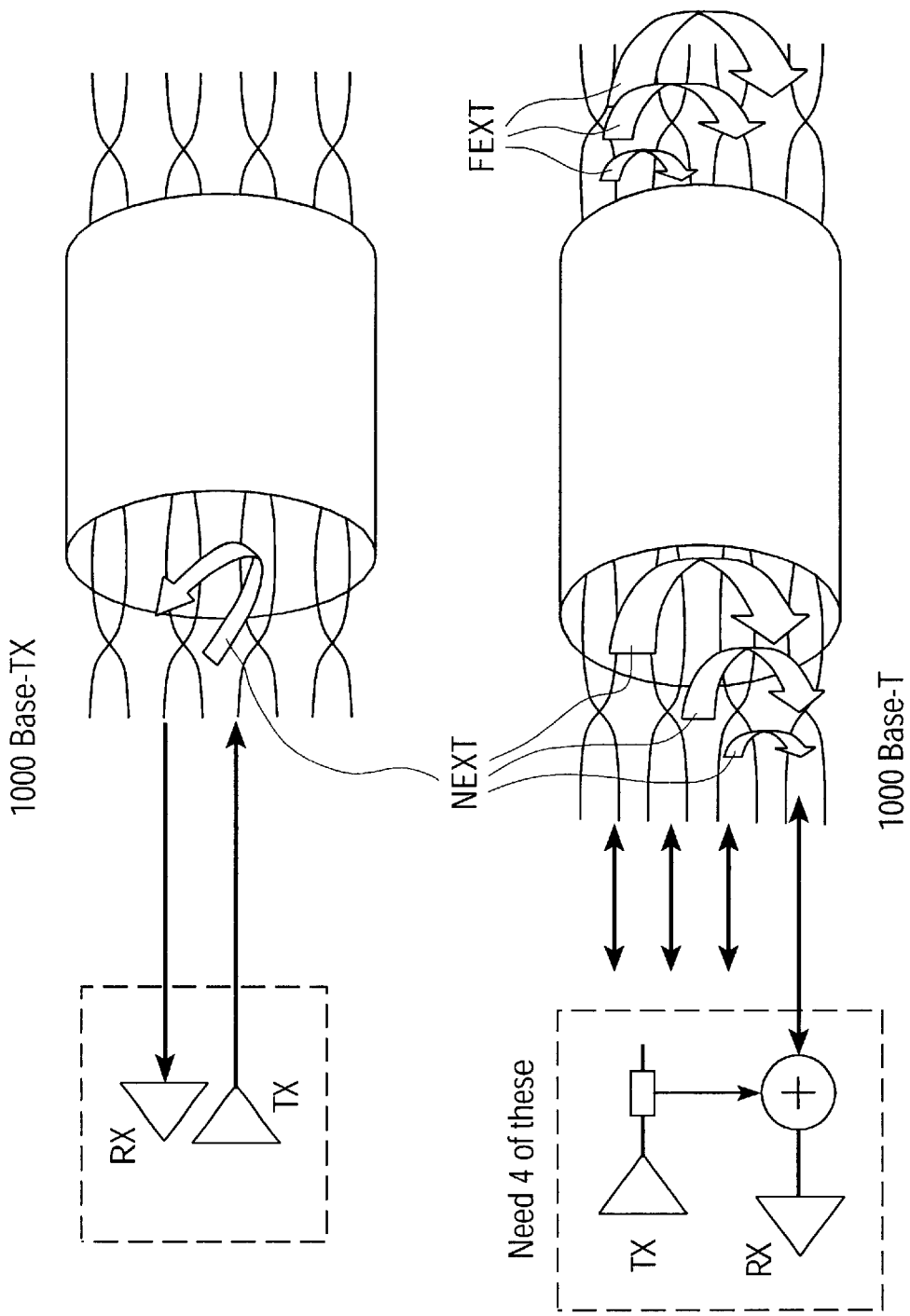
FIG. 2 is A 100/1000BaseT and Com2000™ 2000Base-T device transmits on all four pairs from both directions of each pair simultaneously.

Over any type of communication channel, such as nodes on an Ethernet network, there is distortion that can cause errors in data signaling thereby reducing the effective throughput. For example, when data is transmitted over a communication channel at a particular phase and frequency, the frequency and phase of that signal often changes as the signal propagates along the channel. The imperfections in the communication channel tend to reduce the resolution of the data bandwidth of the signal being transmitted across the channel. Furthermore, the data may not be interpreted correctly at the receiving end of the channel if the transmitted signals are outside of a defined phase and frequency range. The present invention, hereinafter referred to as the Com2000™ system, provides a system and method that measures the channel, codes a new signal using precision control of the signal's frequency and phase, and adjusts the signal to eliminate distortions arising from the increased data throughput provided by the new signal. Additionally, the new signal is both scaleable and secure using coding systems that take advantage of the precision control. The present invention integrates the subsystems that provide this functionality and may be manifested at either the physical layer interface or the medium access layer interface for all communication system types including Ethernet, cable and xDSL modems, POTS, Satellite and wireless networks. For clarity, the descriptions will generally focus on the Ethernet data Communications.

The precision controlled communication environment is enabled through a Clock Transfer system. This system provides synchronous phase and frequency transfer from one network node to another that proliferates throughout the entire network. The network is then in turns providing a Synchronous Communication Environment that enables multitude of other enabling technologies to deliver an increased bandwidth solutions. The Clock Transfer system provides the baseline precision required for manipulating and controlling specific signal characteristics enabling increased data throughput and more efficient bandwidth utilization.

Present cable and wireless communication infrastructures are not ideal so there may be instances where the highest achievable data rates are not possible due to imperfections and defects in the communications medium. Therefore, the present invention provides a Channel Measurement and Calibration system that measures and calibrates the communication channel to determine the highest possible data capacity of the particular medium. Initially, the communication channel must be characterized so that the errors and imperfections, such as frequency and phase distortions, can be identified. The calibration system then uses these measurements to improve the communication channel resolution by controlling the errors and imperfections of the channel. This system provides scaleable bandwidth transmissions while allowing the best possible data throughput across the transmission medium.

Achieving the increased throughput also requires the line signal channel be as noise free as possible. This is accomplished through the suppression of induced communication channel distortion and signal distortions, in order to more thoroughly characterize the communication channel signal response. The Channel Equalization system provides adaptive filters and algorithms that model the estimated signal and channel responses to optimize signal recovery. The Equalization system delivers the noise reduction schemes for improving the signal to noise ratio (SNR) of the Com2000™ system. Improving the SNR allows ultra high-speed data modulation methods that increase the channel capacity and data for every Hz bandwidth of signal frequency.

Once the channel noise has been reduced and the node has been synchronized, the signal coding system provides a baseband line signal coding method that increases the effective data throughput by increasing the number of symbols per hertz of data transmission. Through the implementation of the Signal Coding system, data rates up to 2 Gigabits per second can be achieved. The Com2000™ new asynchronous signal coding such as Partial Response PAM-5 (SPAM-5) uses the baseband PAM-5 signaling, coding and scrambler as suggested in the IEEE 802.3ab standard to satisfy the FCC power emission requirements.

In addition, the Com2000™ Precision sampling system implements a precision phase offset in order to deliver precision phase delay controls for the partial response PAM-5 realization. With this precision controlled multi-level signaling capability, the Com2000™ System provides multi-level scalability for 100, 1000 and 2000 Base-T data transfers. The Precision Sampling system ensures that every clock signal in each system is transmitted and sampled at the receiver within a predicted phase interval. The Precision Sampling system also provides a precise method of measuring the power of the received signal.

Each of the systems of the Com2000™ system, in conjunctions with the clean signal and improved communications channel, enables a method of providing data and network security at the physical signal layer—greatly reducing the current overhead of encryption and decryption. More specifically, the Com2000™ Electronic DNA (E-DNA) Security System generates a unique electronic signal signature that proliferates throughout the entire data communication networks. The signal's signature is composed of both the waveform signal itself and the content of the waveforms. The security system transmits the signature of the waveform by pre-positioning the signal at a specific frequency and phase matrix cell. The signal signature of the waveform's content is provided via the pseudo-random noise (PN) signature for each node of the network. This PN signature provides network security by prohibiting any unauthorized intrusion by validating the signature, or E-DNA, of the sending node. The security systems works in conjunction with standard MAC layer encryption and decryption algorithms, such as the Time Division Password Algorithm, Connection Awareness Algorithm and Carrier Signal Offset Algorithm, to make transmissions over the Com2000™ system virtually impregnable from unwanted access.

The preferred embodiment of the system is in the form of a 10/100/1000/2000Base-T Com2000™GPHY4 physical interface chip and 10/100/1000/2000Base-T Com2000™ GMAC4 media access interface chip. In the Ethernet context, the Com2000™ system provides Multi-Gigabit channels using the present CAT5 UTP network infrastructure. On the more general Information Technology system level, the system provides advanced IT management across many communications environments. Details of a wireless data communication environment using the Com2000™ system are explained in the Wireless Information System.

Clock Transfer System (ITSync)

This section describes the Com2000™ GPHY4 Clock transfer system for a precision controlled data delivery system and the underlying technologies that are involved in the design and development of this high-speed data communication transceiver. The Clock Transfer system provides precision frequency, phase and time control for the data communication network, enabling Gigabit data communication over the same standard 8-wire Unshielded Twisted Pair (UTP) CAT5 cable as 100Base-T. The Clock transfer system may provide the precision phase, frequency and time control on a network wide basis enabling the network to operate in a synchronous fashion. This system is the cornerstone of the Com2000™ GPHY4 operation that enables the accompanying Precision Sampling system to precisely position the phase sampling and measurement windows at the center of the Eye Diagram with minimal error. This in turn provides the capability to operate at Multi-Gigabit data rates.

The preferred embodiment of the Com2000™ Clock Transfer system is on the network physical interface device (PHY or GPHY4) of the CAT5 Gigabit network. This description is not intended to limit the application of this system to a Cat5 gigabit network, however, as those skilled in the art will recognize that the system may be used in any number of networking systems.

The Clock Transfer system provides the "heartbeat" of the Com2000™ System. The clock transfer system relies on several subsystems including the Reference Clocks and Measurement subsystem, the Precision Reference Clock Generator Subsystem, LAN Reference Clock Generator subsystem.

The Reference Clocks & Measurements Subsystem maintains and corrects the frequency and phase reference signals for the entire Com2000™ transceiver. These corrected frequency and phase reference sources are transmitted across the network system through the Precision Reference Clock subsystem, which selects the reference source, such as external precision reference signals, LAN communication channel signal, or internal free running clock, to utilize as the system reference. (See FIG. 8, 8a, 9, 9a).

The Clock transfer system, through the LAN Reference Clock Generator subsystem, enables the network system nodes to synchronize frequency and phase and operate in unison across the entire network. This enables the extension of the phase-lock period of the receiving clock allowing larger data packages to be transferred. The Clock transfer system's synchronous nature further enables reduction in both self-generated noise and Inter-symbol Interference (ISI). The Com2000™ Clock transfer system enables Precision Sampling Techniques that not only contribute to an incredible SNR increase but also enable complete control of critical transmit channel parameters. These include control of the level of radiated EMI emissions (through the determination of propagation delay) and more accurate Filter coefficient determinations for removing channel distortion. The controls enabled by the Clock transfer system also provide mechanisms for the unique Com2000™ security feature of a personalized electronic signature for each system node (Electronic Deterrence of Network Address (E-DNA)).

The Clock transfer system operates within the Com2000™ State Transition Diagram (STD). Let us describe in detail the VHDL logic interaction for each system mode of the STD. The states, or operating modes, are setup in such a way that the Com2000™ Clock Transfer System can set the desired starting mode through a Control Mode command that forces the VHDL logic to go directly to the selected mode. For standard operation the VHDL logic increments through each of the modes in sequence.

Figure 9B:
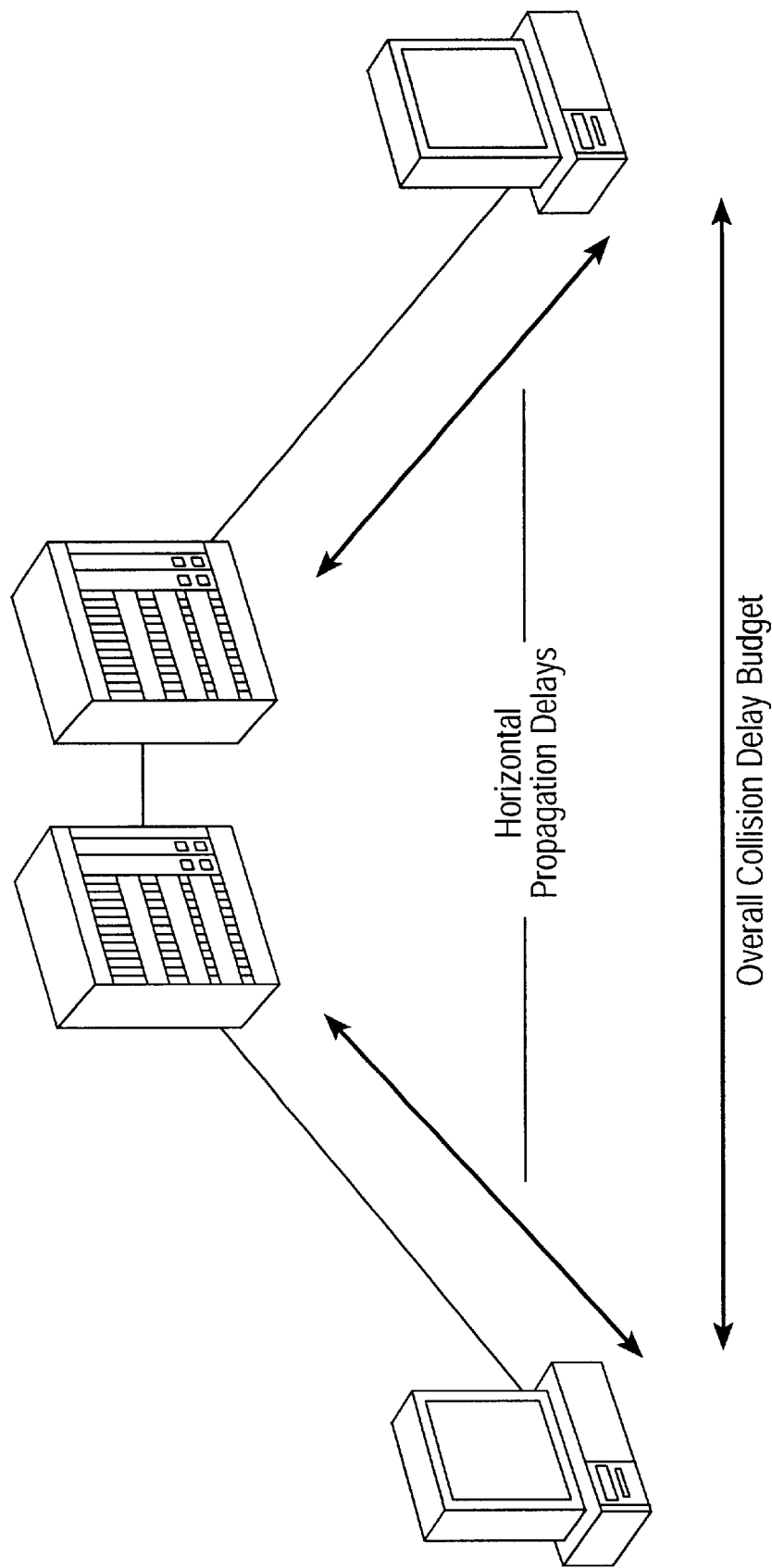
FIG. 9b illustrates the relationship of 100Base-T Cable Propagation Delays to Overall Collision Budget. The 1000/2000BaseT and Multi-Gigabit cable propagation delays will be determined by the Com2000™ Base-T device in realtime for automated MAC collision budget calculations.
Figure 9C:
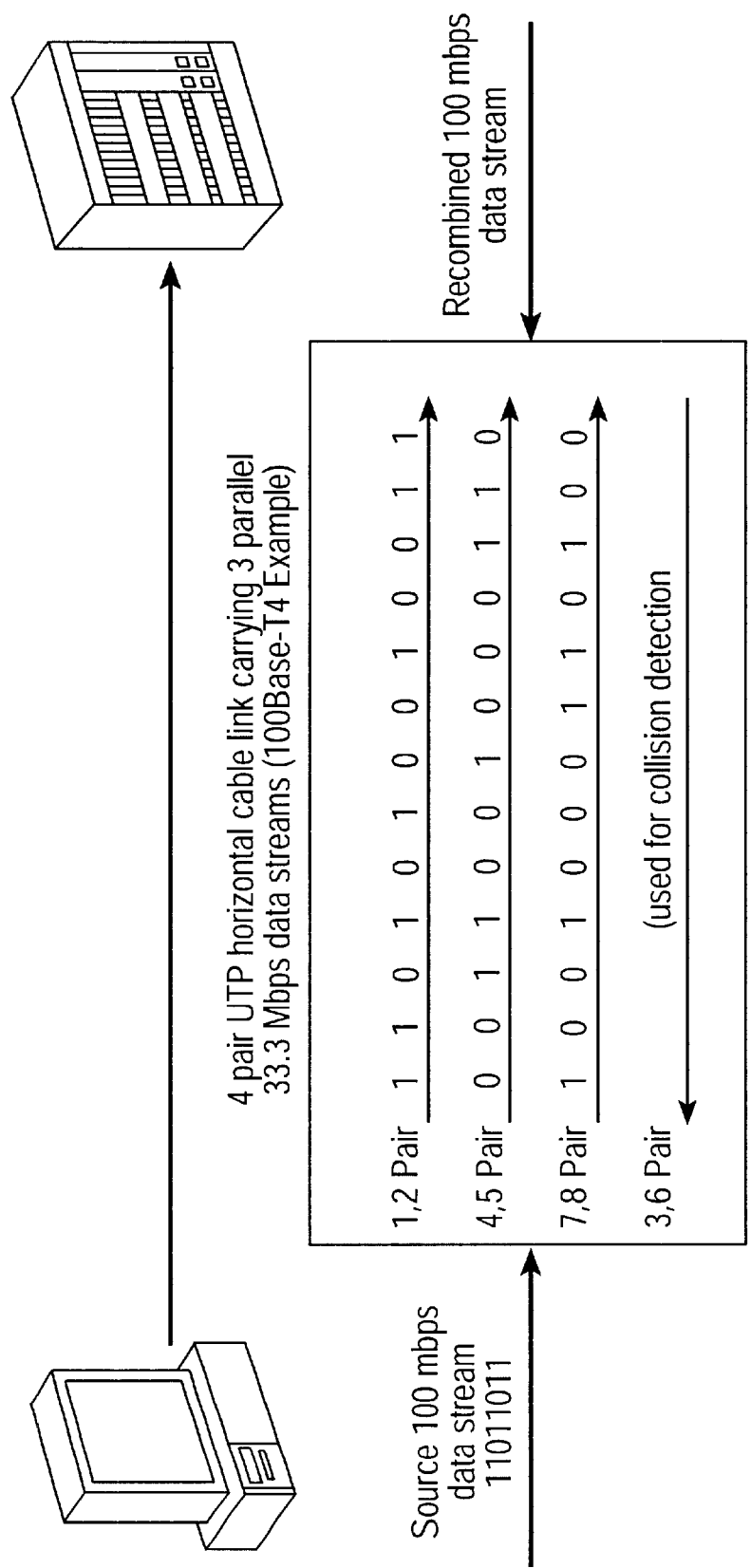
FIG. 9c provides the propagation delay skew limits for simultaneously transmission over 4 pairs (8 wires) Networks. Com2000™ Base-T device calibrated the skew offsets during power up phase and is used for compensation during the data transmission.

The eleven initialization and training states, or operating modes, are described below: (See FIG. 9)

1. Power Up.
2. Discipline Local Oscillator.
3. Initialize all communication channels.
4. Calculate internal communication channel offsets or biases for intrinsic calibration.
5. Internal Idle - Stay off communication channel & maintain system phase.
6. Select the communication channel for Phase and Frequency Transfer.
7. Establish communication channel.
8. Calculate external communication channel offsets or biases for extrinsic calibrations.
9. Perform half-duplex Frequency & Phase Transfers.
10. Perform full-duplex Frequency & Phase Transfers.
11. External Idle - Stay off communication channel & maintain external system phase and frequency.

In summary, upon power up (Mode 1), the system performs a self-test and starts disciplining (precision tuning) its local oscillator to the selected traceable reference source (Mode 2). The CAT5 communication channel signal protocols are then initialized (Mode 3) to the common heartbeat of the reference, or disciplined frequency and phase, so that the communication channel biases can be determined (Mode 4). The system is now ready for external phase and frequency transfers (Mode 5) that can be initiated through an automatic sense signal on the communication channel's data signal (Mode 6).

The received data signal is tracked and decoded (Mode 7) for Station Identification verification and node awareness, and to determine whether the received station identification is synchronized to the traceable reference. If it is not synchronized, the station's Phase and Frequency Transfer process is initiated (Mode 8). The system first determines its phase and frequency offsets relative to the received signal data of the station ID (Mode 8). Once the offsets are determined, the values can be sent back to the requested station ID and used for tuning its local oscillator accordingly (Mode 9). The process continues until the Station ID local reference is within the designated tolerances (Mode 9). The Station ID then does the final full duplex ranging estimates of the offsets (Mode 10) for fine-tuning of the synchronization phase and frequency offsets. Once the station ID completes its fine tuning of the local reference, the Station ID is declared as a Disciplined Station ID and the process will suspend for a predetermined period before the commencing fine tuning process again (Mode 11). The training process continues until all newly identified station ID's internal oscillators are disciplined. Within a few seconds, this training and calibration process brings the network system into an initial disciplined state that is continuously fine-tuned during normal system communication.

Mode 1—Power Up

Within this state the system conducts a proper power up sequence where blind equalization and self-tests are performed to validate the integrity and readiness of the system.

Mode 2—Discipline Local Oscillator

Within this state the Com2000™ system is internally locked to the station reference source through the default LAN communication channel input signals. The Clock Transfer logic has the option to select from other reference sources if the current LAN communication channel signals are not available.

The Com2000™ system has the capability to synchronize its local reference to the phase and frequency of any communication reference source. The system can therefore be used to determine the phase and frequency offsets of its local reference source relative to any communication node through the tracking of the communication channel. The system can determine the phase and frequency offsets (matrix cell of frequency versus Phase) of one particular communication channel node relative to another similar communication channel node or an entirely different communication channel node. In the case of the default input LAN data communication channel, it is used as a reference source (through timing recovery circuitry) for disciplining the internal oscillator and then is used as the disciplined reference source to propagate the absolute phase and frequency across the LAN communication nodes.

Before getting into the actual mode 2 VHDL logic algorithms for disciplining the local oscillator of the Com2000™ Clock Transfer System, a description of the overall logic and system operation is required.

Figure 8B:
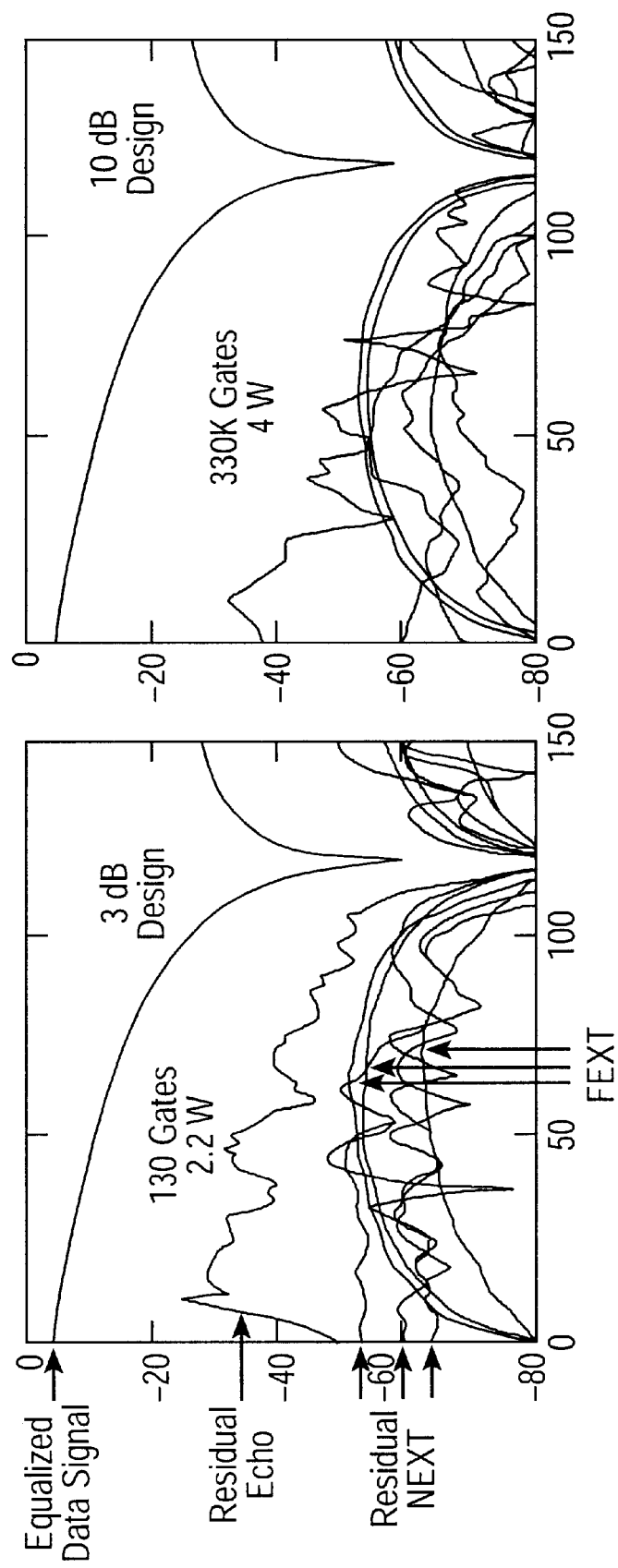
FIG. 8b illustrates Signal and noise power spectra inside the receiver. The signal and noise spectra are shown for 2 simulated 1000/2000Base-T designs targeting 3 dB and 10 dB of SNR margin. The echo and NEXT spectra are shown at the output of the cancelers.

The Reference Clocks & Measurements Subsystem, shown in FIG. 8, includes the Disciplined Signal Generator (11), Oscillator Reference Clock Generator (12), Precision Reference Clock Generator (13), Measurement Source Selector (14). Measurement Reference Clock Generator (141), Corrected Output Generator (15) and The Precision Sampling Logic (16).

The Precision Sampling Logic (16) controls all aspects of the Precision measurement and timing functions. This includes signal clock tracking and management of the Precision signal processing, Phase Estimator Control of the measurements for timing solutions, phase/frequency transfer, security signature processing and PLL controls.

The frequency reference (194) for the Precision Reference Clock Generator (13) is selectable (122) from either an internal Tunable Crystal Oscillator (123) or an external reference input (125). The selected Precision reference (194) drives a phase lock loop of the Precision Reference Clock Generator (13) at the Precision Sampling Logic signal input reference rate or Precision reference (194). The Precision reference clock (191) is distributed to the Precision Sampling Circuit logic and the DDS Signal Synthesizer (111) for generating the Precision corrected 125 MHz output (19G).

The Precision Sampling Logic performs all of the Phase and Frequency offset comparison functions, signal phase and frequency related processing and tracking of individual frequency and phase errors.

The Corrected Output Generator (15) produces 2.5, 25, 125, 250 and 500 MHz outputs (159B, 159C) and a 1 and 100 Pulse Per Second (PPS) signal (159A). The Disciplined Signal Generator (11) produces a disciplined 125 MHz output (19F). The corrected output signals are all synchronized to the Precision reference tracking clock (19J). The Precision reference tracking clock is traceable to the World Standard Reference.

When tracking, the Precision Reference Tracking Clock (19J) and the output frequencies (159A, 159B, 159C) are all within 10 parts per trillion. The 100 PPS (19K, 159D and 159A) is maintained within 4 ns RMS of the Precision Reference Tracking Clock (19J).

The DDS Signal Synthesizer (111) is used to generate the 125 MHz Precision corrected reference signal (19G). The output frequency is controlled by the input control value (114) from the Clock Tuning Logic (161) of the sampling circuitry (16). The N bit control value (114) allows the output digital frequency (116) to be controlled to better than 10 parts per trillion. The control value is derived by the Phase Estimator Control solution of the VHDL logic (161). This value is continually updated to maintain accuracy. During periods of Precision signal outage, the DDS Signal Synthesizer (111) flywheels using the last valid control number (114). The output digital frequency (116) will then drift according to the aging rate of the oscillator (123), <50 PPM drift per day.

The output digital frequency of the DDS Signal Synthesizer (116) is a digital sine wave that is converted to analog using a fast Digital-to-Analog (DAC) converter (112). The resulting analog signal (117) is filtered using a narrow bandpass filter (113) to remove the unwanted noise and harmonics. The output Precision corrected 125 MHz is buffered for isolation (19F).

The 2.5 and 25 MHz frequency outputs (159B, 159C) are generated from (153,154) the 125 MHz Precision corrected signal (19G). The two frequencies are then filtered to remove spurs and to convert the signals to a sine wave (155,156). The frequency dividers (153,154) are synchronized to the 100 PPS (159D) to insure consistent phase relationships between the output frequencies (159B, 159C) and the 100 PPS signal (159D). The outputs are buffered (157) to achieve an isolation between frequency outputs (159B, 159C) of greater than 100 dB.

The 100 PPS signal (159D) is generated from the 125 MHz clock. The counter (152) is initially jam set (159) to properly set the phase, and thereafter maintained through corrections to the DDS Signal Synthesizer (111). Verification of the 100 PPS phase is accomplished by sampling both the 100 PPS (152) and the DDS phase (115). Calibration and alignment of these two registers is performed at power up to achieve a resolution of 125 ps.

The method of generating the 100 PPS signal (159A) is critical as it allows all generated clocks such as 500, 125 MHz (19F), 2.5 MHz (159B) and the 25 MHz (159C) to maintain phase coherence with each other. Non-coherent designs can jump the phase of the 100 PPS signal (159A) with respect to the Precision corrected clock outputs (19F, 159B, and 159C) and upset the phase measurement and calibration circuitry.

Because the Precision corrected 100 PPS signal (159D) is derived from the 125 MHz oscillator (123 & 111), the Pulse-to-Pulse jitter is kept to less than 1 ns RMS. Corrections of the 100 PPS (159D) over phase are created by slowly tuning the 125 MHz oscillator (123,111) so that for changes in Precision reacquisition, or other operating conditions, the corrected signals maintain extremely stable outputs. Phase jumps and output discontinuities are therefore eliminated.

The Measurement Source Selector (14) allows an external 100 PPS input (149C), or an external 100 PPS derived from the external frequency (19A), to be measured using the Precision corrected reference (19G). The 100 PPS is measured to a resolution of 1 ns and the frequency is measured to a long-term resolution of 10 parts per trillion.

To achieve the accuracy and resolution required by the system a 500 MHz clock (147) is generated. The 500 MHz clock (147) is Precision corrected because it is phase locked, as shown in the Measurement Reference Clock Generator (141), to the Precision corrected 125 MHz signal (19G). The Synchronization Circuit (144) for the latch (143) resynchronizes the asynchronous signal input (149C) to the 500 MHz clock (147) while latching (143) the phase of the 500 MHz clock (149A). This allows a measurement resolution of 1 ns to be obtained.

To measure the external 100 PPS input signal (19A), the corrected Precision PLL 500 MHz signal (147) is down counted (142) in a series of decade counters to 100 Hz (149A). The 100 Hz and the Precision corrected 100 PPS (149B) are in phase with each other but with some fixed but unknown offset. A one-phase measurement is made by latching (143) the phase of the counter (142) at the Precision corrected 100 PPS signal selection (149B). The received external 100 PPS (149C) is then selected from the multiplexor (mux)(145) and the phase of the counter (142) is again latched (143). The difference is the offset of the Precision corrected 100 PPS (149B) relative to the input 100 Hz signal (149C). The measurement continues at a 0.1 second update rate.

To measure the external frequency (121), the external input is divided down (19A) to a 100 Hz signal. The 100 Hz is used by the mux (145) and the Sync (144) to latch (143) the phase of the 500 MHz down counter (142). By monitoring the changes in the counter over time, the offset is calculated. The one-shot Sync (144) measurement's accuracy of 5 parts per billion is initially obtained. The resolution improves when integrated over time. At 500 seconds, during normal data communication operation, the measurement resolution reaches the specified 10 part per trillion. All counter measurements are averaged for 500 seconds to insure full resolution at each subsequent measurement (100 Hz).

Once the local frequency (19F) is disciplined to the selected reference, it is used to generate the corresponding timing and clock signals for the Synchronous Partial Response PAM Modulator and Demodulator and the LAN Communication Channel (37).

The previous discussion provided the overall structure and operation of the Reference Clocks and Measurement Subsystem. The following paragraphs will discuss how the master generated reference source is transferred across the LAN communication channel to discipline the local slave's oscillator with respect to the phase and frequency reference of the master.

Figure 10B:
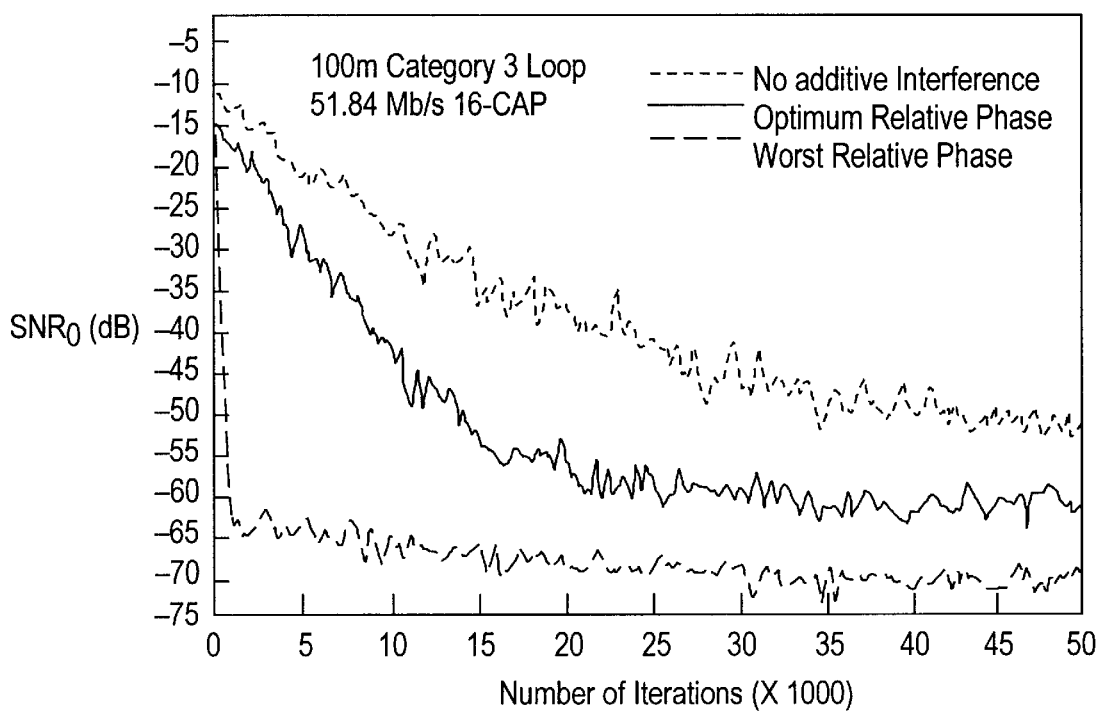
FIG. 10b provides the convergence characteristics of the FFE/DFE Filter in the presence of a single cyclostationary NEXT interferer.
Figures 1, 10C:
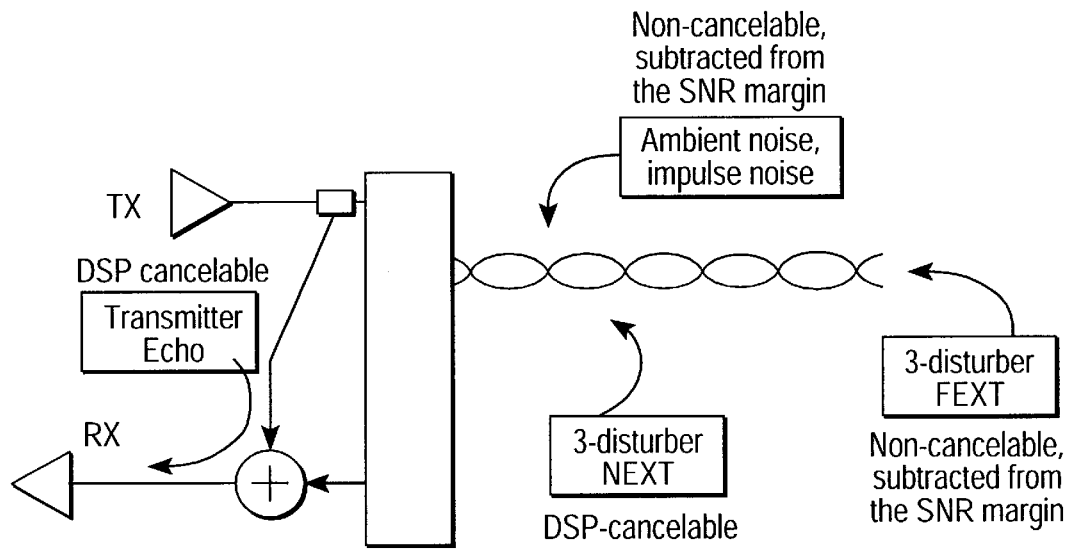
Figures 2, 10C:
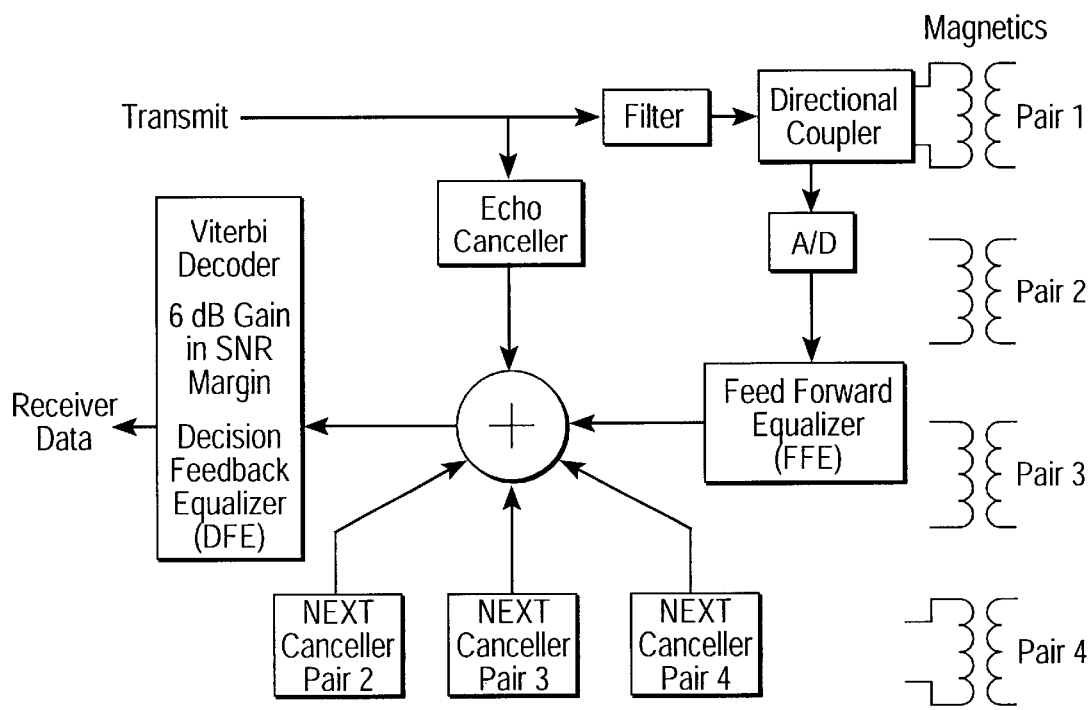
FIG. 10c illustrates the noise at each receiver is the sum of NEXT from 3 adjacent pairs, FEXT from 3 adjacent pairs, transmit echo and ambient noise. All four sources of noise add onto the attenuated receive data signal.

The Network Com2000™ Transceiver (31), or the LAN Front End Interface shown in FIG. 10, is comprised of a Transmitter Section and a Receiver Section. Upon completion of the initialization and training phase, the network system enters the normal data processing phase that maintains the disciplined Clock Phase and frequency across the networking system. During normal operation when data is not being sent, the Com2000™ Clock Transfer Logic transmits the IDLE Clock Symbol for continuous system phase and frequency tuning.

For the transmitter function (Channel Equalization Filter) (312) of the system, the 1000/2000Base-T Transmit Symbol Encoder (315) accepts 8-bit data from the MAC GMII and converts it into Quinary encoded symbols for differential PAM-5 signal modulation transmission. The signal levels of the differential driver (314) conform to the specifications in the 1000Base-T IEEE proposed standard.

The Com2000™ Channel Equalization and Filter Subsystem (312) performs the auto-correlation function for the received unique Multiple Access PN (Pseudo Random Noise) sequence of the FFEIDFE equalizer predefined preamble data. The clock recovered from the received preamble data in the phase lock loop of the Clock Recovery Controller Logic block (311) is captured and used to steer the local clock. For transmission of data, the Transmitter clock reference is the corrected and disciplined 500 MHz clock (19F) and is used as the reference source for the Channel Equalization and Filter (312).

This clock is derived from the selection of either an internal clock source (123), the received data clock from The Clock Recovery Controller Logic block (311) or an external disciplined clock (121). The derived clock is used as the transmitting frequency reference (312). This provides enormous flexibility for the data throughput and synchronization whether utilizing packet-based or cell-based data packages or an external or internal clock source for the transmission frequency reference.

The clock transfer is able to deliver frequency and phase synchronization based on the transmit and receive symbol clock pulses (19A). Once the transmitter's clock pulse (37) is the same as the receiver's clock pulse (171) (within a minimal phase and frequency offset), and the phase stamps for the encoders and decoders of each node in the network are within a 1 ns phase delta, the Com2000™ system is able to use the network clock synchronization to improve bandwidth and throughput over the network communications channels.

The transmitting symbol frequency reference of 125 Mbaud (37) is derived from the Com2000™ absolute oscillator clock (19A) (World traceable frequency). This clock pulse (19A), or heartbeat, is used for the carrier phase signal of the modulated Partial Response PAM-5 Coding data stream (315,313). Because the same heartbeat is on both the Com2000™ transmitter and receiver sides of the LAN communication nodes, the receiver enhances the SNR by improving the filter and equalizer operations, virtually eliminating frequency and phase lock loss and improving the complex signal modulation and data demodulation schemes.

The improvements, when selecting the reference signal (19A), are mostly generated in the 100/1000/2000Base-T Function Block (FIG. 10). This Block performs link integrity test, link failure indication and link reverse polarity correction, SQE test generation at the end of each transmitted packet, and collision detection for simultaneous transmit and receive packets. During heavy network traffic on a typical network, the effective throughput of the 125 Mbaud network would be reduced in capacity due to the signal ISI noise, data retries due to lost data bits and phase lock loss. However, with the Com2000™ System implementation, during heavy network loads, the system operates at near maximum capacity. This is due to the elimination and suppression of the relative phase offset between ISI sources, which enhances the equalizer and detection circuitry, and the elimination of the management overhead that a typical unsynchronized network incurs.

For a typical data receive operation, the filtered recovered clock (311) is fed to the LAN Reference Clock Generator (17) for providing the 125 MHz receive reference clock signal to the Measurement Source Selector (14) for measuring the phase and frequency offsets relative to the disciplined reference signal (19A). This is done so the LAN communication signal, phase & frequency offset calibrations and phase & frequency transfers can commence.

The LAN Reference Clock Generator (17) is a Phase-Locked Loop (PLL) Frequency Synthesizer. This block provides pre-scaler performance (178,172) for high frequency operation, permitting PLL designs that can utilize a smaller VCO division ratio (176). The block 17 design makes possible wider loop bandwidths yielding faster settling phases and lower VCO phase noise contributions (179).

The Reference Clocks and Measurements Subsystem provides the system heartbeat and reference sources for the Com2000™ LAN System. The control of this subsystem is from the Clock Transfer Precision Logic block (166), which executes the mode 2 VHDL logic algorithms for disciplining the local oscillator of the Com2000™ system.

Let us now begin the discussion of the Com2000™'s System VHDL logic for Mode 2. The mode 2 logic is designed for autonomous operation. The Com2000™ has three distinct phases of operation for disciplining the internal oscillator to the absolute phase and frequency reference. The first phase is the Frequency Jam Control, the second phase is the Phase Jam Control and third phase is the Closed Loop Tuning Control.

The Reference Clocks & Measurements control logic (M201, See FIG. 9a) controls the clock skewing of the local oscillator for disciplining to the Precision clock reference. The Com2000™ System receives the Precision phase measurement (16) for the local oscillator frequency and phase offset values from the Phase Estimator Control Solution (M202). This data is used by the Com2000™ system to determine the frequency value of the local oscillator (23) relative to the tracked Precision coded signal frequency (19J) and the phase of the local oscillator (123) relative to the phase value decoded from the Precision Reference signal (19L).

During the Frequency Jam mode, the Reference Clocks and Measurements Control Logic (M201) loads the controlled frequency value (the Phase Estimator Control Frequency solution), with certain gain K, into the Numerical Control Oscillator, or NCO, using the received Phase Estimator Control Frequency offset value.. This is done every cycle as defined by the Phase Estimator Control Solution rate and the Suspend Time Logic (M216). Once the Phase Estimator Control frequency solution is within 500 ps/s (M203) of the frequency error, the gain K for the Frequency Jam mode is adjusted (M204) and the Frequency Jam Cycle repeats.

The Frequency Jam Mode is performed every cycle at the Phase Estimator Control solution rate until the value is within 50 ps/s (M205) of the frequency error. The Clock Control Logic (M201) then transitions the system into the next state, the Frequency Fine Tune Mode. The gain value K for the Frequency Jam mode is quite large and the Frequency Fine Tune Mode gain value K is quite small. As with the Frequency Jam Mode, the Phase Estimator Control for the Frequency Fine Tune mode solution value is loaded into the NCO. This is done for every cycle at the Phase Estimator Control solution rate until the value is within 20 ps/s (M206) of the frequency error.

The Clock Control Logic (M201) transitions the system into the next state, Phase Jam Mode, upon completion of the Frequency Fine Tune Mode. Using the received Phase Estimator Control Phase offset value, the Reference Clocks & Measurements Control Logic (M201) loads the controlled Phase value (The Phase Estimator Control solution), with certain gain K, into the NCO during the Phase Jam mode. This is done every cycle as defined by the Phase Estimator Control Solution rate and the Suspend Time Logic (M216). Once the Phase Estimator Control phase solution is within a 1000 ns (M207) of the phase error, the gain K for the Phase Jam mode is adjusted (M208) and the Phase Jam Cycle repeats. This is done every cycle at the Phase Estimator Control solution rate until the value is within 50 ns (M209) of the phase error. When this is achieved the Clock Control Logic (M201) transitions into the next state of operations.

During the Phase Jam Mode the corrected 100 PPS (159A) is adjusted by the amount indicated in the next Phase Estimator Control phase offset solution and the Precision sensor is commanded to adjust its internal Precision phase calculation with the same amount as the phase jam value.

Once the clock settles and the Phase Estimator Control phase and frequency solutions are within the fine tuning tolerance, the logic will transition into the Closed Loop Tuning mode (M212). During this mode, the NCO is loaded with the 70%, 50% and 30% values of the Phase Estimator Control frequency solutions for a frequency error of 500 to 400 ps/s, 400 to 100 ps/s and 100 to 1 ps/s respectively. During this mode, the time (phase) is loaded with the 70%, 50%, 30% value of the Phase Estimator Control phase solutions for a time (phase) error of 1000 ns to 500 ns, 500 ns to 200 ns and 200 ns to 50 ns respectively.

When the Phase Estimator Control phase and frequency solutions are within the disciplined tolerance (5 ns and 20 ps/s respectively), the Valid Data signal (M211) is enabled and the Disciplined Mode is completed.

Mode 3—Initialize Communication Channels

In this state the Com2000™ communication channels are internally locked to the local reference signal source (123). The Channel Equalization Filter (312) and the Clock Recovery Controller Logic (311) select the derived Corrected 125 MHz signal source (19F) as the reference signal for the PLL and the decoding (313) and encoding (315) blocks.

Mode 4—Calculate Internal Communication Channel Bias for calibration.

In this state, the Com2000™ communication receiver is phase locked to the internal transmitter BIT (Wrap around injection) signal with a clock frequency that is traceable to the 125 MHz Reference signal source (19F). Before external phase and frequency transfers are performed on the selected communication channel, the channel phase and frequency offsets are determined. This is a state where the Com2000™'s communication channels are internally locked to the local reference signal (123) and the phase and frequency offsets for the transmitters and receiversof the channels are determined relative to the absolute reference phase and frequency source (123). The Phase and Frequency measurements (14) are performed for the selected communication channel.

For the LAN Network communication channel, a BIT signal from the Com2000™ Channel Equalization Filter (312), which is derived from the corrected 125 MHz signal source (19F), is used as the transmit and receive signal for the LAN channel calibration calculations.

In order to obtain the phase difference between the absolute phase source (123) and the received signal phase (9) from two phase reference stations, the offset of the 100 PPS Reference signal (15) and the 100 PPS derived from the LAN received signal (9) has to be determined. By using the Measurement Source Selector (14) the 100 PPS phase offset value and frequency offset value of the BIT signal and the LAN reference source is determined.

To measure the external communication channel 100 PPS input signal (9), the corrected Precision PLL 500 MHz signal (147) is down counted (142) in series decade counters to 100 Hz (149A). The 100 Hz and the Precision corrected 100 PPS (149B) are in phase with each other but with some fixed but unknown offset. A one-phase measurement is made by latching (143) the phase of the counter (142) of the Precision corrected 100 PPS signal selection (149B). The received external 100 PPS (9) is selected at switch 7 for the Mux input signal (149C) and is selected through the Mux (145). The phase of the counter (142) is again latched (143) and the difference between the precision 100 PPS latched value and the external 100 Hz latched value is the phase offset relative to the Precision corrected 100 PPS (149B). The measurement continues at a 0.1-second update rate.

To measure the external communication channel frequency (10) offset relative to the local frequency reference, switch 5 selects the external input frequency source for the Auto Selector (121) input frequency. The external input is divided down (19A) to a 100 Hz signal. The 100 Hz is passed through the Mux (145) to the Sync (144) to latch (143) the phase of the 500 MHz down-counter (142). By monitoring the changes in the counter over time, the offset frequency can be calculated. The one-shot (144) phase measurement accuracy of 5 parts per billion is initially obtained. The resolution improves when integrated over time. At 500 seconds, during normal channel communication, the measurement resolution reaches the specified 10 parts per trillion resolution. All counter measurements are averaged for 500 seconds to insure full resolution at each subsequent measurement (100 Hz).

Mode 5—Internal Idle, Stay Off Communication Channel & Maintain System Phase.

In this state the Com2000™ communication channels are internally locked to the local reference signal source (123) without transmitting or receiving any data from the communication channel. The system phase is maintained and calibration is done periodically. This phase is performed during IDLE system operation.

Mode 6—Select The Communication Channel For Phase and Frequency Transfers.

In this state the external Com2000™ communication channels are selected and internally locked to the local reference signal source (123) to be ready for transmitting and receiving data to or from the selected communication channel. The system phase is maintained and calibration is still done periodically.

Mode 7—Establish Communication Channel

In this state the Com2000™ communication channels are sending and listening to and from external nodes. This state performs a signal search in two-dimensional space, frequency and phase, for the received data signal. It performs a frequency search and then phase-locks the received preamble PN sequence of the signal. The received signal offsets from the local reference are determined and compared with the expected frequency and phase cell of the sending node. This establishes a node specific electronic signature (E-DNA) that is utilized for network security. For the sending data signal, the transmit reference carrier is phase locked to the local reference signal source (123) and the encoded data is superimposed on the carrier for sending the data out on the selected communication channel.

Within this mode, the Com2000™ Transceiver System extracts the station ID (PN sequence preamble) or identification information from the data received from each station node and determines if the station is a proper group member. If the incorrect ID is received, the LAN/WAN transceiver will keep attempting to extract the ID from the data until the correct or expected station ID is received.

Mode 8—Calculate External Communication Channel Offsets or Biases for calibration.

In this state the communication receivers are phase locked to the external transmitter signal with a clock frequency and phase that have unknown offsets relative to the internal local reference that is traceable to the 125 MHz Reference signal source (19F).

Before external two-way phase and frequency transfers are performed on the selected communication channels, their respective channel offsets are determined. In this state, the Com2000™ communication channel is externally locked to an unknown input reference signal and the phase and frequency offsets on the transmit and receiver section of the channel are determined relative to the absolute reference phase and frequency source (123). The Phase and Frequency measurements (14) are performed for the selected communication channel utilizing its received derived 100 PPS frequency signal.

The Com2000™ Transceiver unit includes circuitry to count the number of cycles after the "On Phase" mark when decoding the data and resolving down to the "Digital Carrier Cycle Resolution". The unit outputs a 100 PPS pulse synchronized to the phase code "On Phase" mark. This pulse is available as a TTL/CMOS output and can be used to initiate a host (MAC) interrupt that is a precision interval clock pulse. This interrupt pulse can be programmed to generate a synchronized pulse from 2000 PPS to 100 PPS. This provides an absolute time reference source capability within the Com2000™ Transceiver. This can be used as an UTC and World Standard time reference (i.e. year 2000-rollover solution).

Mode 9—Perform 1 Way Frequency & Phase Transfer to an External Communication node.

In this state the Reference Clocks And Measurements Subsystem performs the phase and frequency transfer between nodes with an absolute reference from the sending node to a receiving node that has no absolute signal references. The same frequency and phase tuning that is performed in mode 2, discipline of internal oscillator, is performed except the recovered clock of the received signal PN sequence preamble is utilized as the receiving node clock source.

Mode 10

Perform 2 Way Frequency & Phase Transfer to an External Communication node.

Once the receiving station oscillator is disciplined, full duplex phase and frequency transfers can commence. The Full duplex transfer technique is used for point-to-point phase and frequency transfer to obtain the highest precision and accuracy. Both the Slave and Master receive and transmit stations exchange timing and frequency information through the communication channel protocol employing appropriate coding signals for Category 5 UTP infrastructure and pseudo noise (PN) coded signals for security.

The relative phase measurement consists of simultaneous phase interval measurements (14) at both the Slave and Master nodes in which the 100 PPS generated by the local clock (159A) starts both the local phase and frequency counters (142,143). The master 100 PPS signal is encoded and transmitted across the communication channels. The received encoded 100 PPS stops the remote phase and frequency counters (142,143). The relative phase difference, T1-T2, between the clocks of both stations is given by the following equation:

$$T1 - T2 = 1/2(C1 - C2) +$$
$$1/2[(d1U + d2D) - (d2U + d1D)] +$$
$$1/2(d12 - d21) +$$
$$1/2[(d1Tx - d1Rx) - (d2Tx - d2Rx)]$$

Where:
C1–C2 is the difference of the phase counter readings of station 1 and station 2, which are exchanged in order to compute the clock difference.
d1U, d2U is the Transmit link delay of station 1 and station 2
d1D, d2D is the Received link delay of station 1 and station 2.
d12, d21 is the path reciprocity terms from 1 to 2.
Under the assumption of path reciprocity, this term, d12–d21, should cancel out. This assumption is likely to hold better than 2 ns for multiplexing transmission at IEEE-802.3 protocols.
(d12–d21) is the difference of the Category 5 UTP infrastructure or wireline transceiver delays in both signal directions.
d1Tx–d1Rx is the differential delay of the transmit part and receive part (station delays) of station 1 and 2. The knowledge of these station delay differences determines the accuracy of the phase comparison.

Once the Phase Interval Measurements are determined, the Frequency measurement follows. It consists of simultaneous Frequency interval measurements (14) at the master and slave nodes for an extended period of time. This enables clear definition of the slope of the curve of the counter readings relative to the measurement phase interval.

Mode 11—External Idle and Stay Off Communication Channels and Maintain System Phase.

In this state the Com2000™ communication channels are externally locked to the system reference signal source (123). The system nodes continuously transmit and receive IDLE symbols to maintain system phase and frequency synchronization within a fixed tolerance. The system returns to normal transmit and receive mode upon receipt of a valid data symbol.

The Com2000™ Clock Transfer system provides network system precision not currently available for Ethernet communications by providing complete system frequency and phase synchronization. The synchronized nodes may then transmit enhanced communications signals, using the code signaling system described below, that provide Multi-Gigabit data rates. The Clock transfer system also provides the baseline for the Com2000™ Channel Equalization, Calibration, Measurement and System Synchronization technologies that are required for high speed data transfers. Each of these Com2000™ technologies requires the precision control of the frequency and phase of both the internal and external frequency and phase parameters. The phase and frequency control capabilities generated by the Clock Transfer system also enables generation of the PN sequence that enables greater network security . Further details of the Com2000™ systems that rely on the clock transfer system are provided below.

Channel Measurement and Calibration System

This section describes the Com2000™ GPHY4 Channel Capacity Measurement and Calibration system that are part of the Com2000™ high-speed data communication transceiver for Category 5 cable infrastructures. The GPHY4 is a universal 10/100/1000/2000Base-T Physical Layer manifestation that delivers a robust high performance Multi-Gigabit data measurement and calibration system...

The GPHY4 Ethernet system delivers Multi-Gigabit data communication over standard 8-wire (2 Gbps over 8 wires) Unshielded Twisted Pair (UTP) CAT5 cable as 100base-T through the insertion of the Com2000™ technology. The Com2000™ GPHY4's technologies provide multiple solutions over and above the 1000Base-T (802.3ab) Ethernet standard. There are some CAT5 Gigabit problems and challenges that the 802.3ab standard body has not yet resolved but are currently addressed and solved by the GPHY4 Com2000™ Technology. These include: the inability to ensure consistent 1000Base-T communication due to the undetermined propagation delay skew limits of the CAT5 cable medium, which varies from one manufacturer to the other, that can cause the Gigabit data streams transmitted over 4 pairs of the cable to become asynchronous and therefore unreadable and the present standard also does not guarantee the efficient and reliable operation of the Gigabit network if the installed network is configured in violation of the propagation delay limit. The Com2000™ GPHY4 Channel Capacity Measurement and Calibration System (or technologies) provide solutions to these issues that ensures maximum data transfer capacity across any installed and new CAT5 cable medium.

The following discussion provides a background of CAT5 cabling with reference to FIG. 3 and identifies some of the contributing distortion and noise factors inherent in the cable usage and construction. Although inexpensive and easy to install, Unshielded Twisted Pair (UTP) wire is susceptible to noise generation from multiple sources, including fluorescent light ballasts and other common electrical devices. In addition, a length of twisted-pair wire acts as an antenna, gathering noise from readily available emitters. Thus, the longer the wire length, the greater the noise it gathers. At a certain length, the received noise will obliterate the signal, which greatly attenuates or decreases the signal in strength as it propagates along the length of the wire. This noise affects the error rate of data transmitted on the network.

The bandwidth of twisted-pair cable is considerably less then coaxial or fiber optic cable, since normally only one signal is transmitted on the cable at a time. This signaling technique is known as baseband signaling and can be compared to the broadband signaling capability of coaxial and fiber optic cable. Other constraints of unshielded twisted pair wire are the rate at which data can flow. Although data rates up to 2Gigabit per second can be achieved, normally local area networks employing UTP wire operate at a significantly lower data rate (1/10/100 Mbps).

Furthermore, a UTP wiring system normally covers a limited distance and is measured in terms of several hundred to a few thousand feet. Extending transmission distances over twisted pair wire requires data generators or repeaters. For 10Base-T and 100Base-T, standards dictate an operating rate at a distance up to 100 meters over UTP without the use of repeater.

The Com2000™ 10/100/1000/2000Base-T Ethernet application CAT5 UTP cable requires 2 pairs of twisted wire. One pair is used for transmitting while the other pair is used for receiving. Each pair of wires is twisted together, and each twist is 90 degrees relative to the other wire in the pair. Any EMI and RFI is therefore received 90 degrees out of phase; this theoretically cancels out the EMI and RFI noise while leaving a clean network signal. In reality, although the twisted nature of the cable reduces some of the noise, the wire between twists acts as an antenna and does receive noise. This noise reception results in the 100-meter cable limit and contributes to the degradation of the transmitted signal. The RJ45 jack is utilized for Ethernet UTP applications and is an eight-pin connector. In present Com2000™ 10/100/1000/2000Base-T network system applications only four pins are actually used, Transmit Data +,– and Receive Data +,–. For Gigabit applications, all eight pins will be utilized with each of the 4 wire pairs targeted to transmit 250 Mbps in a dual duplex mode per the 802.3ab standard and 500 Mbps per 802.3ab+.

The transceivers of the Com2000™ 10/100/1000/ 2000Base-T network interface send and receive the data utilizing differential drivers and receivers. The receiver measures the voltage difference between the conductors of Transmit Data+and Transmit Data–inputs. It is important that both twisted pair cables travel the same path and not include large cable loops within the cable path since large cable loops are susceptible to magnetic pickup, generating additional noise as well as increasing the cable propagation delay.

The Com2000™ Channel Capacity Measurement and Calibration Technology compensates for the specific cable parameters that induce additional noise or cause signal degradation and attenuation. These technologies enable the operation of Gigabit and Multi-Gigabit data transmission across the CAT 5 cable medium.

The objective of the Com2000™ Channel Capacity Measurement and Calibration design and implementation is to provide a method of measuring the capacity of the current Ethernet (802.3) communication channel to enable scaleable 100 Mbps to 2000 Mbs data rates within the allowable bandwidth of the current CAT5 infrastructure. The Com2000™ Channel Capacity Measurement and Calibration technology measures and compensates for many critical parameters: Clock Skew and Jitter; Propagation Delay; Specific signal characteristics; Power Sum Near-End Cross Talk; Power Sum-attenuation-to-cross-talk ratio; Return Losses; Manufactured Delay Skew; and Power Sum Far end cross-talk. Utilizing the results from the previously mentioned measurements, the GPHY4 's Physical Layer Device provides channel distortion correction and calibration by using precision phase and frequency calibration controls that suppress self generated phase noise sources of ECHO & NEXT and compensate for cable signal degradation and attenuation. In the preferred embodiment, the GPHY4's Channel Capacity Measurement and Calibration system resides in the Physical Layer Device . The GPHY4's Physical Layer Device provides propagation delay measurements for each pair in the 4 pair cables and provides propagation delay compensation on the transmitter side for all 4 pairs to ensure consistent Com2000™ 10/100/1000/2000Base-T operations. The compensation skew value is based on the measured maximum skew value from 4 pairs of signal wire to enable output data streams to be synchronized which then provides successful data recombination at the receiving end. The GPHY4's Physical Layer Device provides the propagation delay measurement results to the higher level MAC for optimum determination of the network collision limit. This guarantees efficient and reliable operation of the Gigabit network if the network is configured in violation of the propagation delay limit.

The GPHY4's Physical Layer Device also provides the channel capacity measurements and the scalable data transfer rate establishment during the channel calibration phase during the power up sequence. This will be used to verify that the new 1000Base-T return loss and FEXT specifications are met. If the specifications are not met, the negotiated scalable bandwidth capabilities can be used (provided there is GPHY4's Physical Layer Device at both ends for bandwidth scalability) to deliver a maximum data rate for the network {from 100 Mbps to 2000 Mbps} in 100Mbps increments. The re-test of CAT5 networking cables is already designed into the GPHY4 physical layer device so re-testing of the cables by external test devices are not required. The determination of the cable capacity and re-test capabilities are based upon the measurements and calibrations mentioned in the previous paragraph and described in further detail below. A discussion of the unique aspects of jitter measurement and management concludes this section.

One of the primary measurements that must be performed by the Channel Capacity Measurements and Calibration Techniques of the Com2000™ GPHY4 is the determination of channel capacity, To determine channel capacity, however, the sources of noise in the 1000/2000 Base-T system must be analyzed. Within this section is the description of the different types of measurements required for removing signal noise and degradation sources that effect channel capacity.

The Com2000™ Synchronous Signal Power Distortion and Measurements enable the 1000/2000BaseT to model and compensate the accurate estimation attenuation characteristics of the CAT5 . This is done so that the FEXT and NEXT signal equalization can be done optimally to recover and get back the 6 dB of signal's degradations and also get back an additional 2 dB for noise margin improvement over the 1000BaseT.

The primary goal of the P802.3ab standards group is to produce an Ethernet standard that would guarantee operation of a 1000Base-T network over existing and new category 5 installations at a BER of 10-10. As previously described, the 802.3ab standard does not provide guaranteed gigabit transmission across the CAT5 cable medium. This guarantee can be realized with the Com2000™ Channel Capacity Measurement and Calibration system which can measure the full bandwidth utilization capability of the CAT5 channel. Through these measurements and calibration techniques, the Com2000™ GPHY4 can transmit data up to 2 Gbps due to the noise suppression capability of the included technology. The Com2000™ Channel Capacity Measurement and Calibration technology delivers the re-test of existing CAT5 installations in real-time at the PHY level for channel capacity determination and negotiates the maximum allowable throughput of each channels. The data rates are scaled in multiple of 100 Mbps and have the range of {100 Mbps, 2000 Mbps}. This includes compensation for the propagation delays inherent in the 4-wire pair implementation of the 1000Base-T Ethernet application.

The following paragraphs describe the different measurement parameters performed within and as a part of normal operations for the Com2000™ GPHY4 Physical device. Propagation Delay for Transmission Cable Paths. The propagation delay for transmission cable path refers to the time required for a transmitted data bit to travel from one node to another (typically from the hub in the wiring closet to the NIC in the user location). Although both the 100Base-T and 100VG-AnyLAN specifications define limits for this parameter, the limit for 100Base-T is more critical because the 100Base-T limit is derived from the concept of a maximum network delay budget within which the two most widely spaced stations in a repeated network domain can reliably detect data collisions. The total delay budget is determined by timers that are inherent in the IEEE 802.3 defined medium access layer (MAC) protocol. A similar delay budget is required for implementation of the Com2000™ 10/100/1000/2000Base-T Ethernet MAC protocol.

The overall delay budget limit is important because it guarantees efficient and reliable operation of the network segment. If a network is configured in violation of this limit, there will be late collisions, necessitating retransmissions, ultimately limiting the effective bandwidth of the network segment.

In order to simplify configuration rules, the 100Base-T specification allocates a portion of the overall delay budget to each of the elements used in building compliant networks. A portion of the delay budget is allocated to cable propagation delays, a portion to repeater delays, etc. Under this framework, the 100Base-T specification places limits on the propagation delay of horizontal cabling runs. (See FIG. 9b).

The portion of the overall delay budget allocated to cable propagation delays was chosen to encompass a reasonable worst case estimate of the performance of a hypothetical 100 meter cable run. In practice, the actual delay of a 100 meter cable run can vary substantially, since propagation velocities, or the rate at which signals travel along these cables vary among manufacturers and among cable grades. This variance is caused by variations in cable construction methods (i.e. twist construction) and insulation materials. In the field, there is the additional complication in that sometimes it may be necessary to install cable runs that are slightly longer than the 100-meter limit due to site requirements.

This Propagation Delay Skew parameter, also referred to as Pair Skew, describes the difference in propagation delay between the fastest and the slowest pairs in a four pair UTP transmission cable run. Propagation delay skew is an important parameter if a cabling run is intended to support networks that transmit simultaneously over multiple cable pairs and require data recombination upon reaching their destination (e.g. Gigabit and Multi-Gigabit Ethernet Propagation delay skew arises from the fact that for many four pair cables, each pair is intentionally constructed with a different twist length in order to minimize the crosstalk coupling between pairs. Propagation delay for any pair is in part a function of twist length, so delays vary between pairs.

It is critical that the parallel lower speed data streams transmitted on the individual cable pairs arrive at approximately the same time at the far end of the cable so that they can be successfully recombined without losing synchronization. In order to ensure that this happens, it is important that the four pairs in any cable link have propagation delays which do not deviate from each other by more than the maximum limits listed in (FIG. 29).

The Com2000™ PHY supports direct field measurement and determination of the propagation delays for each pair in four pair cables via utilizing the synchronization nature of the sending and receiving node for cable pair test. The maximum delay skew is automatically calculated and compensated for within the Com2000™ GPHY4 during data transmission. (See FIG. 9c).

The Com2000™ PHY then applies the delay skew requirements listed in (FIG. 29) when determining an overall pass/fail result for the 1000/2000BaseT and Multi-Gigabit applications. In this way, the Com2000™ GPHY4 provides a simple and comprehensive means of verifying that pair delay skew limits are maintained.

The Com2000™ GPHY4 reports the propagation skew measurement and pass the results to the Com2000™ MAC to determine application-specific network pass/fail criteria. The cable performance data is compared against both the generic cable specification requirements (i.e. Category 5 or Class D) and also against the specific requirements of up to 25 network application specifications stored within the chipset (i.e. 100BaseT4, ATM155 etc.).

If the measured data does not allow the CAT5 cabling to operate at full capacity, the Com2000™ GPHY4 automatically transitions to "Scaleable Network" mode. (This option is only valid when Com2000™ GPHY4 are at both ends of the network). This option allows the system to determine the maximum data bandwidth available (in multiple of 100 Mbps) that corresponds to the measured existing cable capacity.

The system also provides a precise method of measuring the power of the received signal. The power penalties above 3 dB result from the uncertainty of the measured eye center power and increase significantly due to the increased timing jitter of the signal.

One goal for the Com2000™ 10/100/1000/2000Base-T system is to ensure that every clock signal in each system arrives within the predicted phase interval. The system manages all the parameters that can contribute to unequal or inconsistent arrival phases of the clock at the load. This necessitates measurement of the distributed path delay and the management of those mechanisms that tend to alter the delay along the distributed path. The worst case tolerance is generally computed from the earliest and latest arrivals of the data stream therefore balancing the mean cable delay moderates the impact of any statistical delay variation. The tolerance can be defined as the sum of Intrinsic Skew, Extrinsic Skew and Jitter.

The Com2000™ Channel Calibration (330) logic removes the Intrinsic and Extrinsic Skews. The Intrinsic Skew is the delay variation in the clock buffer and is usually specified separately for part-to-part and pin-to-pin skew. The Extrinsic Skew is the phase distortion variation that is attributable to effects in the system interconnections.

The relationship between the receiver noise distribution threshold and edge-placement (jitter) phase distribution threshold defines the window of the signal-tracking threshold. This window is directly correlated to the extrinsic skew phase distortion. The extrinsic skew is the sum of the Phase Variation, Distortion-Delay Variation and Manufacturing Tolerance.

The Phase Variation delay is the variation in the phase of travel of an undistorted signal. This delay is due primarily to the variation in line lengths, and does not include additional delay variation attributable to edge degradation. This effect is addressed by equalizing all clock net lengths (cable) to that of the longest clock net length. The Com2000™ Measurement and Calibration Logic measures the cable length delays with the Measurement circuitry of the system The Distortion-Delay Variation is the signal propagation attenuation of the high-end spectral content of the signal.

One prominent cause of this is the capacitance of the clock load. This results in a slower or degraded edge, and ultimately induces additional delay in reaching the threshold voltage. Any variation in edge degradation results in a variation in delay. The Com2000™ Calibration Logic compensates for the power distortion of the propagation cable length delay, which is estimated by the Measurement circuitry of the system The equation of the phase distortion for Extrinsic Skew (phase of travel distortion+distortion delay variation) is Delta T.

Delta T (ps)=(Length of Line in inches)*(Propagation Rate of loaded transmission line in ps/inch)*Delta Transmission Line Factor.

Where the Transmission Line factor=Sqrt (1+(Distributed Capacitance Load (pF)/(Length of Line in Inches*Intrinsic Capacitance load of the line (pF per Inch)))) and the Propagation Rate of the loaded transmission line=Propagation Rate of unloaded transmission line*Transmission Line Factor.

The Com2000™ Measurement Logic estimates the best case of the power distortion of the propagation cable length delays, measures the actual received power, and determines the cable load differential which is currently estimated by the Measurement circuitry of the GPHY4 chip Once the minimum and maximum values of the Distributed Capacitance Load have been measured, the Delta of Transmission Line Factor and the Delta T, which is the Extrinsic Skew phase variation, can be determined.

Hence, the CAT5 cable manufacturer's Intrinsic Capacitance Specs (pF per inch), typical Distributed Capacitance load of the RJ45, and the 125 Mbps transmission speed in ps/inch (this is determined at start-up utilizing a slow-rate manchester-encoded signal scheme for measurement)can be used to determine the CAT5 transmission medium phase distortion. When this is done, a further determination of the exact line characteristics of the transmission cable distance can be calculated by the Com2000™ Precision sampling system.

On top of measuring the phase related variations of the signal, the Com2000™ Calibration Logic (in combination with the Measurement circuitry of the chip) also takes into account the power related distortions and other phase related variations. The Com2000™ Measurement and Calibration system, operating with the CAT5 cable, measures, monitors and controls six parameters, which are benchmarked and optimized for tailoring to gigabit high speed data transmission:

1. Power Sum Near-End Cross-Talk (PS-Next). This measures in dB how well a cable pair resists interference generated by other wires. The minimum acceptance level of the CAT 5 standard (including cable and connector) is 3.1 dB @ 100 MHz.
2. Power Sum-attenuation-to-cross-talk ratio (PS-ACR). This term indicates in dB how much stronger the data signal on one pair is than the noise on the other pair. The minimum PS-ACR for a CAT5 channel is 3:1 dB.
3. Return Losses (RL). This term measures in dB how well the cabling deals with signal reflections (which interfere with data transmissions). Higher numbers indicate that only a small amount of signal is reflected, which is what the design wants. Return loss for the CAT5 cable channel is 10 dB.
4. Propagation delay (Delta T). This term was described previously and is used to indicate how long it takes a signal to travel 100 meters. It is 538 ns for CAT5 cable as defined per the specification.
5. Manufactured Delay Skew (MDS). Not included in the extrinsic skews of the signal, MDS is the manufacture related skew. It is the difference between the propagation delay on the fastest and slowest cable pair. This skew is inherent in the way cable is manufactured. Each cable pair exhibits a different twist ratio (to cancel out crosstalk), which means that each cable is a different length (depending on the number of twists). The standard for CAT5 is 40 ns as the highest acceptable delay skew contributed by manufacturing flaws.
6. Power Sum Far End Cross-Talk (PS-Elfext). This term is a new term that indicates the ratio of attenuation to far-end crosstalk. It is measured in dB; higher numbers are better. The standard for CAT5 is 20 dB.

The measurement and determination of these parameter values are compensated for during the transmission of a data stream from one node to another. The reduction of these cable line effects enables gigabit and multi-gigabit data transmission across the CAT5 cable medium.

This section describes the management and measurement of jitter in Gigabit applications across Category 5 UTP infrastructure cable using Com2000™ GPHY4 transmitter and receiver circuits. It discusses design techniques for jitter minimization, describes the equipment needed for jitter measurement and provides connections and setup descriptions and a discussion of the characteristics and implementation details.

High Speed Serial Link Jitter Design

Jitter is defined as short-term phase variations of the significant instants of a digital waveform from an ideal clock running at the same average rate as the signal. "Significant Instant" refers to any clearly defined point, such as zero crossing.

Short-term phase variations means phase oscillations of at least 10 Hz. Lower frequency phase noise is generally referred to as Wander. Jitter can be measured in peak-to-peak unit intervals (UI). One UI is equal to the period of the ideal clock, or one-baud interval, at the data rate of 1 Gigabit.

Since jitter can introduce bit errors and cause loss of synchronization in high-speed serial links, it is crucial to be aware of the causes of jitter and to minimize it as much as possible through out the system. Both the SONET and Gigabit Channel Standards include rigorous jitter specifications. Each standard specifies jitter differently.

SONET Jitter Specification

The present invention includes the ability to support SONET-like synchronous communication protocols. The SONET standard allows the asynchronous payloads to float inside the synchronous frame to accommodate the varying clock rates. These pointer movements occur in byte-wide steps at irregular intervals and can cause large jitter to be introduced in the payload. Additional jitter is introduced by mismatched oscillator signals in the signal regenerators of self-phased systems. Jitter Generation is defined as the amount of jitter at the output of the SONET equipment. It can not exceed 0.01 UI rms (per SONET specification). The Jitter Transfer function is defined as the ratio of jitter at the output signal to the jitter applied on the input signal versus frequency. The SONET jitter transfer requirements are very stringent.

CAT5 Channel Jitter Specification

In the Gigabit Com2000™ GPHY4, the general pulse shaping characteristics include rise phase, fall phase, pulse overshoot, pulse undershoot, and ringing. These general parameters define the mask of the transmitter eye diagram. The BER or Bit Error Rate requirement is guaranteed by defining the transmitter eye diagram, the CAT5 cable plant, and the minimum and maximum received power levels.

The specified values for the transmitter eye take into account power penalties caused by the use of transmitter spectral, extinction ratio and pulse shaping characteristics. For 1000BaseT CAT5, the requirement includes a specification for frequency because there is a requirement for repeaters, as in the SONET standard.

CAT5 Jitter Budget

The Com2000™ GPHY4 a gigabit-per-second serial link is made up of several components. These include the reference clocks, electrical transmitter, CAT5 transmitter, CAT5 receiver, and electrical receiver. Each Com2000™ GPHY4 system component has its associated jitter specification, management and measurement jitter budget requirements. The jitter budget allocates a certain amount to each component. The jitter budget is defined as "slices" of a data bit for a system running at 2 gigabit-per-second. The ideal symbol width for the gigabit bandwidth bus is 4 ns as in the case of the CAT5 channel. The ideal symbol width defined for 802.3ab 1000Base-T is 8 ns at the 125 MHz bandwidth at a minimum phase jitter as required by the Partial Response PAM signal modulation. The jitter slices are defined as follows:

1. Transmit Duty Cycle Distortion jitter is caused by propagation delay differences in the transmitter between high-to-low and low-to-high transitions. Duty Cycle Distortion shows up as a pulse width distortion of the nominal baud phase and is measured in the Com2000™ GPHY4 Measurement Circuitry.

2. CAT5 Transmitter Data Dependent Jitter is caused by the limited bandwidth characteristic, non-ideal individual pulse responses and imperfections in the CAT5 channel components in the related transmitted symbol sequences. Selecting the appropriate driver for the output pulses at the estimated load and power requirements controls this jitter.

CAT5 Receiver Data Dependent Jitter is caused by the limited bandwidth of the receiver. Properly selecting a low noise distortion amplifies at the receiver controls this jitter.

3. Static Position Error or Jitter is caused by the error associated with the signal sampling accuracy (or, how close the timing pulse is to the optimum sampling point or the center of the eye). To suppress this jitter, the Com2000™ GPHY4 has a revolutionary approach that uses a combination of technologies such as Channel Calibration and Precision Sampling and Measurements circuits for controlling this eye sampling window to within an unsurpassed tolerance of the center.

4. CAT5 Dispersion Jitter, also called Relative Power Fluctuation, is in the channel due to the antenna characteristics of the twisted pair. To suppress this jitter, the Com2000™ GPHY4 Channel Calibration and Measurement Circuits measure and compensate for the power fluctuations using the unique Com2000™ Blind Equalization technique during initialization of the channel.

5. Margin Jitter (30% of eye opening) is the resulting eye opening from which the clock recovery device must extract the clocking information. To suppress this jitter, the Com2000™ GPHY4 has a revolutionary approach using a combination of technologies such as Channel Calibration and Precision Sampling and Measurements circuits for opening the transmit eye up to 90–95% of the theoretical limitations through the removal of signal and cable induced distortion.

6. Random Jitter (40%) is caused by Gaussian noise sources. The peak-to-peak value of the random jitter noise is of a probabilistic nature and any specific value requires an associated probability.

To control and suppress this jitter, the Com2000™ GPHY4 jitter budget for the 2 twisted pair CAT5 Gigabit Ethernet environment is given below:

| | |
|---|---|
| Com2000 Clock Distribution | = 200 Ps |
| Propagation distort of stations 1&2 | = 100 ps |
| Transceiver delays distortion | = 50 ps |
| Physical layer jitter | = 100 ps |
| Cable (Antenna) pulse-width Jitter | = 50 ps |
| Xmit/Recv Duty Cycle Distortion | = 50 ps |
| CAT5 Transmitter Data Dependent | = 50 ps |
| CAT5 Receiver Data Dependent | = 50 ps |
| Static Position Error | = 50 ps |
| CAT5 Dispersion | = 100 ps |
| Margin Jitter | = 100 ps |
| Random Jitter | = 200 ps |
| Total jitter budget per baud | = 1000 ps |

Managing Jitter

This section of the patent describes the Com2000™ jitter management and measurement capability of the Com2000™ operating at Gigabit speed with Category 5 UTP infrastructure cable for 8-wire twisted pair serial links using the Com2000™ transmitter and receiver circuits.

The Com2000™ Measurement Technology is used to measure many parameters that contribute to the propagation delays of Category 5 UTP infrastructure. The Com2000™ Measurement circuitry is used to measure phase interval, frequency, period, pulse width, phase, rise and fall time and also does event counting.

Propagation Delay Measurements

The Com2000™ Measurement circuitry measures the phase interval between two independent signals A and B. This measurement is used to determine the electrical length of the CAT5 cable. The CAT5 cable can be configured as end to end or single ended with the remote end shorted to ground or left open. Using the Measurement circuitry's stable 125 MHz reference signal as stimulus, the propagation delay from one end of the CAT5 cable to the other, or between the incident and reflected rising edge of the pulse and the relative phase offset can be measured. Knowing that electricity travels at approximately 1 ft per 1.7933 ns, or 136.65 ps/inch, the CAT5 cable length is easily calculated.

The phase distortion from the GPHY4's input to the output is also measured with the Com2000™ Measurement (343) circuitry. Transmission Jitter of the signal is defined as short-term phase variations or phase distortion of the significant instants of a digital waveform from an ideal clock running at the same average rate as the signal. "Significant Instant" refers to any clearly defined point, such as zero crossing.

Pulse Width Measurement

Data communications and telecommunications use different modulation schemes to minimize the amount of data transfers and maximize the signal to noise ratio. The Com2000™ GPHY4 uses a 3–11 modulation scheme during power up and initialization phase. This scheme produces data patterns with different pulse widths. The Com2000™ Measurement Circuitry measures the pulse width of any signal and their variations within a specified phase interval between any two independent signals A and B. This is used to measure the electrical pulse length characteristics of the CAT5 cable.

Rise and Fall Time Measurements

Since the 10–90% rise time of the transition is important for the CAT5 receiver, the Com2000™ Measurement system measures the transition time. The small signal frequency response of the cable can therefore be calculated (Bw=0.35/ Rise-Phase). The Com2000™ Measurement system allows a squelch circuit to be triggered with the start and stop voltage thresholds to obtain maximum flexibility in rise and fall time measurements so that any part of a transition may be measured and analyzed.

Frequency and Period Measurements

The Com2000™ Measurement system measures a self-generated reference and compares this to the input signal for determining the quality of the input frequency. The Com2000™ Measurement analyzes the source over a set gate phase (Delta T) and then, for that interval, determines the maximum and minimum frequencies and the associated jitter, revealing the quality of the source. Frequency is measured as N/DeltaT and the period is measured as Delta_TIN, where N is the number of cycles and Delta_T is the elapsed phase to complete N cycles.

Phase Measurements

The Com2000™ Measurement circuitry measures the difference in phase between the input and output and a self-generated reference phase. This allows for fine tuning the local clock signals and tuning the local oscillator to ensure continuous system synchronization across the network.

Event Counting & Measurements

The Com2000™ Measurement circuitry also has the capability to operate as a pulse counter that counts either transmit or receiving electrical pulses at a rate of up to 500 MHz. The resolution of the measurement, or single shot resolution, is typically 50 ps RMS. This number can be improved by averaging over many measurements, or in the case of frequency and period measurements, increasing the time gate. The absolute error (the difference between the measured value and actual value) is typically less than 1 ns for a time interval measurement of less than 1 ns. This error is of interest in determining how far a value is from the actual value. Often only the relative accuracy (the difference between two measurements) is important. The differential non-linearity is a measurement of the relative accuracy of a measurement and is specified as the maximum phase error for any given relative measurement. The Com2000™ Measurement (343) circuitry differential non-linearity is typically +/−50 ps.

Short Term Stability & Measurements

The Com2000™ Measurement circuitry measures the short-term stability of an oscillator frequency. The short-term stability is a measure of the changes in the output of frequency of the oscillator on a short time scale (seconds or less). These changes in the frequency are usually random and are due to the internal oscillator noise. These random changes in frequency affect the resolution of the measurement just as other internal noise. The short-term stability of the Com2000™ is Isec in 50 parts per billion. The measurement resolution for an interval 1 second gate or time interval, will be dominated by the short term stability.

The resolution in ps of the Com2000™ Measurement circuitry is defined as:

$$Res=Sqrt[(50ps)(50ps)+(Delta\_T * Short\text{-}term\ Stability)(Delta\_T * Short\text{-}term\ Stability)]$$

Long Term Stability & Measurements

The Com2000™ Measurement circuitry measures the long-term stability of an oscillator. The long-term stability is a measure of the changes in the output of frequency of the Com2000™ oscillator on a long time scale (days, months or years). These changes in the frequency are usually due to the internal oscillator's aging rate or physical change of the crystal and temperature response. This drift change in frequency affects the resolution of the frequency measurement of a long phase interval just as other internal noise does. The long-term stability of the Com2000™ in a day (aging rate for one day) is one part per million. The measurement resolution for a 1 day interval gate or time interval will be dominated by the long-term stability.

The frequency drift of the Com2000™ Measurement (343) system is defined as:

$$Freq\ Drift = \#Days * Aging\ Rate * Osc\ Output$$

The long-term stability of the oscillator does not pose an issue for the Com2000™ system. This is because the Com2000™ provides a common distributed clock reference source throughout the network system. This source is monitored and corrected during the Com2000™ network system operation. Therefore each of the network nodes is referenced to the same clock source which minimizes the relative long-term stability affect.

The following paragraphs describe the background and capability of CAT5 UTP Digital Measurement of Com2000™ Measurement system that is responsible for signal modulation, frequency reference source, and sending and receiving reference and measurement sources over the twisted pair wires with modulation characteristics.

In a multiple Com2000™ encoded signal environment, it is necessary to accurately measure the parameters in the digital Com2000™ data communication system. Measurements include analyzing the Com2000™ code phase modulator and demodulator, characterizing the transmitted signal quality, locating causes of high Bit Error Rate (BER) and monitoring and maintaining link noise budgets. The four parameters measured by the Com2000™ Measurement system are power, frequency, time and code modulation accuracy.

The Com2000™ Measurement system measures the power which includes carrier power and associated measurements of gain of the drivers and insertion loss of filters and attenuators. The signals used in the Com2000™ digital modulation are noise-like (multi-level and varying frequency). The Com2000™ Measurement system measures the Band-power (power integrated over a certain band of frequencies) or power spectral density (PSD). PSD measurements are normalized power to a certain bandwidth, usually 1 Hz. Simple frequency counter measurement techniques are often not accurate or sufficient enough to measure center frequency. The Com2000™ Measurement system measures the average accumulation of the PSD across a known bandwidth such that the roll-off and center points for a particular bandwidth are determined. This provides the capability to maintain the optimum probability of signal detection by estimating the carrier centroid, which is the center of the distribution of frequency versus PSD for a modulated signal. The Com2000™ Measurement system also measures duty cycle distortion that is made most often in pulse or burst mode. Measurements include pulse repetition interval or PRI, on time, off time, duty cycle, and time between bit errors. Turn-on and turn-off times are also involved with the power measurements.

The Com2000™ Measurement system measures Modulation accuracy that involves measuring how close either the constellation states or the signal trajectory is relative to a reference or ideal signal trajectory. The Com2000™ received signal is demodulated and compared with a Com2000™ reference signal source. The received signal phase is subtracted from the reference signal phase and the result is the difference or residual. Modulation accuracy is a residual measurement.

The difference between the Com2000™ received signal modulation vector and the ideal reference signal vector is the modulation error. It can be expressed in a variety of ways including Error Vector Magnitude (EVM), Magnitude Error, Phase error or emulated I and Q errors, where Q is the quadrature component. But for Com2000™ baseband signalling SPAM-5 (emulation of baseband CAP signal), it is the phase rotational vector. The Com2000™ Residual measurements of the Measurement system are very powerful tools for troubleshooting and calibrating communications across CAT5 channels. Once the reference signal has been subtracted, it is easier to see small errors that may have been swamped or obscured by the modulation itself.

At this point further definition of the Error Vector Magnitude (EVM) is required. The Com2000™ digital bits are transferred on a Synchronous Partial Response PAM (SPAM-5) digital coded pulse carrier by varying the carrier's magnitude and phase transitions. At each symbol clock transition, the carrier occupies any one of several unique locations in the I versus Q plane. Each location encodes a specific data symbol, which consists of 4 data bits. A constellation diagram shows the valid locations (i.e., the magnitude and phase relative to the carrier) for all permitted symbols of which there must be 2 exp N, given N bits transmitted per symbol. For the Synchronous Partial Response PAM demodulator to decode the Com2000™ incoming data, the exact magnitude and phase of the received signal for each 4× baud clock transition must be accurately determined. The logic layout of the constellation diagram and its ideal symbol locations are determined generically by the modulation SPAM-5 format.

At any instance, the Com2000υ Measurement system can measure the received signal's magnitude and phase. These values define the actual or measured phasor. The difference between the measured and the predefined reference phasors form the basis for the EVM measurements of the Com2000™ Measurement circuitry.

The Com2000™ EVM is defined by the average voltage level of all the symbols (a value close to the average signal level) or by the voltage of the outermost (highest voltage) four symbols. The Com2000™ Measurement system measurements of error vector magnitude and related quantities can, when properly applied, provide great insight into the quality of the Synchomous Partial Response PAM digitally modulated signal. The Com2000™ Measurement system can also pinpoint the causes of any problems related to power and phase by identifying exactly the type of degradation present in a signal and even lead to the identification of the sources.

When the EVM is resolved by the Com2000™ Measurement system into its magnitude and phase error components and compared to their relative sizes, and when the average phase error (degree) is substantially larger than the average magnitude error, it can be determined that some sort of unwanted phase modulation is the dominant error (Inter-Symbol Interference). This is caused by noise, spurious or cross-coupling problems in the Com2000™ m reference frequency and phase lock loops, or other frequency generating stages. Uniform noise is also a sign of some form of phase noise (random jitter, residual PM/FM)

The Com2000™ Quadrature error, when the Q-axis height does not equal the I-axis width, is caused when the phase relationship between the I and Q vectors are not exactly 90 degrees. When viewing the Com2000™ Measurement EVM in terms of phase or symbol, errors may be correlated to specific points on the input waveform, such as peaks or zero crossings. The Com2000™ Measurement EVM is a scalar (magnitude-only) value. Error peaks occurring with signal peaks indicate compression or clipping. Error peaks that correlate the signal minimum suggest zero-crossing non-linearities.

In the Com2000™ digital communication system, non-uniform noise distribution or discrete signal peaks indicate the presence of externally coupled interference. The Com2000™ Measurement (343) system ensures that the sending and receiving frequency and phase are the same.

The frequency and phase counter capabilities provide another method of measurement for the Com2000™ Measurement system for determining the CAT5 transmission medium frequency and phase distortions. The Com2000™ frequency counter function of the Com2000™ Measurcment system is a versatile device. Most simply, it is used to directly measure the frequency of a signal applied to its input port, which is derived from the recovery clock of the received signal carrier of the phase lock loop. The accuracy of the measurement is directly related to the internal resolution of the counter (50 ps) and the stability of the internal frequency source. The performance of the Com2000™ Measurement system frequency counter is significantly improved in both accuracy and stability by using the external precision reference node's frequency source as an external phase base for the counter.

However, the Com2000™ frequency counter function of the Com2000™ Measurement system are still limited by their internal design resolutions on the order of 50 part per billion. But most high precision frequency sources can still be adequately evaluated by direct measurement with a Com2000™ frequency counter.

Overall accuracy and stability is governed by the signal with the worst stability. Therefore, unless it is known that the Com2000™ frequency reference source is significantly better than that being measured, we can only conclude that the signal being measured is no worse than the measurement indicates and may be much better.

Another method of frequency and phase measurement of the Com2000™ Measurement system is the comparison of two signals that are essentially identical. This involves comparing the change in phase between the two sources. Both signals are applied to a digital linear phase comparator and the result is accumulated as a function of time. The data variation in time is similar to "Direct Phase Interval" variations as a function of the time, but is generally continuous. The slope of the comparator results in time indicates the difference in frequency of the unknown signal versus the frequency reference This capability of the Com2000™ Measurement system is then used to determine the frequency drift of the communication channel assuming the sending and receiving frequencies are synchronized and have the same heartbeat.

The "Phase-Difference" technique of the Com2000™ Measurement system is a method for comparing two signals that are essentially identical in frequency. The Start signal for the Com2000™ phase counter feature is derived from the internal reference frequency source. The Stop signal for the Com2000™ phase counter is derived from the external unknown frequency signal source (recovered from received signal clock by the 100/1000 Clock Recovery Circuitry. The Com2000™ Measurement system measured phase interval between the start and stop signals can be plotted as a function of elapsed time. The maximum phase interval that can accumulate is the "period" of the highest frequency applied to either the "Start" or "Stop" inputs of the counter.

When a full "period" of the phase interval accumulates, the data reduction becomes more complicated as proper one-period adjustments must be made to all of the data obtained after the data step. Since both the Start and Stop signals are relatively stable, the determination of the unknown frequency of the Com2000™ Measurement system can be performed by computing the slope of the data. As mentioned before, the results will indicate that the unknown frequency is no worse than the measurement indicates and may be much better.

The existing category 5 systems intended to support 1000/2000 Base-T traffic will be re-tested by the Com2000™ Physical Layer Chip during the power up sequence. This is done in order to verify that the physical layer specifications covered by the TIA-568 and ISO11801 standards meet the requirements of 1000 Base-T and whether to deliver the scalable throughputs available from the Com2000™ Channel Capacity Measurement and Calibration technology. This technology greatly enhances the capability of high-speed data transmission across installed or new CAT5 cable. This is due to the measurement and calibration technologies within the Com2000™ GPHY4 . The implementation of these technologies to compensate for existing and generated noise and attenuation sources enables data rates up 2 Gbps across CAT5 cabling. This will greatly increase the life cycle of the installed Ethernet network infrastructure and allow users to upgrade their system networks to gigabit speeds without the added burden of upgrading their infrastructure.

Channel Equalization System

This section describes the Com2000™ Channel Equalization System and the underlying technologies that are involved in the design and development of a high-speed data communication transceiver. The GPHY4 is a universal 10/100/1000/2000Base-T Physical Layer manifestation that provides a Gigabit data delivery system Although the discussion will focus on the Ethernet embodiment, the system is also applicable to other wireline communication means such as cable modem, ATM, and xDSL modem standards, satellite and to wireless communication means such as Wideband CDMA, and GSM.

The Com2000™ Gigabit Channel Equalization Technology applies to all data communication media interfaces, such as Gigabit Ethernet, and operates to improve the overall SNR allowing sending and receiving of new line coded digital data signals at higher speeds (Multi-Gigabits per second) over 4 pairs CAT5 cable. This can be thought of as having a technology that emulates the current CAT5 cable to a higher grade cabling available such as CAT6. In the ethernet context, the Com2OOO Channel Equalization system enables the GPHY4 Ethernet system to deliver Multi-Gigabit data communication over the same standard 8-wire (2 Gbps oyer 8 wires) Unshielded Twisted Pair (UTP) CAT5 cable as 100Base-T . The GPHY4 Channel Equalization system is implemented at the media Physical Interface to deliver significant signal to noise ratio (SNR) improvements that enable a new bandwidth efficient coding scheme to support Multi-Gigabit signaling over the existing CAT5 cabling infrastructure.

To achieve the new GPHY4 coding scheme a higher SNR margin, relative to the current technology that has a much lower SNR margin (1.8 dB, with FEXT+3 dB additional) (see FIG. 8c for 3 dB design) is required. The Com2000™ Channel Equalization system also ensures the consistent operation of multi-gigabit per second data transfer over existing CAT5 ,8-wire cabling. This is done through the use of uniquely Adaptive Filters and Algorithms that contribute to the modeling of the estimated signal and channel responses to achieve an optimized signal recovery capability.

Gigabit and Multi-Gigabit transmission of digital data over the CAT5 communication channel requires adaptive equalization to reduce coding errors caused by channel distortion. In CAT5 cable, the channel distortions are mostly due to the non-flat magnitude response (amplitude distortion) and nonlinear phase response (time dispersion) of the CAT5 wirelines.

The time dispersion distortion affect is perhaps the most important as time dispersion distortion causes the smearing and elongation of the duration of each symbol. In network communications where the data symbols closely follow each other, specially at multiple of gigabit speed, time dispersion results in an overlap of successive symbols, an effect known as inter-symbol interference (ISI). The Equalization system in concert with a Synchronous Communication Environment alleviates the relative phase dispersion of the interfered and interfering signals that greatly reduces ISI. This is a critical factor affecting the CAT5 receiver performance.

The following paragraphs describe the high level of steps performed by the Com2000™ Channel Equalization system to improve the overall SNR of the receiver and allow more advanced data coding and signal modulation techniques. (See FIG. 5A)

1. Optimize the ECHO and NEXT Canceller filter coefficient calculation through a controlled Blind Equalization process during cold start up mode. The ECHO and NEXT Canceller's filters are initialized in the Blind Equalization phase. In this phase almost all of the error signal is ISI and channel noise. The Com2000™ Blind Equalization process utilizes thc frequency and phase knowledge obtained from the 5-ary SPAM signal input in conjunction with a Synchronous Communication Environment, and a statistical model of the CAT5 channel to estimate the channel impulse response in order to alleviate these noise contributors.

2. Establish a Synchronous Communication Environment via Frequency & Phase Clock Synchronization during cold start up mode before the filter's coefficient determination of the Feed Forward Equalizer (FFE) and Decision Feedback Equalizer (DFE) are commenced. This a Synchronous Communication Environment initialization's order is used to offset the clock synchronization jitter, which degrades the performance of the FFE and DFE equalizers. This is because it creates a transient mismatch between the digital samples of the FFE/DFE impulse response and the taps of the filter, which can be interpreted as White Gaussian Noise. The Frequency and Phase clock synchronization ensures the error signal, e(m), for recursive coefficient calculations noise is relatively small and primarily derived from the CAT5 channel synchronized received data and locally stored patterns during the autocorrelation process.

3. Optimize the FFE & DFE filter coefficient calculations through Training phase of the Com2000™ Equalization during warm start up mode. This phase initializes the FFE and DFE filter coefficients utilizing the Frequency and Phase Clock Synchronization between the Com2000™ Master & Slave of the Synchronous Communication Environment. This process also provide an propagation delay information so it can be used by the Com2000™ Equalizer system to deliver an optimal NEXT Canceller Memory Span estimation. The memory span is a function of Com2000™ propagation round trip delay measurements, which performs by the Com2000™ Channel Measurement and Calibration Technology. The memory spans determine the number of real filter taps necessary to achieve optimized filter coefficients for tuning, calculations and fast filter convergence resulting in a positive SNR margin. This also ensures the error signal, e(m), for recursive coefficient calculations noise is relatively small and primarily derived from the CAT5 channel synchronized received data and locally stored patterns during the autocorrelation process.

4. Maintain the optimized the FFE & DFE filter coefficient utilizing the Sounding phase of the Com2000™ Equalization process during normal operation mode. Through the Synchronous Communication Environment of the Com2000™ Master to the Slave, which performed in the background during the data sending mode, a selected predefined node ID of specific Pseudo Random Noise (PN) sequence code, is used as the preamble bits for Master and Slave to perform as the background Sounding sequence autocorrelation for channel adaptation and also as a station code ID for security access purpose. Please refer to the section of E-DNA Technology for more details. This node ID is also used as Security Spread PN Coding for a Secured Signal Signature. This autocorrelation is done to ensure the minimum error signal, e(m), for filter's recursive coefficient calculations is adaptively to the communication channel response. These sounding sequences or node ID are selected in such a way so that the security, synchronization and filter adaptations can be benefits from them. The correlation is done and the error derived from the appropriately synchronized received and locally stored PN sequence (Sounding) patterns that are used to update the filter's coefficients recursively and dynamically in order to reflect the CAT5 time-variant channel distortions.

5. Optimize FFE/DFE Equalization Filter Convergence by providing a method of suppressing the ISI caused by relative phase distortions. (Note: This provides an increase in the SNR, filter's convergence level, by optimizing the Com2000™ relative phase). With the symbol clock of the Master and Slave synchronized, the difference of the relative clock phases of the disturbed and disturbing signals are relatively small. Phase offsets from Near and Far cross talk at the receiver from other local and /or remote sending terminal signals is relative phase difference between the desired receiving signal and the interference symbol. Hence, due to the relative phase's ISI is suppressed and the front end receiver benefits the increased SNR. This is due to the filter's converges cleanly with an SNR that has up to 6 dB signal SNR gain.

6. Calibrate the FFE/DFE adaptive filter coefficients dynamically during background of data transfer mode, this is done by inserting a sequence of pre-determined, known PN sounding preamble phasors (known amplitude and Phasor for Carrier drift direction determination) into the stream of useful data information symbols for optimal channel sounding calibration during the Com2000™ normal data sending mode.

7. Enhance Channel Impulse Response Symmetry through the Com2000™ Channel Measurement and Calibration Technology's capability of CAT5 where the channel frequency offset measurements are done due to channel cable doppler drift. The measured delta frequency offset is used to provide an optimum Square Root pulse shaping Com2000™ transmit filter with doppler frequency offset compensation, while maintaining the in-band differential mode signal.

8. Optimize the receiving EYE Sampling time to a precision accuracy relative from the middle of the eye diagram. Imperfectly timed sampling has the similar effect of increasing AWGN noise as far as the demodulator SNR is concerned. The Com2000™ Post Equalizer signal, which is the input signal that have passed through all of the above ECHO, NEXT, FFE and DFE filters will delivers a clean and wide-open eye diagram.

The signal modulation of new asynchronous line code signal SPAM-5 requires a certain budget of SNR to achieve a particular probability of symbol error, or BER, over a CAT5 medium.The revolutionary design of the Com2000™ Adaptive Filters, which are used in the Com2000™ Equalization Technology, provide the improvements for the CAT5 channel distortion with clean signal recovery and increased SNR at the receiver. The Channel Equalization, in concert with Com2000™ Channel Measurement and Calibration System provides the channel distortion measurements, suppression of self generated phase noise sources of ECHO & NEXT, and optimization of the ECHO/NEXT/FFE/DFE filter taps and coefficients calculation methods for delivery an SNR margin increase of more than 8 dB.

This section provides a more detailed description of the operation of the Com2000™ Equalization system that provides the means and method for increasing the Signal To Noise Ratio (SNR) tor any communications channel.

Referring now to FIG. 3, the Com2000™ transceiver is shown. The CAT5 cable plant (37,25) has an intrinsic channel capacity of 500 to 2000 Mb/s for transmission that is limited by attenuation and near-end cross-talk (NEXT). This is achieved through well-controlled cable geometry by ensuring tight twisting of the individual cable pairs providing predictable attenuation characteristics and low cross talk. There are several factors that determine how much of this available capacity can readily be used. Cable emissions and externally induced noise usually dominate over NEXT limitations.

In the CAT5 medium section (37), the Com2000™ Adaptive Equalizer/Filters (354) are used for combating the channel distortion. Adaptive Filters, like equalizers, are used to filter out narrow-band noise and discrete sinusoidal components. The Com2000™ 10/100/1000/2000Base-T Ethernet Physical Layer (PHY) (14) Adaptive Equalizer Filters (354) for the receiver can be considered as a general filter with multiple inputs similar to a Transversal Adaptive filter. The multiple inputs are simply delayed versions of the single primary input signal (i.e., inputs originate from a shift register or tapped delay line).

In general, the CAT5 transmission of data often requires that an equalizer be incorporated in the CAT5 receiver to correct for distortions produced by the transmission medium. These distortions range from amplitude variations and signal echo to nonlinear phase delays. The most serious distortion source over the CAT5 data communication channel is often the nonlinear phase delay. Delay distortion results when the propagation time is different for different frequencies in the frequency spectrum of the data pulses. Any channel with delay distortion is called a "Time Dispersive Channel". The CAT5 channel (25) distortion is often varies due to environmental changes. Under normal operating conditions, it is assumed the CAT5 channel distortion is time invariant and the nonlinear phase delay distortion causes transmission errors by producing Inter-symbol Interference. This is due to the effect of the contribution to the matched filter output that may not only be the result of the current bit but also, to varying degrees, of past bits. The non-complex baseband signal equalizer of the Com2000™ Adaptive Filter (354) is preceded by a PLL that drives the carrier frequency to zero. This results in the real part of the transmitted signal being received within distinct sections of the equalizer. The Com2000™ equalizer is specifically utilized for the SPAM-5 signaling scheme described below with reference to the code signaling system.

In order to produce a near ideal inverse impulse response of the CAT5 channel, the equalizers (354) and cancellers are initialized in a specific order. First, the ECHO & NEXT Cancellers determine and initialize the filter's coefficients using the Com2000™ Controlled Blind Equalization method. This process occurs during power up or a cold start in order to begin reduction of the channel noise and ISI impairment. Following the completion of Blind Equalization, the Sender's and Receiver's Clocks are frequency and phase synchronized through the Com2000™ Clock Phase Transfer method. This method is designed to avoid the transient mismatch between the digital samples of the equalizer and the taps of the filter.

After completion of the frequency and phase synchronization, the Feed Forward Equalizer (FFE) and Decision Feedback Equalizer (DFE) initialize the filter's coefficients with the Com2000™ Training Equalization method. This occurs during warm starts utilizing a variety of predefined training sequences between the sending and receiving nodes. Once the FFE/DFE Equalizer's coefficients are initially defined, the coefficients can be maintained and updated with the Com2000™ Sounding Equalization method during normal data transfers in order to adapt to the time invariant noise of CAT5 channel communication.

The Com2000™ Adaptive Filter capitalize on a unique method of using a PN training signal to adapt the equalizer during the initialization which is also providing a method of adaptation of the filter coefficients that are determined based on measurements of the channel. This process is performed on cach of the CAT5 channels. The PN code for the training sequence is also used as the signal signature of the sending node for security system implementation. Further details of the security system are provided below.

In many systems, perfect equalization is not possible and some residual Inter-symbol Interference and NEXT will appear at the decision device. For the Multi-Gigabit CAT5 application, cross talk, due to the relative phase of the interfered and interfering signals, is the most significant source of Steady State noise affecting the receiver's performance. The second most significant source of steady-state noise is implementation-dependent noise, which is directly related to the variation of the characteristics of the transmission medium.

To deliver a robust Multi-Gigabit data stream over CAT5 cable in the Ethernet embodiment of this sytem, the sources of noise for a 1000/2000 Base-T system need to be analyzed in order to provide methods of removing the noise and increasing the SNR. The two major sources of noise in 1000/2000Base-T system are produced by non-standard and poorly characterized cabling parameters—return loss and FEXT.

SNR margin, in general, is a measure of the communication system's immunity to noise. SNR margin is expressed in dB and represents the level of additional noise that the system can tolerate before violating the required Bit Error Rate (BER). For example, an SNR margin of 3 dB means that if the noise level is increased by 3 dB, the system would be subject to excessive errors. The higher the SNR margin, the more robust the system. If network A has an SNR margin of 3 dB and network B has an SNR margin of 10 dB then network B can tolerate 7 dB more noise than network A without violating the required BER. This is what Com2000™ Synchronous Communication Channel and Com2000™ Channel Measurement and Calibration , and Channel Equalization Technologies are invented and designed to do.

Figure 6B:
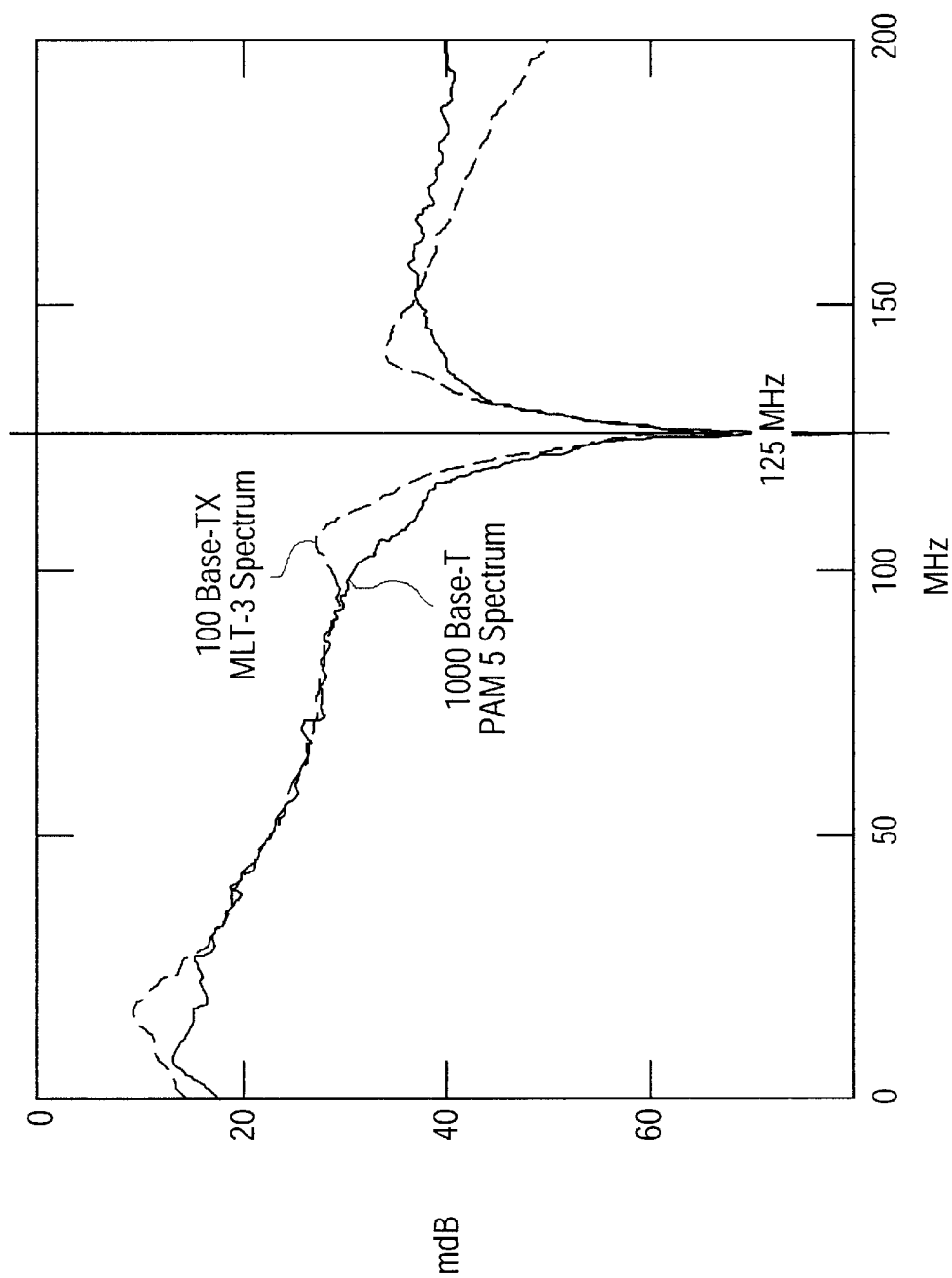
FIG. 6b illustrates the spectrum of 1000/2000Base-T is shaped to match the spectrum of 100Base-TX. The spectra and the symbol rates of the two networks were matched in order to facilitate the development of a 100/1000Base-T transceiver. We will use this as a basis of comparison between the 1000BaseT and newly invented Multi-Gigabit Com2000™ signaling.
Figure 6C:
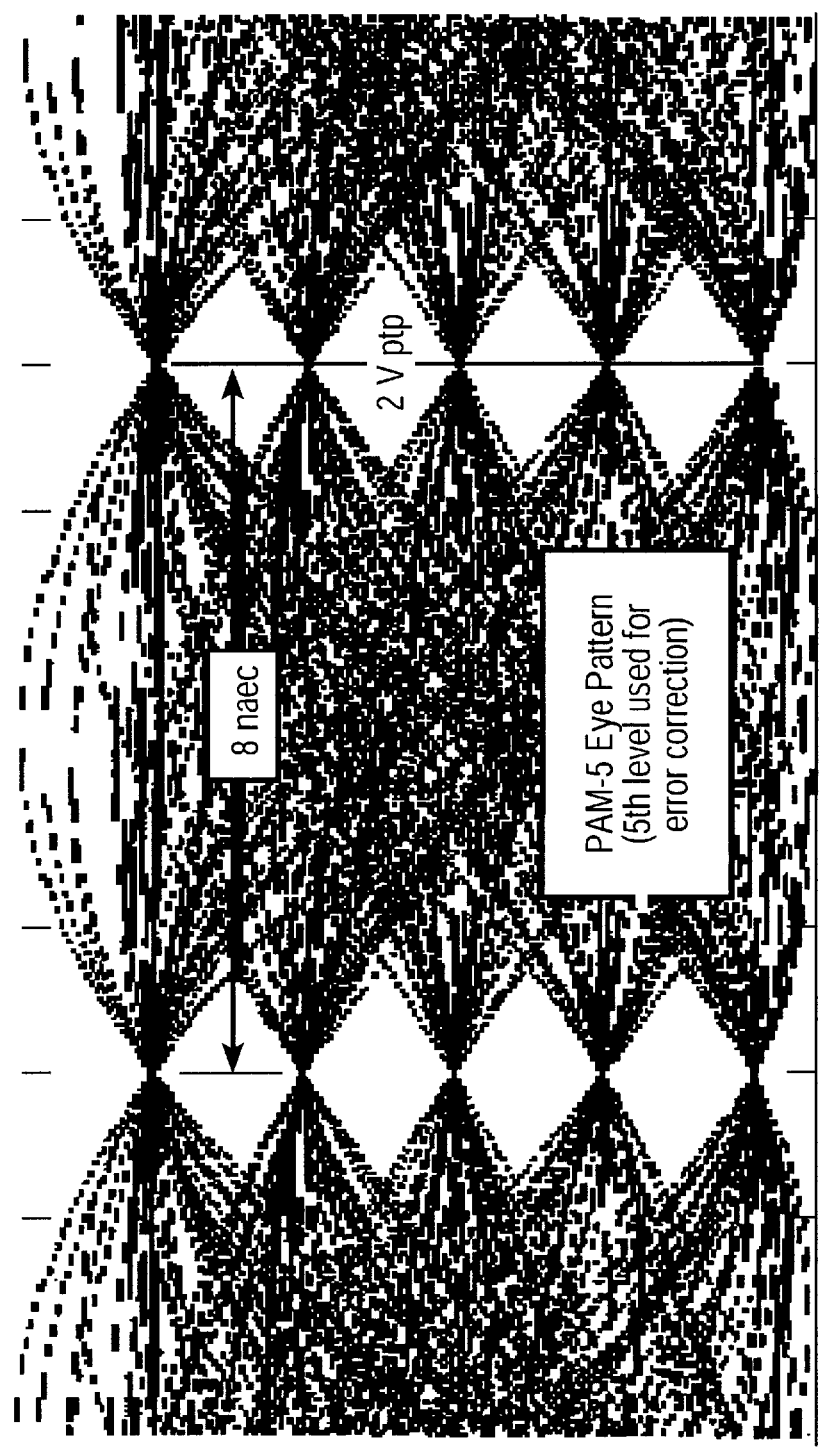
FIG. 6c illustrates PAM-5 Eye Pattern. 1000Base-T generates a 5-level 2V peak to peak data signal with the symbol period of 8 nsec. Eye pattern examples of binary and bandwidth efficient data signals transmitted at approximately the same voltage level. The openings of the eye patterns exhibited by the bandwidth efficient systems are considerably smaller than those of the binary systems
Figure 6D:
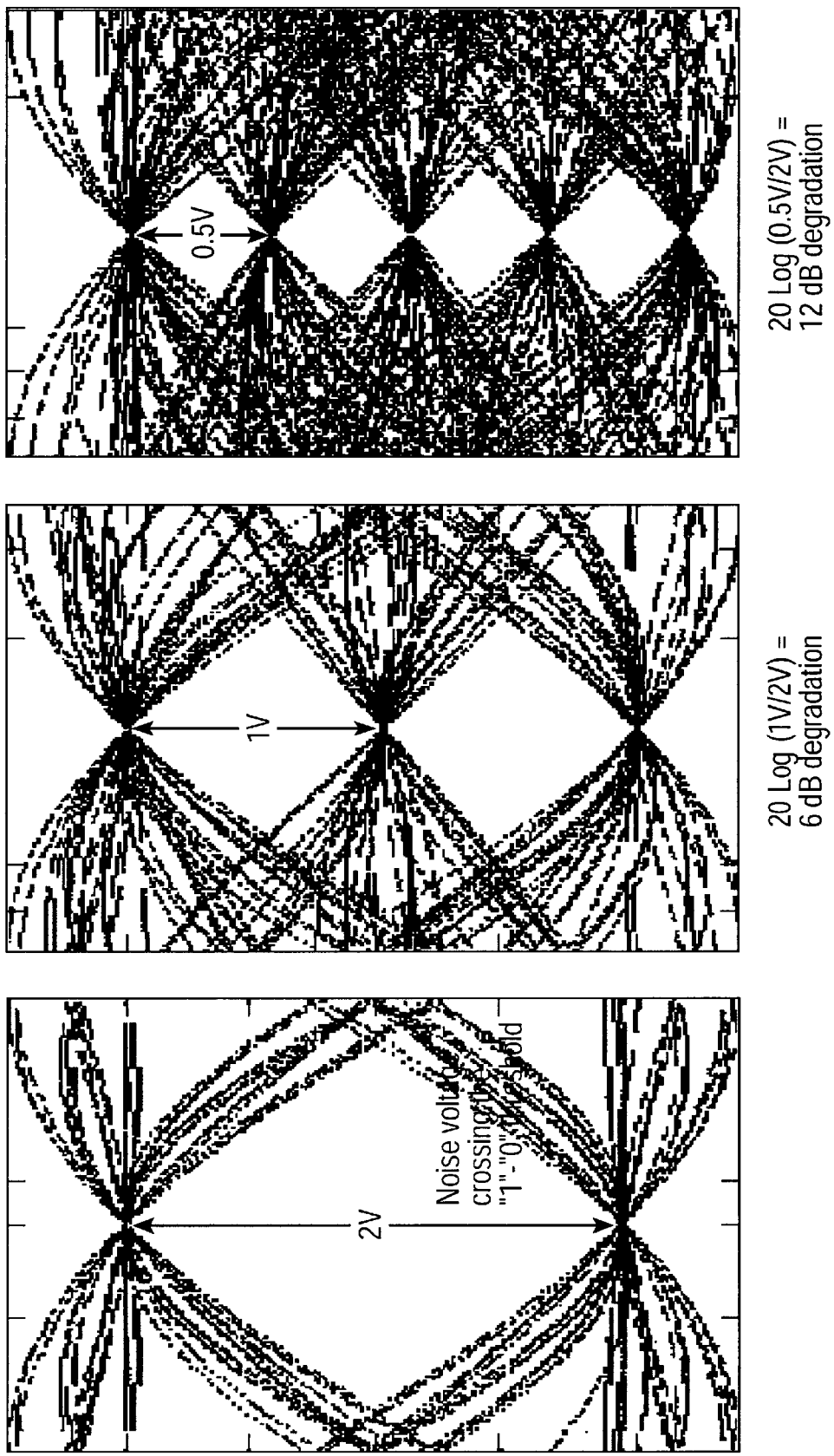
FIG. 6d illustrates the Eye patterns of 2-(NRZ), 3-(MLT3) and 5-level (PAM-5) Signals. Increasing the number of levels while maintaining the same transmit voltage reduces the SNR margin of the system. If the noise voltage is sufficiently high to force the data signal to the wrong voltage level (e.g. to the wrong side of the "1"–"0" threshold as shown on the left) the affected symbol can be misinterpreted by the receiver resulting in bit errors.

FIGS. 6d demonstrates the degradation of the SNR margin that results from increasing the number of signal levels while maintaining the same transmit voltage. This is based on the fact that, as the vertical opening of the eye gets smaller. the system can tolerate less noise before bit errors begin to occur. For example, increasing the number of voltage levels from 2 to 3 cuts the voltage between adjacent levels in half, reducing the vertical eye opening by a factor of 2. The noise voltage required to cause a symbol error on a 3-level signal is half (or 6 dB lower) than the voltage required to cause a symbol error on a binary signal. So a 3-level signal has 6 dB less SNR margin than a binary signal, assuming both signals operate at the same peak to peak voltage. The 10/100/1000/2000BaseT new line coding signaling has a 6 dB lower SNR margin than a PAM-5 of 1000BaseT signal.

Therefore, the Com2000™ Synchronous Communication Channel and Com2000™ Channel Measurement and Calibration , and Channel Equalization Technologies in concert deliver a new level of Noise Suppression method that enables the 1000/2000BaseT to recover the 6 dB signal degradation and also obtain an extra 2 dB for Noise margin improvement over the 1000BaseT. The noise suppression method improves the NEXT and ECHO cancellers by suppressing the relative phase offset of the interfered and interfering signals that effect the receiver filter performance (see FIG. 10a,10b). The method measures the channel distortions and uses filters to compensate for this distortion. More specifically, this is done by using a transmit pulse shaping filter and by receiving ECHO, NEXT, FFE and DFE filters. The method equalizes the desired signal in such a way that the impulse response from the transmitter to the receiver is as close as a Nyquist pulse, which goes through zero at all multiples of the symbol period except at the origin. It also equalizes the NEXT/ECHO signal (from local transmitters) in such a way that the impulse response from the local transmitter and local receiver goes through zero at all multiples of the symbol period, including the origin.

See FIG. 10B. After passing through a 100 m CAT5 loop, the amount of inter-symbol interference (ISI) at the input of the receiver is larger than the amount of NEXT. Thus, the initial filter convergence curves of the solid and dashed lines follow the dotted line (see FIG. 10b), which is the convergence curve of the FFE/DFE filter in the presence of inter-symbol interference only. Once the filter settles down to about 13 and 18 dB for dashed and solid curves. respectively, enough ISI interference has been removed by the filters so that the filters start to "sees" the NEXT interference and starts to jointly equalize the data signal and interfering signal. Notice that the steady-state SNR with the worst phase $\phi(0)$ is about 6 dB worse than that the optimum phase $\phi(3)$. As illustrated in figure 10B, the convergence time with the worst phase is about twice as long as the one achieved with the optimum phase. Simply put, SNR margin is a measure, in dB, of how much additional noise a system can tolerate or how far the system is from not working properly. The next section of this application will provide the details the SNR margin of 1000/2000Base-T. But first, let us examine the CAT5 noise environment with an overview of the noise and crosstalk coupling at each receiver.

Noise Environment in a CAT 5 Channel for 10/100/1000/2000BaseT

The noise at each of the 4 receivers in a 1000/2000Base-T device includes Near End Crosstalk (NEXT) from 3 adjacent pairs, Far End Crosstalk (FEXT) from 3 adjacent pairs, transmit echo and ambient noise. (see FIG. 10c)

The SNR margin of 1000/2000Base-T can be computed by adding up the noise from all the sources shown in FIG. 3 and taking a ratio of the noise with respect to the attenuated signal. When the SNR margin is thus computed for a worst case category 5 channel, it can be shown that a conventional transceiver implementation would yield a system with a negative SNR margin. This means that on the wire, the noise power could be so high that the specified Bit Error Rate (BER) of $10^{-10}$ would not be achievable without the use of sophisticated signal processing technology of Com2000™ Channel Equalization.

In order to guarantee smooth operation of the new 10/100/1000/2000BaseT signaling coding system, the worst case category 5 models for NEXT, FEXT, attenuation and return loss models will be examined and used in the following discussion.

Return Loss Model

Figure 4A:
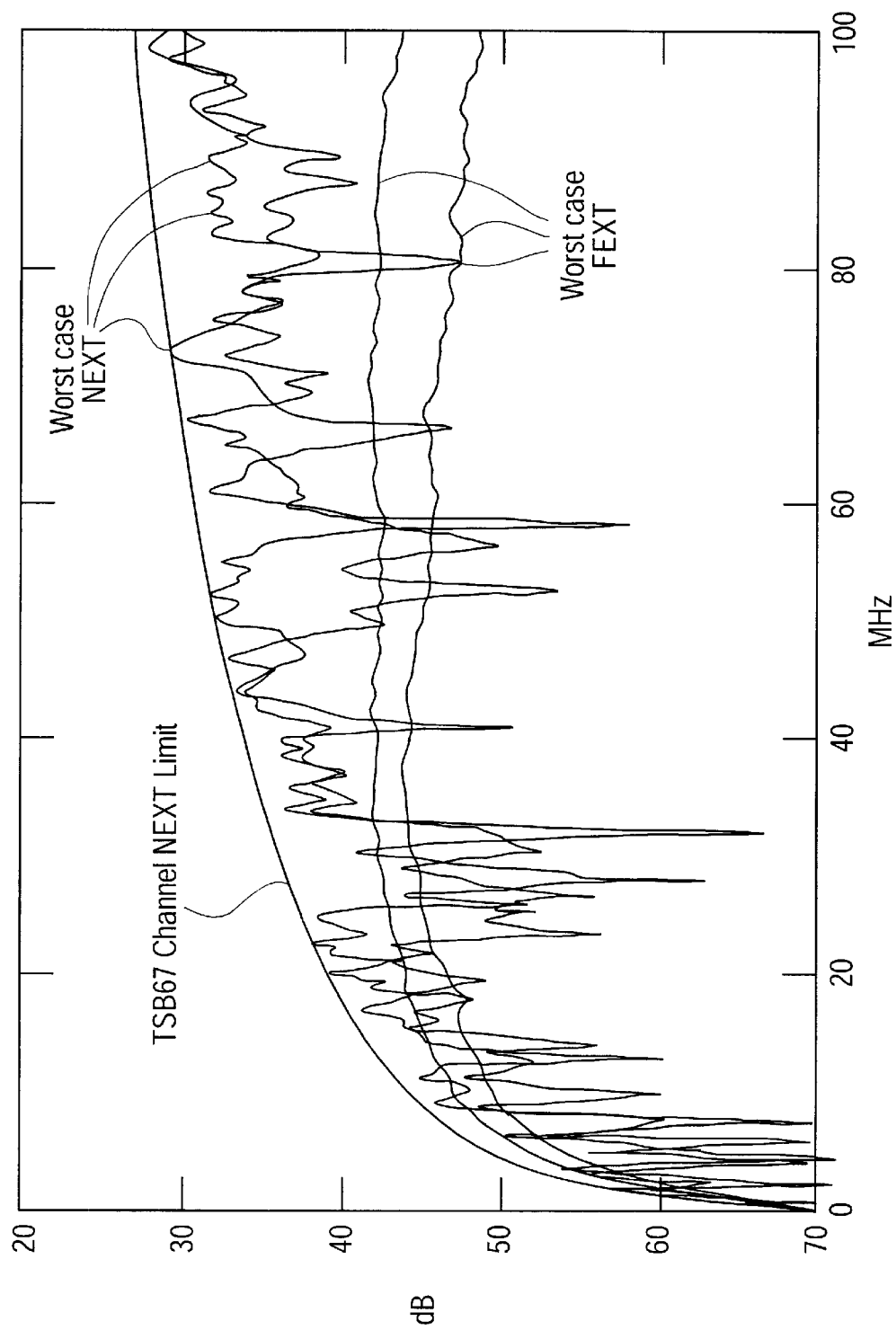
FIG. 4a illustrates the NEXT and FEXT models used in the design simulations. The NEXT models are NEXT measurements offset in the direction of the TSB67 category 5 limit so that the peak of each curve touches the limit. The offset thus produces the "worst case" category 5 NEXT models.

The source of noise known as the echo is a direct function of the channel return loss. Transmit and receive signals are present on each pair simultaneously because 1000/2000Base-T uses dual duplex signaling. A directional coupler circuit, known as a hybrid, is used to separate the outbound transmit signal from the inbound receive signal. Echo interference occurs when the outbound transmit signal reflects off the channel due to imperfect return loss and passes back through the hybrid into the receiver. The magnitude of the reflection, or echo, is proportional to the return loss of the channel. See FIG. 4c.

The Com2000™ Signal Equalization system design to provide ECHO/NEXT Noise and ISI Canceling enables the 1000/2000BaseT to recover 6 dB of the signal degradation and also achieve and additional 2 dB for Noise margin improvement over the 1000Base-T specification.

Attenuation Model

The amplitude of the receive data signal is a function of channel attenuation. The worst-case category 5 attenuation model is based on the measurements of a channel having the attenuation at the TSB67 [1] channel limit. See FIG. 6a. The noise affecting the Bit Error Rate (BER) at each of the four receivers is the sum of several noise environment and sources as depicted in FIG. 10c.

Signal Power Distortion Measurements of Com2000™ Channel Measurement and Calibration Technology, along with the Cable Attenuation Model, provide the capability to compensate for the attenuation characteristics of the CAT5. This is done so that the FEXT and NEXT signal equalization can be done optimally to recover and 6 dB of the signal degradation and also achieve and additional 2 dB for Noise margin improvement over the 1000Base-T specification.

Three-Disturber NEXT

Figure 4B:
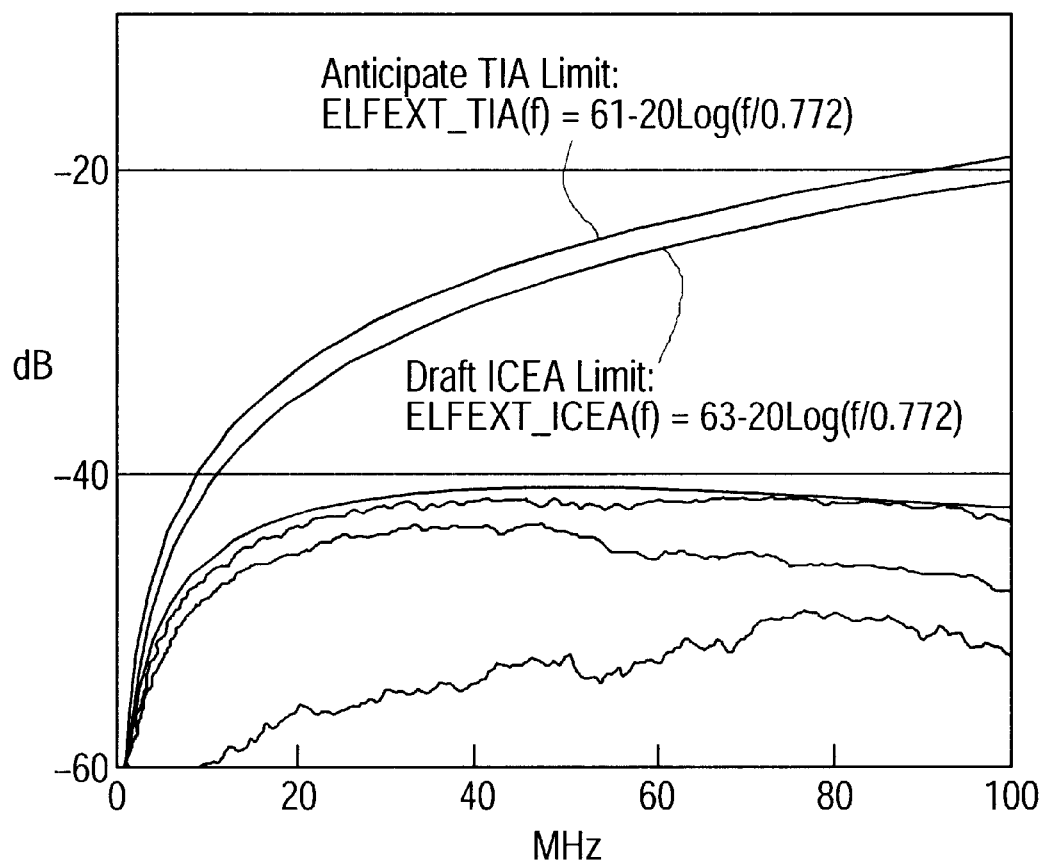
FIG. 4b illustrated the models are based on measurements offset in the direction of the channel limit so that the peak of each curve touches the limit. The FEXT models are included on this plot to demonstrate that the FEXT noise is comparable in magnitude to the NEXT noise. The FEXT models are based on the power sum of the pair-to-pair measurements while the NEXT models are based on the pair-to-pair measurements. One effect of power summation is that the characteristic nulls in the coupling curve tend to disappear once multiple curves are added. NEXT and FEXT Coupling.
Figure 4C:
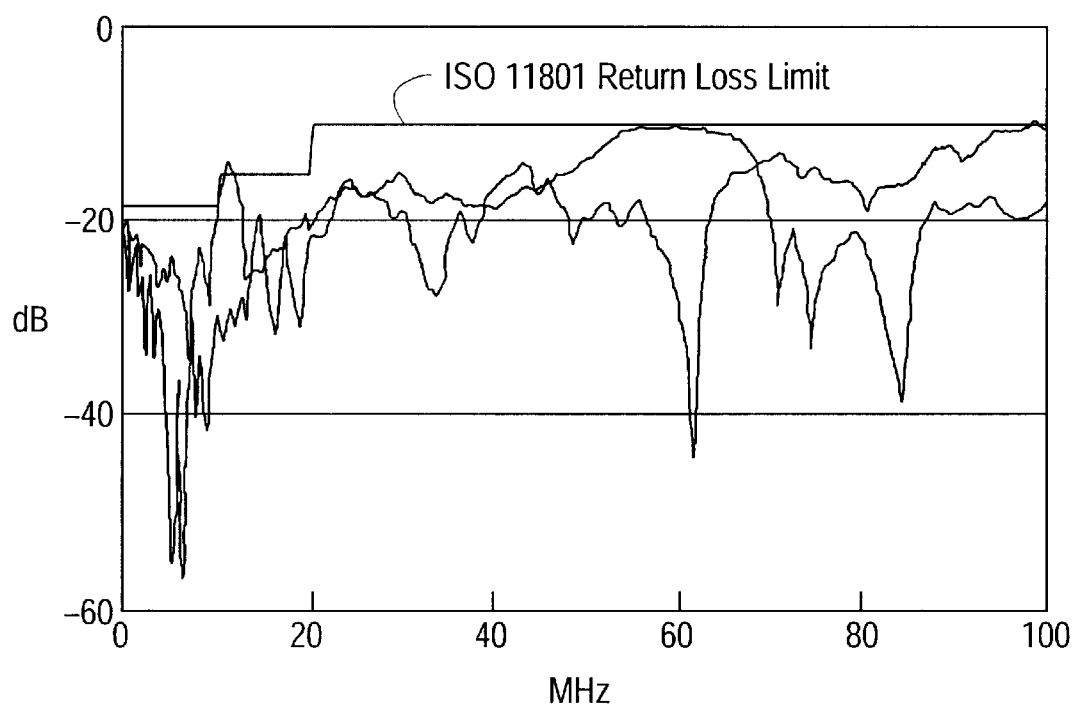
FIG. 4c is a Return Loss models used in design simulations are based on measured data.

Each wire pair is subject to Near End Crosstalk (NEXT) coupling from the three adjacent pairs transmitting simultaneously. The Com2000™ DSP circuitry on each pair is included a NEXT canceller that measures and subtracts out the NEXT noise. The NEXT models shown in FIG. 4b are based on NEXT measurements of a category 5 channel. To use the worst case measurements, an offset was added to the measured NEXT curves to shift the peak of the NEXT response up to the TSB67 [1] channel limit.

The Com2000™ Signal Equalization System capitalize on Synchronous Communication Environment and Com2000™ Channel Measurement and Calibration Technologies described above to suppress NEXT and power Distortions to the minimum level.

Three-disturber Equal Level Far End Crosstalk (ELFEXT)

Equal Level Far End Crosstalk (ELFEXT) is the signal coupling from the adjacent transmit pairs onto the receiver pair as multiple signals travel from the transmitter to the receiver. ELFEXT is measured in dB with respect to the attenuated transmit signal. "Equal Level" refers to the fact this disturbance typically happens between pairs carrying signals of equal level. Such coupling is significant in the case of twisted pair networks using multiple pairs for transmission simultaneously. In the context of a 10/100/1000/2000 Base-T link, the ELFEXT coupling accumulates as the four equal level signals propagate from the transmitters at the far end of the cable to the receivers at the near end. Far End Crosstalk (FEXT) is the same coupling as ELFEXT but measured with respect to the unattenuated transmit signal. See FIG. 4b.

The "worst case" FEXT models are based on power sum FEXT measurements of a real link shifted up to the anticipated FEXT limit. This method of modeling worst case FEXT is similar to the method used to model worst case NEXT (see above). FEXT is the noise seen by the receiver along with the NEXT noise. FIG. 4 demonstrates the relative levels of the NEXT and FEXT signals at the receiver. While the NEXT coupling can be cancelled by the Com2000™ DSP circuitry, the FEXT coupling cannot be cancelled and has a direct effect on the Bit Error Rate of the system.

The Com2000™ Signal Equalization System capitalize on Synchronous Communication Environment and Com2000™ Channel Measurement and Calibration Technologies described above to suppress NEXT and power Distortions to the minimum level.

Transmit Echo

Since the 10/100/1000/2000 Base-T system uses full duplex signaling on each pair, the transmit and receive signals are present on each pair simultaneously. The transmit signal must be subtracted from this combined signal to recover the received data. Due to the return loss imperfections of the cable, the transmit signal may not be completely subtracted from the receive signal. The difference between the subtracted signal and the signal present on the wire is called the transmit echo. The Com2000 DSP circuitry includes an echo canceler on each pair. The return loss models used in 1000/2000 Base-T transceiver embodiment are based on representative link measurements.

Ambient Noise

Ambient noise typically includes background white noise, impulse noise generated by power lines and telephone voltages. Ambient noise can also include interfering wireless signals and alien crosstalk. Due to its random nature, the ambient noise cannot be reliably canceled by the Com2000™ DSP and will contribute to the BER of a 10/100/1000/2000 Base-T system and so directly detracts from the SNR margin of the system.

To summarize, each pair of a 1000/2000 Base-T link experiences four major sources of noise, two that are cancelable by the receiver and two that cannot be reliably canceled. The noise contributed by the cable NEXT and by the transmitter echo can be cancelled by Equalization Technology but does not disappear entirely. The noise contributed by the ambient sources and by FEXT cannot be cancelled and will directly affect the Bit Error Rate (BER) performance of the system.

The 10/100/1000/2000Base-T transceivers designed to guarantee the SNR margin higher than 1.8 dB by 3 dB of margin @ 2 Gb/s data rate. We will now describe how an equivalent 3 dB improvement in the SNR margin can be achieved using the Com2000™ Signal Equalization System. (This can be thought of as having a technology which emulates the current CAT5 to a higher grade cabling available). Suppose we have a emulated cabling system very similar to Anixter Level 6, that specifies power-sum crosstalk levels. If we require that power-sum crosstalk meets the category 5 pair to pair crosstalk limit, we could assume that our "Next Level" cabling exhibits a 5 dB improvement over category 5 in its NEXT and FEXT performance. Pair to pair NEXT performance with Com2000™ Signal Equalization of Level 6 represents a 5 dB (10*Log (3)=5 dB) improvement with respect to category 5 because power-sum NEXT in a 4 pair cable is the sum of NEXT from 3 adjacent pairs.

The new emulated cabling system has an improved system return loss using Com2000™ Signal Equalization System by 3 dB better than normal category 5. So the Next Level system will have a 5 dB margin on NEXT, a 5 dB margin on FEXT and a 3 dB margin on return loss with respect to category 5. Based on the improvements in the NEXT, FEXT and return loss performance, stem from Com2000™ emulated cabling technology, it improves the overall SNR margin of 10/100/1000/2000Base-T system by almost 3 dB.

Com2000™ emulation of the Next Level cabling is a Com2000™ Signal Equalization system that does SNR improvements that is equivalent to the best cabling systems available today. It serves as an example to demonstrate that the additional SNR margin achieved by using cabling which is better than category 5 can substantially improve the robustness of 1000/2000Base-T & higher speed applications.

The Adaptive Filters of the Signal Equalization are used to decrease the channel response length while simultaneously preserving a good SNR in the resultant controlled inter-symbol interference channel. Note that when using the Com2000™. Equalizer with PAM-5 on channels that have inter-symbol interference, the equivalent front-end SNR can be replaced with the SNR at the input to the decision element after the Com2000™ Equalizer to compute the achievable data rate of 2Gb/s.

Let us first address the SNR parameters for SPAM-5, then discuss the CAT5 SNR analysis and findings. SNR improvement methods are then discussed referencing the current 125 Mbaud symbol rate of CAT5 channel distortions. When data is transferred over the CAT5 channel, the total SNR budget increases to the Margin Gain. Typically, this is 6 dB for Ethernet applications. Sometimes a Margin Gain of 12 dB is requested for "Theoretical" studies, implying that theory is likely to be incorrect by as much as an additional 6 dB with respect to the measurements. The Margin Gain is the quantity of interest for channel distortion suppression performed by the Signal Equalization.

Margin Gain=10 log (SNR/(M−1))+Coding Gain−9.8 dB

Where M is the Symbol (2**bits);

For the CAT5 channel with an SNR (after applying the Com2000™ Filter/Equalizer) of 27 dB and a powerful 4D-8 State Trellis code (as specified in the 802.3ab Specification) with a Coding Gain of 6 dB and an M of 10 bits/symbol (PAM-5 ), the resultant Margin Gain is 6.8 dB.

Therefore, our chosen CAT5 target probability of error (10**(−10)) requires an SNR total budget of 14.5 dB+6.8 dB of margin gain−6 dB of Coding Gain, or 15.3 dB for PAM-5. For a selected Coding Gain of 3 db, the total SNR for the PAM modulation requires in excess of 18.3 dB.

The SNR improvement methods are achieved through the Com2000™ Equalizer of the receiver and the unique Pulse Shaping of the 125 Mbaud symbol rate transmitter on a noisy CAT5 channel. The input differential signal is shaped by a feed forward equalizer (FFE) that compensates for signal dispersion and attenuation induced by the cable. A decision feedback equalizer (DFE) corrects for baseline wander and the limitations of the feed forward equalizer.

Since some portions of the Com2000™ Equalizer are in the ECHO/NEXT canceller and the FFE/DFE of the receiver, the receiving signal jitter has to be controlled. This is done through a Phase Transfer Technique of Synchronous Communication Environment so that the Com2000™ Equalizer phase jitter of the signal, between the sending and receiving node, is bounded within 1/64 of the baud period (125 ps). This level of phase accuracy, enabled by the Com2000™ Master/Slave clock synchronization methods described above, provides additional SNR enhancement for the SPAM-5 signaling.

The jitter degrades the performance of the ECHO and NEXT cancellers and FFE/DEF filters because it creates a transient mismatch between the samples of the ECHO or NEXT impulse response and the taps of the canceller. As a result of the use of ECHO/NEXT cancellation and FFE/DFE filters, the jitter specification for 10/100/1000/2000Base-T is significantly much tighter than it is for 100Base-T. From the precision phase synchronization between Master and Slave of Synchronous Communication Environment, the SNR improvement of Equalizer will be approximately 6 dB.

The Adaptive Equalization methods for the multi-level pulse amplitude modulation (5-ary SPAM) signal is described in the following paragraphs. At the sending Com2000™ node of the Partial Response PAM Modulator (57, FIG. 4), the kth set of N binary digits is mapped into a pulse duration of Ts seconds (8 ns) and an amplitude a(k). Thus the modulator output signal, which is the communication channel. is given as:

$$X(t)=\Sigma\ a(k)r(t-kTs) \tag{1}$$

Where r(t) is a pulse of duration Ts seconds and the amplitude a(k) can assume one of M=2**n distinct levels. Since the CAT5 channel is a fixed channel and relatively linear, the channel sample m output can be modeled as the convolution of the input signal and sample channel response, h(k), as $$Y(m)=\Sigma\ h(k)X(m-k) \tag{2}$$

To remove the CAT5 channel distortion, the sampled channel output y(m) is passed to the Com2000™ Equalizer with impulse response h_inv(k). The Com2000™ Equalizer output Z(m) is given as $$Z(m) = \sum h\_inv(k)Y(m-k) \tag{3}$$
$$= \sum X(m-j)\sum h\_inv(k)h(j-k)$$

The ideal Com2000™ equalizer output (for some delay D that is the function of the 100 m CAT5 channel and the length of the equalizer) is $$Z(m)=X(m-D)=a(m-D) \tag{4}$$

This only happens when the CAT5 channel distortion is greatly reduced and where the combined impulse response, Hc(m), of the cascade of the channel and the Com2000™ equalizer:

$$Hc(m)=H(m)*H\_inv(m)=\sigma(m-D) \quad (5)$$

A particular form of the CAT5 channel equalizer for the elimination of ISI is the Nyquist's Zero-Forcing filter. In the Nyquist's Zero Forcing Filter the impulse response of the combined channel and the Com2000™ Equalizer is defined as (note that at the sampling instances the CAT5 channel distortion is cancelled, and hence no ISI at the sampling instances)

$$Hc(kTs+D)=1 \text{ if } k=0;\ 0 \text{ if } k=/0 \quad (6)$$

A function that satisfies the above condition is the Sinc function:

$$Hc(t)=\sin(\pi fs(t))/\pi fs(t) \quad (7)$$

The Nyquist's Zero-Forcing filter, however, is sensitive to deviations in the error estimation of Hc(t) and jitter in the synchronization and sampling process. One benefit for this ideal filter is that at each of the sampling instances the CAT5 channel distortion is cancelled, and hence no ISI is present during the sampling instances.

Due to the principle of this scheme, the zero-forcing filter is only possible over the length of the transversal filter's memory. One limitation of this ideal filter is resolved due to the fact that the CAT5 channel transfer function's inverse filter, h_inv(k), constituted by the Com2000™ Equalizer when cascaded with the CAT5 channel h(k), enhances the CAT5 channel noise in those frequency interval Ts where h(k) has a high amplitude attenuation.

The form of the Com2000™ Equalizer is considered a combination of LMS (Least Mean Square) based Adaptive Equalizer followed by a non-linear estimator. In the Training mode (104), the filter coefficients are adjusted to minimize the mean square distance between the filter output and the desired training signal (102). In the Blind Equalization mode (104), the desired signal, which is the channel input, is not available. The use of the Com2000™ Adaptive filter (101), for the blind equalizer, requires an internally generated desired signal.

As illustrated in FIG. 5D, the Com2000™ Equalizer is comprised of two distinct sections: An adaptive equalizer (FIR Filter) (101), that removes a large part of the CAT5 channel distortion, followed by a Non-Linear Estimator (Decision Device) (103) for an improved estimate of the channel input. The output of the channel's non-linear estimator (103) is the final estimate of the CAT5 channel input, and is used as the desired signal to direct the equalizer adaptation (101). This Blind Equalization method ensures that the equalizer (101) removes a large part of the channel distortion. This method uses a cold start up (104) period during which no training signal is transmitted, and a warm start period during which a training signal sequence is transmitted.

The adaptation of the equalizer coefficient vector is governed by the following recursive equation:

$$H\_inv(m)=H\_inv(m-1)+\mu E(m)Y(m) \quad (8)$$

Where H_inv(m) is an estimate of the optimal inverse channel filter H_inv, the scalar $\mu$ is the adaptation step size, and the error signal E(m) is defined as equation (9) and includes both ISI and noise. ($\Psi$ is defined as the non-linear estimate function of the channel input)

$$E(m) = \psi(z(m)) - z(m) \quad (9)$$
$$= X(m-d) - Z(m)$$

We can use Bayesian framework to formulate the non-linear estimator $\Psi$ (t) during Blind Equalization. To estimate the channel impulse response during the blind equalization, the Com2000™ utilizes the knowledge of the estimated input signal, X(m) (104), and the statistical model of the CAT5 channel. The knowledge of the input signal, a 5-ary SPAM signal used in the 9-level Decision Device (103), is used to estimate the channel input signal X(m) (104). The knowledge of the CAT5 channel is the relative duration relationship between the duration of the CAT5 channel impulse response and the duration of the input signal X(m) (104), which is measured by a long time averaging of the channel output. (CAT5 channel impulse response duration is usually an order of magnitude smaller than the input signal, X(m), duration)

As illustrated in FIG. 5D, the FIR equalizer (103) is followed by a 9-level quantiser (103). In this configuration, the output of the equalizer filter (101) is passed to a 9-ary decision circuit. The decision device, which is essentially a 5-level quantiser (103), classifies the channel output into one of 9 valid symbols. The output of the decision device is taken as an internally generated desired signal to direct the equalizer adaptation.

The following paragraphs describes the steps that needed to be transitioned into an orderly fashion, in order to deliver the 8 dB SNR margin gain.

Before the discussion of the method and means of improving the data communication front end via addressing the filter optimizations, a measurement, called the Error Vector Measurement (EVM), is summarized. The EVM is the difference between the received signal phase and known sending signal phase. It is a powerful tool to trouble shoot and calibrate any data communication channels. It determines the correlated errors between a predetermined sending phase vectors and receiving phase vectors. This EVM method identifies the causes of power and phase distortions and problems. It calculates the average for both power and phase error components. It determines the unwanted phase modulation, resulting from the dominant InterSymbol Interference (ISI), by comparing the derived power error component with the phase error components. If the phase error component is larger than the power error component, this is indicative of phase distortions.

The EVM method also determines the external ISI coupling and the non-linearity of the signal zero crossings. By measuring the expected amplitudes of the received signal at a predefined phase angle of the signal space, the corresponding amplitude of each In-Phase component and staggered phase component of the signal or P-Phase component, and their difference can be defined. If the error peaks at the signal peaks, this is the indication of the presence of external ISI coupling. If the error peaks at the signal minimum, this suggested the signal non-linearily of zero crossings.

Now let us address the method and means of improving the Signal to Noise Ratio (SNR) via optimizing the front end filters. There are many type of filters in the signal data communication front end: The ECHO, NEXT cancellers, and the FFE and DFE filters. The Com2000™ Adaptive Filters, or Equalizer, is the combination of filter's optimization techniques and designs used to decrease the channel response length while simultaneously preserving a good SNR in the resultant controlled inter-symbol interference channel.

To optimize of filters for SNR improvements, the following steps needs to be performed: (A) Optimize the ECHO and NEXT Cancellers via the Controlled Blind Equalization. This is done so that the cancellers filter coefficients can reflect to the good and coarse estimation of the communication channels without sending and receiving any signals of the system nodes. (B) Establish the external phase and frequency synchronization before Signal Training. This is done so that the underlying assumption of the predefined frequency and phase matrix cell are defined. This frequency and phase synchronization are used as a baseline for the EVM measurements. (C) Optimize the FFE and DFE filter's coefficients for determining the Pre-ISI. This is done so that the filter's coefficients can be optimally trained in the presence of the large signal noise due to the relative phases of the true and interfered received signals. (D) Suppress the signal interference due to the relative phase difference of the receiving signals. This is done so that the filter's coefficients can be optimally trained in the presence of the minimum signal noise due to the relative phases of the true and interfered received signals (E) Optimize the FFE and DFE filter convergence and filter's coefficients for determining the Post-ISI. (F) Maintain the optimization of the FFE & DFE filter's coefficients via channel adaptive method of the Sounding Sequence. This is done so that the filter's coefficients can be maintained optimally trained in the presence of the large noise due to environmental and channel response changes. (G) Deliver Coherent signal carrier recovery and frequency/phase synchronization for starting at a precision EYE sampling interval and maintaining the precision throughout the data sampling window.

To optimize the ECHO and NEXT Cancellers via Controlled Blind Equalization (A), the following steps are taken: (a) Establish internal the coarse phase and frequency synchronization and calibration before starting the blind equalization. It is used to isolate all of the noise that incured between the true input signal noise and the clocking of the measured noise model pattern for each of the noise filter bandwidth. (b) Estimates the sending and receiving node coarse propagation path delays via using the propagation delay measurement circuitry. This is used to determine the accurate number of the filter taps for this channel filter memory. (c) Positioning the ECHO, NEXT, FFE and DFE right number of filter taps for optimizing the coefficient calculations and weighting determinations. (d) Send the BIT wrap around of the front end via a predefined signal (from transmitter to receiver) for stimulus and calibrate the initial estimate of the channel response on the predefined calibrated signal. (e) Calculate all of the filter's coefficients based on the received calibrated signal.

To establish the external frequency and phase synchronization before Signal Training (B), the following steps are taken: (a) Establish initial external (node to node) clock transfers and synchronization via sending and receiving the Synchronization Symbols. This is done so that the baseline for the precision controls and measurement related to the frequency, phase and power are defined. (b) Measure the sending and receiving node's propagation delay. This is done so that the filter's memory can accurately reflect to the channel's memory, and the power threshold level can be also defined accordingly. (c) Measure the channel's frequency offset. This defines the frequency and phase errors on the controlled frequency and phase matrix cell and will be used to compensated for during the EVM measurements.(d) Positioning the ECHO, NEXT, FFE and DFE right number of filter taps for optimizing the coefficient calculations and weighting determinations. To optimize the ECHO, NEXT, FFE and DFE filter's coefficients via Signal Training (Pre-ISI), the following steps are needed to be taken: (a) Send a predetermined phase of the training sequences. This will allows the EVM to study the channels responses and its errors on to different signal phases. (b) Measure the EVM phase offset error vector. These errors will be used to compensated and calibrated for the channel induced errors via fine tuning and capture the offset of the local oscillator signal frequency and phase. (c) Position and phase align the local stored training pattern to the receiving pattern. This is done so that the correlation noise induced from the filter's coefficient taps and its digital sampling AID clocking is suppressed. (d) Clocking the FFE and DFE filter taps for training coefficient calculations. Starts the filter's coefficient calculation with a clean slate from the signal autocorrelation of the training and the predefined stored training patterns.

To suppress the signal interference due to the relative phase difference of the receiving signals (D), the following steps are taken : (a) Broadcast the predetermined time, frequency and phase training sequences. This is done so that the all of the adjacent sending nodes are sending at the same time interval with the predefined phase and frequency matrix cell. (b) Measure the received EVM phase and power error vector for phase noise magnitude determination. This will be used to define the maximum and minimum signal level for a specific phase sector angles so that the EVM can compensated for the phase noise error during normal data transfer mode. (c) Clock Tune and Phase align local stored training pattern to minimum EMV rms errors. This is done so that the local clock's phase and frequency are compensated for this phase noise error.

To optimize the ECHO, NEXT, FFE and DFE filter's coefficients via Signal Training (Post-ISI)(E) , the following steps are needed to be taken: (a) Send a predetermined phase of the training sequences. This will allows the EVM to study the channels responses and its errors on to different signal phases when the relative phase noise of channel are minimized. (b) Measure the EVM phase offset error vector. These errors will be used to compensated and calibrated for the channel induced errors via fine tuning and capture the offset of the local oscillator signal frequency and phase. (c) Position and phase align the local stored training pattern to the receiving pattern. This is done so that the correlation noise induced from the filter's coefficient taps and its digital sampling A/D clocking is suppressed. (d) Clocking the FFE and DFE filter taps for training coefficient calculations. Restarts the filter's coefficient calculation with a clean slate from the signal autocorrelation of the training and the predefined stored training patterns.

To maintain the optimization of the FFE & DFE filter's coefficients via channel adaptive method of the Sounding Sequence (F), the following steps are needed to be taken: (a) Insert and Send predetermined phase Sounding Sequences during the normal data transfers. This enables the filter's coefficients adaptively to the changes of the channel responses. (b) Measure the EVM phase offset error vector. This defines the error vectors and its magnitude. (c) Position and phase align the local stored Sounding pattern to the receiving Sounding pattern. This is done so that the correlation noise induced from the channels are compensated for. (d) Clocking the FFE and DFE filter taps for sounding coefficient calculations. Restarts the filter's coefficient calculation with a clean slate from the signal auto-correlation of the Sounding and the predefined stored Sounding patterns.

To deliver Coherent signal carrier recovery and frequency/phase synchronization for starting at a precision EYE sampling interval and maintaining the precision throughout the data sampling window (E), the following steps needed to be taken: (a) Maintain Coherent Clock phase and carrier recovery via sounding sequence. This is done so that the sending and receiving frequency and phase are within the cell matrix. (b) Bound the long term drift via the clock transfer. When the master or the switching hubs front end has this technology in the PHY, the system can be synchronized to a very precision signal reference source so that the long term drift properties of the master clock are transferred to the slave or receiving local clocks. (c) Maintain the short term drift via the DLL lock with minimal drift and jitter generations. This is done via bypassing the regeneration carrier of the PLL. (d) Position and phase align the local stored Sounding pattern to the receiving Sounding pattern. This is done so that the correlation noise induced from the channels are compensated so that the phase of the signal for precision sampling can be maintained within a predefined phase error window of matrix cell for a extended period of time. This in turns improves the front end SNR.

While all of the front end filter's are implemented asynchronously, the equalization system capitalizes on the synchronous nature of the signal and optimize the channel response estimations to reduce channel noise. In the Gigabit Ethernet context, the equalization system guarantees a Bit Error Rate (BER) of $10^{-10}$ on networks that use existing category 5 installations.

Signal Coding System

This section describes the signal coding system of the Com2000™ GPHY4 delivery system and the underlying technologies that are involved in the design and development of this high-speed data communication transceiver. The GPHY4 is a universal 10/100/1000/2000Base-T Physical Layer manifestation that delivers a robust high performance Gigabit or multi-gigabit Ethernet data delivery system.

The GPHY4 Ethernet system delivers Gigabit data communication over the same standard 8-wire (2 Gbps over 8 wires) Unshielded Twisted Pair (UTP) CAT5 cable as 100Base-T through the insertion of the Com2000™ technology. The GPHY4 system is implemented at the media Physical Interface to deliver a revolutionary bandwidth efficient coding scheme to support Multi-Gigabit signaling over the existing CAT5 cabling infrastructure.

Capitalizing on the precision controls of signal's frequency, phase, time and amplitude, the Com2000™ signal coding is the selecting signal or a combination of signals from any one of the following selections: (a) Precision Phase Control Multi-Level Amplitude signals (CAP Emulation—SPAM-5), (b) Precision Frequency Control Multi-Level Amplitude signals (DMT Emulation—FPAM5), (c) Precision Frequency & Phase Controls Multi-Level Amplitude signals (DMT/CAP—FTPAM5), (d) Precision Frequency, Phase, Time and Multi-Level Amplitude signals (DMT/CAP—FTSPAM5).

For the Com2000™ Multi-Gigabit signal coding system, the selected signal scheme is SPAM-5, which capitalize the precision phase and amplitude controls of the signal, uses both Synchronous and Partial Response features of the Pulse Amplitude Modulation signal scheme. The SPAM-5 and/or Synchronous Partial Response NRZ or SNRZ Code Signaling deliver multi-gigabit signaling and scalable network data transmission from 100 Mbps to 2000 Mbps data rate for Ethernet data over existing UTP Category 5 cable.

Figure 19:
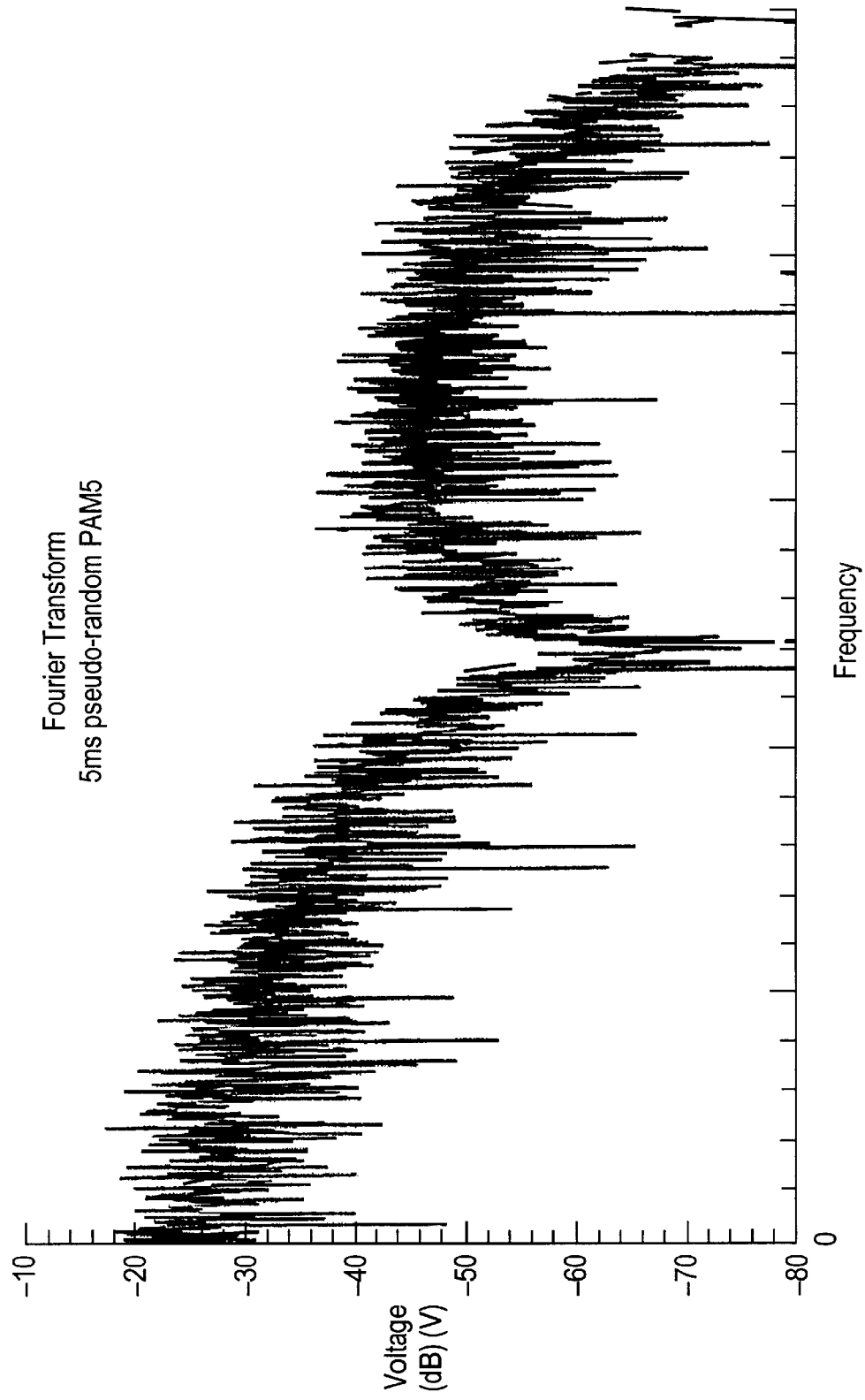
FIG. 19: A Typical Power Spectrum for 1000BaseT PAM-5 signaling. Refer to FIG. 7a with pulse shaping.
Figure 20:
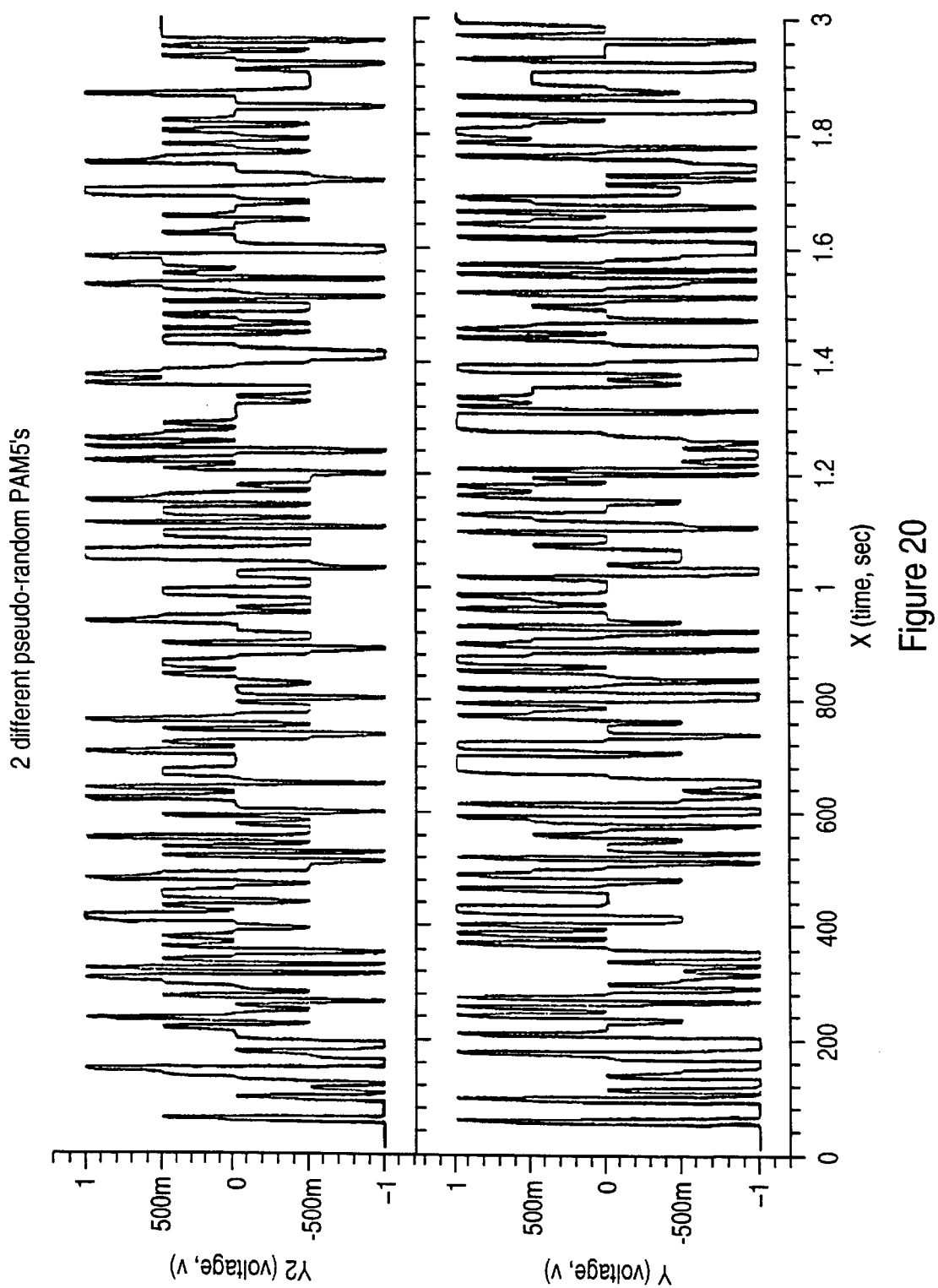
FIG. 20 illustrates the invented interleaved PAM-5 signaling as indicate at the output B of the FIG. 16 for Multi-Gigabit signaling.
Figure 32:
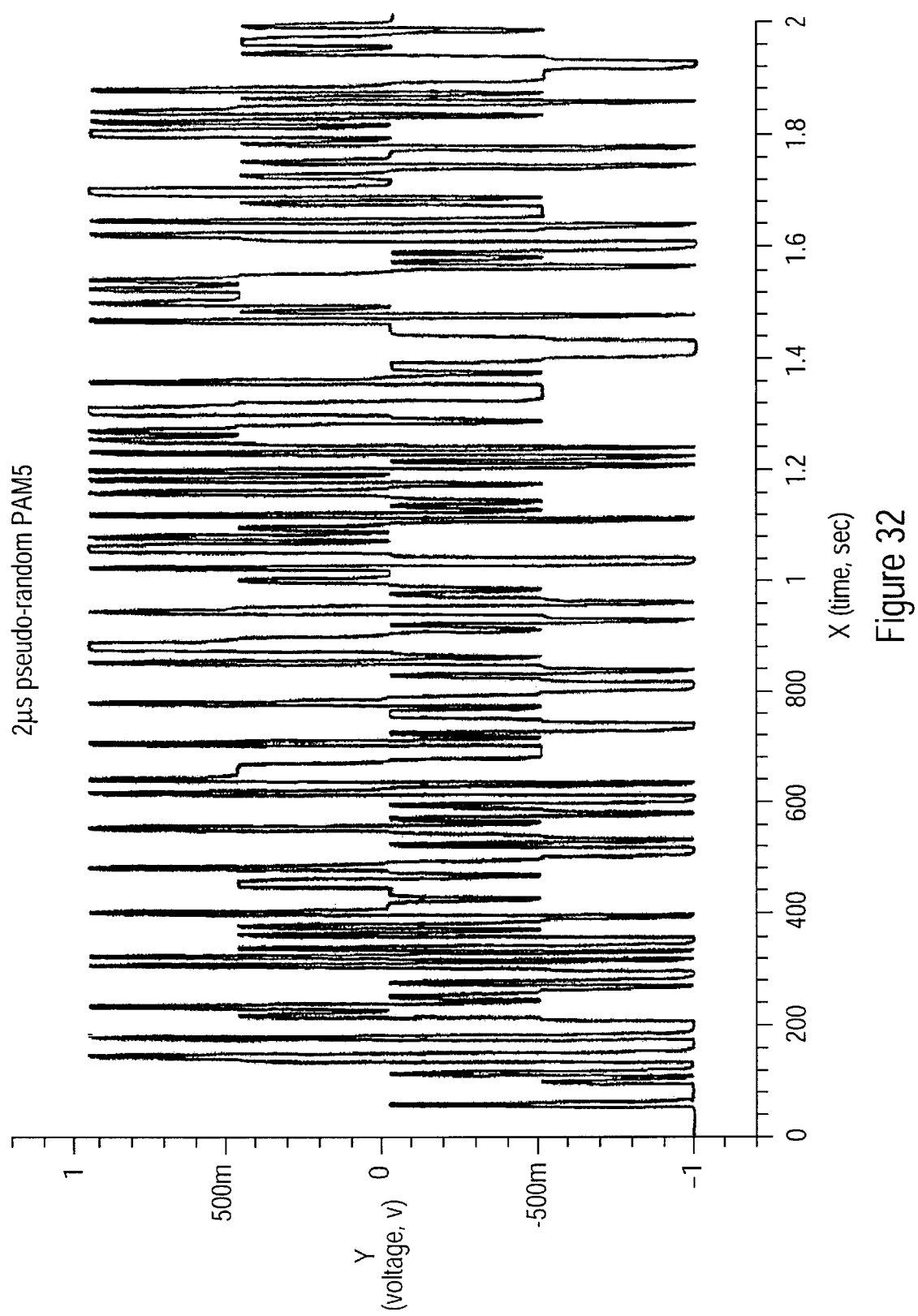
FIG. 32 illustrates a Typical simulated 1000BaseT pseudo-random PAM-5 signal.

The twisted pair gigabit Ethernet standard—1000Base-T—is under development by the IEEE P802.3ab task force. In September 1997, after a year of debate, the P802.3ab task force selected the PAM-5 (PAM-5, see FIGS. 18,19 and 32) line code developed by Level One Communications for implementing 1000Base-T. The name PAM-5 was chosen because this signaling scheme has inherited the symbol rate and spectrum of 100Base-TX and is based on the line code used by 100Base-T2 (100 Mbps over 2 pairs of CAT3).

100Base-T (802.3ab) achieves full duplex throughput of 1000 Mb/s by transporting data over four pairs from both ends of each pair simultaneously. The method of transporting data from both ends of a pair simultaneously is known as dual duplex transmission. Each pair carries a dual duplex 250 Mb/s data signal encoded as 5-level Pulse Amplitude Modulation (PAM-5).

A 1000Base-T physical layer device includes four identical transceiver sections—each with its own transmitter and receiver. Each transceiver section operates at 250 Mb/s—2 bits per symbol with a symbol rate of 125 Msymbols/s. The total throughput is 250 Mb/s×4 pairs=1000 Mb/s=1Gb/s.

The new line coding design of the Com2000™ 10/100/1000/2000Base-T (802.3ab+) achieves the full duplex throughput of 2000 Mb/s by transporting data over four pairs from both ends of each pair simultaneously. Each pair carries a dual duplex 500 Mb/s data signal encoded as Synchronous Partial Response 5-level Pulse Amplitude Modulation (SPAM-5). See FIG. 31.

The Com2000™ Multi-Gigabit line coding design of Com2000™ 1000Base-T (802.3ab+) physical layer device includes four identical transceiver sections (same front end as 1000Base-T)- each with its own transmitter and receiver. Each transceiver section operates at 500 Mb/s–4 bits per symbol with a symbol rate of 125 Msymbols/s. The total throughput is 500 Mb/s×4 pairs=2000 Mb/s =2 Gb/s.

The charter of the P802.3ab study group is to define a standard for transporting a full duplex 1 Gb/s data stream over a 100 MHz category 5 channel. To reduce the complexity of the line code to a manageable level, the data will be transported over four pairs simultaneously from both ends of each pair. With this approach, each pair carries a 250 Mb/s full duplex data stream.

To reduce the complexity of the line code (Partial Response PAM-5 signal), the data will also be transported over four pairs simultaneously from both ends of each pair just as the 802.3ab standards. With this approach, each pair carries a 500 Mb/s full duplex data stream and can be scaled utilizing the system clock adjustment in order to deliver scalable data transfer rates for interim non-compliance to 1000Base-T CAT5 capacity. The 10/100/1000/2000Base-T Com2000™ Multi-Gigabit signaling is compatible with the 100Base-TX signal so as to facilitate the development of a four data rate 10/100/1000/2000Base-T transceiver. The symbol rate of 1000/2000Base-T is the same as that of 100Base-TX–125 Msymbols/s.

When implementing a 10100/1000/2000Base-T system, one advantage of having equal symbol rates for 100 and 1000/2000 Mb/s operation is that common clocking circuitry can be used with both data rates. Another advantage is that the spectra of both signals are similar with a null at 125 MHz (FIG. 6b). The null in the spectrum of a baseband signal occurs at the frequency equal to the symbol rate. 1000/2000Base-T and 100Base-TX, both operating at the same symbol rate and using baseband signaling, have similar signal spectra. This reduces the complexity to match the spectrum of 1000/2000Base-T to that of 100Base-TX almost exactly through some additional filtering. The advantage of having similar spectra for 100 and 1000/2000 Mb/s signals is that common magnetics and other emission suppression circuitry can be used regardless of the data rate.

A PAM-5 eye pattern for 1000Base-T is shown in FIG. 6c. An eye pattern is a trace produced by a modulated random data waveform, with each symbol period tracing from left to right and starting in the same place on the left. An eye pattern appears on an oscilloscope if the modulated random data signal is viewed while triggering the oscilloscope on the data clock. The eye pattern of the PAM-5 signal deviates somewhat from this classical 5-level eye pattern because the waveform of the PAM-5 signal has been shaped to make the spectrum of 1000Base-T match the spectrum of 100Base-TX.

Figure 24:
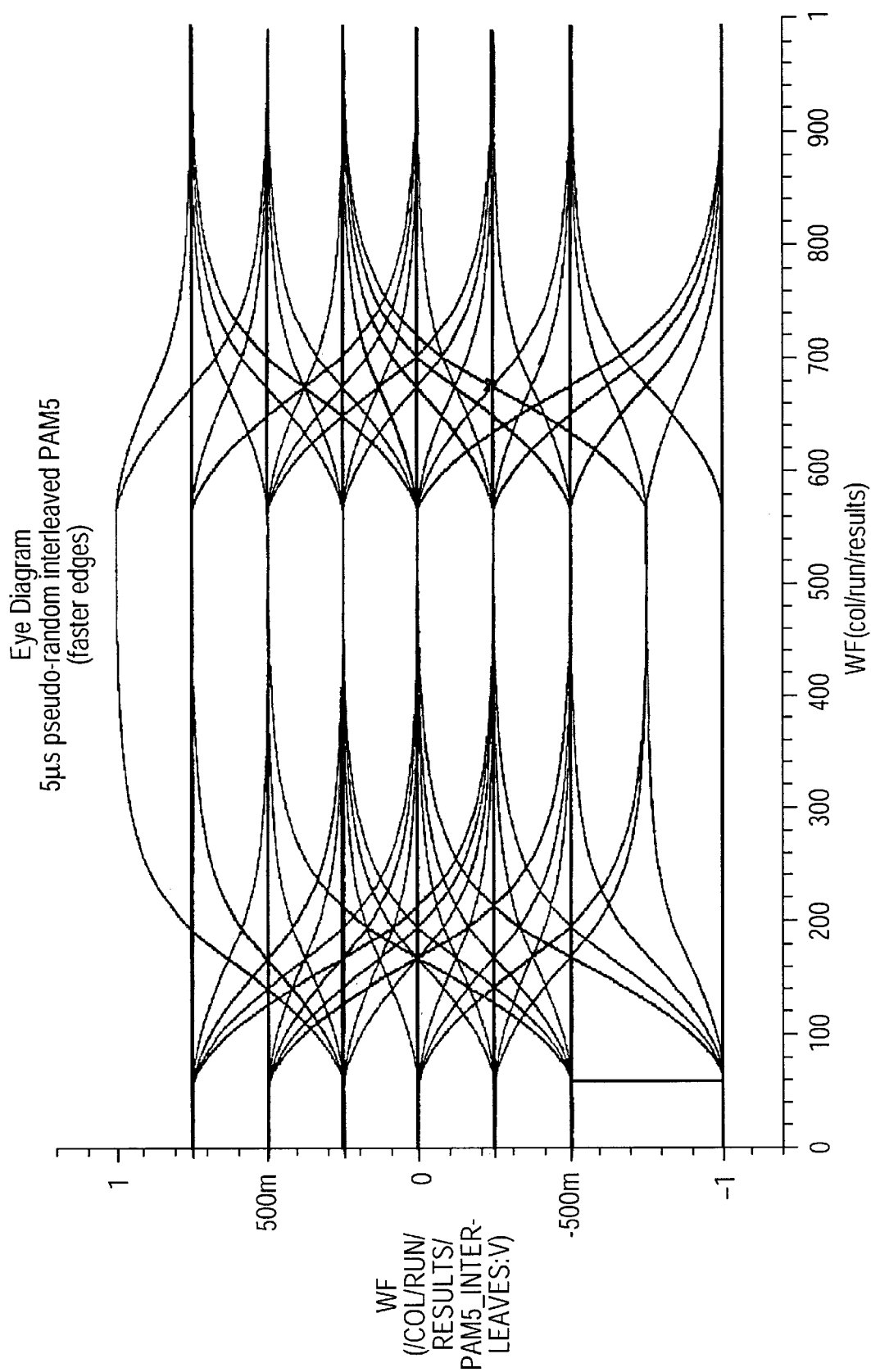
FIG. 24: A Eye Diagram for newly invented simulated interleaved PAM-5 signaling's of Com2000™ Multi-Gigabit signaling. (Signal B of the FIG. 16)
Figure 25:
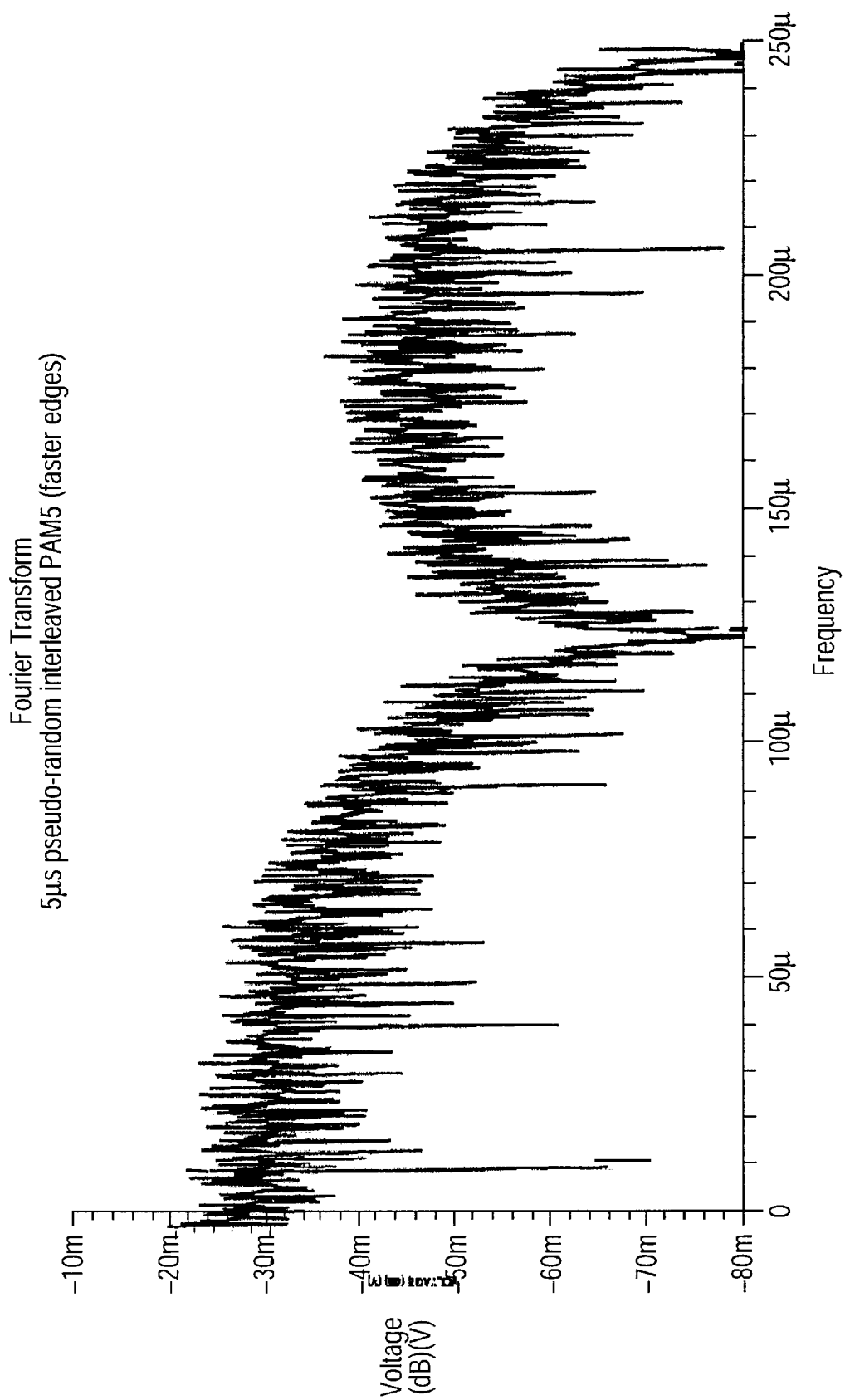
FIG. 25: A newly invented Power Spectrum for Com2000™ Multi-Gigabit signaling (Signal B of FIG. 16) in comparison to the FIG. 19 for 1000BaseT PAM-5 power spectrum. Note Com2000™ Multi-Gigabit signaling power spectrum is about 3–6 dB less than the PAM-5 spectrum in FIG. 19.
Figure 26:
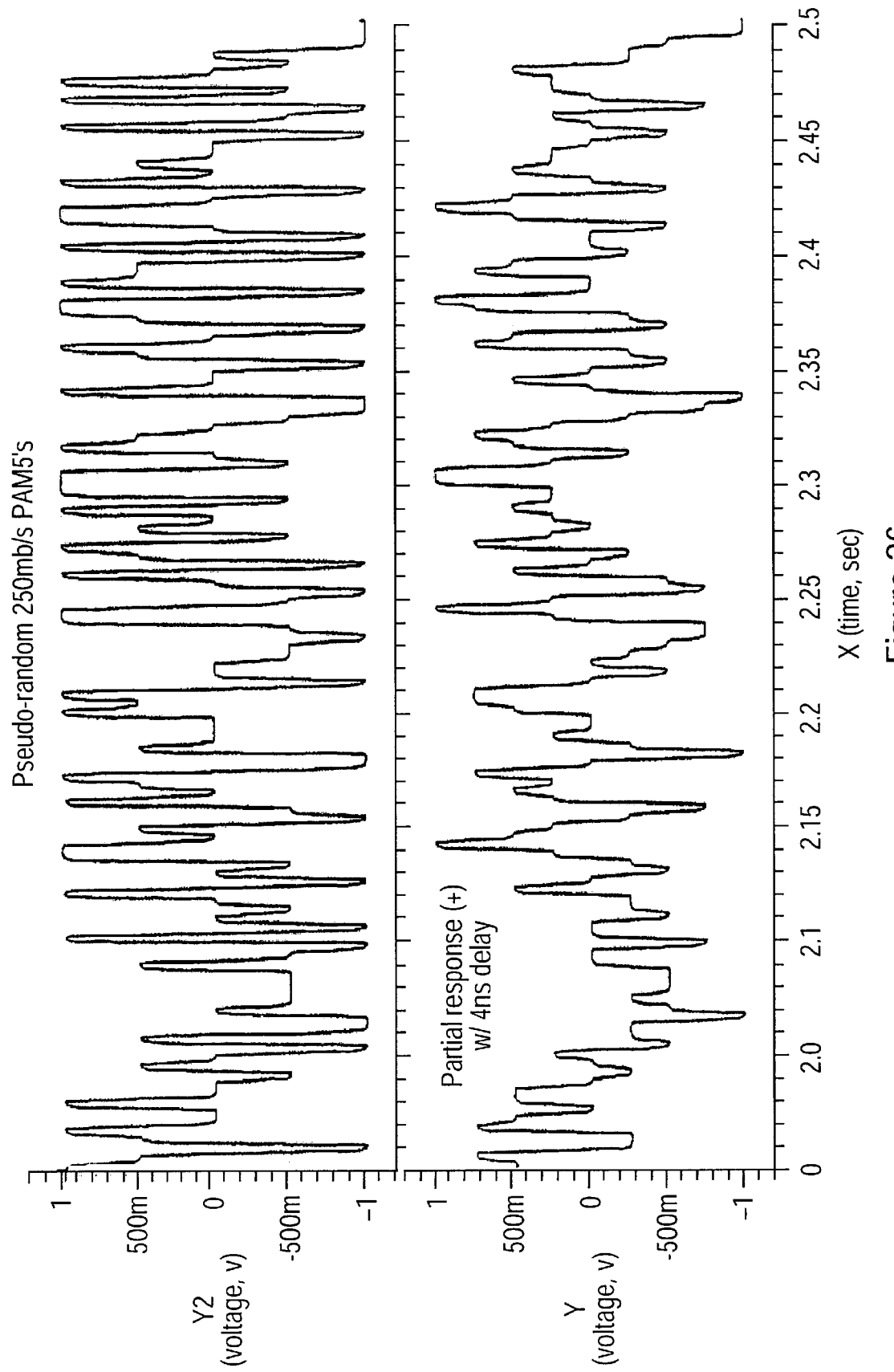
FIG. 26: A newly invented simulated partial response+interleaved PAM-5 signaling diagram for Com2000™ Multi-Gigabit signaling. (Output Signal C of FIG. 16)
Figure 27:
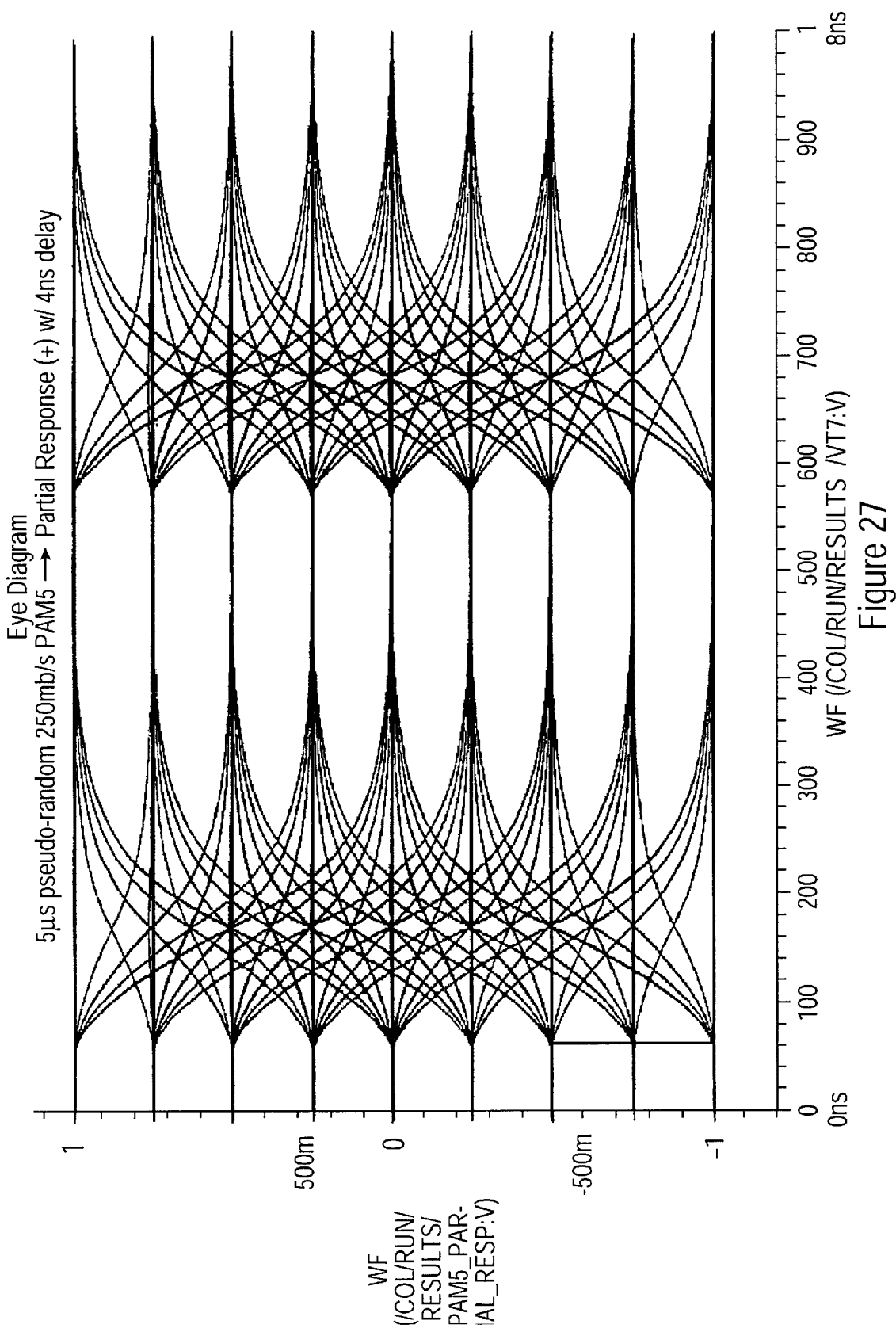
FIG. 27: The Eye diagram of a newly invented simulated partial response+interleaved PAM-5 signaling's of Com2000™ Multi-Gigabit signaling. Note that there is 8 eyes and the eye is 4ns in width. These are overcomed via the Com2000™ Noise suppression and Precision Sampling Technologies.
Figure 28:
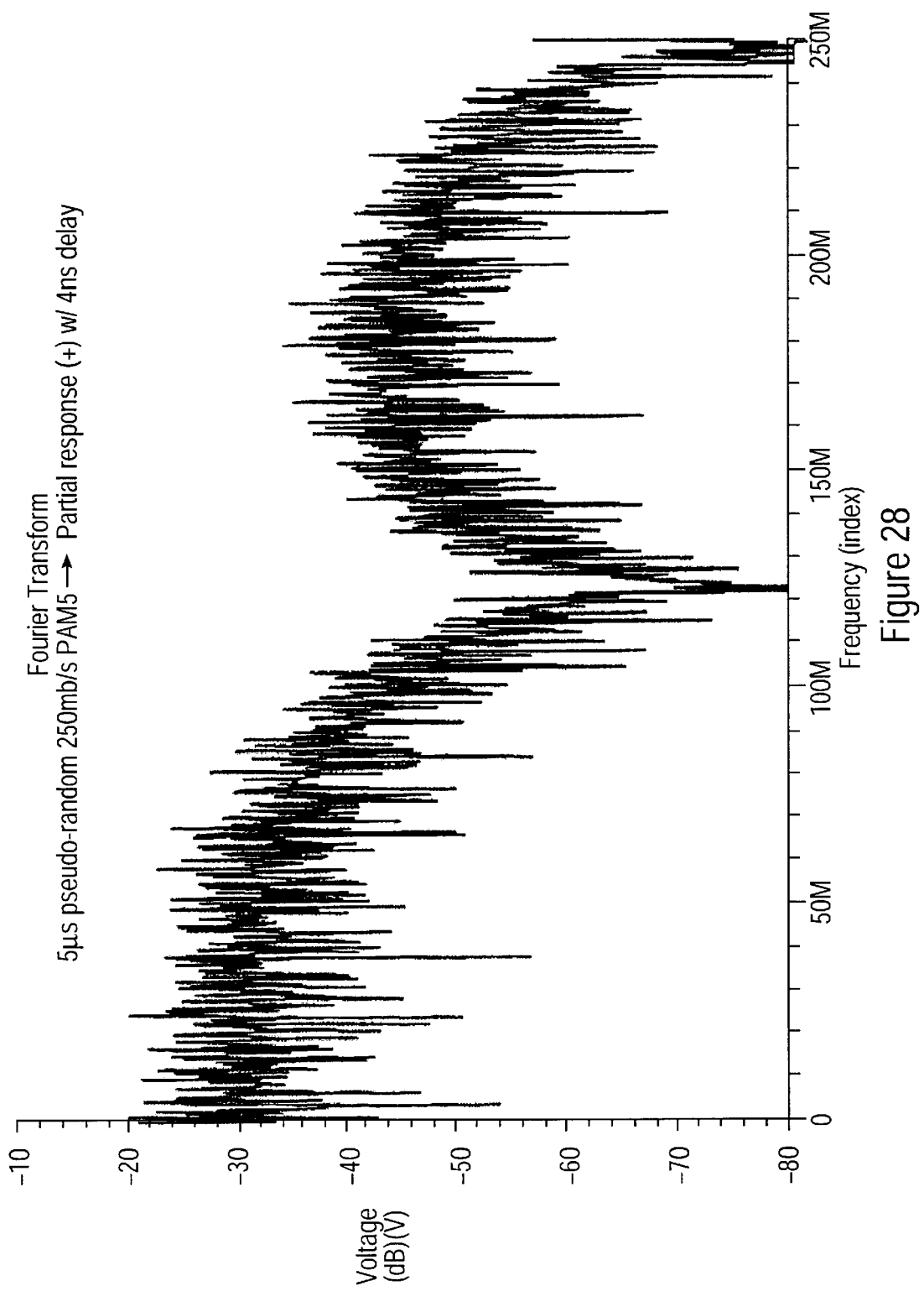
FIG. 28: Power Spectrum for a newly invented for Com2000™ Multi-Gigabit signaling (FIG. 26) in comparison to the FIG. 19 for 1000BaseT PAM-5 power spectrum.

A Synchronous Partial Response PAM-5 eye pattern for 2000Base-T is shown in FIGS. 24 and 27. A Synchronous Partial Response PAM-5 eye pattern appears on an oscilloscope if the modulated random data signal is also viewed while triggering the oscilloscope on the data clock. The eye pattern of the Com2000™ Partial Response PAM-5 has twice as many eyes as the PAM-5 signal. The eye's vertical noise voltage threshold is reduced in half relative to the PAM-5 eye.

The Com2000™ Partial Response PAM-5 signal is 6 dB less than the 1000Base-T signal and has been shaped to make the spectrum of the newly proposed 2000Base-T match the spectrum of 100Base-TX. (See FIG. 24). The Com2000™ Signal Equalization system enables the front end to recover the 6 dB of signal degradation and achieve an extra 2 dB for Noise margin improvement over the 1000BaseT. Please see the section describing the signal equalization system for further details. For clarity, a general background on signaling is provided below.

Figure 30A:
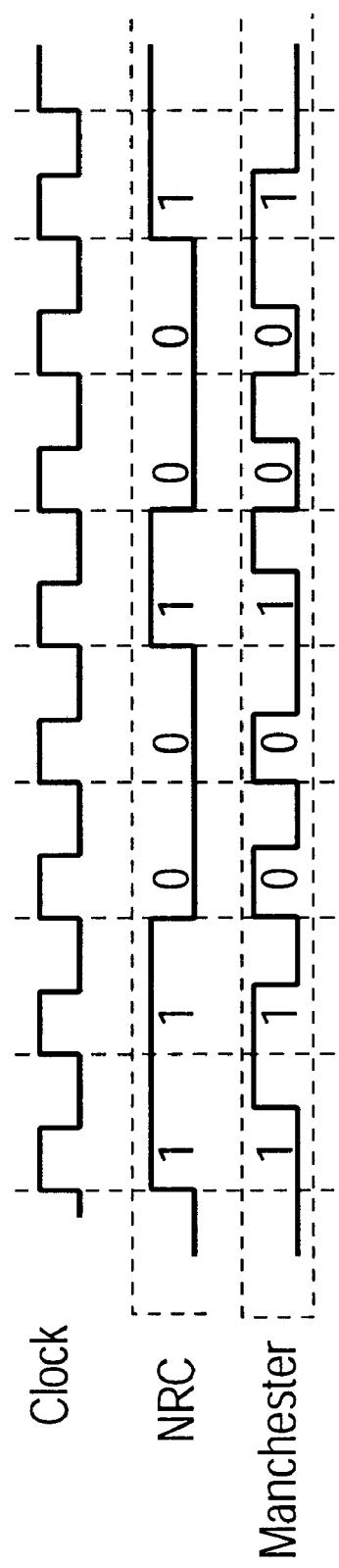
FIG. 30a illustrates the NRZ and Differential Manchester binary coding schemes.

The simplest form of data signaling includes encoding the information into two symbols—a "0" and a "1". Such signaling is referred to as binary and is typically transmitted over twisted pair Local Area Network (LAN) data channels as two distinct voltage levels. Examples of two commonly used binary coding schemes are NRZ (used for ATM-155) and Manchester (used for 10 Base-T). See FIG. 30a.

Figure 30B:
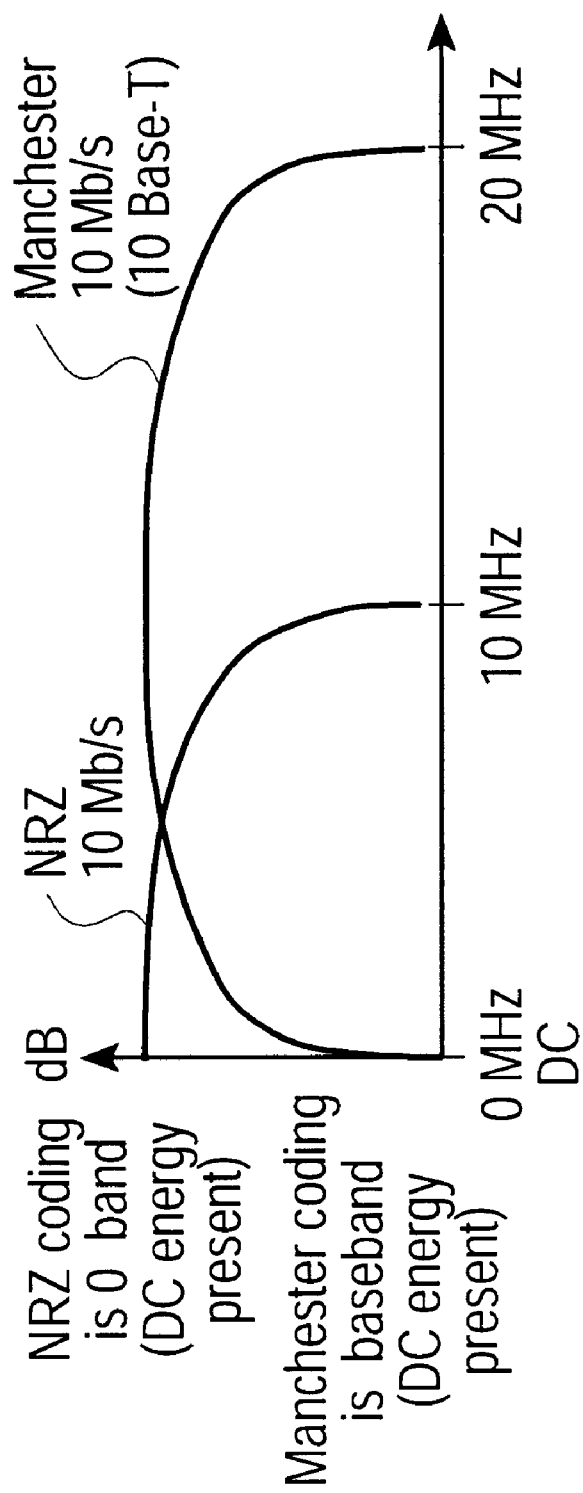
FIG. 30b illustrates the spectral shapes of random 10 Mb/s NRZ and 10 Mb/s Manchester data signals. The Manchester spectrum corresponds to the spectrum of a perfectly random 10 Base-T signal.
Figure 30C:
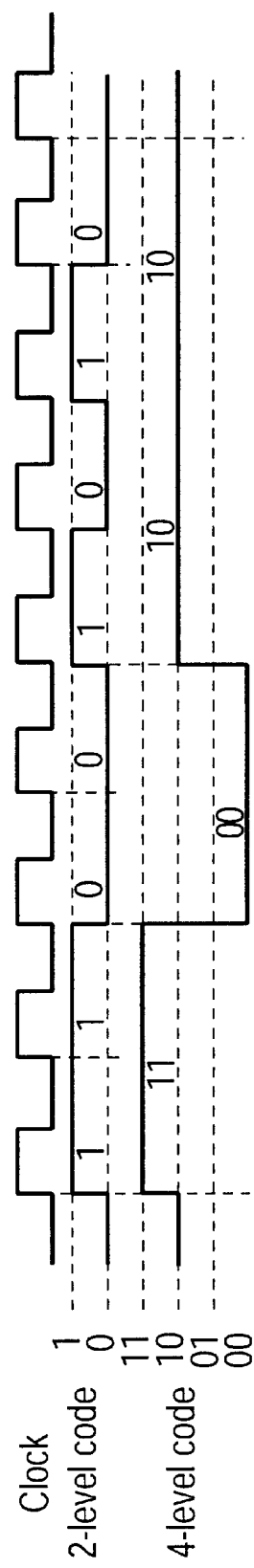
FIG. 30c illustrates the spectral efficiency through multi-level amplitude coding. The data pattern of "11001001" encoded into 2 and 4 levels. The 4-level coding cuts the frequency of voltage transitions in half.
Figure 30D:
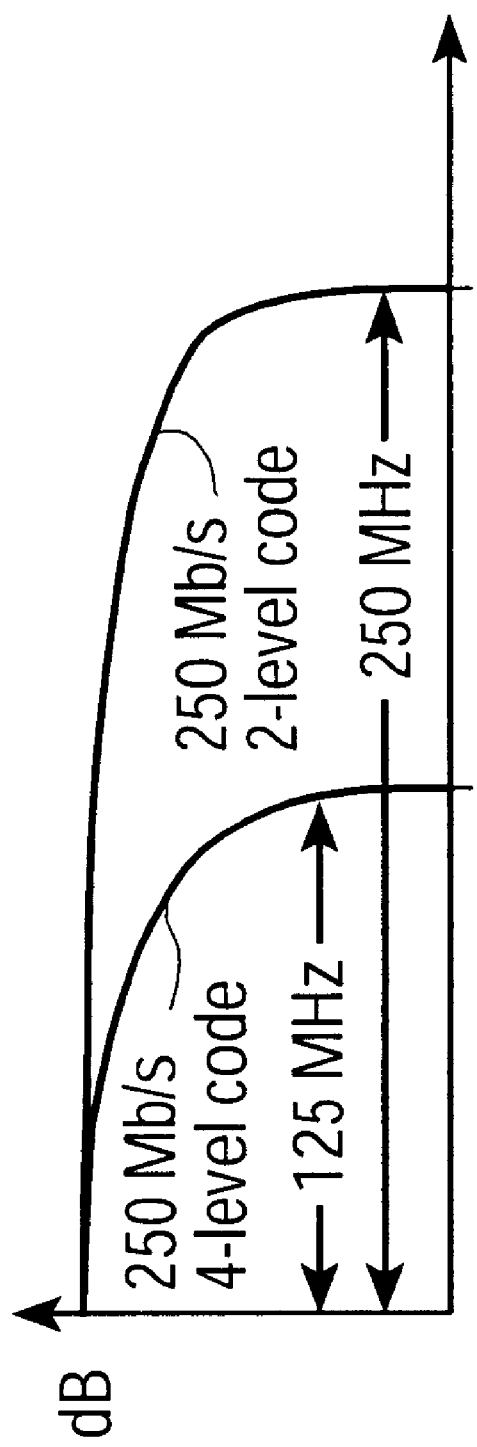
FIG. 30d illustrates the Spectral efficiency through multi-level coding. The spectral shapes of a 200 Mb/s random data stream encoded into 2 and 4 levels. The 4-level signal consumes half the bandwidth of the 2-level signal.

The simplicity of binary coding comes at the price of channel bandwidth. The useful bandwidth of a random NRZ signal consumes the bandwidth (in MHz) equal to the data rate of the signal (in Mb/s). The useful bandwidth of a random Manchester signal is double the data rate of the signal. See FIG. 30b.

FIG. 5a shows that a 10 Mb/s Manchester-coded 10 Base-T signal requires 20 MHz of channel bandwidth. Although the bandwidth utilization of any data signal can be reduced through filtering, a common practice in today's twisted pair LAN implementations is to transmit the first spectral lobe unfiltered.

A signal having no spectral energy at DC is known as a passband signal. Manchester coded data is an example of a passband signal. Due to the voltage transitions in every bit cell of a Manchester-coded data stream, the Manchester spectrum has no DC component. An NRZ signal, on the other hand, does not guarantee transitions in every bit cell and, therefore, has a DC component. A data signal, such as NRZ, with non-zero energy at DC is known as a baseband signal. The spectrum of a passband data signal is twice as wide as the spectrum of a baseband signal generating the same data rate.

Bandwidth efficient coding schemes, as their name implies, are designed to consume less bandwidth than binary coding schemes running at the same data rate. The main difference between bandwidth efficient and binary coding is that binary coding generates one bit at a time while bandwidth efficient coding generates two or more bits simultaneously.

The Synchronous Partial Response PAM-5 signaling is a method of increasing the bandwidth efficiency and includes:

1. Encoding multiple bits into several voltage levels on the transmit signal
2. Generating two baseband data streams and generating a partial response version in the same frequency channel
3. Pulse shaping (or filtering)
4. Combination of (1), (2) and (3)

Multi-level Coding

Suppose we want to transmit 200 Mb/s over a 100 MHz category 5 channel. If we attempt to use a binary-coding scheme such as 2-level NRZ, the signal bandwidth will extend to 200 MHz. However, if we transmit 2 bits at a time, or 2 bits per symbol, the required channel bandwidth can be reduced by a factor of two allowing the 200 Mb/s link to operate over a 100 MHz channel. See FIG. 5c and 5d. The bandwidth efficiency of the 4 level baseband signals shown in FIGS. 5c and 5d are 2 bits per Hertz.

Partial Response Multi-Level Coding (SPAM-5 & SNRZ)

Com2000™ partial response coding involves combining two distinct PAM-5 data signals into one channel, each operating at the same data rate as the combined signal (SPAM-5 ). These two PAM-5 baseband signals, with one signal staggered in time (4 ns) with respect to each other, are combined and transmitted simultaneously over the (FIG. 31). Since each data signal operates at the same data rate of the partial response signal, the combined 2-phase partial response signal (spam-5) requires the same bandwidth of the original PAM-5 signals.

In order for the receiver to recover the two data streams, the phase offset between the two original signals must be known (equal to a multiple of 90°). The 4 ns (180 degree) power sampling level and its previous level with the direction of the transitions must also be known (see FIGS. 11a, 11b).

Figure 21:
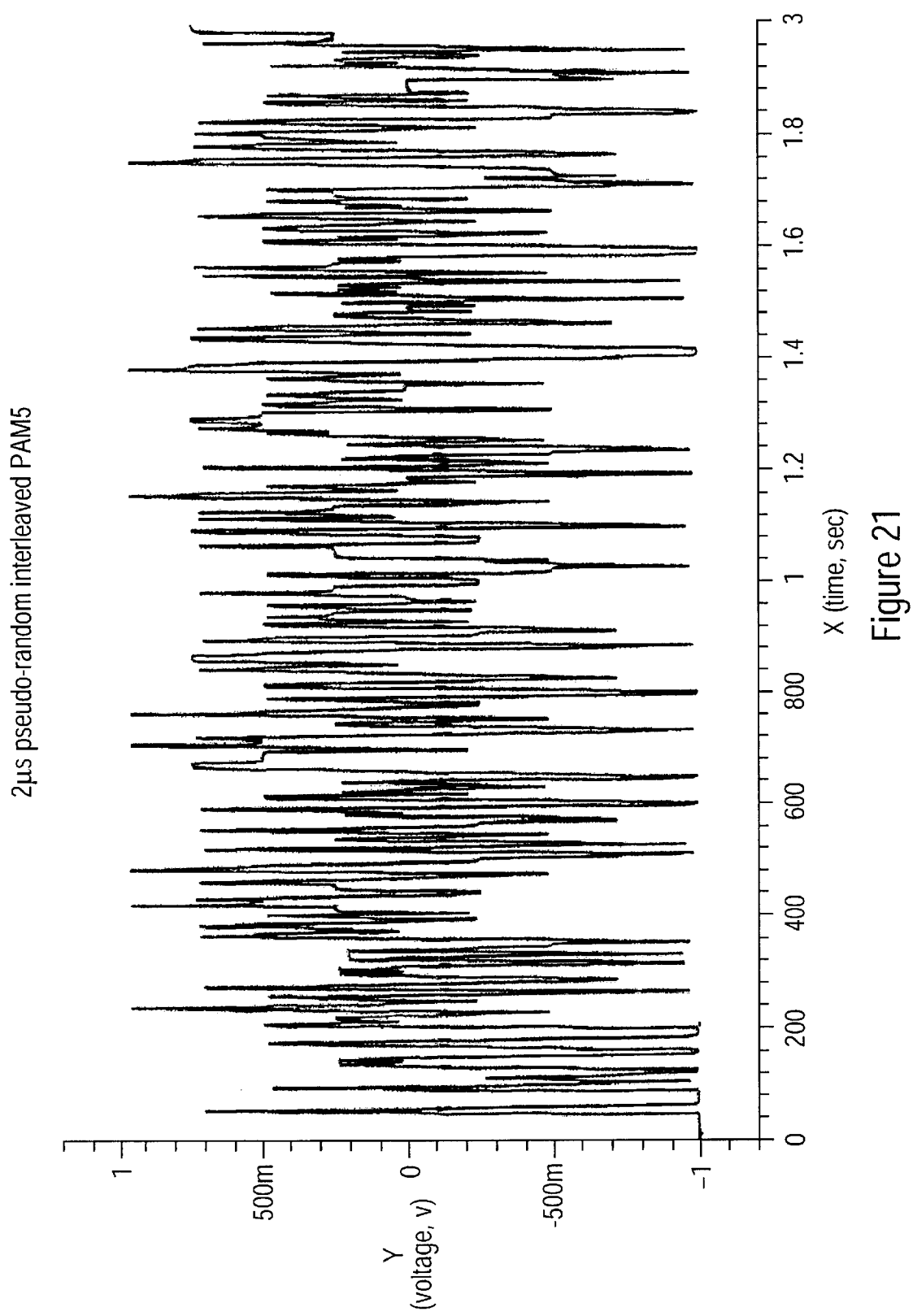
FIG. 21 illustrates the newly interleaved PAM-5 signaling.
Figure 22:
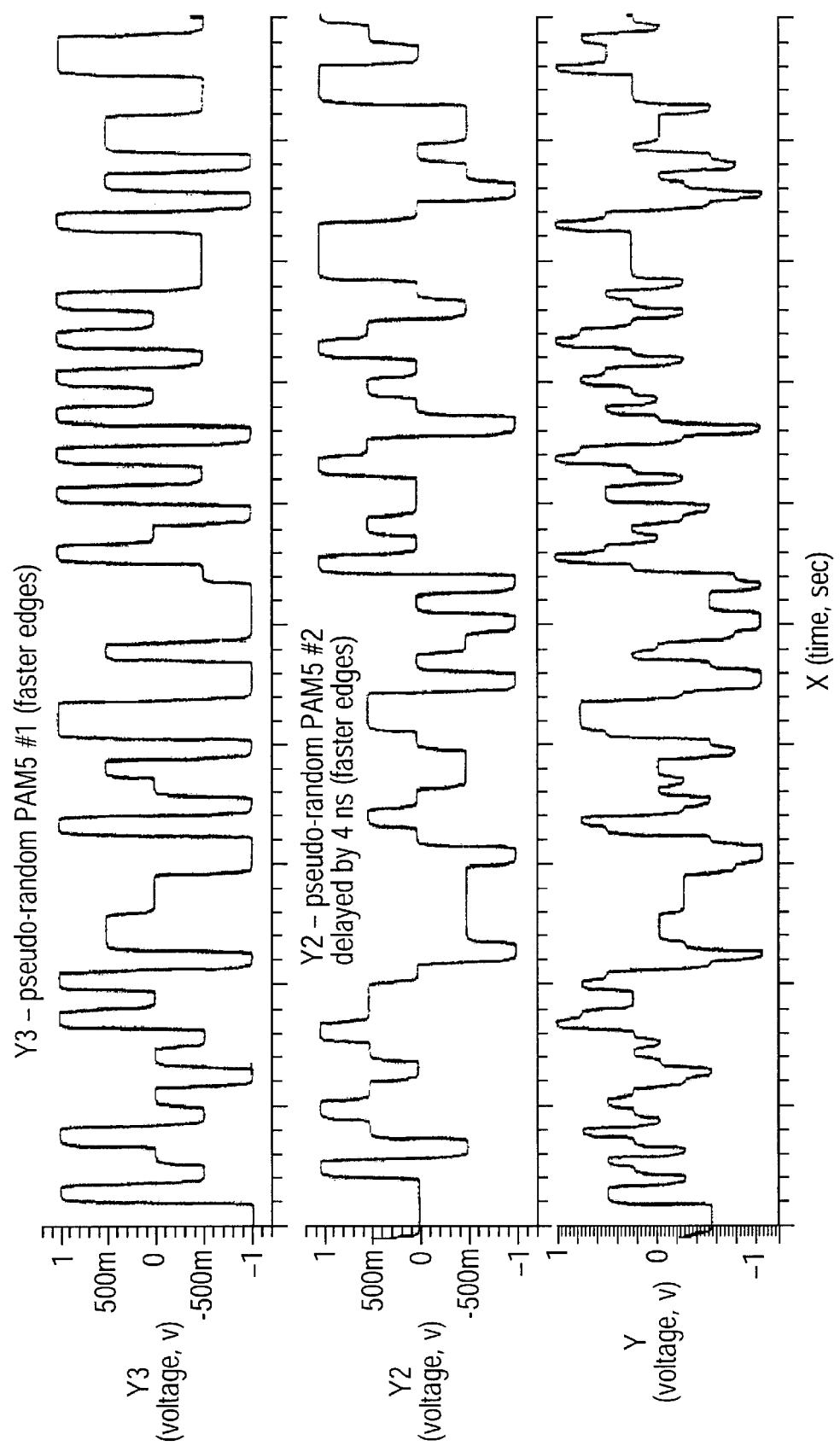
FIG. 22: Same as the FIG. 20 with faster transition edge for Y signal.
Figure 23:
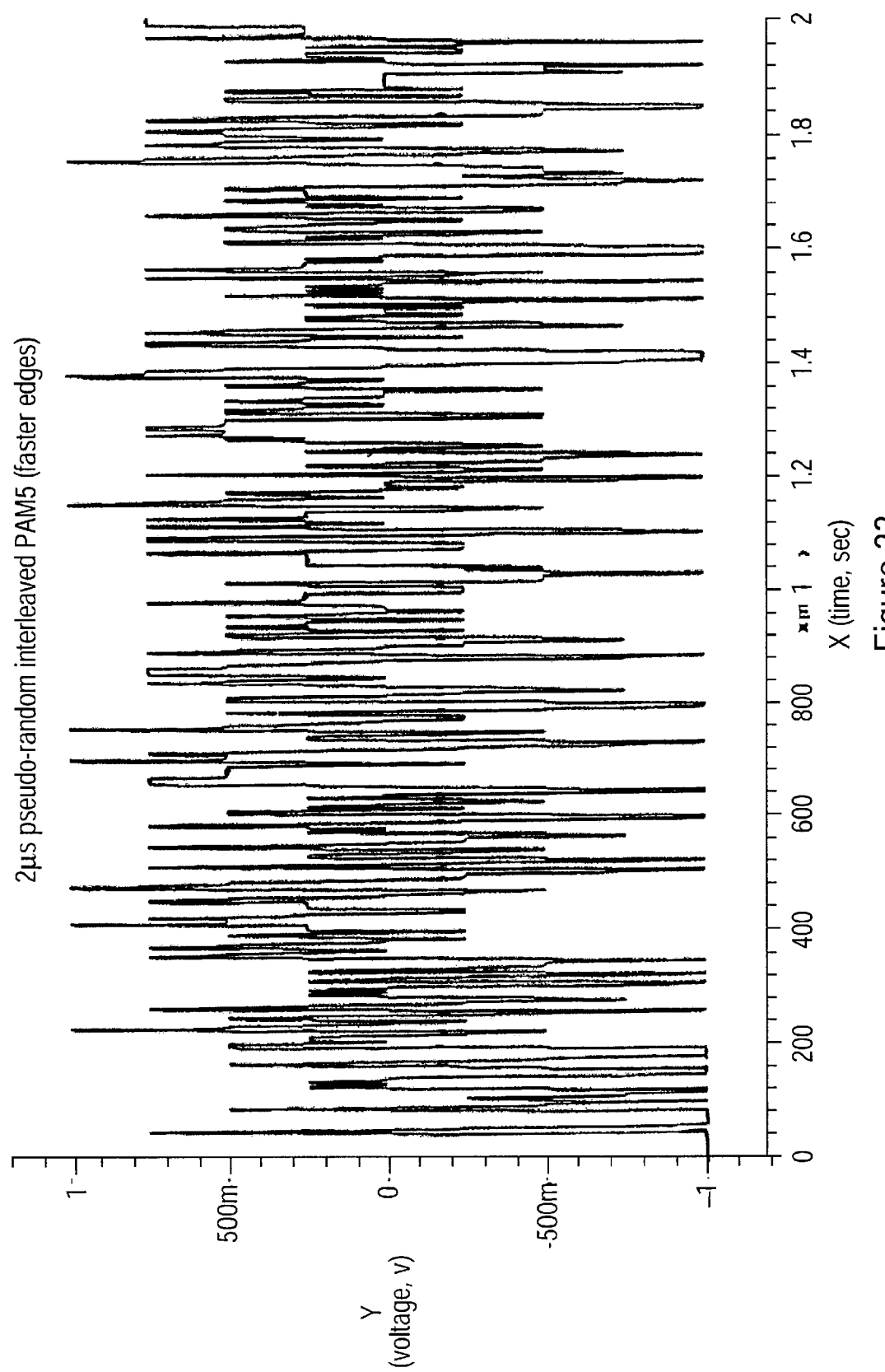
FIG. 23: A large drawing of the new interleaved PAM-5 signaling with faster transition edge (Signal B of the FIG. 16).

As an example, let us consider more simple waveforms such as in FIG. 13. The received waveform is sampled at 250 MHz. For the Synchronous NRZ partial response signal or SNRZ, there are 3 amplitude levels. There will be 9 amplitude levels for synchronous partial response PAM-5 signaling. (see FIG. 21). The same rules apply for both.

Let us now recover the received SNRZ or PAM-3 signal (see FIGS. 11a, 11b). This signal is the composite signal of 2 NRZ signals (NRZ and NRZ'). The signal level is sampled at a 250 MHz rate. The signal power sample is taken every 4 ns period for use in the decision base of the slicer. If the amplitude level is positive (10) then the NRZ signal is HIGH and the NRZ' signal is LOW. If amplitude level is negative (01), then the NRZ signal is LOW and the NRZ' signal is HIGH. If the amplitude level is zero (11 or 00) and if the previous signal level & direction of transition is down, then the NRZ signal is HIGH and the NRZ' signal is also HIGH. Otherwise, if the transition is up, then the NRZ signal is Zero and the NRZ' signal is also Zero. The predetermined phase offset value (4 ns) is used to regenerate the NRZ and NRZ' signal from the receiving composite signal (PAM-3).

For SPAM-5 signal recovery, the received signal will have 9 amplitude levels. Each of the sampled amplitude levels will equate to a particular combination of original PAM-5 and its 4 ns -delay version. The knowledge of the previous amplitude and its transition direction will dictate the level of the present signals.

The Partial Response signaling method is a bandwidth efficient coding scheme employing only multi-level signaling and no phase modulation and is known as a one-dimensional (1-D) coding scheme. FIG. 16 demonstrates two possible coding methods—1-D and Partial Response 1-D—of transmitting 500 MB/s over a 100 MHz channel.

The 1-D method generates 2 bits per symbol with a symbol rate of 100Mega-symbols per second. The Partial Response 1-D method generates 4 bits per symbol in order to keep its bandwidth within 100 MHz. However, the Partial Response 1-D method is capable of transmitting up to 500 Mb/s in the same channel where the 1-D method is limited to 250 Mb/s.

The 2000 Base-T proposed signaling methods (SPAM-5) are also a 1-D based coding scheme. The signaling method is Partial Response of the composite 1-D signal. The composite 1-D signal is the difference of a multi-level signal with a controlled phase offset by half of the 125Mbaud period. A more detailed description of the Com2000™ signaling system is provided below. The Partial Response of the composite 1-D signal coding scheme described below is designed to generate 500 Mb/s plus control symbols. The circuitry implementing such transceivers would have to be present at both ends of each pair of the category 5 channel to achieve 500 Mb/s. 250 Mb/s would be achieved with a single Com2000™ transceiver operating with an 802.3ab compatible transceiver. See FIG. 31.

The Com2000™ Coding system codes the signals using (Synchronous PAM-5) a Partial Response of the composite 1-D signal. This 1-D coding method optimizes the multi-level encoding of the transmission signal so as to minimize Inter Symbol Interference (ISI). Partial Response of the composite 1-D signal coding at the transmitter helps to minimize the distortion caused by channel attenuation.

Synchronous PAM-5 or Partial Response PAM-5 Summary

One-dimensional 9 level coding 4 bits per symbol

125 Mbaud

See FIGS. 18–28,31,32 for the Scalable Com2000™ Signal Coding SPAM-5 is also a Partial Response of the composite 1-D signal. The scalable Com2000™ SPAM-5 coding can be scaled by either slowing down the clock or the SNRZ signal encoding or SPAM-5 signal encoding or the combination all of the above.

SNR Penalties For Com2000™ Coding Bandwidth Efficiency signaling

A bandwidth efficient data signal is typically more sensitive to channel noise and distortion than a binary signal. A good indicator of network robustness is the opening in the eye pattern of the data signal. The size of the opening indicates the signal's immunity to noise—it is proportional to the noise voltage required to cause a bit error in the receiver. The horizontal opening of the eye pattern typically indicates the signal's immunity to jitter. It is a measure of how much jitter can be added to the data signal by the channel before timing-related bit errors are likely to occur. See FIGS. 6b, 6c and 6d.

In the case of two-phase signaling schemes, noise immunity is further compromised by the coupling between the two channels. The amount of signal coupling between the two channels is related to the error in the X phase offset between these channels. Any deviation from the perfect sending phase offset (X degree relationship) between the two channels results in cross channel coupling (i.e. one channel "leaking" into the other channel).

In general, the higher the efficiency, in bits per Hz, of the data signal, the more vulnerable the signal is to the noise and distortion in the channel. This means that the higher the data rate we attempt to transmit through a category 5 channel the more work we need to do to counteract the system's vulnerability to bit errors. These issues are addressed by the Channel Equalization Section and Channel Measurement & Calibration Section.

A 4-level PAM-5 signal has voltage transitions every 2 bit periods while a binary (2 level) signal could have voltage transitions every bit period. Therefore, the rate of transitions, or symbol rate, of a 4-level signal PAM-5 is half the frequency of a binary signal. Thus, a 250 Mb/s data signal (PAM-5) can be transmitted at a rate of 125 Msymbols/sec using 125 MHz of channel bandwidth with only 4 voltage levels. A 8 level signal (SPAM-5) is a 500Mb/s data signal, is transmitted at a rate of 125 Msymbol/s using 125 MHz of channel bandwidth with only 8 voltage levels.

The $5^{th}$ level in the PAM-5 system or $9^{th}$ level of the SPAM-5 system allows for redundant symbol states that are used for error-correction encoding. The error correction method includes Trellis coding [9] in combination with Viterbi decoding. The error correction logic further enhances the system's Signal to Noise Ratio (SNR) margin by up to 6 dB. The extra 6 dB of SNR margin gives the 5 level PAM-5 signal the noise immunity of a 3 level signal. The PAM-5 signal also incorporates error correction coding to improve the BER performance of the system. The same applies for SPAM-5 with 9 signal levels.

The spectrum of the PAM-5 and SPAM-5 transceivers closely resemble that of a 100 Base-T MLT-3 transceiver facilitating a design that would use 100 Base-T magnetics allowing the design of a scaleable 100/1000/2000 Base-T device.

Digital signal modulation, in general, transforms input digital signals into waveforms that are compatible with the nature of the communication channel medium. Through modulation, baseband communication channel signals are modified to carry the desired information. The SPAM-5 Modulator (327) and Demodulator (332) are the methods of delivering baseband digital signal modulation that uses a variation in the amplitude and phase of the carrier to transmit information. The phase variation is accomplished with the Phase Modulation technique and the amplitude variation is performed with the Pulse Amplitude Modulation (PAM-5) technique. The SPAM-5 signal modulation is a unique and advanced baseband modulation technique that conveys multiple (4) bits of information simultaneously (at 125 Mbaud Symbol Rate) by providing multiple states in each symbol of transmitted information. Each time the number of states per symbol increases, the bandwidth efficiency also increases. This bandwidth efficiency is measured in bits per second per Hz.

Details of the Signal generated by Signal Coding System

The following paragraphs detail the structure of the signal generated by the signaling system is. The standard 1OOOBase-T signal operates on the same frequency band as the 100Base-T square wave digital signal with all of the above offsets and delays. However, the new 2000Base-T SPAM-5 is also an amplitude modulation coded signal that operates on a baseband signal frequency of 125 MHz. This is similar to a PAM duo-binary and partial channel response-coding scheme. This in effect allows 5 bit (4 information and 1 error correction bits) times higher in bit rates over a 1 hertz operating frequency range with the optimal bit error rates.

The basis of the new Com2000™ Gigabit line code signaling for 2000Base-T (see FIG. 9) is that 5 bits of encoded data are modulated on multi-level signals (PAM-5).This can be thought of as operating as 2 virtual (2*250 Mb/s) 1000Base-T data channels independently that are transmitted over the same CAT5 wire. In effect, 2 amplitude levels for the Quinary symbol rate are decoded on each transition of the 125 Mbaud symbol rate.

The transmitting and receiving signals are baseband signals. The SPAM-5 signals (Partial Response PAM-5) modulated by a 125 MHz clock rate that is modulo-2 added to the PAM-5 modulated data A, to form the A+B composite data signal AB. This signal AB still maintains the baud rate of 125 Mbaud. The phase shift signal B is maintained via a precision source of reference and frequency/phase controls which are addressed in details by the Clock transfer system section.

The SPAM-5, in general is explained as a multi-level baseband signal which is the composite signal from the two multi-level I axis and multi-level R axis baseband signals. The R axis signal is the rotated (multiple of) 90 degrees in phase with the I version signal. SPAM-5 can be thought of as an emulated baseband version of CAP-256 signal. The SPAM-5 (Partial Response PAM-5) Modulator and Demodulator are responsible for maintaining the system within the required FCC Spectrum and Amplitude signal modulation limitations for sending and receiving data over the twisted pair wires.

SPAM-5 Baseband Digital modulation transforms input digital signals into waveforms that are compatible with the nature of the baseband communications channel that are used to carry the desired information. Referring now to FIG. 3, the SPAM-5 (Partial Response PAM-5) Modulator (327) and Demodulator (332) implement a method of delivering digital signal modulation that uses variations in amplitude and phase of the carrier to transport information. The phase variation is accomplished through precision control of the multiple of 90-degree phase offset and the 5 level amplitude variation is accomplished through Pulse Amplitude Modulation (PAM-5). The Com2000™ m baseband SPAM-5 signaling technique is a simple yet advanced baseband modulation scheme that conveys multiple (4) bits of information in a full duplex scheme (at 125 Mbaud Symbol Rate) for each cable pair.

The nature of Synchronous Pulse Amplitude Modulation (SPAM-5) increases the number of states per symbol. Each of the SPAM-5 states are defined as a specific amplitude and phase. This means that the generation and detection of symbols is more complex than a simple phase detection or amplitude detection device. The Com2000™ Partial Response PAM or baseband SPAM-5 Modulator (327) delivers high bandwidth efficiency through the transmission of 4 bits per second per Hz.

The Com2000™ m baseband SPAM-5 Modulator (327) in the Electrical Transmitter section of the transceiver adds a channel coding preamble header to the data stream in such a way as to minimize the effects of noise and interference in the CAT5 communication channel. The Channel Coding preamble symbol adds extra bits to the input data stream and removes redundant ones. The added bits are used for error correction or to send specific system training sequences for identification or equalization. This can make synchronization (or finding the symbol clock) easier for the Com2000™ SPAM-5 Demodulator (332) of the Electrical Receiver.

The symbol clock frequency represents the exact timing of the transmission of the individual symbols. The reciprocal of this is the symbol clock frequency of 125 Mbaud. The symbol clock phase can be resolved up to ⅛ of the received carrier signal phase and is correct when the symbol clock is aligned with the optimum instant(s) (2 ns and 6 ns relative to the beginning of the baud period) to detect the symbols. This feature is uniquely impacting on the convergence of the front end filters such as Feed Forward Filter (FFE), Decision Feedback Filter (DFE), ECHO and Near End Cross Talk (NEXT) canceller filters. The important relative phase offset of the interfered and the interfering signals that effect the receiver are explained with reference to the channel equalization system.

Precision Sampling System

The Com2000™ Precision Sampling System comprises a method for precisely positioning the phase sampling and measurement windows at the center of the Eye Diagram with minimal error. This system relies on the complete frequency and phase synchronization of one or more network nodes, preferably accomplished using the Clock Transfer system. The clock synchronization can be either relative or absolute and is used as one improvement to deliver a multitude of benefits, such as bandwidth and SNR improvements, ISI suppression and more data bits per frame. This technique is also possible due to the Channel Jitter Suppression and Measurement Technologies.

Static Position Error or Jitter is caused by the error associated with the signal sampling accuracy or the proximity of the timing pulse to the optimum sampling point or to the center of the eye. To suppress this jitter, the Com2000™ GPHY4 uses a combination of technologies, such as Channel Calibration and Measurement system (and Measurements circuits 330, 343 as shown in FIG. 3) and Precision Sampling system, for placing the sampling window within a specified tolerance of the center Imperfectly timed sampling has the similar effect of increasing AWGN noise as far as the demodulator SNR is concerned. The Com2000™ Post Equalizer signal delivers a clean and wide-open eye diagram. With a signal demodulator precision sampling window for a Non-Linear Estimator such as a 9-Level Quantiser for SPAM-5 and Partial Response PAM Demodulator (74) accurate to a level of 500 ps, therefore the Com2000™ can allow 2 more symbols per baud on the existing 125 Mbaud Quinary symbol rate.

The Com2000™ Precision Sampling Techniques provides both an SNR improvement while also providing a method and means for maintaining the receiving signal phase and frequency much longer (5x) over the conventional PLLNCO lock loops. The precision sampling system uses the Coherent Clock Phase and Carrier Recovery Circuits to maintain the carrier signal phase and frequency. The Coherent Clock Phase and Carrier Recovery circuits (see FIG. 33) uses the crystal frequency and phases rather than the VCO frequency and phases. The long term drift of the crystal are bounded by the Clock transfer system. The short drift of the crystal are also bounded by the crystal short term drift criteria instead of the VCO short term drift. This is roughly 100 times worst than the crystal version. The carrier signal regeneration is also a much cleaner signal with less jitter.

The Com2000™ Coherent Clock Phase and Carrier Recovery Circuits allows the Precision sampling system to sample the receiving signal with a predefined phase error for a extend period of time. This is due to the fact that the crystal frequency drift and phase noise and jitter are less than the jitter caused by the VCO oscillator of the PLL circuits. This feature, therefore, also allows the increasing of the message size or number of data bits per packet load to be sent across a communication channel such as Ethernet packet. Through the Com2000™ Coherent Clock Phase and Carrier Recovery Circuits, the recovered carrier frequency remain a clean locked for more than 5x of the normal PLL lock. It is therefore, the new packet size is roughly 5x of the normal Ethernet size (1500 bytes). For normal packet data size, the improved SNR achieved by the Precision Sampling system increases the noise margin up to 8 dB, which required for guaranteeing multi-gigabit operation of the 10/100/1000/2000 BaseT over the CAT5 channel.

Com2000™ Gigabit Ethernet CAT5 Physical Layer (GPHY4)

This section describes the Com2000™ GPHY4 high-speed data communication transceiver. The GPHY4 is a universal 10/100/1000/2000Base-T Physical Layer manifestation that provides a Gigabit data delivery system over existing Ethernet networks. The GPHY4 system is backward compatible with 10/100BaseT systems for rapid network deployment complies with the 802.3z and 802.3ab IEEE Gigabit Ethernet Standards. The GPHY4 system uses the Com2000™ system to deliver a bandwidth efficient coding scheme to support Multi-Gigabit signaling over existing CAT5 cabling by utilizing a combination of Precision Sampling Techniques, Code Signaling Techniques and Signal Equalization Techniques. This is section provides high level descriptions on gigabit Ethernet transmission over category 5 twisted pair. Previous sections of this application provide further details of the systems that enable the full duplex 1000/2000 Mb/s data stream through a 100 MHz category 5 channel. Before going into the details of the GPHY4 , a overview current position of 1000BaseT standards as they apply to the GPHY4 is provided.

The twisted pair gigabit Ethernet standard—1000Base-T—is under development by the IEEE P802.3ab task force. In September 1997, after a year of debate, the P802.3ab task force selected the PAM-5 (see FIGS. 18,19, and 32) line code for implementing 1000Base-T. The name PAM-5 was chosen because this signaling scheme has inherited the symbol rate and spectrum of 100Base-TX and is based on the line code used by 100Base-T2 (100 Mbps over 2 pairs of CAT3).

1000Base-T (802.3ab) achieves the full duplex throughput of 1000 Mb/s by transporting data over four pairs from both cnds of each pair simultaneously. The method of transporting data from both ends of a pair simultaneously is known as the dual duplex transmission. Each pair carries a dual duplex 250 Mb/s data signal encoded as 5-level Pulse Amplitude Modulation (PAM-5 ). (See FIG. 34.)

A 1000Base-T physical layer device includes four identical transceiver sections—each with its own transmitter and receiver. Each transceiver section operates at 250 Mb/s—2 bits per symbol with a symbol rate of 125 Msymbols/s. The total throughput is 250 Mb/s×4 pairs=1000 Mb/s=1 Gb/s.

The new design of Com2000™ 1000/2000Base-T (802.3ab+) achieves the full duplex throughput of 2000 Mb/s by transporting data over four pairs from both ends of each pair simultaneously. The method of transporting data from both ends of a pair simultaneously is known as the dual duplex transmission. Each pair carries a dual duplex 500 Mb/s data signal encoded as Partial Response 5-level Pulse Amplitude Modulation (SPAM-5 ). (See FIG. 31.)

The new design of Com2000™ 1000/2000Base-T (802.3ab+) for physical layer device includes four identical transceiver sections (same front end as 1000BaseT)—each with its own transmitter and receiver. Each transceiver section operates at 500 Mb/s—4 bits per symbol with a symbol rate of 125 Msymbols/s. The total throughput is 500 Mb/s×4 pairs=2000 Mb/s=2 Gb/s.

How can the IEEE 802.3 committee assume that 1000Base-T will operate over existing category 5 cabling? The IEEE 802.3 committee expects that the TIA and ISO cabling standards will have specifications for the missing cabling parameters by the time 1000Base-T standard is released. The installed category 5 will have to be re-certified to verify that the requirements of 1000Base-T are met.
802.3ab 1000BaseT & Com2000™ 2000BaseT CAT5 Signaling The charter of Com2000™ Technology application is focus on Multi-Gigabit Ethernet and also is to define a standard for transporting a full duplex 2Gb/s data stream over a 100 MHz category 5 channel. To reduce the complexity of the line code (Partial Response PAM-5 signal) to a manageable level, the data will also be transported over four pairs simultaneously from both ends of each pair just as the 802.3ab standards. With this approach, each pair carries a 500 Mb/s full duplex data stream and can be slow down the clock in order to deliver a scalable data transfer rates for non-compliance to 1000/2000BaseT CAT5 capacity.

When implementing a 100/1000/2000Base-T system, one advantage of having equal symbol rates for 100 and 1000/2000 Mb/s operation is that common clocking circuitry can be used with both data rates. Another advantage is that the spectra of both signals are similar with a null at 125 MHz (FIG. 6*b*). The null in the spectrum of a baseband signal occurs at the frequency equal to the symbol rate. 1000/2000Base-T and 100Base-TX, both operating at the same symbol rate and both using the baseband signaling, have similar spectra to begin with. This made it easy to match the spectrum of 1000/2000Base-T to that of 100Base-TX almost exactly through some additional filtering. The advantage of having similar spectra for 100 and 1000/2000 Mb/s signals is that common magnetics and other emissions suppression circuitry can be used regardless of the data rate.

A PAM-5 eye pattern for 1000BaseT is shown in (FIG. 6*c*). An eye pattern is a trace produced by a modulated random data waveform, with each symbol period tracing from left to right and starting in the same place on the left. An eye pattern appears on an oscilloscope if the modulated random data signal is viewed while triggering the oscilloscope on the data clock. The eye pattern of the PAM-5 signal deviates somewhat from this classical 5-level eye pattern because the waveform of the PAM-5 signal has been shaped to make the spectrum of 1000Base-T match the spectrum of 100Base-TX.

A Partial Response PAM-5 eye pattern for 2000BaseT is shown in (FIG. 24,27). An eye pattern is a trace produced by a modulated random data waveform, with each symbol period tracing from left to right and starting in the same place on the left. An Partial Response PAM-5 eye pattern appears on an oscilloscope if the modulated random data signal is also viewed while triggering the oscilloscope on the data clock. The eye pattern of the Com2000™ Partial Response PAM-5 has twice as many eyes as the PAM-5 signal. The eye's vertical noise voltage threshold is reduced in half relative to the PAM-5 eye. The eye's width is also reduced in half (4ns) relative to the PAM-5 8ns width. The newly invented Com2000™ Partial Response PAM-5 signal is 6 dB degradation from the 1000BaseT signal and has been shaped to make the spectrum of the newly proposed 2000Base-T match the spectrum of 100Base-TX. (See FIG. 24). The Com2000™ Signal Equalization and Noise Suppression Technology enable the front end to recover and getting back the 6 dB of signal's degradations and also getting back of extra more 2 dB for Noise margin improvement over the 1000BaseT.

Clearly, the 1000/2000BaseT multi-gigabit Ethernet transceiver for category 5 will be a complex device. The complexity of the line coding will inevitably aggravate the transceiver's sensitivity to noise and distortion. Therefore, the 1000/2000 Base-T link is designed to operate over a minimally compliant category 5 channel. Further details of the sources and thresholds of the line noise are provided below.
1000/2000BaseT SNR Margin SNR margin, in general, is a measure of communication system's immunity to noise. SNR margin is expressed in dB and represents the level of additional noise that the system can tolerate before violating the required Bit Error Rate (BER). For example, an SNR margin of 3 dB means that if the noise level is increased by 3 dB, the system would be subject to excessive errors. The higher the SNR margin, the more robust the system. If network A has an SNR margin of 3 dB and network B has an SNR margin of 10 dB then network B can tolerate 7 dB more noise than network A without violating the required BER.

FIG. 6d demonstrates that increasing the number of signal levels while maintaining the same transmit voltage results in a degradation of the SNR margin. The reason for this is that as the vertical opening of the eye gets smaller, the system can tolerate less noise before bit errors begin to occur. For example, increasing the number of voltage levels from 2 to 3 cuts the voltage between adjacent levels in half, reducing the vertical eye opening by a factor of 2. The noise voltage required to cause a symbol error on a 3-level signal is half (or 6 dB lower) than the voltage required to cause a symbol error on a binary signal. So a 3-level signal has 6 dB less SNR margin than a binary signal, assuming both signals operate at the same peak to peak voltage. The proposed 2000BaseT signaling has 6 dB lower SNR margin than a PAM-5 of 1000BaseT signal.

The Com2000™ Signal Equalization and Noise Suppression system enables the 1000/2000BaseT to recover and getting back the 6 dB of signal's degradations and also getting back 2 dB for Noise margin improvement over the 1000BaseT. This done by improving the NEXT and ECHO cancellers via suppressing the relative phase offset of the interfered and interfering signals which can greatly effect the receiver filter performances (see FIGS. 10a and 10b). It also is done by measuring the channel distortions and compensates the filter for distortion. This is done via the transmit pulse shaping filter and receiving FFE and DFE filters. It equalizes the desired signal in such a way that the impulse response from the transmitter to the receiver is a Nyquist pulse, which goes through zero at all multiples of the symbol period except at the origin. It also equalizes the NEXT/ECHO signal (from local transmitters) in such a way that the impulse response from local transmitter and local receiver goes through zero at all multiples of the symbol period including the origin.

After passing through a 100 m CAT5 loop, the amount of intersymbol interference (ISI) at the input of the receiver is larger than the amount of NEXT. Thus, the initial convergence curves of the solid and dashed lines follow the dotted line (see FIG. 10b), which is the convergence curve of the FFE/DFE filter in the presence of intersymbol interference only. Once the filter settle down to about 13 and 18 dB for dashed and solid curves, respectively, enough ISI interference has been removed by the filters so that the filters "sees" the NEXT interfer and starts to jointly equalize the signal and interferer. Notice that the steady-state SNR with the worst phase $\phi(0)$ is about 6dB worse than that the optimum phase $\phi(3)$. It is also note that in (FIG. 10B), that the convergence time with the worst phase is about twice as long as the one achieved with the optimum phase. Simply put, SNR margin is a measure, in dB, of how much additional noise a system can tolerate or how far the system is from not working properly.

This section provides a detail description of the preferred embodiment of the Com2000™ GPHY4 network physical interface device (PHY). This section begins with a discussion of the operation of network systems and how the Com2000™'s primary subsystems interact with the MII and GMII and general network operation is provided. This is followed by an overview of the primary Com2000™ subsytems: the Com2000™ Transmitter and the Com2000™ Receiver. The detailed description of the operation of the Com2000™ systems includes Equalization System and Descriptions, which describes the means and methods utilized to reduce the various noise components of a communication system; the Precision Clock Sampling System and Descriptions, which describes the system frequency and phase synchronization means and methods for enabling the unique partial response PAM-5 modulation signaling for high-speed data transfer and the tuning algorithms that maintain system frequency and phase synchronization; and the GPHY4 Measurement and Calibration Technology, which describes the means and methods for monitoring, measuring, calculating and correcting for various parameters that induce error and noise factors into communication systems.

The Com2000™ 10/100/1000/2000Base-TX Ethernet Physical Layer (PHY) (14, See FIG. 1C) is part of the family of high-speed CSMA/CD network specifications. The Com2000™ 10/100/1000/2000Base-TX Ethernet Physical Coding Sublayer (PCS), Physical Medium Attachment (PMA) and baseband PHY components are developed to provide 1000/2000 Mb/s data transmission performance over the existing Category 5 4-twisted pair cabling infrastructure. This is in contrast to the 802.3ab Gigabit Ethernet specification that provides high-speed data transmission across 4 twisted pair cable systems. The Com2000™ 10/100/1000/2000Base-TX Ethernet Physical Layer Signaling techniques and data transfer capabilities are completely compatible with existing 10/100BaseT Ethernet system components.

The Com2000™ 10/100/1000/2000Base-TX Ethernet Physical Layer (PHY) (14):
  a) Complies with the GMII specification of 802.3z
  b) Complies with the PCS sublayer specification of 802.3ab
  c) Provides full and half-duplex operation
  d) Provides FCC Class A operation
  e) Supports operation across 100m of CAT5 cabling
  f) Supports Bit Error Rate of 100BaseT specification
  g) Supports Auto-Negotiation as defined in 802.3ab The Com2000™ 10/100/1000/2000Base-TX Ethernet Physical Layer (PHY) employs full-duplex baseband transmission over four-pairs of Category 5 Unshielded twisted-pair (UTP-5) wiring. The aggregate data rate of 1000/2000 Mb/s is achieved by a data transmission rate of 500 Mb/s over each wire pair as shown in (FIG. 3). The use of a hybrid and echo cancellation scheme at the Transceiver's Transmitter (242) and Receiver (243) sections (See FIG. 34) enable full-duplex operation by allowing symbols to be transmitted and received on the both wire pairs at the same time. The multi-level baseband signaling as used with 100BaseT at a 125 Mbaud rate is used on each of the wire-pairs. The Transmitted symbols are sent in phase-staggering sets to allow for the transmitted In-Phase and Partial Response-Phase symbol sets to be selected from a four-dimension 5 level symbol constellation.

The modulation rate of 125 Mbaud coincides with the GMII clock rate of 125 MHz and results in a symbol period of 8 ns. This permits the use of CAT5 or better balanced cable pairs, installed according to ANSI/TIA/EIA-568-A, for Gigabit Ethernet operation.

The Com2000™ 10/100/1000/2000Base-TX Ethernet Physical Coding Sub-layer (PCS) is similar to the proposed PCS as defined by 802.3ab. The Physical Medium Attachment (PMA) and its associated PHY Control functions are different from the proposed 802.3ab standard because of the generation and transmission of the new Com2000™ signaling scheme over 4 pairs of UTP. (See FIG. 1B)

The following paragraphs provide a high level description of the Com2000™ Gigabit Ethernet system. The complete Com2000™ 10/100/1000/2000Base-TX Ethernet System, as illustrated in (FIG. 1C), consists of 4 sections:

Host Microprocessor or Other PC (11)
System Bus Interface (PCI) and Direct Memory Access (DMA) (12)
Media Access Control (MAC) (13)
The Physical or Medium Dependent Interface (MDI) layer (14)

The Ethernet applications are executed and controlled by the Host Microprocessor (11). The PCI bus interface section (121) includes transmit and receive data buffering, DMA control buffering (122), and register access module buffering. The MAC layer (131,132) consists of transmit and receive blocks, a Content Addressable Memory (CAM) for address recognition and control, status and error counter registers.

This representative PCI-based 10/100 and 1000/2000 Mbits/s Ethernet controller (see FIG. 2) supports the MII (211) of 100BaseT and the GMII (212) of 1000BaseT. The MII and GMII are the standards for the Media Independent layer that separates the physical layer (22) from the MAC layer (13, See FIG. 1C). The MII and GMII are included in the IEEE 802.3 10/100/1000 Base-TX standards for Ethernet.

The following sections describe in greater detail the Com2000™ 10/100/1000/2000Base-TX Ethernet Physical Layer (PHY) (14) with reference to FIG. 1C. The design of the Com2000™ 10/100/1000/2000Base-TX Ethernet PHY supports 1000/2000 Mbits/sec over 4 pairs, 100 Mbits/sec and 10 Mbits/sec operations on 2 pair CAT5 infrastructure cabling. The transceiver provides an electrical interface between the Media Independent Interface (M11) (13, See FIG. 1C) for 10/100BaseT and Gigabit Media Independent Interface (GMII) for 1000BaseT & 1000BaseSx MAC (13, See FIG. 1C) as well as the physical wire pair interface.

The Com2000™ Gigabit Transceiver (141) provides encoding and decoding of serial data streams and delimiters, level conversion, collision detection, signal quality error reduction, link integrity testing, jabber control, and loop back testing. The Com2000™ Gigabit Transceiver maintains the Media Access Control (MAC) layer (131,132) and the CSMA/CD protocol to ensure seamless operation for 10, 100 or 1000 Mbps applications.

The Com2000™ 10/100/1000Base-TX Ethernet Physical layer (PHY) is a single chip that implements the Physical or MDI layer (24) (See FIG. 34) of the 10/100/1000 Mbits/s Ethernet system. The chip includes both a Digital section (22) and an Analog Section (23) for performing the Physical layer functions. The chip interface to the Transformer section (25) provides the functions required for the CAT5 cable signal transmitter.

The MII/GMII (31) interface comprises a Digital section (32), Analog section (34) and CAT5 medium sections of the r Com2000™ 10/100/1000Base-TX Ethernet Physical Layer (PHY) chip architecture (see FIG. 3).

The MII/GMII interface (31) provides a simple, cost-effective method for implementing the interconnection between the MAC layer and the Physical (PHY) layer devices and between PHY layer devices and the host Station Management. The MII/GMII interface (31) provides a uniform interface to the chip for PHY interface development.

The services performed by the MII/GMII (31) include Mapping of transmit and receive code bits between the Physical Medium Attachment or PMA client and the underlying Physical Medium Dependent layer or PMD. The MII/GMII (31) generates a control signal indicating the availability of the PMD data to the PCS. The MII/GMII services include Serialization (deserialization) of code groups for transmission (reception) at the underlying serial PMA and Mapping of Transmit, Receive, Carrier Sense and Collision Detection information between the MII/GMII and the underlying PMA.

The Com2000™ 10/100/1000Base-TX Ethernet Physical Layer (PHY) Management Interface has dedicated status and control registers (328) used to communicate Auto-Negotiation (329) information to the MII/GMII that includes the control, status, advertisement, link partner ability, and expansion register capability. The Power Management (328) is performed on the transceiver by monitoring data stream activity and power-down modes are selected based on maximizing power conservation onboard the PHY transceiver chip.

The Configuration Register/Status Register sets (328) are used to control and monitor the Com2000™ 10/100/1000Base-TX Ethernet Physical Layer (PHY) transceiver chip. These can be accessed through the MII/GMII management interface (328) from the host system. The management interface consists of a pair of signals that transport the management information across the MII/GMII. The status/control information is transmitted across a frame format with a protocol specification for exchanging management frames and an accompanying register set that are read/write accessible through these frames. The register definition specifies a basic register set with an extension register capabilities.

The Auto-Negotiation function (329) provides a mechanism to control the connection of a single MDI to a PMA signal type, where more than one PMA signal type may exist. The Control and Status registers (328) provide additional management capabilities for the control of Auto-Negotiation (329).

Auto-Negotiation function (329) provides the Transmit, Receive, Arbitration, and Normal Link Pulse (NLP) integrity test function (346). The Auto-Negotiation functions interact with the technology dependent PMA through technology dependent interface.

The Link Monitor Function (346) is responsible for determining whether the channel is providing reliable data. Failure of the channel will cause the PMA client to suspend normal operation. The Link Monitor function (346) takes advantage of the PMD sub-layer's continuous-signaling transmission scheme to provide the PMA with a continuous indication of signal detection on the channel through the signal-status interface as communicated by the PMD. The Link Monitor function responds to control by the Auto-Negotiation (329 and is affected through the link control parameter of the PMA signal request.

The continuous-signaling transmission scheme of the 1000BaseT PMD sub-layer also provides the Com2000™ Precision Clock Reference (344) the capability to deliver the same frequency & time heart beat for the sending and receiving nodes based on the continuous availability of an absolute reference source. This is one of the enablers for Com2000™ 1000Base-TX Ethernet Clock transfer system.

Com2000™ Transmitter

The Com2000™ Transmitter composes of Electrical Transmitter (221) and CAT5 Transmitter (231,241). The Com2000™ Digital Transmitter function controls the flow of data at the specified rate determined through the auto-negotiation function.

For 100BaseT data transmission, a 4B/5B Symbol Encoder (322) receives the 4-bit (4B) nibble data from the MII/GMII and converts the data generated by the MAC into 5-bit (5B) blocks for transmission. This 4B/5B conversion combines control symbols with data symbols.

For 1000 BaseT data transmission, the 8B/10B symbol encoder function is executed by the 802.3z MAC (132, See FIG. 1C). The 1000BaseT Symbol Encoder of the MAC substitutes the first 8 bits of the MAC preamble with J/K symbol pair (11000 10001). The symbol encoder continues to replace subsequent 8B codes with the corresponding IOB symbols. At the completion of the transmit data packet generation, the 8B/10B symbol encoder of the 802.3z MAC (132) injects the T/R symbol pair to indicate end of frame. The symbol encoder (322) continuously injects IDLE symbols into the transmitted data stream until the next transmit data packet is detected.

Upon completion of the 10B/8B decoder in the PHY, the 8-bit data symbols are converted to a 4-tuple of quinary symbols. Each four-dimensional symbol can be viewed as a 4-tuple (An, Bn, Cn, Dn) of one-dimensional quinary symbols taken from the set {−2, −1, 0, +1, +2} of valid serial transmission data.

The Com2000™ 10/100/1000/2000Base-TX Ethernet performs the Parallel to Serial Conversion function (see FIG. 4). This performs Serialization of code-groups for transmission on the underlying serial Physical Medium Attachment sub-layer. The Transmit blocks (44,50,53) are an array of shift registers (44) and data latches (50,53).

Upon completion of data serialization, the 100BaseT data stream goes into the Serial Scrambler (46) and the 1000BaseT data stream goes into the Quinary Symbol Encoder Process (55). This allows the PHY to operate at 100 Mb/s and/or 1000 Mb/s data rates with Forward Error Correction capabilities. This function also minimizes electromagnetic emissions from the PMD physical layer by randomizing the data spectrum with the addition of a Pseudo-Random Noise (PN) sequence to the plain text data sequence transmitted by the PHY. The length of the PN sequence is chosen to reduce radiated emissions by approximately 20 dB when the station is continuously transmitting the IDLE Symbol.

The Serial Scrambler (46) for the 100BaseT decodes single bit errors in the scramble serial stream as single bit errors in the recovered plain-text stream. The PMA generates the scrambled 100BaseT NRZI data and sends it to the MLT3 Encoder (324) where the data is encoded and transmitted to the Twisted Pair Transmit Driver. The MLT3 coding (324) has similar characteristics to NRZI but allows three levels of output instead of two (i.e. Positive, Zero, and Negative). Each time a logic "1" is encoded, a transition will take place. Each time a logic "0" is encoded, the previous output level will be maintained for another bit period. This coding scheme ensures the maximum bandwidth distributed to the CAT5 cable is less than or equal to 125 MHz frequency range.

The received data streams from the 1000BaseT go into Quinary Symbol Encoder (55). The data is encoded into the appropriate symbol structure and sent to the Stagger PAM Modulator (57). This data-encoding scheme allows the PHY to operate at the Gigabit data rate including FEC capabilities. The combination of the nx90-degree phase and PAM-5 amplitude modulation is a revolutionary baseband signaling technique for data encoding. This provides the capability for the Com2000™ PHY to deliver 10 bits per bandwidth hertz. This is only possible because of the precision phase synchronization between the transmitter and receiver stations via the internal Com2000™ clock synthesizer (343, See FIG. 3) circuits and the Com2000™ clock transfer system.

The baseband in-phase and nx90-degree stagger phase data encoding and transmit sequence length is selected for reduction of the radiated emissions of the PAM-5 amplitude modulations to meet the FCC requirements. This data-encoding scheme is enabled only when the sending and receiving baseband signal phase noise and jitter are within specific limits. The system is within the limits when the sending and receiving stations have the same frequency and time heart beat (344) and maintains a minimum phase error (330). These unique baseband technologies are explained in further detail with reference to the Signaling Technology (330).

The baseband SPAM-5 (Partial Response PAM-5) Modulator (327) and Demodulator (332) are responsible for maintaining the system within the required FCC Spectrum and Amplitude signal modulation limitations for sending and receiving data over the twisted pair wires utilizing PAM-5 signaling characteristics (MLT-5). Baseband Digital modulation transforms input digital signals into waveforms that are compatible with the nature of the baseband communications channel that are used to carry the desired information. The SPAM-5 (Partial Response PAM-5) Modulator (327) and Demodulator (332) implement a method of delivering digital signal modulation that uses variations in amplitude and phase of the carrier to transport information. The phase variation is accomplished through precision control of the nx90-degree phase offset and the 5 level amplitude variation is accomplished through Pulse Amplitude Modulation (PAM-5). The Com2000™ baseband SPAM-5 signaling technique is an advanced baseband modulation scheme that conveys multiple (4) bits of information simultaneously (at 125 Mbaud Symbol Rate) by providing two or more symbol states within each symbol of transmitted information.

The nature of Pulse Amplitude Modulation increases the number states per symbol. Each of the Partial Response PAM states are defined as a specific amplitude and phase. This means that the generation and detection of symbols is more complex than a simple phase detection or amplitude detection device. Each time the number of states per symbol is increased, the bandwidth efficiency also increases. This bandwidth efficiency is measured in bits per second per Hz. The Com2000™ Partial Response PAM or baseband SPAM-5 Modulator (327) delivers high bandwidth efficiency through the transmission of 10 bits per second per Hz.

Initially, the Com2000™ baseband SPAM-5 Modulator (327) in the Electrical Transmitter adds a channel coding preamble header to the data stream in such a way as to minimize the effects of noise and interference in the CAT5 communication channel. The Channel Coding preamble adds extra bits to the input data stream and removes redundant ones. The added bits are used for error correction or to send specific system training sequences for identification or equalization. This can make synchronization (or finding the symbol clock) easier for the Com2000™ SPAM-5 Demodulator (332) of the Electrical Receiver.

The symbol clock frequency represents the exact timing of the transmission of the individual symbols. At the symbol clock transitions, the transmitted carrier is at the correct In-Phase (or magnitude/0 degree phase) value to represent a specific symbol. The nx90-degree phase offset injected onto the In-phase value (magnitude/ nx90 degrees phase) is changed to represent another symbol. The interval between these two phases is the symbol clock period (8 ns). The reciprocal of this is the symbol clock frequency of 125 Mbaud. The symbol clock phase can be resolved up to ⅛ of the received carrier signal phase and is correct when the symbol clock is aligned with the optimum instant(s) (2 ns and 6 ns relative to the beginning of the baud period) to detect the symbols.

Another function performed by the Com2000™ SPAM-5 Modulator (327) is filtering. Pulse Shaping Filtering is useful for good bandwidth efficiency. Without filtering, signals would have very fast transitions between states and therefore very wide frequency spectra- much wider than is needed for the purpose of sending information. There are two filters, one for each the CAT5 channel pairs. This implementation creates a compact and spectrally efficient signal that can be efficiently placed on a carrier.

The output from the Quinary Symbol Encoder (55) goes into the signal SPAM-5 modulator (57). Since there are independent 0 and nxnx90-degree phase offset components in the transmitted digital signal, half of the information is sent on 0-degree phase and the other half on the multiple of nx90-degree phase. The 0/Nx90 components are essentially separate.

The Internal Com2000™ clock synthesizer (343) serves as the internal master clock distribution system supplying all transmit clock reference for the Com2000™ 10/100/1000/2000Base-TX Ethernet Physical Layer (14). The Precision Clock Reference (344) delivers a Stratum I equivalent clock to the synthesizer as the stable master clock reference source. The reference logic of the Precision Clock Reference (344) tunes the crystal oscillator for frequency and phase so that it locks to the true and traceable external precision reference clock with minimum frequency and phase offsets.

The Synthesizer (343) includes PLL frequency synthesis and synchronous frequency divider functions to generate all of the Com2000™ 10/100/1000/2000Base-TX Ethernet. The Synthesizer (343) block generates 2.5/5/10/25/125/250/500 MHz clocks for use in all of the digital and analog circuits.

The Analog Transmitter functions as part of the Com2000™ 10/100/1000/2000Base-TX Ethernet Physical Layer (PHY) (14). In the Com2000™ Gigabit implementation the system utilizes 2-pairs of cabling that greatly reduces the noise reduction requirements delineated in 802.3ab for NEXT, FEXT and ECHO noise sources. This reduces the complexity of the receiver in that redundant cable pairs do not have to be considered in the design of the noise cancellation implementation. The 1000BaseT analog transmitter front end is very similar to 100BaseT except for the specific Pulse Shaping Filters utilized for influencing the ideal shape of the transmitted signal's spectrum for support of the receiver signal detection process. The transmitter filter and the receiver filter are selected in to maximize noise immunity and minimize Inter-symbol Interference. The Com2000™ 10/100/1000/2000Base-TX Ethernet pulse shaping filter's value $(0.80+0.2z^{**}-1)$ for the transceiver is different from the recommended value of the 802.3ab specification due to the variation in the phase (0 and nx90 degrees) and amplitude within each transmitted pulse width. Com2000™ Receiver Before discussing the analog and digital implementation of the Com2000™ 10/100/1000/2000Base-TX Ethernet receiver. it is necessary to address the CAT5 channel distortions and impairments and its filters to deter the noise and ISI interference. The Com2000™ Analog Receiver section 244,225 (see FIG. 34) describes techniques for achieving data rates up to 1 Gigabit/second over unshielded twisted pair (UTP) wiring for local area network (LAN) applications. The Com2000™ System provides for full duplex operation at ultra high-speed data rates with bandwidth utilization of 125 MHz that avoids potential problems regarding radiation limits as regulated by the FCC. The transmission scheme used for these LAN applications is Multi-level Amplitude which is a bandwidth efficient two-dimensional baseband encoding scheme. The patent also discusses in detail a technique called Com2000™ Adaptive Equalization and Calibration, which allows high-speed data transfer while allowing several users to share the same cable.

The CAT5 cable plant (37,25) has an intrinsic channel capacity of 500 to 1000/2000 Mb/s for transmission that is limited by attenuation and near-end cross-talk (NEXT). This is achieved through well-controlled cable geometry by ensuring tight twisting of the individual cable pairs providing predictable attenuation characteristics and low cross talk. There are several factors that determine how much of this available capacity can readily be used. Cable emissions and externally induced noise usually dominate over NEXT limitations.

In the CAT5 medium section (37) provides Adaptive Equalizer Filters (354) that channel distortion. Adaptive Filters, like equalizers, are used to filter out narrow-band noise and discrete sinusoidal components.

The Com2000™ 10/100/1000/2000Base-TX Ethernet Physical Layer (PHY) (14) Adaptive Equalizer Filters (354) for the receiver can be considered as a general filter with multiple inputs. In a Transversal Adaptive filter, which composes the majority of the adaptive filter, the multiple inputs are simply delayed versions of the single primary input signal (i.e., inputs originate from a shift register or tapped delay line).

In general, the CAT5 transmission of data often requires that an equalizer be incorporated in the CAT5 receiver to correct for distortions produced by the transmission medium. These distortions range from amplitude variations and signal echo to nonlinear phase delays. The most serious distortion source over the CAT5 data communication channel is often the nonlinear phase delay. This delay distortion results when the propagation time is different for different frequencies in the frequency spectrum of the data pulses. Any channel with delay distortion is called a "Time Dispersive Channel". The CAT5 channel (25) distortion is often vary in time due to environmental changes. Under normal operating conditions, we can assume the CAT5 channel distortion is time invariant and the nonlinear phase delay distortion causes transmission errors by producing Inter-symbol Interference. This is due to the effect of the contribution to the matched filter output that may not only be the result of the current bit but also, to varying degrees, of past bits.

The non-complex signal equalizer of the Com2000™ Adaptive Filter (354) is preceded by a PLL that drives the carrier frequency to zero. This results in the real part of the transmitted signal being received within distinct sections of the equalizer. The Com2000™ equalizer is specifically utilized for the PAM-5 signaling scheme.

In order to produce a near ideal inverse impulse response of the CAT5 channel, the Com2000™ Equalizers (354) and cancellers are initialized in a specific order. First, the ECHO & NEXT Cancellers determine and initialize the filter's coefficients with the Com2000™. Blind Equalization method. This process occurs during power up or a cold start in order to begin reduction of the channel noise and ISI impairment (see FIG. 10). Following the completion of Blind Equalization,, the Sender's and Receiver's Clocks are frequency and phase synchronized through the Com2000™

Phase Transfer method. This method is designed to avoid the transient mismatch between the digital samples of the equalizer and the taps of the filter.

After completion of the frequency and phase synchronization, the Feed Forward Equalizer (FFE) and Decision Feedback Equalizer (DFE) initialize the filter's coefficients with the Com2000™ Training Equalization method. This occurs during warm starts utilizing a pre-defined training sequence between the sending and receiving nodes. Once the FFEDFE Equalizer's coefficient are initially defined, the filter's coefficients can be updated with the Com2000™ Sounding Equalization method during normal data transfers to adapt to the time invariant noise of CAT5 channel communication.

The Com2000™ Adaptive Filter's use a PN training signal to adapt the equalizer during the initialization from which the filter coefficients are determined from the estimations of the channel. This adaptation process is performed on each of the CAT5 channels. The PN code for the training sequence of the Com2000™ is also used to define the signal signature of the sending node for security system implementation.

Once the receiver's filters is initialized, the receiver can receive data. Valid data is on the receiver bus when the Carrier Sense Block (347) detects the presence of two non-contiguous zeros occurring within any 10-bit boundary of the receiving data stream. The PMA Carrier Detect (347) process provides repeater clients an indication that a carrier event has been sensed and an indication if it is deemed an error. A carrier event is in error if it does not start with a Start of Stream Delimiter. The carrier detect (347) performs this function by continuously monitoring the code-bits being delivered by the receiving process and checks for specific patterns that will indicate non-IDLE activity and Start of Stream Delimiter bit patterns. The Carrier Detect (347) circuitry monitors the amplitude of signals on the twisted pair cable and has a threshold of 700 mV peak-to-peak.

The Receive Squelch circuitry (348) is enabled once the carrier-detect determines there is valid bus activity. The received squelch circuitry serves as a signal slicer and noise rejector. The squelch circuit is activated if the input signal amplitude decreases below the carrier detect de-assertion threshold of 400 mV peak-to-peak. This prevents a high bit error rate for transmission to the digital and protocol sections of the chip.

The Timing Recovery Circuit (353) for the 100/1000/2000BaseT generates a 125 MHz clock and re-timed data from the equalized signal. The Timing Recovery Circuit (353) uses an on-chip VCO for rapid acquisition. An external differential PLL loop filter (352) is connected between received differential pins.

Once the clock is recovered, the 125 MHz clock for 100/1000/2000BaseT is sent to the Synthesizer (343), which includes PLL frequency synthesis and the frequency synchronous divider functions necessary to generate all of the transmit Com2000™ 10/100/1000/2000Base-TX Ethernet clocks utilized in the chip design.

For 100BaseT, the receiving 5B data symbol for the 5B/4B decoder (59, FIG. 4) comes from the Serial to Parallel Conversion (61) function block. The output serial data stream of the Serial Descrambler (63) is fed into the Parallel Conversion (61) shift register for conversion. The serial data stream is converted to a 5-bit symbol data stream for the 5B/4B-decoder (59). The receiving blocks (60,61,62) of the Com2000™ 10/100Base-TX Ethernet are implemented using shift registers (61) and data latches (60,62).

The Serial Descrambler (63) operates opposite the Scrambler (45). In the Descrambler, the receiver subtracts the Pseudo Random (PN) Noise sequence of the Scrambler in order to recover the transmitted data. For 1000/2000BaseT, the data stream is fed into the SPAM-5 Demodulator (74) for quinary data recovery.

Electronic DNA Com2000™ Security System

The Com2000™ GPHY4 Security system provides Network Data Security that makes authorized access easy while prohibiting unauthorized intruders from accessing your host or server. The Com2000™ GPHY4 Security system addresses and resolves this and other security issues. The system's sophisticated algorithm provides the deterrence required for thwarting forged message attacks and terminal modification attacks.

The GPHY4 Ethernet Security system delivers Gigabit secured data communication over standard 8-wire Unshielded Twisted Pair (UTP) CAT5 cable through the use of the Com2000™ security system. The GPHY4 Security system is implemented at the media and Physical Interface to deliver a bandwidth efficient Security scheme to support Secured Multi-Gigabit signaling over existing and new CAT5 cabling. This is done through the utilization of a combination of Precision Frequency and Phase Cell Control Techniques, Station ID Code Multiple Access, and Security Algorithms to deliver scalable and robust Secured networks from 100 Mbps to 2000 Mbps data rate of Ethernet data over UTP Category 5 cable. The Com2000™ security system also provides backwards compatibility with the current Ethernet (802.3) communication channels to the SEC requirements at a data rate over the allowable bandwidth of the current CAT5 infrastructure.

The Com2000™ security system provides multi-layers of security for denying access to unauthorized users. The primary security feature, the Electronic Deterrence Network Address or E-DNA, brings system security to a physical level that makes it near impossible to duplicate. This E-DNA feature combined with the multi-level access algorithms that enables a network security system that ensures continued network integrity and offers the highest levels of data protection. The Com2000™ Security System is part of the complete Com2000™ system and therefore the security provided directly compliments the Gigabit and Wireless communication capabilities. This ensures maximum data throughput while utilizing superior security features down to the physical communication layer, whether it is wireless or wireline. Further details of the security system are provided below.

First, a review of the current position of the SEC standards and the inherent compliance challenges and then address the Com2000™ security technological advancement and the solutions for the next generation of secured data communication systems is provided.

The Com2000™ GPHY4 contains an Adaptive Filter that has a unique method of using a Pseudorandom Noise (PN) training signal to adapt the equalizer during the initialization of the system from which the filter coefficients are determined from the channel signal estimations. This adaptation process is performed on each of the CAT5 channels (4). The PN code or Station ID code for the training sequence of the Com2000™ is used to define the signal signature of the sending node for security system implementation.

Com2000™ E-DNA Security Physical Layer (PHY) Algorithm

Through the continuous delivery of the Clock Frequency and Phase Synchronization from the Com2000™ Master to the Slave during normal operation, a selected specific predefined Pseudo Random Noise (PN) sequence code is used as the preamble for the Master and Slave to perform the code auto-correlation level detection. This can be thought of as a Security Spread PN Coding for Node Signal Signature.

The security PN sequence is available when the Com2000™ communication channels are sending and listening to and from external nodes. Each channel performs a signal search in two-dimensional space, frequency and phase, for the received data signal. The channels perform a frequency search and then phase-lock to the received preamble PN sequence of the signal. The received signal offsets from the local reference are determined and compared with the expected frequency and phase cell of the sending node. This establishes a node specific electronic signature that is utilized for network security, E-DNA. This E-DNA frequency/phaser cell data is unique for each network node. For the sending data signal, the transmit reference carrier is phase locked to the local reference signal source and the encoded data is superimposed on the carrier for sending the data out on to the selected communication channel.

The Com2000™ Transceiver System extracts the station identification information (PN sequence preamble) from the data received from each station node and determines if the station is a proper group member. If the incorrect PN preamble is received, the LAN/WAN transceiver will keep attempting to extract the PN preamble from the data until the expected station preamble is received. When the correct station preamble is received the system transitions into the next mode. If a time out occurs, the system determines the source of the improper station preamble and generates a "security alert" report. This report will contain all available data regarding the time delta, frequency and phase information and the distance from the targeted node in order to provide the system administrator information for tracking and securing the intruder.

The Full duplex transfer technique is used for point-to-point phase and frequency transfer to obtain the highest precision and accuracy. Both the Slave and Master receive and transmit timing and frequency information through the communication channel protocol employing appropriate coding signals for Category 5 UTP infrastructure and pseudo noise (PN) coded signals for security.

The key to determining the security and channel performance coefficients of the Com2000™ 10/100/1000/2000Base-T signaling is generalized by code ID auto-correlation performance. Any Com2000™ transceiver must, in effect, perform an auto-correlation operation if it is to extract the signal clock and recover the data. The received signals are modulated by 2 separate PN codes, PN(I,t), PN(J,t). The signals are of equal strength and the noise affects are additive and can be considered as a separate noise channel.

The Com2000™ coherent auto-correlation operation delivers optimum equalizer coefficients where the coherent carrier (Com2000™ Frequency Transfer Technology) of the CAT5 125 Mbaud rate is multiplied by a phase synchronized replica of the desired code (PN(I,t)). The output of the multiplier is then integrated for some time T seconds to produce the "correlation" output. The correlation output level will be checked against the predetermined threshold level. If the output equals or exceeds the correlation threshold level and if T is equal to or a multiple of the period of the 125 Mbaud square waveform or approaches infinity, the correlation output is the true correlation and we have achieve the valid authentication. Otherwise, it will be a partial correlation function, which will cause a security alert to be generated. This is done for every data frame.

Security Media Access Control (MAC) Algorithm

Through the utilization of an absolute (traceable to NIST) or relative time and frequency PN reference source to determine the node level time and frequency offsets, other communication receivers, such as LAN and POTS communication receivers, can capitalize on the absolute reference resource and improve the communication security. The absolute time reference source enhances the time related encryption and decryption data transfer algorithms and security algorithms that take into account the precision time and its synchronization nature of the signals, and also the more intelligent security algorithms that take advantage of the physical communication time line.

The combined Com2000™ PHY, MAC and software provides a simple DES algorithm with a time variant key in order to provide sufficient protection from Message-modification attacks. Three additional algorithms provide sufficient protection from terminal-modification attacks. The system's first algorithm is the Time Division Password Access algorithm or TDPA, the second algorithm is the Connection Awareness Algorithm or CAA and the third access algorithm is the Carrier Signal Offset Algorithm or CSOA. These three algorithms operate in conjunction with each other to ensure a secure connection is made every time a node connects to another node or station.

The system's first algorithm is the Time Division Password Access algorithm or TDPA. It handles the connection integrity at the time when the connection is initially established. This constitutes the first pass of the connection-filtering algorithm. It utilizes the onboard synchronized clocks of the client/server & peer stations and user ID and password memory that enables the user to program a separate password for access validation.

The system's second algorithm is the Connection Awareness Algorithm or CAA. The algorithm handles connection integrity after the TDPA is validated. This is the second pass of the connection-filtering algorithm. It utilizes the onboard relative time offset and phase offset determination system of the Com2000™ synchronized network to determine whether the network connection IP location and time offset are within an acceptable range.

The system's third algorithm is the Carrier Signal Offset Algorithm or CSOA. It handles the connection integrity after the CAA is verified. This is the third pass of the connection-filtering algorithm. It utilizes the onboard precision frequency reference of the Com2000™ system to determine whether the network stations are within the frequency offset tolerance. This offset is the criteria of connection integrity checks.

Security Application Control (SW) Algorithm

The Secured Internet & Intranet system software is comprised of a secured application server and client which can be an Internet or Intranet web browser and an agent which mediates the communications. The Security Software provides the enabling secured communication scheme for systems that are synchronized to each other. The software, which also uses the synchronous nature in frequency and time of the Com2000™ TM communication system at the macro level, orchestrates the simple yet sophisticated methods of securing the connections on both terminal and message validation levels.

Once the server and the client are synchronized, the system further exercises the simple software Network DES (Decryption & Encryption Standard) algorithm with a dynamic encryption key identification, Time Division Password Access algorithm and Connection Awareness Algorithm for determining the integrity of the data and connection respectively. The system utilizes the DES algorithm to provide sufficient protection from message-modification attacks of data integrity validation and terminal-modification attacks of connection integrity validations.

For Software solution for the Wireless Secured Networking System, the Com2000™ system can determine the propagation delay for each of the nodes with respect to the virtual wireless switching hub by using the ensemble clock synchronization of the sending and receiving mobile stations and spread spectrum PN code sequence. The Com2000™ can determine at which time the transmitting stations are activated and when it is time for receipt of the data.

The TDPA algorithm capitalizes on this time synchronization feature of the wireless network nodes and provides a secured password scheme that relies on the knowledge of the absolute or relative time between the wireless communication nodes. The software on each node has the default password or table set upon power on. This table can be changed either by a embedded Web Browser Graphical User Interface (GUI) or standard operators station access commands. The contents of the table are correlated with each other in time. The previous password content and its associate relative time in the day or week or month in milliseconds will determine the key identification of the encrypted sending data. The key identification can also be derived from the modulated password indexing pattern of the table,such as staircase, triangle, sawtooth, or clipped triangle patterns. The default pattern is provided upon power on. In the case when the pattern is modified, the pattern selection code will always be sent to the receiving node for every encrypted message and the selected pattern will then be stored in the Non-Volatile RAM to be thenext power up default.

The Wireless Security system can operate in as either the client or the server. In a wireless network configuration, one of the Com2000™ Systems will be assigned as the Manager or the Server of the network. Each of the Com2000™ systems in the network will establish communication with each other through the transmission of the "Establishing Communication Message" on their unique PN code sequence. The encrypted sending message is continuously sent during this period so all stations can initialize the network configuration map. All of the encryption and decryption schemes, code and tables are exchanged in this initial phase of communications. This is performed every communication period (frame time) upon which the receiver of each station receives the message, receiving time tags, decode key identification pattern and can now determine the encryption key identification base for the receiving time. This is then used to derive the Key ID for decrypting the receiving messages. If the receiving message can not be authenticated, the "Establishing Communication Message" is again requested by the server for the unauthenticated client node.

The CSOA algorithm capitalizes on both the time and frequency synchronization feature of the wireless network nodes and provides a secured password scheme that relies on both the knowledge of the absolute and relative time and frequency of the communication nodes. The software for each node has the default password sets or table sets when powered on. The operation of this algorithm is the same as the TPDA with the exception that this algorithm requires that the sending and receiving node's frequency offsets are within a certain threshold value. This threshold value will be used as one of the parameters for the encryption and decryption key ID table.

To summarize, the Com2000™ Wireless security system provides multi-layers of security for denying access to unauthorized users. The primary security feature, the Electronic Deterrence Network Address or E-DNA, brings system security to a physical level that makes it near impossible to duplicate. This E-DNA feature combined with the multi-level access algorithms that enables a network security system that ensures continued network integrity and offers the highest levels of data protection. The Com2000™ Security System is part of the complete Com2000™ system and therefore the security provided directly compliments the Gigabit wireline and 10 Mb/s Wireless communication capabilities. This ensures maximum data throughput while utilizing superior security features down to the physical communication layer, whether it is wireless or wireline.

UNIVERSAL WIRELESS INFORMATION SYSTEM

This section describes an application of the present invention that uses time and frequency to provide encryption and decryption methods and network connection algorithms that enable a secured communication means on wireless networks. This application further provides IP management for mobile computing systems and dynamic IP transfer algorithms that uniquely apply to the mobile network communication. The application described, present the invention of wireless switch hub via relies on the reduction or elimination of wireless network data collisions through the development and invention of the Time Division Duplex Access (TDDA) and Dynamic Internet Protocol Access (DIPA) algorithms at the node level. The TDDA algorithm provides specific time-sliced data sending and receiving periods for each wireless network node. This enables the nodes of the network to have their own dedicated transmit period to ensure network access. The DIPA algorithm operates similar to the Ethernet wireline CSMA/CD collision avoidance method. The DIPA method is utilized in those wireless systems where precision time and frequency parameters are not available.

The Wireless System described hereafter, utilizes methods that improve wireless data communications, such as wireless information technology (IT) communication electronics and software systems, are relatively complex. Subsystems have to be integrated so that they perform cohesively to implement sophisticated system functions with minimal data transfer errors. In wireless applications, data transfer errors occur due to the level of data collisions and data drop-out caused by peer-to-peer communication that do not dynamically provide access to multiple nodes. Through the invention of the Wireless switching-hub, these problems are alleviated by providing multiple node access and broadcast capability through a common "virtual switch". In combination with the TDDA and DIPA time multiplexing and collision avoidance algorithms, respectively, the "virtual switch" provides a high wireless channel data rate of multi-node simultaneous access. As this is a "virtual switch", any node within a specified network has the capability to perform the switching and broadcast function. This greatly enhances the wireless network throughput and aggregate transmission time.

Another problem in wireless networking that is solved by this application involves the network IP connection of the mobile node. The determination of the IP address that will be used as the address for the mobile node and the effects of the propagation window on the maximum transmit time for the data collision detection process are important issues in mobile computing. This application provides a Network Mobile IP that makes mobile node access easy while preventing unauthorized intruders from reaching the host or server. The Network Mobile IP Access functions of the Network & Web IT Server Subsystem of this embodiment utilizes an IP assignment method that dynamically changes the IP as a function of time and relative position of the node from a server. (See FIG. 35). This application also includes embedded security algorithms that prevent message modification attacks and terminal modification attacks on both the mobile node and the server

SUMMARY OF ALGORITHMS

The following paragraphs provide a quick summary of the algorithms that are used in this application and will provide further clarity to this description by reference to E-DNA Technology section. The system's first algorithm is the Time Division Password Access algorithm or TDPA. It handles the connection integrity at the time that connection is requesting to be established. This is the first pass of the connection-filtering algorithm. It utilizes the onboard relative time of the client, server and peer stations as well as password memory that enables the user to program separate passwords for each access validation. The system's second algorithm is the Connection Awareness Algorithm or CAA. This algorithm handles connection integrity at the time which the connection is already established. This is the second pass of the connection-filtering algorithm. It utilizes the onboard relative time offset to determine whether the network connection location and time offset is valid.

The system's third algorithm is the Carrier Signal Offset Algorithm or CSOA. It handles the connection integrity at the time for which the connection is already made. This is the third pass of the connection-filtering algorithm. It utilizes the onboard relative frequency reference to determine whether the network stations are within the frequency offset tolerance. This offset will be the criteria for periodic connection integrity checks.

The TDPA, CAA and CSOA algorithms provide system security by preventing Terminal-Modification Attacks and eliminating network data encroachment by non-valid users. These security algorithms are embedded within the mobile system and do not require high cost Fast Encryption-Decryption circuitry.

Figures 1, 7E:
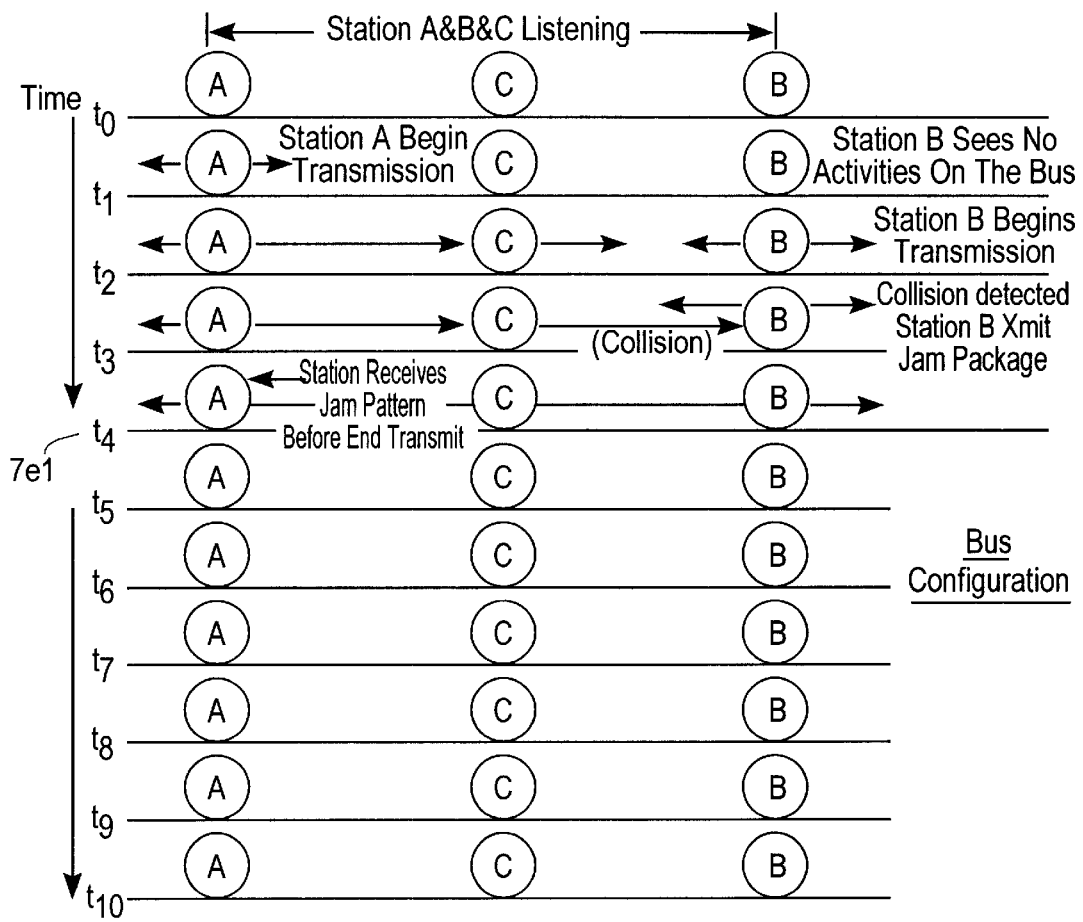
Figures 2, 7E:
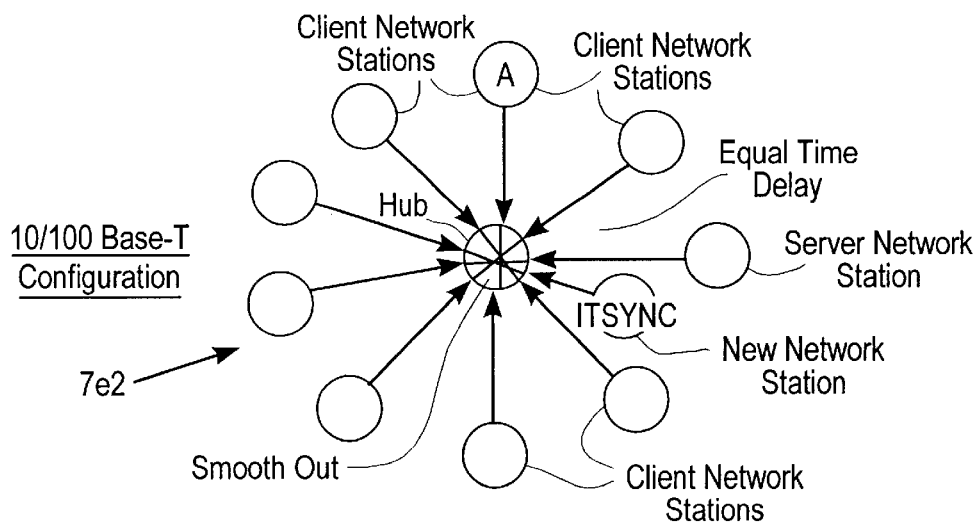
FIG. 7E is Data Collision Time Sequence Diagram for both Bus and Star Topologies of the TDDA Algorithm. It is used to illustrate the methods of improving the current bandwidth of the existing networking infrastructure.

The wireless network requires a similar collision avoidance (CSMA/CA) configuration for as the baseband Ethernet system illustrated in (FIG. 7e). The stations A,B,C . . . , F are the existing network system nodes. For the wireless applications, the node C is the Server in the client server environment or Peer in the peer-to-peer communication environment, the virtual wireless network Hub is a pure packet wireless data repeater hub and the third system node is a new networking station utilzing the Com2000™ Wireless IT Algorithms. The primary goal of the modified CSMA/CA algorithm access method is to minimize or to eliminate the potential for data collision and to provide corrective action if collisions do occur for wireless data communication network system.

Since Com2000™ system can determine the relative propagation delay for each of the nodes with respect to the hub, it can determine which transmitting station can detect the data collision signal first. As illustrated in the (FIG. 7e), the time delay ring is the spherical common radius of the networking nodes. Some nodes reside on the outer layer of the ring and some nodes reside on the inner layer of the ring, such as Station A.

The Carrier Sense wireless signaling, can be sensed by any wireless station to note whether another station is currently transmitting. If a carrier signal is found, the station waiting for free transmission time will continue to monitor the wireless channels. When the current transmission ends, the station will then transmit its data while checking the wireless channel for data collisions. This is done through the detection of the signal equalization noise level at the transceiver front end. Once the collision is detected, the wireless transmitting station will cease transmission of data and initiate transmission of a Jam Pattern. The Jam Pattern ensures that the collision lasts long enough to be detected by all stations on the network. Therefore, transmission of a long Jam Pattern provides a means for inhibiting (Red Light) the network nodes from transmitting any data since it is used as the data collision message.

The collision signal (certain signal equalization code level) can also be sent by the Com2000™ system for determining which node is currently using the network for data transmission. This is possible as the sending node's front end, which first senses the collision signal, will stop transmitting data and will send out the Jam pattern. The first signal received by the Com2000™ system will be the next node to transmit data. With capability of permitting and inhibiting data flow, the Com2000™ wireless system behaves as the smart traffic light at an intersection and is able to control the traffic and avoid collisions that happen most often when networking traffic increases.

Referring now to (FIGS. 7F and 7G), the Network Data Security for the Wireless Network Information Data Communication portion of the Com2000™ System is shown. More specifically, a software flow chart of the Time Division Password Access or TDPA and Carrier Signal Offset or CSOA Algorithms is provided. The TDPA and CSOA algorithms serve to deter the Terminal Connection intrusions of Wireline or Wireless Networking Communications. Both algorithms will also be used to prevent the Terminal-Modification Attacks. The Com2000™ Wireless Secured Networking System determines the propagation delay for each of nodes with respect to the wireless Com2000™ "virtual" hub using the relative clock synchronization of the sending and receiving stations. This provides details about the time the transmitting stations are activated and when data will be received.

The TDPA algorithm (7f1) capitalizes on this relative time synchronization feature of the network nodes and provides a secured password scheme that relies on the knowledge of the relative time between communication nodes. The software on each node has the default password or table set upon power up. The contents of the table are correlated with each other in relative time. The previous table contents and its associated relative time in the day or week or month in milliseconds will determine the key ID of the encrypted sending data (7f3). The key ID can also be derived from the modulated (7f4) password indexing pattern of the table such as a staircase, triangle, sawtooth, or clipped triangle pattern. The default pattern is provided upon power up. In case the pattern is modified, the pattern selection code will always be sent to the receiving node for every encrypted message sent (7f5) and the selected pattern will then be stored in the Non-Volatile RAM of the receiving node for next power up default password determination (7f6).

Each of the Com2000™ Wireless system nodes can operate as either the client or the server. In a wireless network configuration, one of the Com2000™ System will be the Manager or the Server of the network. Each of the Com2000™ system nodes in the network establish initial communication with each other by transmitting out an "Establishing Communication Message" with the unique node specific code sequence. The encrypted message is continuously transmitted during this period so all stations can initialize the network configuration map. All of the encryption and decryption schemes, code and tables are exchanged in this initial phase of communications. When this is complete the receiver of each station receives the message, tags the receiving time, and decodes key ID pattern. This process is repeated every communication time frame due to the mobile nature of the systems on the network. The derived Key ID is used for decrypting received messages (7f10) from authenticated system nodes. If a received message cannot be authenticated, the "Establishing Communication Message" is again requested by the server from the non-authenticated client node.

The CSOA algorithm (7G1) capitalizes on both the relative time and frequency feature of the network nodes and provides a secured password scheme that relies on the knowledge of the relative time and frequency of the communication nodes. The software on each node has the default password set upon power up. This operation is the same as the TDPA with the exception that this algorithm requires the sending and receiving node's frequency offset be within a certain threshold value. This maximum threshold value will be used as one of the parameters for encryption and decryption in the key ID table.

The Means and Methods for Wireless Network Communication networking system is described here, This section of the paper describes the Com2000™ system's Dynamic Internet Protocol Access or DIPA for a Wireless Networking Communication System. The DIPA algorithm will be used to replace the Carrier Sense Multiple Access CSMA/CD software algorithm that is currently used for wireline networking configurations.

As a reference for a wireless networking configuration, the similar CSMA/CD method for a baseband Ethernet system is illustrated in FIG. (7e). The stations A,B,C . . . , F are the existing networking station nodes. The node C is the Server in the client server environment communication environment, the virtual wireless network Hub is a pure packet data wireless repeater hub and a third station is the Com2000™ system.

For the wireless networking configuration, the DIPA method for a passband wireless Ethernet system also can be illustrated in (FIG. 7e) as in the wireline configurations. The stations A,B,C . . . , F are the existing networking station nodes. The primary goal of the wireless TDDA algorithm is to eliminate or avoid the potential for wireless data collision. The primary goal of the wireless DIPA algorithm is to provide corrective action if data does collide.

The Com2000™ Wireless Networking System can determine the propagation delay for each of nodes with respect to the wireless Com2000™ hub using the relative clock synchronization of the sending and receiving stations in combination with a predetermined code sequence. The Com2000™ wireless hub can determine which station will transmit next based on the TDDA and DIPA algorithmsThis current scheme of wireless communication avoids data collision since the transmitting and receiving stations have the knowledge of the data traffic on the wireless bus.

The Dynamic IP Access or DIPA algorithm is illustrated in (FIGS. 7A1, 7B, 7C, 7D). The algorithm begins with the calculation of the initial wireless networking control message (7A102). Each of the Com2000™ systems can operate in as either the client or the server. In a network configuration, one of the Com2000™ Systems will be assigned as the Manager or the Server of the network. Each of the Com2000™ systems in the network will establish communication with each other (7a103) by transmitting an "Establishing Communication Message" with their unique code sequence. This message continuously transmitted during this period so all network stations can initialize their internal network configuration map. During this period, the receiver of each station decodes the data (7a104) for relative time and frequency determination of all the transmitting stations (7a105). The stations then determine the relative frequency and time offset values (7a106) for each of the network station.

In addition to the timing information included in the "Establishing Communication Message" the position information of each of the transmitting nodes. The algorithm then decodes the position information of the received code sequence (7a107) and determines the geometric distance for the initial estimation of propagation delay map (7a108). This message can be used as an indication of a new mobile connection was established. The Connection Awareness Logic of the wireless networks requires connection and disconnection broadcast messages so that the propagation delay maps and the network configuration maps are updated accordingly. This process will eventually establish all of the node-to-node maps, node-to-server maps, server-to-server maps and server-to-node maps.

Based on the calculated geometric distance between system nodes and the respective server, if a node is in the "Soft Handoff Zone" (7a109), the server node will try to establish a 'Soft IP Handoff' with the next nearest server (7a110). This ensures that mid-stream data transmission is not interrupted as the mobile IP station seamlessly transition over to the new IP servomode. The Soft IP Handoff algorithm is similar to the current digital CDMA cellular phone handoff scheme. The two server stations will track the incoming mobile station's code sequence simultaneously until one of the server stations terminates the tracking when the correlated signal strength drops below a certain carrier to signal noise ratio. This hand-off method will ensure that data dropouts will not occur Upon determination of the propagation time delay (7a111), the network relative time and frequency offset and Propagation Delay maps are updated (7a112). The dynamically allocated transmit and receive time for each of the system nodes that reside in the Connection Awareness Maps are also updated (7a113). The maximum transmission time for each node will be determined (7a114) for dynamically establishing the TCP/IP collision window adjustment range (7a115). When all of the node's timing related data is calculated, the server will calculate the optimal transmit time and receive time (7a116) for each based on the priority level of the transmission data of each type of node (manager, server, "virtual switch", etc.).

The Connection Awareness Maps and its timing related data is broadcast to all of the client nodes during every frame time. This allows the Com2000™ wireless system to provide adaptive bandwidth allocation and communication times for based on the needs of each system node. The extensive wireless transmission node will be allocated large blocks of transmitting time as opposed to the idle nodes that will be allocated minimal bandwidth for data transmission.. The adaptive bandwidth cycle is the frame time. The sending node therefore defragment its transmitted message into the appropriate Maximum Transmit Unit (MTU) (7a117). The frame time is a function of how fast the mobile IP client or server can travel in time or how long the optimum MTU transmit time can contain the moving propagation time delay time with respect to the server node. By updating the control parameter of the clientevery sending and receiving node will know the adjacent nodes and servers as well as when it is time to transmit and time to receive. This information can be used with an overlay of the other parameter maps to provide the server or the user with the capability of networking or information technology situation awareness.

The communications and security algorithms can now be used to enable a distributed computing model software algorithm that will be used for Wireless Remote Computing and Data Delivery. The Com2000™ Wireless Common Web Information Environment (WOE) is a distributed software operating environment. It is the "middleware" between the Com2000™ System and the host. As illustrated in FIG. 1e, the host can either be a Client (Tier 1) 82, an application server (Tier 2) 84, a Database Server (Tier 3) 83 or the General Purpose Data acquisition system 81.

The WOE is built around the Com2000™ System Operating Environment (OE) software and is used to allow the IT technology software to be integrated very easily into the environment and transition easily into the Com2000™ information technology applications. The WOE also accommodates interfaces from a variety of hand-held PC Bus platforms, software environments, and other application software on multi-vendor platforms. The WOE must be compatible with several commercial communication standards.

The WOE is a virtual Wireless Web Operating Environment layer which can resides on any of the Operating Systems. It operates as a multiprocessing version of an OS kernel. It extends many OS calls to operate seamlessly across multiple processing nodes as illustrated in FIG. 6. The WOE is designed so that tasks that form applications can reside on several processors and platform nodes and still exchange data, communicate, and synchronize as if they are running on a single computer.

When the WOE receives a system call whose target object ID indicates that the object does not resides on the node from which the call is made, the WOE will process the system call as a Remote Service Call (RSC). In general, an RSC involves two nodes. The source node is the node from which the system call is made. The destination node is the node on which the object of the system call resides. To complete an RSC, the WOE on both source and destination nodes must carry out a sequence of well-coordinated actions and exchange a number of inter-node packets. Object ID creation and deletion calls are supported. As illustrated in (FIG. 37), the WOE's distributed and remote computing functions comprised of Tier 1 Web interface 372, Online Database Server/Agent 374, Application Server/Agent 373 and Remote Computing Agent 371.

The Tier 1 interface or Embedded HTTP Server/Agent 372 handles the WEB Page interface and updates the display parameters. The Online Database Server/Agent 374 handles the interface with external and online database systems. The agent of Application Target System (84) allows the server of Web GUI and Application's executable to be downloaded and uploaded to and from the Application Target System 84. This is merely the interface conduit between the sender (Client) and the receiver (Application Server).

Tier 2 interface or Application Server/Agent 373 handles the interface of the Application Target System's Operating system for spawning and terminating a client task requests. Tier 3 interface or Online Database Server/Agent 374 handles the interface of Remote Database system for up and downloading the results of the remote executions or the distributed running tasks.

The Network & Web Server/Client Subsystem is also responsible for handling the Wireless Network Information Data Communication portion of the Com2000™ System. Please refer to the summary of the invention and software flow chart of the Dynamic IP Access or DIPA Algorithm in FIGS. 7A0,7A1, 7B,7C and 7E for further details.

Each level of the three tier computing model are interfaced with each other by the Com2000™ System, which acts as an agent. The clients are low-powered desktop computers, which are simply used to display information to the user and to return user feedback to the application server system. The application server system is a combination of a powerful remote computing system and Com2000™ system that are executing core algorithms of the application through a Com2000™ agent. The system is simply a low-powered handheld embedded communicator/computer. The Client, Application, and Data Base agents all reside in the Com2000™ System software.

The wireless system's agent is comprised of Online Database Server/Agent, embedded HTTP Server/Agent and Application Server/Agent. The application agent allows the executable file to be uploaded or downloaded to or from the application server. It is part of Com2000™ ITSync system software and is behaved as the interface conduit between the internet & intranet client and the application server. The Remote Computing Agent for Com2000™ ITSync has two functions: one for the client and one for the server host and it is transparent to the user. All phases of operation for Client and Server Remote Computing Agent software will be activated when the Com2000™ ITSync system is housed inside a either client or Server communicator or computers.

The wireless Server/Remote Computing Agent portion of the software will be activated when the Com2000™ system is housed inside the wireless application server. The agent software has three phases of operation. The first phase is the Client/Remote Computing Agent Communication and Data transferring phase, the second phase of operation is the Application Server/Host Data transferring phase and the last phase is the Application Server/Host execution phase. Each of these phases of operation will only be activated when the Com2000™ system is housed inside a server.

The Client/Remote Computing Agent of Com2000™ system interfaces with the Client computers for sending data and executable files over the wireless internet or intranet. This means that the Com2000™ system allows a Client computer to interface with the remote Host Server file system for downloading the client's executable image file to and from the host.

The Server agent software of Com2000™ system will interface with the Client agent through the client or user's web page requests. The server agent then transfers the specified executable results to the Client's computer from the internal Com2000™ Online Database Subsystem across the wireless internet or intranet for status display web pages. When the Server/Remote Computing Agent functions are exercised, which allows the interface to the Com2000™ Data Base Subsystem application server file system, the system agent has the capability to interface to the application server operating system for spawning and terminating a client delivered executable task.

A Mobile Internet and Intranet Wireless Network and Data Communication System is utilizes a relative time and position determination system, a wireless networking communication system, an IP Server Map and a Mobile IP Command and Control System. It is a system that uses a three-tier client server connection model. The system uses the time and positioning data to handle the P Server Soft Handoff. (See FIG. 1B). The wireless Web browser is the platform for lightweight hypertext-based user interface client (Tier 1) which correlates server maps with client's relative time and position and communicates with the network IP server (Tier 2). This is done through the network IP connection requests that is handled by an agent software of Com2000™ ISync system. The Database server agent software of the Com2000™ interface with the Host Database Server (Tier 3 is used for updating the network IP server with pertinent connection data.

What is claimed is:

1. A method for increasing bandwidth of signals between a transmitting node and a receiving node coupled over a communications channel comprising the steps of:

receiving time synchronization data;

synchronizing the transmitting and receiving node using the synchronization data received;

measuring the capacity of the communications channel between the nodes;

calibrating the communications channel to remove an intrinsic skew and an extrinsic skew, including the steps of:

calculating an internal phase offset and an internal frequency offset for the communication channel using a first reference signal to identify said intrinsic skew, internally calibrating the channel using said internal phase offset and said internal frequency offset to substantially remove said intrinsic skew, calculating an external phase offset, an external frequency offset and a distortion delay variation for the communication channel using a first reference signal to identify said extrinsic skew, measuring a value of a power sum near end cross talk over the communications channel representing interference from a second communication channel; and externally calibrating the channel using said external phase offset, said external frequency offset, said distortion delay variation, and said power sum near end cross talk to substantially remove said extrinsic skew;

equalizing channel and signal distortions;

coding the signal to the amplitude and frequency of the receiving node;

sampling clock signals of the nodes; and delivering phase delay control to the nodes in response to the sampled clock signal of one of the nodes exceeding a phase interval.

2. A system for increasing bandwidth of signals between a transmitting node and a receiving node coupled over a communications channel comprising the steps of:

receiving means for receiving time synchronizing data;

synchronizing means for synchronizing the transmitting and receiving node using the synchronization data received;

measuring means for measuring the capacity of the communications channel between the nodes;

calibrating means calibrating the communications channel to remove an intrinsic skew and an extrinsic skew, including the steps of:

internal phase offset means for calculating an internal phase offset and in internal frequency offset for the communication channel using a first reference signal to identify said intrinsic skew, internal calibrating means for internally calibrating the channel using said internal phase offset and said internal frequency offset to substantially remove said intrinsic skew, external phase offset means for calculating an external phase offset, an external frequency offset and a distortion delay variation for the communication channel using a first reference signal to identify said extrinsic skew, near cross talk measuring means for measuring a value of a power sum near end cross talk over the communications channel representing interference from a second communication channel; and external calibrating means for externally calibrating the channel using said external phase offset, said external frequency offset, said distortion delay variation and said power sum near end cross talk to substantially remove said extrinsic skew;

equalizing means for equalizing channel and signal distortions;

coding means for coding the signal to the amplitude and frequency of the receiving node;

sampling means for sampling clock signals of the nodes; and control means for delivering phase delay control to the nodes in response to the sampled clock signal of one of the nodes exceeding a phase interval.

3. The method of claim 1, further comprising the step of:

measuring a value of a power sum far end cross talk over the communications channel representing a ratio of signal attenuation to a far end cross talk;

wherein said step of externally calibrating the channel uses said power sum far end cross talk.

4. The system of claim 2, further comprising:

far end cross talk measuring means for measuring a value of a power sum far end cross talk over the communications channel representing a ratio of signal attenuation to a far end cross talk;

wherein said external calibrating means calibrates the channel using said power sum far end cross talk.

* * * * *